US010874122B2

(12) United States Patent
Bromley

(10) Patent No.: US 10,874,122 B2
(45) Date of Patent: Dec. 29, 2020

(54) BEVERAGE COMPOSITIONS CONTAINING NON-POLAR COMPOUNDS

(71) Applicant: Philip J. Bromley, Fullerton, CA (US)

(72) Inventor: Philip J. Bromley, Fullerton, CA (US)

(73) Assignee: Virun, Inc., Pomona, CA (US)

(*) Notice: Subject to any disclaimer, the term of this patent is extended or adjusted under 35 U.S.C. 154(b) by 0 days.

(21) Appl. No.: 13/815,193

(22) Filed: Feb. 8, 2013

(65) Prior Publication Data

US 2013/0309362 A1 Nov. 21, 2013

Related U.S. Application Data

(60) Provisional application No. 61/633,431, filed on Feb. 10, 2012, provisional application No. 61/743,466, filed on Sep. 4, 2012.

(51) Int. Cl.
A23L 2/52 (2006.01)
A23L 2/68 (2006.01)
A23L 2/385 (2006.01)
A23L 33/155 (2016.01)
A23L 33/12 (2016.01)
A23L 33/16 (2016.01)

(52) U.S. Cl.
CPC .......... A23L 2/52 (2013.01); A23L 2/385 (2013.01); A23L 2/68 (2013.01); A23L 33/12 (2016.08); A23L 33/155 (2016.08); A23L 33/16 (2016.08); A23V 2002/00 (2013.01)

(58) Field of Classification Search
None
See application file for complete search history.

(56) References Cited

U.S. PATENT DOCUMENTS

| | | | |
|---|---|---|---|
| 2,680,749 A | 6/1954 | Cawley et al. | 549/410 |
| 3,102,078 A | 8/1963 | Robeson et al. | 514/458 |
| 3,538,119 A | 11/1970 | Grant | 549/410 |
| 3,917,859 A | 11/1975 | Terada et al. | 426/602 |
| 4,353,365 A | 10/1982 | Hallworth et al. | 128/203.15 |
| 4,524,769 A | 6/1985 | Wetterlin et al. | 128/203.15 |
| 4,572,915 A | 2/1986 | Crooks | 514/458 |
| 4,665,204 A | 5/1987 | Wirth | 549/410 |
| 4,670,285 A | 6/1987 | Clandinin et al. | 426/602 |
| 4,835,002 A | 5/1989 | Wolf et al. | 426/590 |
| 4,849,227 A | 7/1989 | Cho | 424/498 |
| 4,867,986 A | 9/1989 | Desai et al. | 424/464 |
| 4,916,163 A | 4/1990 | Shah et al. | 514/593 |
| 5,035,237 A | 7/1991 | Newell et al. | 128/203.15 |
| 5,167,950 A | 12/1992 | Lins | 424/47 |
| 5,179,122 A | 1/1993 | Greene et al. | 514/458 |
| 5,234,695 A | 8/1993 | Hobbs et al. | 424/489 |
| 5,239,993 A | 8/1993 | Evans et al. | 128/203.15 |
| 5,397,591 A | 3/1995 | Kyle et al. | 426/602 |
| 5,407,957 A | 4/1995 | Kyle et al. | 514/547 |
| 5,415,162 A | 5/1995 | Caspser et al. | 128/203.12 |
| 5,430,021 A | 7/1995 | Rudnic et al. | 514/10.1 |
| 5,492,938 A | 2/1996 | Kyle et al. | 514/786 |
| 5,583,105 A | 12/1996 | Kovacs et al. | 514/20.5 |
| 5,593,682 A | 1/1997 | Papas et al. | 424/401 |
| 5,597,595 A | 1/1997 | Dewille et al. | 426/74 |
| 5,711,983 A | 1/1998 | Kyle et al. | 426/635 |
| 5,715,810 A | 2/1998 | Armstrong et al. | 128/230.15 |
| 5,798,333 A | 8/1998 | Sherman et al. | 514/11 |
| 5,891,469 A | 4/1999 | Amselem | 424/451 |
| 6,045,826 A | 4/2000 | Borowy-Borowski et al. | 424/451 |
| 6,048,566 A | 4/2000 | Behnam et al. | 426/590 |
| 6,054,261 A | 4/2000 | Masterson | 435/1.2 |
| 6,056,971 A | 5/2000 | Goldman | 424/439 |
| 6,136,851 A | 10/2000 | Bonte et al. | 424/455 |
| 6,162,474 A | 12/2000 | Chen et al. | 426/72 |
| 6,180,130 B1 | 1/2001 | Chen et al. | 424/439 |
| 6,184,255 B1 | 2/2001 | Mae et al. | 514/720 |
| 6,193,985 B1 | 2/2001 | Sonne et al. | 424/400 |
| 6,200,550 B1 | 3/2001 | Masterson et al. | 424/49 |
| 6,267,985 B1 | 7/2001 | Chen et al. | 424/451 |
| 6,284,268 B1 | 9/2001 | Mishra et al. | 424/455 |
| 6,300,677 B1 | 10/2001 | Chopra | 514/715 |

(Continued)

FOREIGN PATENT DOCUMENTS

| | | |
|---|---|---|
| DE | 10 2005 049664 | 4/2007 |
| EP | 1 055 374 | 11/2000 |

(Continued)

OTHER PUBLICATIONS

Letter/Written Disclosure of the Information Disclosure Statement for the above-referenced application, mailed on Jan. 14, 2014, 2 pages.
Boukley, B. "'Next Generation' Omega-3 sports drink set to hydrate America" Beveragedaily.com Aug. 1, 2013 [online] [Retrieved from:<URL:beveragedaily.com/content/view/print/804977] [accessed on Aug. 16, 2013], 2 pages.
Boukley, B. "Runaway Omega-3 beverage demand 'can be scary'—Virun CEO" Beveragedaily.com Dec. 20, 2012 [online] [Retrieved from:<URL:beveragedaily.com/content/view/print/711158] [accessed on Aug. 16, 2013], 2 pages.
Boukley, B. "Searching for the Holy Grail: Science-backed functional beverages" Beveragedaily.com Mar. 3, 2013 [online] [Retrieved from:<URL:beveragedaily.com/content/view/print/749075] [accessed on Aug. 16, 2013], 2 pages.

(Continued)

Primary Examiner — Tamra L. Dicus
(74) Attorney, Agent, or Firm — Dentons US LLP; Stephanie Seidman

(57) ABSTRACT

Provided are beverage compositions containing non-polar compounds that retain one or more organoleptic properties after formulation as compared to beverage compositions that do not contain the non-polar compounds. Also provided are methods for producing beverage compositions that contain non-polar compounds such as essential fatty acids, including omega-3 fatty acids, omega-6 fatty acids, conjugated fatty acids, and other fatty acids; phytochemicals, including phytosterols and carotenoids; oil soluble vitamins; alpha lipoic acid; other oils; and coenzymes, including coenzyme Q10, and other oil-based additives.

29 Claims, No Drawings

(56) References Cited

U.S. PATENT DOCUMENTS

| | | | |
|---|---|---|---|
| 6,335,022 B1 | 1/2002 | Simonnet et al. | 424/401 |
| 6,378,519 B1 | 4/2002 | Davies et al. | 128/203.21 |
| 6,383,471 B1 | 5/2002 | Chen et al. | 424/45 |
| 6,391,370 B1 | 5/2002 | Rogers et al. | 426/611 |
| 6,403,116 B1 | 6/2002 | Anderson et al. | 424/439 |
| 6,441,050 B1 | 8/2002 | Chopra | 514/675 |
| 6,455,512 B1 | 9/2002 | Ward et al. | 514/59 |
| 6,509,044 B2 | 1/2003 | Van Den Braak et al. | 426/2 |
| 6,534,085 B1 | 3/2003 | Zeligs | 424/451 |
| 6,632,443 B2 | 10/2003 | Borowy-Borowski et al. | 424/400 |
| 6,635,293 B2 | 10/2003 | Fullmer et al. | 426/250 |
| 6,761,903 B2 | 7/2004 | Chen et al. | 424/451 |
| 6,870,077 B2 | 3/2005 | Kenaschuk | 800/298 |
| 6,919,378 B2 | 8/2005 | Jacobs et al. | 514/618 |
| 6,977,166 B1 | 12/2005 | Ratledge et al. | 435/134 |
| 6,982,281 B1 | 1/2006 | Chen et al. | 514/458 |
| 6,982,282 B1 | 1/2006 | Lambert et al. | 424/405 |
| 7,015,252 B2 | 3/2006 | Fujii et al. | 514/690 |
| 7,026,361 B2 | 4/2006 | Minemura et al. | 516/75 |
| 7,030,102 B1 | 4/2006 | Madhavi et al. | 514/58 |
| 7,094,804 B2 | 8/2006 | Behnam | 514/440 |
| 7,115,565 B2 | 10/2006 | Gao et al. | 514/9 |
| 7,145,044 B2 | 12/2006 | Ueda et al. | 568/823 |
| 7,182,950 B2 | 2/2007 | Garti et al. | 424/401 |
| 7,273,624 B2 | 9/2007 | Rosenberg et al. | 424/489 |
| 7,374,779 B2 | 5/2008 | Chen et al. | 424/451 |
| 7,906,140 B2 | 3/2011 | Bromley et al. | 424/450 |
| 8,252,323 B2 | 8/2012 | Bromley | 424/450 |
| 8,282,977 B2 | 10/2012 | Bromley | 426/72 |
| 8,337,931 B2 | 12/2012 | Bromley | 426/602 |
| 8,414,914 B2 | 4/2013 | Bromley et al. | 424/450 |
| 8,741,373 B2 | 6/2014 | Bromley | 514/560 |
| 8,765,661 B2 | 7/2014 | Bromley | 514/1 |
| 9,320,295 B2 | 4/2016 | Bromley | 424/94.1 |
| 9,351,517 B2 | 5/2016 | Bromley | 424/94.1 |
| 9,693,574 B2 | 7/2017 | Bromley | 426/72 |
| 9,788,564 B2 | 10/2017 | Bromley | 514/1 |
| 2001/0025058 A1 | 9/2001 | Borowy-Borowski et al. | 541/772.4 |
| 2003/0072798 A1 | 4/2003 | Schwarz | 424/456 |
| 2003/0165438 A1 | 9/2003 | Behnam | 424/49 |
| 2003/0165572 A1 | 9/2003 | Auriou | 264/5 |
| 2003/0180352 A1 | 9/2003 | Patel et al. | 424/465 |
| 2004/0033202 A1 | 2/2004 | Cooper et al. | 424/46 |
| 2004/0043043 A1 | 3/2004 | Schlyter et al. | 424/400 |
| 2004/0072330 A1 | 4/2004 | Ratledge et al. | 435/258.1 |
| 2004/0086619 A1 | 5/2004 | Zhong et al. | 426/590 |
| 2004/0105889 A1 | 6/2004 | Ryde et al. | 424/489 |
| 2004/0115287 A1 | 6/2004 | Chen et al. | 424/731 |
| 2004/0121043 A1 | 6/2004 | Behnam | 514/458 |
| 2004/0219274 A1 | 11/2004 | Cook | 426/590 |
| 2005/0008581 A1 | 1/2005 | Parkhideh | 424/46 |
| 2005/0037073 A1 | 2/2005 | Schwarz | 42/464 |
| 2005/0092969 A1 | 5/2005 | Ueda et al. | 252/299 |
| 2005/0095233 A1* | 5/2005 | McCleary et al. | 424/94.1 |
| 2005/0208082 A1 | 9/2005 | Papas et al. | 424/400 |
| 2005/0260752 A1 | 11/2005 | Wilding et al. | 435/373 |
| 2005/0281772 A1 | 12/2005 | Bromley et al. | 424/70.14 |
| 2006/0051462 A1 | 3/2006 | Wang | 426/72 |
| 2006/0088558 A1 | 4/2006 | Jandzinski et al. | 424/400 |
| 2006/0121172 A1* | 6/2006 | Portman | A23L 2/39 |
| | | | 426/590 |
| 2006/0165735 A1 | 7/2006 | Abril | 426/601 |
| 2006/0165769 A1 | 7/2006 | Hyatt et al. | 424/456 |
| 2006/0222716 A1 | 10/2006 | Schwarz et al. | 424/490 |
| 2007/0003614 A1 | 1/2007 | Chen et al. | 424/456 |
| 2007/0043106 A1 | 2/2007 | Behnam | 514/440 |
| 2007/0087104 A1 | 4/2007 | Chanamai | 426/602 |
| 2007/0104741 A1 | 5/2007 | Murty et al. | 424/400 |
| 2007/0104780 A1 | 5/2007 | Lipari et al. | 424/456 |
| 2007/0141203 A1 | 6/2007 | Cook et al. | 426/72 |
| 2007/0141224 A1 | 6/2007 | Zawistowski | 426/611 |
| 2007/0160738 A1 | 7/2007 | Van Bokkelen et al. | 426/601 |
| 2007/0166411 A1 | 7/2007 | Anthony et al. | 424/750 |
| 2007/0184117 A1 | 8/2007 | Gregory et al. | 424/489 |
| 2007/0207196 A1 | 9/2007 | Zhang | 424/450 |
| 2007/0213234 A1 | 9/2007 | Yaghmur | 508/110 |
| 2007/0218012 A1 | 9/2007 | Bittorf et al. | 424/45 |
| 2007/0218138 A1 | 9/2007 | Bittorf et al. | 424/488 |
| 2007/0248668 A1 | 10/2007 | Michaelis et al. | 424/464 |
| 2007/0298083 A1 | 12/2007 | Mehansho et al. | 426/590 |
| 2007/0298099 A1 | 12/2007 | Peresypkin et al. | 424/456 |
| 2007/0298156 A1 | 12/2007 | Mehansho et al. | 426/590 |
| 2008/0058418 A1 | 3/2008 | D'Angelo et al. | 514/560 |
| 2008/0070981 A1 | 3/2008 | Borowy-Borowski et al. | 514/458 |
| 2008/0187632 A1* | 8/2008 | Smith | B65D 85/73 |
| | | | 426/112 |
| 2008/0233056 A1 | 9/2008 | Berl | 424/49 |
| 2008/0254188 A1 | 10/2008 | Borowy-Borowski et al. | 424/400 |
| 2009/0018186 A1 | 1/2009 | Chen et al. | 426/590 |
| 2009/0162483 A1* | 6/2009 | Constantine | A23L 2/52 |
| | | | 426/62 |
| 2009/0297491 A1 | 12/2009 | Bromley | 424/94.1 |
| 2009/0297665 A1 | 12/2009 | Bromley | 426/72 |
| 2009/0317532 A1 | 12/2009 | Bromley | 426/590 |
| 2010/0041622 A1 | 2/2010 | Bromley et al. | 514/52 |
| 2010/0080785 A1 | 4/2010 | Berl | 424/94.1 |
| 2010/0104730 A1 | 4/2010 | Mehansho et al. | 426/590 |
| 2010/0136175 A1 | 6/2010 | Skiff et al. | 426/72 |
| 2010/0166915 A1 | 7/2010 | Sande et al. | 426/477 |
| 2010/0260913 A1 | 10/2010 | Horlacher et al. | 426/546 |
| 2010/0279413 A1 | 11/2010 | Fain | 435/406 |
| 2011/0008305 A1 | 1/2011 | Yu et al. | 424/94.1 |
| 2011/0008514 A1* | 1/2011 | Spelman et al. | |
| 2011/0015266 A1 | 1/2011 | Hanefeld et al. | 252/363.5 |
| 2011/0117184 A1 | 5/2011 | Bromley | 424/450 |
| 2011/0118351 A1 | 5/2011 | Berl | 514/560 |
| 2011/0135745 A1 | 6/2011 | Sande et al. | 424/522 |
| 2011/0236364 A1 | 9/2011 | Bromley | 424/94.1 |
| 2012/0016026 A1* | 1/2012 | Bromley | A23D 7/0053 |
| | | | 514/560 |
| 2012/0083530 A1 | 4/2012 | Mai et al. | 514/560 |
| 2012/0128815 A1* | 5/2012 | Poulos | A23L 2/52 |
| | | | 426/2 |
| 2012/0308644 A1 | 12/2012 | Bromley et al. | 424/450 |
| 2013/0017183 A1 | 1/2013 | Bromley | 424/94.1 |
| 2013/0017295 A1 | 1/2013 | Bromley | 426/66 |
| 2014/0039052 A1 | 2/2014 | Borowy-Borowski et al. | 514/560 |
| 2014/0227242 A1 | 8/2014 | Bromley et al. | 424/94.1 |
| 2014/0242055 A1 | 8/2014 | Bromley | 424/94.1 |
| 2014/0271593 A1 | 9/2014 | Bromley | 424/94.1 |
| 2015/0110924 A1 | 4/2015 | Bromley | 426/72 |
| 2016/0081927 A1 | 3/2016 | Bromley | 424/439 |
| 2016/0081975 A1 | 3/2016 | Bromley | 424/464 |
| 2016/0081976 A1 | 3/2016 | Bromley | 424/456 |
| 2016/0193146 A1 | 7/2016 | Bromley | 424/94.1 |
| 2016/0227832 A1 | 8/2016 | Bromley | 424/94.1 |
| 2017/0182133 A1 | 6/2017 | Bromley et al. | 424/450 |

FOREIGN PATENT DOCUMENTS

| | | | | |
|---|---|---|---|---|
| EP | | 1875816 A2 * | 1/2008 | A23L 1/305 |
| EP | | 1 972 334 | 9/2010 | |
| WO | WO | 1996/36316 | 11/1996 | |
| WO | WO | 1999/59421 | 11/1999 | |
| WO | WO | 2000/23545 | 4/2000 | |
| WO | WO | 2002/076970 | 10/2002 | |
| WO | WO | 2004/098311 | 11/2004 | |
| WO | WO | 2005/105290 | 11/2005 | |
| WO | WO | 2007/016073 | 2/2007 | |
| WO | WO | 2007/080515 | 7/2007 | |
| WO | WO | 2007/149591 | 12/2007 | |
| WO | WO | 2008/030949 | 3/2008 | |
| WO | WO | 2008/039564 | 4/2008 | |
| WO | WO | 2008/134766 | 11/2008 | |
| WO | WO | 2009/029046 | 3/2009 | |
| WO | WO | 2010/008762 | 1/2010 | |
| WO | WO | 2010/021820 | 2/2010 | |
| WO | WO | 2011/040141 | 4/2011 | |

(56) References Cited

FOREIGN PATENT DOCUMENTS

| WO | WO 2011/127163 | 10/2011 |
|---|---|---|
| WO | WO 2011/149854 | 12/2011 |
| WO | WO 2013/120025 | 8/2013 |

OTHER PUBLICATIONS

Boukley, B. "Stepan Lipid Nutrition and Virun paint bold brushstrokes on clear beverage 'canvas'," Beveragedaily.com Apr. 11, 2013 [online] [Retrieved from:<URL:beveragedaily.com/content/view/print/761692] [accessed on Aug. 16, 2013], 2 pages.
Boukley, B. "Time for a Change . . . Cola? US firm heralds healthy cola revolution'," Beveragedaily.com Apr. 30, 2013 [online] [Retrieved from:<URL:beveragedaily.com/content/view/print/769020] [accessed on Aug. 16, 2013], 2 pages.
Certified English translation of International Patent WO 2011/040141, published Apr. 7, 2011, entitled: "Composition Containing Fat-soluble Vitamin," Inventor—Kondo, 17 pages.
Engredea News & Analysis, "VIRUN, Vital Pharmaceuticals expand operations", published Nov. 5, 2013, Retrieved from:<URL:newhope360.com/print/specialty/virun-vital-pharmaceuticals-expand-operations [accessed Dec. 17, 2013], 2 pages.
Gander, P. "Sea changes," published Nov. 5, 2013, Retrieved from:<URL:foodmanufacture.co.uk/content/view/print/843822 [accessed Dec. 17, 2013], 2 pages.
Higgins, K., "Emerging plant technologies help processors make better beverages," Food Processing, Retrieved from:<URL:foodprocessing.com/articles/2013/beverage-technology/?show=all [accessed Dec. 17, 2013], 3 pages.
Lipshutz, B. and S. Goharai, "Transition-metal-catalyzed cross-couplings going green: in water at room temperature," Aldrichimica Acta 41(3):59-72 (2008).
Press Release: "Virun and Vital Pharmaceuticals expand operations," Retrieved from:<URL:bevnet.com/news/supplier-news/2013/virun-and-vital-pharmaceuticals-expand-operations/ Nov. 15, 2013, 2 pages.
Schultz, H. "PQQ set to make splash in sports nutrition beverages," nutraingredients-usa.com Aug. 6, 2013 [online] [Retrieved from:<URL:nutraingredientsusa.com/content/view/print/807624] [accessed on Aug. 16, 2013], 2 pages.
Virun Facebook Page Retrieved from:<URL:facebook.com/pages/Virun/168007462662 [accessed on Aug. 16, 2013], 8 pages.
Virun Facebook Page Retrieved from:<URL:facebook.com/pages/Virun/168007462662 [accessed on Dec. 17, 2013], 6 pages.
Response to Office Action, dated May 15, 2013, and instructions for response, in connection with Mexican Patent Application No. MX/a/2010/010050, 16 pages.
Office Action and Search Report, dated May 15, 2013, and translation, in connection with Chinese Patent Application No. 200980132984.6, 15 pages.
International Search Report and Written Opinion, dated May 29, 2013, in connection with corresponding International Patent Application No. PCT/US2013/025445, 11 pages.
Request for Continued Examination and Preliminary Amendment filed in response to Final Office Action, dated Jun. 19, 2013, in connection with U.S. Appl. No. 12/383,241, 31 pages.
Office Action, dated Jul. 4, 2013, in connection with Australian Patent Application No. 2009226019, 2 pages.
Response to Office Action, dated Jul. 19, 2013, and instructions for response, in connection with Chinese patent Application No. 200980118258.9, 25 pages.
Response to Office Action, dated Jul. 22, 2013, in connection with Australian Patent Application No. 2009226019, 18 pages.
Response to Rule 70(2) and 70a(2) communication, dated Jul. 23, 2013, in conneciton with European Patent Application No. 12188577.6, 9 pages.
Supplemental Response to Office Action, dated Jul. 26, 2013, in connection with Australian Patent Application No. 2009226019, 19 pages.
Office Action, dated Jul. 30, 2013, and translation, in connection with Chinese Patent Application No. 200980118257.4, 6 pages.
Notice of Acceptance, dated Aug. 15, 2013, in connection with Australian Patent Application No. 2009226019, 2 pages.
Office Action and Search Report, dated Aug. 21, 2013, and translation, in connection with Chinese Patent Application No. 201180025197.9, 12 pages.
Translation of Response to Office Action, dated Sep. 10, 2013, in connection with Israeli Patent Application No. 208133, 16 pages.
Final Office Action, dated Sep. 23, 2013, in connection with U.S. Appl. No. 90/012,700, 46 pages.
Response to Office Action, dated Sep. 26, 2013, in connection with with U.S. Appl. No. 13/134,927, 25 pages.
Office Action, dated Sep. 27, 2013, in connection with U.S. Appl. No. 12/383,241, 9 pages.
Response to Office Action, dated Sep. 30, 2013, and instruction for response, in connection with Chinese Patent Application No. 200980132984.6, 24 pages.
Office Action, dated Nov. 21, 2013, and translation, in connection with Chinese patent Application No. 200980118258.9, 9 pages.
Response to Office Action, dated Nov. 25, 2013, in connection with U.S. Appl. No. 90/012,700, 73 pages.
Office Action, dated Nov. 25, 2013, and translation, in connection with Chinese Patent Application No. 20130096300.X, 4 pages.
Advisory Action, dated Dec. 6, 2013, in connection with U.S. Appl. No. 90/012,700, 4 pages.
Summary of issues to discuss in interview, dated Dec. 10, 2013, in connection with U.S. Appl. No. 90/012,700, 6 pages.
Response to Office Action, dated Dec. 16, 2013, and instructions for response to Office Action, in connection with Chinese Patent Application No. 200980118257.4, 30 pages.
Response to International Search Report and Written Opinion, dated Dec. 10, 2013, in connection with corresponding International Patent Application No. PCT/US2013/025445, 43 pages.
Response to Office Action, dated Dec. 20, 2013, in connection with U.S. Appl. No. 12/383,241, 20 pages.
Second Response to Office Action, dated Dec. 23, 2013, in connection with U.S. Appl. No. 90/012,700, 23 pages.
U.S. Appl. No. 13/573,440, filed Sep. 14, 2012, 2013/0017295, Jan. 17, 2013.
U.S. Appl. No. 90/012,800, filed Oct. 9, 2012.
U.S. Appl. No. 12/383,241, filed Mar. 20, 2009, 2009/0297491, Dec. 3, 2009.
U.S. Appl. No. 13/573,424, filed Sep. 14, 2012, 2013/0017183, Jan. 17, 2013.
U.S. Appl. No. 13/134,927, filed Jun. 20, 2011, 2012/0016026, Jan. 19, 2012.
U.S. Appl. No. 12/583,209, filed Aug. 13, 2009, 2010/0041622, Feb. 18, 2010.
U.S. Appl. No. 13/065,510, filed Mar. 22, 2011, 2011/0236364, Sep. 29, 2011.
U.S. Appl. No. 60/887,754, filed Feb. 1, 2007, Borowy-Borowski et al.
Letter/Written Disclosure of the Information Disclosure Statement for the above-referenced application, mailed on May 22, 2013, 2 pages.
"Alpha-Tocopherol Polyethylene glycol Succinate (TPGS)," Pure Matters website [online][retrieved on Feb. 26, 2013] Retrieved from:<URL: resources.purematters.com/herbs-supplements/a/alpha-tocopherol-polyethylene-glycol-succinate-tpgs [2 pages].
Antares Health Products, "Vitamen-E TPGS," product brochure distributed at SupplySide Trade Show Oct. 22, 2008, 2 pages.
Bromley, P., "Nanotechnology and nonpolar active compounds in functional foods: An application note," found in *Bio-Nanotechnology: A Revolution in Food, Biomedical and Health Sciences*, Chapter 39 (eds. Bagchi et al.), Blackwell Publishing Ltd., Oxford, UK, pp. 697-703 (2013).
Byberg et al., "Plasminogen activator inhibitor-1 and relations to fatty acid composition in the diet and in serum cholesterol esters," Arteroscler. Thromb. Vasc. Biol., 21:2086-2092 (2001).

(56) References Cited

OTHER PUBLICATIONS

Certified English translation of German patent DE 10 2005 049664, published Apr. 19, 2007, entitled: "Liquid Composition and Method for its Production," Inventor—Haller, 9 pages.
Compass Foods Website, Food emulsification products, copyright 2005 [online][retrieved on Sep. 25, 2008] Retrieved from:<URL:compassfoods.com [2 pages].
Covington, M., "Omega-3 fatty acids," American Family Physician 70(1):133-140 (2004).
*CRC Handbook of Chemistry and Physics*, "Properties of common laboratory solvents," Lide, D., ed., 82nd edition, Cleveland, OH:CRC Press 15(14)-15(18) (2001).
DK Ester Sucrose Esters Applications, Montello Inc [online][retrieved on Mar. 24, 2008] Retrieved from:<URL:montelloinc.com/dk_ester2.htm [1 page].
DK Ester Sucrose Esters Properties Montello Inc [online][retrieved on Mar. 24, 2008] Retrieved from:<URL:montelloinc.com/dk_ester.htm [2 pages].
DK Ester Sucrose Esters Specifications, Montello Inc [online][retrieved on Mar. 24, 2008] Retrieved from:<URL:montelloinc.com/dk_ester3.htm [1 page].
"Eastman Vitamin E TPGS NF," Eastman Chemical Company, Publication PCI-102B, published in Oct. 2005, 24 pages.
Ernst, E., "The risk-benefit profile of commonly used herbal therapies: Ginkgo, St. John's Wort, Ginseng, Echinacea, Saw Palmetto, and Kava," Ann Intern Med. 136(1):42-53 (2002).
Fan, Y. and R. Chapkin, "Importance of dietary γ-linolenic acid in human health and nutrition," Journal of Nutrition 1411-1414 (1998).
Gordon, A. and A. Shaughnessy, "Saw palmetto for prostate disorders," American Family Physician 67(6):1281-1283 (2003).
Griffin, W., "Classification of surface-reactive agents by HLB," J. Soc. Cos. Chem. 1:311-326 (1949).
Landfester, K., "Miniemulsions for Nanoparticle Synthesis: Formation of particles in inverse microemulsion," Colloid Cheimstry II, vol. 227. Ed. M. Antionietti. New York: Springer, 2003 pp. 97-99.
Lands, W., "Biochemistry and physiology of n-3 fatty acids," The FASEB Journal, 6(8):2530-2536 (1992).
Miyashita, K., "Effects of chemical properties of oil in water emulsion on lipid peroxidation," Foods Food Ingredients J. Jpn., 209(11):1-2 (2004).
Offer for Sale, "Kaneka Liquid CoQ10" formulation, to Kaneka Nutrients L.P., Pasadena, TX, on Jun. 22-27, 2007, 2 pages.
Osako et al., "Effect of starvation on lipid metabolism and stability of DHA content of lipids in horse mackerel (*Trachurus japonicus*) tissues," Lipids, 38(12):1263-1267 (2003).
Perry, R. and D. Green, *Perry's Chemical Engineers' Handbook*, Sixth Edition, New York:McGraw-Hill, pp. 20-54 to 20-57 (1984).
Press Release, "VIRUN® to Premiere OmegaH2O® Through WEDAR at CPhI and HI/NI in Shanghai, China," Published on May 18, 2010 [online] Retrieved from:<URL:pr.com/press-release/235132_pr.com/press-release/417599 [2 pages].
Press Release, "OmegaH2O® clear shelf stable Omega-3, CoQ10 and other non polar compounds U.S. Appl. No. 12/383,244 approved in Europe and Notice of Allowance in U.S.," Published on Jun. 4, 2012 [online] Retrieved from:<URL:pr.com/press-release/417599 [4 pages].
Press Release: "VIRUN® closes $2.1 million series—A funding to bolster innovation and world-wide expansion," Published on Aug. 2, 2012 [online] Retrieved from:<URL:pr.com/press-release/431579 [4 pages].
Ross et al., "Omega-3 fatty acids as treatments for mental illness: which disorder and which fatty acid?," Lipids in Health and Disease 6(21):1-19 (2007).
Starling, S., "Virun debuts shelf-stable, H20 soluble, nanotech omega-3," Published on Mar. 12, 2009 [online] Retrieved from:<URL:beveragedaily.com/Products/Virun-debuts-shelf-stable-H20-soluble-nanotech-omega-3 [1 page].
Stojkovic et al., "Coenzyme Q10 in submicron-sized dispersion improves development, hatching, cell proliferation, and adenosine triphosphate content of in vitro-produced bovine embryos," 61:541-547 (1999).
Surfhope SE Pharma, Mitsubishi-Kagaku Foods Corporation, Copyright 2002 [online] Retrieved from:<URL:mfc.co.jp/english/se_pharma/sepharma.htm [3 pages].
Swern, D., *Bailey's Industrial Oil and Fat Products*, vol. 1, 4th edition. John Wiley & Sons, New York, pp. 387-391 and then 424-428 (1979).
Tadros, T., "Emulsion science and technology: a general introduction," *Emulsion Science and Technology*, Ed. T. Tadros., Wienheim: Wiley-VCH, pp. 1-56 (2009).
Virun Clear Water Soluble Omega-3 DHA, EPA & ALA for Foods & Beverages, Copyright 2009 [online] Retrieved from:<URL:slideshare.net/virun/virun-food-beverage-division-v2, 6 pages.
Virun home Webpage [online][retrieved on Mar. 24, 2011] Retrieved from:<URL:virun.com [59 pages].
Virun home Webpage [online][retrieved on May 1, 2013] Retrieved from:<URL:virun.com [22 pages].
Virun Improving Life Through Safe & Effective Oral Delivery, Copyright 2009 [online][retrieved On May 11, 2009] Retrieved from:<URL:slideshare.net/virun/virun-improving-life-through-safe-effective-oral- [15 pages].
Virun Intricate Science, Copyright 2011 [online][retrieved on May 25, 2011] Retrieved from:<URL:slideshare.net/virun/virun-intricate-science [22 pages].
Virun on slideshare.net, Philip Bromley's Presentations on SlideShare, Copyright 2009 [online][retrieved on May 8, 2009] Retrieved from:<URL:slideshare.net/virun [5 pages].
Virun Pharmaceutical & Food Beverage Divisions, Copyright 2009 [online][retrieved on May 11, 2009] Retrieved from:<URL:slideshare.net/virun/virun-food-beverage-divisions [9 pages].
Virun Product Sheet "Clear oils for water based beverages," Jan. 16, 2009, 4 pages.
Virun, "Virun Omega 3 Fortified Foods and Beverages," Copyright 2009 [online][retrieved on May 7, 2010] Retrieved from:<URL:slideshare.net/virun/virun-omega-3-fortified-foods-and-beverages [15 pages].
Wright, R., "Companies to watch—Nutraceuticals World," [online][retrieved on Jun. 4, 2009] Retrieved from:<URL:nutraceuticalsworld.com/articles/2009/06/companies-to-watch [7 pages].
Youan et al., "Evaluation of sucrose esters as alternative surfactants in microencapsulation of proteins by the solvent evaporation method," AAPS PharmSci., 5(2):1-9 (2003).
International Search Report/Written Opinion, dated Jul. 3, 2009, in connection with International Application No. PCT/US2009/001775, 16 pages.
Response to Written Opinion, dated Jan. 19, 2010, in connection with International Patent Application No. PCT/US2009/001775, 35 pages.
International Search Report/Written Opinion, dated Mar. 2, 2010, in connection with International Application No. PCT/US2009/003761, 14 pages.
International Search Report/Written Opinion, dated Apr. 7, 2010, in connection with International Patent Application No. PCT/US2009/001774, 16 pages.
Response to Written Opinion, dated Jun. 1, 2010, in connection with International Application No. PCT/US2009/003761, 25 pages.
International Preliminary Report on Patentability, dated Jun. 11, 2010, in connection with International Patent Application No. PCT/US2009/001775, 9 pages.
Response to Written Opinion, dated Jul. 7, 2010, in connection with International Patent Application No. PCT/US2009/001774, 37 pages.
International Preliminary Report on Patentability, dated Jul. 27, 2010, in connection with International Patent Application No. PCT/US2009/003761, 7 pages.
International Preliminary Report on Patentability, dated Sep. 3, 2010, in connection with International Patent Application No. PCT/US2009/001774, 5 pages.
Examination Report, dated Mar. 7, 2011, in connection with European Patent Application No. 09722985.0, 6 pages.

(56) References Cited

OTHER PUBLICATIONS

International Search Report and Written Opinion, dated Jul. 22, 2011, for International Application No. PCT/US2011/000538, 11 pages.
Restriction Requirement, dated Sep. 6, 2011, in connection with U.S. Appl. No. 12/383,241, 6 pages.
Office Action, dated Sep. 9, 2011, in connection with Patent Application No. 12/456,926, 11 pages.
Response to Examination Report, dated Sep. 16, 2011, in connection with European Patent Application No. 09722985.0, 8 pages.
International Search Report and Written Opinion, dated Sep. 26, 2011, in connection with International Application No. PCT/US2011/001099, 9 pages.
Office Action, dated Oct. 4, 2011, in connection with U.S. Appl. No. 12/383,244, 13 pages.
Office Action, dated Nov. 4, 2011, in connection with U.S. Appl. No. 12/456,926, 9 pages.
Itention to Grant European patent, dated Nov. 8, 2011, in connection with European Patent Application No. 09723157.5, 5 pages.
Examination Report, dated Dec. 19, 2011, in connection with European Patent Application No. 09722985.0, 4 pages.
Response to Written Opinion, dated Jan. 23, 2012, in connection with International Application No. PCT/US2011/000538, 9 pages.
Translation of Office Action, dated Feb. 8, 2012, in connection with Chinese patent Application No. 200980118257.4, 2 pages.
Response to Restriction Requirement, dated Mar. 6, 2012, in connection with U.S. Appl. No. 12/383,241, 11 pages.
Examiner's Report, dated Mar. 28, 2012, in connection with Canadian Patent Application No. 2,715,018, 2 pages.
Examiner's Report, dated Mar. 28, 2012, in connection with Canadian Patent Application No. 2,718,231, 3 pages.
Response to Office Action, dated Apr. 4, 2012, in connection with U.S. Appl. No. 12/383,244, 16 pages.
Office Action, dated Apr. 4, 2012, in connection with U.S. Appl. No. 12/383,241, 12 pages.
Response to Examination Report, dated Apr. 5, 2012, in connection with European Patent Application No. 09722985.0, 60 pages.
Response to Examiner's Report, dated Apr. 17, 2012, in connection with Canadian Patent Application No. 2,715,018, 7 pages.
Decision to Grant, dated Apr. 19, 2012, in connection with European Patent Application No. 09723157.5, 1 page.
Response to Written Opinion, dated Apr. 23, 2012, in connection with International Application No. PCT/US2011/001099, 10 pages.
PCT Communication, dated Apr. 25, 2012, in connection with International Patent Application No. PCT/US2011/000538, 4 pages.
Notice of Allowance, dated May 30, 2012, in connection with U.S. Appl. No. 12/383,244, 5 pages.
Response to Office Action, dated May 4, 2012, in connection with U.S. Appl. No. 12/456,926, 27 pages.
Communication reporting grant, dated May 16, 2012, of European Patent Application No. 09723157.5, 2 pages.
Notice of Allowance, dated May 17, 2012 in connection with Canadian Patent Application No. 2,715,018, 1 page.
Translation of Office Action, dated May 31, 2012, in connection with Chinese Patent Application No. 200980118258.9, 1 page.
Second Written Opinion, dated Jun. 1, 2012 in connection with International Patent Application No. PCT/US2011/001099, 5 pages.
Response to Examiner's Report, dated Jun. 8, 2012, in connection with Canadian Patent Application No. 2,718,231, 18 pages.
Itention to Grant European patent, dated Jun. 15, 2012, in connection with European Patent Application No. 09722985.0, 5 pages.
Final Office Action, dated Jun. 19, 2012, in connection with U.S. Appl. No. 12/456,926, 8 pages.
Response to PCT Communication, dated Jun. 25, 2012, in connection with International Patent Application No. PCT/US2011/000538, 5 pages.
Office Action, Search Report, dated Jun. 25, 2012, and translation, in connection with Chinese Patent Application No. 200980132984.6, 13 pages.

International Preliminary Report on Patentability, dated Jul. 17, 2012 in connection with International Patent Application No. PCT/US2011/000538, 12 pages.
Response to Office Action, dated Jul. 16, 2012, and Instructions for response to Office Action, in connection with Chinese patent Application No. 200980118257.4, 27 pages.
Response to Office Action, dated Jul. 30, 2012, in connection with U.S. Appl. No. 12/383,241, 16 pages.
Response to Written Opinion, dated Aug. 1, 2012 in connection with International Patent Application No. PCT/US2011/001099, 5 pages.
Amendment after Final, submitted Aug. 6, 2012, in connection with U.S. Appl. No. 12/456,926, 13 pages.
Supplemental Notice of Allowance, dated Aug. 17, 2012, in connection with U.S. Appl. No. 12/383,244, 1 page.
Examination Report, dated Aug. 17, 2012, in connection with Canadian Patent Application No. 2,718,231, 2 pages.
Examiner's Amendment Communication, dated Aug. 20, 2012, in connection with U.S. Appl. No. 12/456,926, 5 pages.
International Preliminary Report on Patentability, dated Aug. 20, 2012, in connection with International Patent Application No. PCT/US2011/001099, 6 pages.
Notice of Allowance, dated Aug. 21, 2012, in connection with U.S. Appl. No. 12/456,926, 10 pages.
Final Office Action, dated Aug. 21, 2012, in connection with U.S. Appl. No. 12/383,241, 17 pages.
Response to Examination Report, dated Aug. 29, 2012, in connection with Canadian Patent Application No. 2,718,231, 11 pages.
Office Action, dated Sep. 6, 2012, in connection with U.S. Appl. No. 13/065,510, 22 pages.
Third Party Reexamination Request, dated Oct. 9, 2012, in connection with U.S. Pat. No. 8,282,977, 148 pages.
Response to Office Action, dated Oct. 15, 2012, in connection with Chinese Patent Application No. 200980118258.9, 17 pages.
Supplemental Notice of Allowability, dated Nov. 6, 2012, in connection with U.S. Appl. No. 12/456,926, 2 pages.
Notice of Allowance, dated Nov. 7, 2012, in connection with Canadian Patent Application No. 2,718,231, 2 pages.
Decision to Grant, dated Nov. 8, 2012, in connection with European Patent Application No. 09722985.0, 2 pages.
Office communication, dated Nov. 14, 2012, in connection with U.S. Appl. No. 90/012,700, 3 pages.
Translation of Office Action, dated Nov. 15, 2012, in connection with Israeli Patent Application No. 208133, 3 pages.
Extended European Search Report, dated Dec. 5, 2012, in connection with European Patent Application No. 12188577.6, 7 pages.
Order Granting Request for Ex Parte Reexamination, issued Dec. 10, 2012, in connection with U.S. Appl. No. 90/012,700, 27 pages.
Restriction Requirement, dated Jan. 3, 2013, in connection with U.S. Appl. No. 13/134,927, 7 pages.
Response to Office ACtion, dated Jan. 10, 2013, in connection with Chinese Patent Application No. 200980132984.6, 22 pages.
Office Action, dated Jan. 5, 2013, and translation, in connection with Chinese Patent Application No. 200980118257.4, 8 pages.
Response to Restriction Requirement, dated Jan. 16, 2013, in connection with U.S. Appl. No. 13/134,927, 9 pages.
Notice of Appeal, submitted Feb. 21, 2013, in connection with U.S. Appl. No. 12/383,241, 3 pages.
Office Action, dated Mar. 4, 2013, in connection with U.S. Appl. No. 90/012,700, 40 pages.
Office Action, dated Mar. 4, 2013, and translation, in connection with Chinese Patent Application No. 200980118258.9, 11 pages.
Response to Office Action, dated Mar. 6, 2013, in connection with U.S. Appl. No. 13/065,510, 25 pages.
Office Action, dated Mar. 7, 2013, in connection with U.S. Appl. No. 13/573,424, 11 pages.
Response to Office Action, dated Mar. 20, 2013, and instructions for response, in connection with Chinese Patent Application No. 200980118257.4, 28 pages.
Office Action, dated Mar. 26, 2013, in connection with with U.S. Appl. No. 13/134,927, 22 pages.
Office Action, dated Mar. 27, 2013, in connection with Mexican Patent Application No. MX/a/2010/010050, 9 pages.

(56) References Cited

OTHER PUBLICATIONS

Response to Office Action, dated May 6, 2013, in connection with U.S. Appl. No. 90/012,700, 89 pages.
U.S. Appl. No. 14/271,847, filed May 7, 2014, 2014/0242055, Aug. 28, 2014.
U.S. Appl. No. 14/253,773, filed Apr. 15, 2014, 2014/0227242, Aug. 14, 2014.
U.S. Appl. No. 14/207,310, filed Mar. 12, 2014, 2014/0271593, Sep. 18, 2014.
U.S. Appl. No. 14/449,880, filed Aug. 1, 2014.
Letter/Written Disclosure of the Information Disclosure Statement for the above-referenced application, on Jul. 31, 2015, 2 pages.
Barrow et al., "Bioequivalence of encapsulated and microencapsulated fish-oil supplementation," Journal of Functional Foods, 1(1):38-43 (2009).
Virun Facebook Page, [online] Retrieved from:<URL:facebook.com/pages/Virun/168007462662>, [retrieved on Mar. 10, 2015], 11 pages.
Communicaiton pursuant to Rules 161(1) and 162 EPC, dated Nov. 11, 2014, in connection with European Patent Application No. 13 705 695.8, 2 pages.
Response to Office Action, dated Nov. 17, 2014, and Instructions for Response, in connection with Chinese Patent Application No. 201180025197.9, 23 pages.
Translation of Response to Office Action, dated Nov. 17, 2014, in connection with Israeli Patent Application No, 208133, 8 pages.
Restriction Requirement, dated Dec. 17, 2014, in connection with U.S. Appl. No. 14/207,310, 6 pages.
Response to International Search Report and Written Opinion, dated Jan. 13, 2015, in connection with International Patent Application No. PCT/US2014/025006, 31 pages.
Notice of Hearing, dated Jan. 13, 2015, in connection with U.S. Appl. No. 90/012,700, 3 pages.
Response to Office Action, dated Jan. 16, 2015, in connection with U.S. Appl. No. 13/065,510, 24 pages.
Office Action, dated Jan. 21, 2015, and Translation, in connection with Chinese Patent Application No. 20130096300.X, 24 pages.
Office Action, dated Jan. 30, 2015, in connection with Korean Patent Application No. 10-2010-7027534, 6 pages.
Restriction Requirement, dated Feb. 23, 2015, in connection with U.S. Appl. No. 14/207,310, 6 pages.
Response to Restriction Requirement, dated Mar. 11, 2015, in connection with U.S. Appl. No. 14/207,310, 9 pages.
Summary of Examiner Interview, in connection with Korean Patent Application No. 10-2010-7027534, 1 page.
International Preliminary Report on Patentability, dated Mar. 23, 2015, in connection with International Patent Application No. PCT/US2014/025006, 6 pages.
Record of Oral Hearing, issued Apr. 21, 2015, in connection with U.S. Appl. No. 90/012,700, 13 pages.
Notification of Reexamination, dated Apr. 28, 2015, in connection with Chinese Patent Application No. 200980118257.4, 12 pages.
Response to Rules 161(1) and 162 Communication, dated May 26, 2015, in connection with European Patent Application No. 13705695.8, 22 pages.
Response to Office Action, dated Jun. 5, 2015, and Instructions for Response, in connection with Chinese Patent Application No. 20130096300.X, 27 pages.
Request for Rehearing, submitted Jun. 22, 2015, in connection with U.S. Appl. No. 90/012,700, 28 pages.
Non-final Office Action, dated Jun. 26, 2015, in connection with U.S. Appl. No. 14/207,310, 12 pages.
Letter/Written Disclosure of the Information Disclosure Statement for the above-referenced application, filed herewith on Nov. 5, 2015, 2 pages.
Notice of Eligibility for Grant and Supplementary Examination Report, dated Sep. 1, 2015 and Aug. 21, 2015, respectively, in connection with Singapore Patent Application No. 11201404640Y, 3 pages.
Letter/Written Disclosure of the Information Disclosure Statement for the above-referenced application, filed herewith on May 19, 2016, 2 pages.
Letter/Written Disclosure of the Information Disclosure Statement for the above-referenced application, filed herewith on Aug. 12, 2016, 3 pages.
Communication pursuant to Article 94(3), dated Jul. 12, 2016, in connection with European Patent Application No. 13705695.8, 4 pages.
Letter/Written Disclosure of the Information Disclosure Statement for the above-referenced application, filed herewith on Apr. 25, 2016, 2 pages.
Virun Facebook Page found at https://www.facebook.com/Virun-168007462662/?fref=ts [accessed on Nov. 4, 2015], 18 pages.
Bromley, P., "Inside Virun: Manufacturing the next generation of supplements, foods and beverages," presented at: The 2016 Beverage Innovation: Online Summit, Feb. 18, 2016, available at: https://vts.inxpo.com/scripts/Server.nxp?LASCmd=AI:1;S:17;F:QP!14100&EventKey=178592&EventAttendeeKey=14661401&RandomValue=1456260156563 [accessed on Feb. 23, 2016], 70 pages.
Virun Esolv—Clean label claim, vitamin E emulsifier, Product Pamphlet, Feb. 10, 2016, available at: https://vts.inxpo.com/scripts/Server.nxp?LASCmd=AI:1;S:41008;F:LBSATTACH!V&AttachmentKey=1309430 [accessed Feb. 23, 2016], 3 pages.
Virun Esolv—Free emulsifier, Product Pamphlet, Feb. 10, 2016, available at: https://vts.inxpo.com/scripts/Server.nxp?LASCmd=AI:1;S:41008;F:LBSATTACH!V&AttachmentKey=1309401 [accessed Feb. 23, 2016], 2 pages.
Virun Esolv—functional beverages cognitive ingredients, Product Pamphlet, Feb. 10, 2016, available at: https://vts.inxpo.com/scripts/Server.nxp?LASCmd=AI:1;S:41008;F:LBSATTACH!V&AttachmentKey=1309416 [accessed Feb. 23, 2016], 4 pages.
Response, filed Aug. 13, 2015, to Notice of Reexamination, dated Apr. 28, 2015, in connection with Chinese Patent Application No. 200980118257.4 [English instructions and response as filed in Chinese], 13 pages.
Notification of Grant, dated Oct. 10, 2015, and Search Report, dated Sep. 24, 2015, in connection with Chinese Patent Application No. 201310096300.X [English translation and original document in Chinese], 7 pages.
Request for Examination and Voluntary Amendment, filed Nov. 6, 2015, in connection with Canadian Patent Application No. 2792330, 22 pages.
Response, filed Dec. 4, 2015, to Communication pursuant to Rules 161(1) and 162 EPC, dated Oct. 22, 2015, in connection with European Application No. 14726228.1, 16 pages.
Amendment after Final, filed Dec. 4, 2015, to Final Office Action, dated Dec. 1, 2015, in connection with U.S. Appl. No. 14/207,310, 10 pages.
Certificate of Grant of Patent, dated Oct. 30, 2015, in connection with corresponding Singapore Patent Application No. 11201404640Y, 1 page.
Notice of Reexamination, dated Nov. 30, 2015, in connection with Chinese patent Application No. 200980118258.9 [English translation and original document in Chinese], 11 pages.
Response, filed Mar. 11, 2016, to Notice of Reexamination, dated Nov. 30, 2015, in connection with Chinese patent Application No. 200980118258.9 [English instructions and response as filed in Chinese], 23 pages.
Notice of Allowance, dated Dec. 7, 2015, in connection with U.S. Appl. No. 13/065,510, 11 pages.
Certificate of Grant of Patent, dated Nov. 20, 2015, in connection with corresponding Hong Kong Patent Application No. 13101768.3, 3 pages.
Letter reporting Decision of Reexamination, dated Nov. 26, 2015, in connection with Chinese Patent Application No. 200980118257.4 [English letter and original document in Chinese], 17 pages.
Notice of Docketing, dated Dec. 3, 2015, in connection with U.S. Appl. No. 90/012,700, 1 page.
Docketing Statement, filed Jan. 5, 2016, in connection with U.S. Appl. No. 90/012,700, 3 pages.
Brief of Appellant, filed Feb. 1, 2016, in connection with U.S. Appl. No. 90/012,700, 78 pages.

(56) References Cited

OTHER PUBLICATIONS

Decision for Grant of Patent, dated Feb. 28, 2016, in connection with Korean Patent Application No. 10-2012-7027534 [English translation and original document in Korean], 6 pages.
Examination Report, dated Mar. 7, 2016, in connection with Indian Patent Application No. 7340/DELNP/2010, 4 pages.
Certificate of Grant of Patent, dated Aug. 21, 2015, in connection with corresponding Hong Kong Patent Application No. 12100628.6, 3 pages.
Letter/Written Disclosure of the Information Disclosure Statement for the above-referenced application, filed herewith on Apr. 27, 2017, 2 pages.
Partial Translation of Ling, X., "Research on the Preparation of Natural Vitamin E Derivatives," Wufang Database, Published on Sep. 18, 2006, 15 pages.
Press Release: "DSM: 'Consumers are searching for new ways to add omega-3s into their diet'," Published on Jul. 27, 2015 [online] Retrieved from: <URL:nutraingredients-usa.com/content/view/print/1145391 [retrieved on Nov. 4, 2015], 2 pages.
Press Release: "Hormel Foods Specialty Products Division and VIRUN®, Granted U.S. Pat. No. 8,741,373," published Jul. 9, 2014 [online] Retrieved from: <URL:pr.com/press-release/569191 [retrieved on Aug. 20, 2014], 3 pages.
Press Release: "The State of California invests in VIRUN® NutraBIOsciences™; VIRUN® receives two more patent grants in China while premiering Esolv® Vitamin E Encapsulator," Published on Apr. 7, 2015 [online] Retrieved from:<URL: pr.com/press-release/pr-613759 [retrieved on Nov. 4, 2015], 4 pages.
Press Release: "We All Want to Live in a Yellow Submarine at Virun's SupplySide West Booth," Published on Sep. 15, 2016 [online] Retrieved from <URL: pr.com/press-release/687560 [retrieved on Nov. 22, 2016], 3 pages.
US Pharmacopeia NF-30, Vitamin E Polyethylene Glycol Succinate, pp. 2013-2015 (2012).
Virun Facebook Page [online] Retrieved from: <URL: facebook.com/Virun-168007462662/?fref=ts [retrieved on May 31, 2016], 6 pages.
Virun Facebook Page [online] Retrieved from: <URL: facebook.com/viruninnovations/ [retrieved on Dec. 14, 2016], 25 pages.
Virun Facebook Page [online] Retrieved from: <URL: facebook.com/viruninnovations/ [retrieved on Mar. 15, 2017], 14 pages.
Watson, E., "Think you need to pop pills to get a decent dose of omega-3? Think again, say Hormel and Virun," Published Jul. 16, 2014 [online] Retrieved from: <URL: foodnavigator-usa.com/Suppliers2/Hormel-Virun-patent-new-way-to-add-omega-3s-to-foods-beverages [retrieved on Aug. 20, 2014] 5 pages.
Appellant's Reply Brief, filed Jun. 8, 2016, in connection with U.S. Reexamination No. 90/012,700, 42 pages.
Judgment, issued Nov. 10, 2016, in connection with U.S. Reexamination No. 90/012,700, U.S. Court of Appeals for the Federal Circuit, Appeal No. 16/1280, In re: Virun, Inc., 5 pages.
Response, filed Jan. 11, 2017, to Examination Report, dated Jul. 12, 2016, in connection with European Patent Application No. 13705695.8, 20 pages.
Examination Report, dated Feb. 10, 2017, in connection with Canadian Patent Application No. 2,863,544, 4 pages.
Notice of Intent to Issue Ex Parte Reexamination Certificate, issued Mar. 10, 2017, in connection with U.S. Appl. No. 90/012,700, 5 pages.
Ex Parte Reexamination Certificate, issued Apr. 14, 2017, in connection with U.S. Appl. No. 90/012,700, 2 pages.
Letter/Written Disclosure of the Information Disclosure Statement for the above-referenced application, submitted on Oct. 10, 2014, 2 pages.
Press Release: "VIRUN® & Pacific Deep Ocean Biotech Combine Natural Mineral Complexes with OmegaH2O® EPA and DHA for Foods, Beverages & Supplements" Jun. 18, 2014 [online] [retrieved at http://www.pr.com/press-release/565168] [accessed on Aug. 20, 2014], 2 pages.
Supplemental Response to Written Opinion, dated Mar. 10, 2014, in connection with corresponding International Patent Application No. PCT/US2013/025445, 26 pages.
Office Action, dated May 29, 2014, and translation, in connection with Chinese patent Application No. 200980118258.9, 10 pages.
Office Action, dated Jun. 4, 2014, and translation, in connection with Chinese Patent Application No. 200980118257.4, 7 pages.
International Preliminary Report on Patentability, dated Jun. 6, 2014, in connection with corresponding International Patent Application No. PCT/US2013/025445, 7 pages.
Response to Office Action, dated Jun. 23, 2014, in connection with Chinese Patent Application No. 200980132984.6, 33 pages.
Reply Brief, dated Jul. 9, 2014, in connection with U.S. Appl. No. 90/012,700, 30 pages.
Office Action, dated Jul. 16, 2014, in connection with U.S. Appl. No. 13/065,510, 19 pages.
Office Action, dated Jul. 1, 2014, in connection with Chinese Patent Application No. 201180025197.9, 5 pages.
Office Action, dated Jul. 18, 2014, in connection with Chinese Patent Application No. 20130096300.X, 6 pages.
Response to Communication pursuant to Rule 94(3) EPC, dated Jul. 21, 2014, in connection with European Patent Application No. 12 188 577.6, 6 pages.
International Search Report and Written Opinion, dated Aug. 12, 2014, in connection with International Patent Application No. PCT/US2014/0250006, 13 pages.
Response to Office Action, dated Aug. 25, 2014, and instructions for response, in connection with Korean Patent Application No. 10-2010-7027534, 71 pages.
Response to Office Action and Request for Reexamination, dated Sep. 15, 2014, and instructions for response, in connection with Chinese Patent Application No. 200980118258.9, 24 pages.
Response to Office Action and Request for Reexamination, dated Sep. 19, 2014, and instructions for response, in connection with Chinese Patent Application No. 200980118257.4, 24 pages.
Response to Office Action, dated Sep. 28, 2014, and instructions for response, in connection with Chinese Patent Application No. 20130096300.X, 17 pages.
U.S. Appl. No. 15/789,756, filed Oct. 20, 2017.
U.S. Appl. No. 15/838,930, filed Dec. 12, 2017.
U.S. Appl. No. 15/461,389, filed Mar. 16, 2017, 2017/0182133, Jun. 29, 2017.
Letter/Written Disclosure of the Supplemental Information Disclosure Statement for the above-referenced application, filed herewith on Jul. 17, 2018, 2 pages.
Notice of Allowance, dated Jul. 10, 2018, in connection with Canadian Patent Application No. 2,863,544, 1 page.
Letter/Written Disclosure of the Supplemental Information Disclosure Statement for the above-referenced application, filed herewith on Jan. 8, 2018, 2 pages.
Response, filed Jun. 1, 2017, to Examination Report, dated Feb. 10, 2017, in connection with corresponding Canadian Patent Application No. 2,863,544, 46 pages.
Communication under Rule 71(3) EPC (Intention to Grant), dated Jul. 5, 2017, in connection with corresponding European Patent Application No. 13705695.8, 5 pages.
Examination Report, dated Jul. 31, 2017, in connection with corresponding Canadian Patent Application No. 2,863,544, 3 pages.
Response, filed Oct. 27, 2017, to Examination Report, dated Jul. 31, 2017, in connection with corresponding Canadian Patent Application No. 2,863,544, 50 pages.
Decision to Grant, dated Nov. 16, 2017, in connection with corresponding European Patent Application No. 13705695.8, 2 pages.
Letter/Written Disclosure of the Supplemental Information Disclosure Statement for the above-referenced application, filed herewith on Sep. 6, 2018, 2 pages.
Certificate of Grant, dated Jun. 8, 2018, in connection with Hong Kong Patent Application No. 15104193.0, 2 pages.
Letter/Written Disclosure of the Information Disclosure Statement for the above referenced application, mailed on June 3, 2014, 2 pages.
Beveragedaily.com, On-demand Supplier Webinar Introduction Webpage, "Unknown Thoughts. How to reduce competition on the

(56) References Cited

OTHER PUBLICATIONS shelf" Feb. 13, 2014 [online] [retrieved at http://www.beveragedaily.com/smartlead/view/924435/4/Unknown-Thoughts.-How-to-reduce-competition-on-the-shelf"] [accessed on Jun. 2, 2014], 2 pages.
Boukley, B, "Straight Dope: Canna Energy hemp oil drink scores sales high," Beveragedaily.com Apr. 2, 2014 [online] [retrieved at http://www.beveragedaily.com/content/view/print/905372] [accessed on Jun. 2, 2014], 2 pages.
Boukley, B. "BeverageDaily.com Personality of the Year 2013! Philip Bromley, VIRUN" Beveragedaily.com Jan. 27, 2014 [online] [retrieved at http://www.beveragedaily.com/content/view/print/872215] [accessed on Jun. 2, 2014], 3 pages.
Boukley, B. "'Loving my life . . . like a Big Mac after a 12 mile hike!'" Beveragedaily.com Jan. 30, 2014 [online] [retrieved at http://www.beveragedaily.com/content/view/print/873966] [accessed on Jun. 2, 2014], 2 pages.
Boukley, B. "VIRUN boss warns beverage startups: 'Don't assume you'll crack Costco and Kroger's!'" Beveragedaily.com Feb. 3, 2014 [online] [retrieved at http://www.beveragedaily.com/content/view/print/876068] [accessed on Jun. 2, 2014], 2 pages.
Boukley, B. "Virun secures 'significant' equity stakes in beverage brands," Beveragedaily.com Jan. 14, 2013 [online] [retrieved at http://www.beveragedaily.com/content/view/print/730181] [accessed on Jun. 2, 2014], 2 pages.
Daniells, S. "Abbott Nutrition, Standard Process, Nawgan, and Euromonitor to talk cognitive health" Nutraingredients-usa.com Apr. 30, 2014 [online] [retrieved at http://www.nutraingredients-usa.com/content/view/print/915357] [accessed on Jun. 2, 2014], 2 pages.
Daniells, S. "Huge demand for omega-3 liquid products driving delivery innovations: Virun CEO," Nutraingredients-usa.com Mar. 20, 2014 [online] [retrieved at http://www.nutraingredients-usa.com/content/view/print/899348] [accessed on Jun. 2, 2014], 2 pages.
NutraBIOsciences™ food-beverage technology evolved product brochure, published May 21, 2014 [online] [available at http://www.beveragedaily.com/smartlead/view/918190/4/NutraBIOsciences-food-beverage-technology-evolved] [accessed on Jun. 2, 2014], 3 pages.
Press Release: "VIRUN NutraBlOsciences™, Leader in Cognitive-Functional-Ingredients, to Sponsor Cognitive Health Forum at NutraIngredicnts-USA" May 13, 2014 [online] [retrieved at http://www.pr.com/press-release/557966] [accessed on Jun. 2, 2014], 3 pages.
Press Release: "VIRUN® & Amway Open Innovation Push for More Creativity and Technology; Introducing Unknown Thoughts in Industry" Feb. 11, 2014 [online] [retrieved at http://www.pr.com/press-release/541858] [accessed on Jun. 2, 2014], 3 pages.
Scientific Panel of the European Food Safety Authority, "Opinion of the Scientific Panel on Food Additives, Flavourings, Processing Aids and Materials in Contact with Food on a request from the Commission related to D-alpha-tocopheryl polyethylene glycol 1000 succinate (TPGS) in use for food for partic ular nutritional purposes." EFSA J. 490:1-20 (2007).
Virun Esolv technology Webpage, found at: http://www.virun.com/omega2.htm [accessed Jun. 2, 2014], 1 page.
Virun Facebook Page found at https://www.facebook.com/pages/Virun/168007462662 [accessed on Jun. 2, 2014], 14 pages.
Final Office Action, dated Jun. 28, 2013, in connection with U.S. Appl. No. 13/065,510, 22 pages.
Interview Summary, dated Dec. 23, 2013, in connection with U.S. Appl. No. 90/012,700, 11 pages.
Notice of Allowance, dated Jan. 10, 2014, in connection with with U.S. Appl. No. 13/134,927, 26 pages.
Advisory Action, dated Jan. 10, 2014, in connection with U.S. Appl. No. 90/012,700, 4 pages.
Communication pursuant to Rule 94(3) EPC, dated Jan. 10, 2014, in connection with European Patent Application No. 12 188 577.6, 4 pages.
Translation of Notification Prior to Allowance, dated Jan. 21, 2014, in connection with Israeli Patent Application No. 208133, 3 pages.
Notice of Appeal and Petition, dated Jan. 23, 2014, in connection with U.S. Appl. No. 90/012,700, 14 pages.
Advisory Action, dated Jan. 24, 2014, in connection with U.S. Appl. No. 90/012,700, 4 pages.
Written Opinion, dated Jan. 27, 2014, in connection with corresponding International Patent Application No. PCT/US2013/025445, 6 pages.
Notice of Allowance, dated Feb. 6, 2014, and replacement PTOL-37 form, dated Feb. 10, 2014, in connection with U.S. Appl. No. 12/383,241, 8 pages.
Response to Office Action, dated Feb. 7, 2014, and instructions for response, in connection with Chinese patent Application No. 200980118258.9, 15 pages.
Response to Written Opinion, dated Feb. 27, 2014, in connection with corresponding International Patent Application No. PCT/US2013/025445, 30 pages.
Office Action, dated Feb. 7, 2014, and translation, in connection with Chinese Patent Application No. 200980132984.6, 17 pages.
Response to Office Action, dated Mar. 5, 2014, and instructions for response, in connection with Chinese Patent Application No. 201180025197.9, 33 pages.
Appeal Brief, dated Mar. 24, 2014, in connection with U.S. Appl. No. 90/012,700, 68 pages.
Response to Office Action, dated Mar. 26, 2014, and instructions for response, in connection with Chinese Patent Application No. 20130096300.X, 10 pages.
Office Action, dated Apr. 25, 2014, and translation, in connection with Korean Patent Application No. 10-2010-7027534, 11 pages.
Examiner's Response to Appeal Brief, dated May 9, 2014, in connection with U.S. Appl. No. 90/012,700, 76 pages.
Amendment and Request for Continued Examination, dated May 27, 2014, in connection with U.S. Appl. No. 13/065,510, 26 pages.
U.S. Appl. No. 14/271,847, filed May 7, 2014.
U.S. Appl. No. 14/253,773, filed Apr. 15, 2014.
U.S. Appl. No. 14/207,310, filed Mar. 12, 2014.
Letter/Written Disclosure of the Supplemental Information Disclosure Statement for the above-referenced application, filed herewith on Feb. 21, 2020, 2 pages
Certificate of Patent, granted Oct. 31, 2015, in connection with Israeli Patent Application No. 208133, 4 pages.
Brief of Appellee, filed Apr. 22, 2016, in connection with U.S. Reexamination Control No. 90/012,700, 52 pages.

* cited by examiner

BEVERAGE COMPOSITIONS CONTAINING NON-POLAR COMPOUNDS

RELATED APPLICATIONS

Benefit of priority is claimed to U.S. Provisional Application Ser. No. 61/633,431, filed Feb. 10, 2012, entitled "BEVERAGE COMPOSITIONS CONTAINING NON-POLAR COMPOUNDS," to Philip J. Bromley and to U.S. Provisional Application Ser. No. 61/743,466, filed Sep. 4, 2012, entitled "BEVERAGE COMPOSITIONS CONTAINING NON-POLAR COMPOUNDS," to Philip J. Bromley.

This application is related to International PCT Application No. PCT/US2013/025445, filed Feb. 8, 2013, entitled "BEVERAGE COMPOSITIONS CONTAINING NON-POLAR COMPOUNDS," which also claims priority to U.S. Provisional Application Ser. Nos. 61/633,431 and 61/743,466. The subject matter of each of the above-noted related applications is incorporated by reference in its entirety.

This application is related to U.S. application Ser. No. 12/383,244, filed Mar. 20, 2009, published as US-2009-0297665-A1, issued as U.S. Pat. No. 8,282,977, and entitled "COMPOSITIONS CONTAINING NON-POLAR COMPOUNDS," and International Application No. PCT/US2009/001775, filed Mar. 20, 2009, published as International PCT Application No. WO 2009/117152 and entitled "EMULSIONS INCLUDING A PEG-DERIVATIVE OF TOCOPHEROL," all of which claim priority to U.S. Provisional Application Ser. No. 61/070,381, filed Mar. 20, 2008, entitled "COMPOSITIONS CONTAINING NON-POLAR COMPOUNDS" and U.S. Provisional Application Ser. No. 61/132,424, filed Jun. 16, 2008, entitled "COMPOSITIONS CONTAINING NON-POLAR COMPOUNDS," each to Philip Bromley.

This application also is related to U.S. patent application Ser. No. 12/383,241, filed Mar. 20, 2009, published as US-2009-0297491-A1 entitled "COMPOSITIONS CONTAINING NON-POLAR COMPOUNDS" and International Application No. PCT/US2009/001774, filed Mar. 20, 2009, published as International PCT Application No. WO 2009/117151 and entitled "VITAMIN E DERIVATIVES AND THEIR USES," all of which claim priority to U.S. Provisional Application Ser. No. 61/070,392, filed Mar. 20, 2008, entitled "COMPOSITIONS CONTAINING NON-POLAR COMPOUNDS" and U.S. Provisional Application Ser. No. 61/132,409, filed Jun. 16, 2008, entitled "COMPOSITIONS CONTAINING NON-POLAR COMPOUNDS," each to Philip Bromley.

This application also is related to U.S. patent application Ser. No. 13/065,510, filed Mar. 22, 2011, published as US-2011-0236364-A1 entitled "COMPOSITIONS CONTAINING NON-POLAR COMPOUNDS" and International Application No. PCT/US2011/000538, filed Mar. 22, 2011, published as International PCT Application No. WO 2011/119228 and entitled "COMPOSITIONS CONTAINING NON-POLAR COMPOUNDS," all of which claim priority to U.S. Provisional Application Ser. No. 61/340,944, filed Mar. 23, 2010, entitled "COMPOSITIONS CONTAINING NON-POLAR COMPOUNDS," each to Philip Bromley.

This application also is related to U.S. patent application Ser. No. 13/134,927, filed Jun. 20, 2011, published as US-2012-0016026-A1 entitled "COMPOSITIONS CONTAINING NON-POLAR COMPOUNDS" and International Application No. PCT/US2011/01099, filed Jun. 20, 2011, published as International PCT Application No. WO 2011/162802 and entitled "COMPOSITIONS CONTAINING NON-POLAR COMPOUNDS," all of which claim priority to U.S. Provisional Application Ser. No. 61/398,192, filed Jun. 21, 2010, entitled "COMPOSITIONS CONTAINING NON-POLAR COMPOUNDS," each to Philip Bromley.

The subject matter of each of the above-referenced applications is incorporated by reference in its entirety.

FIELD OF THE INVENTION

Provided are beverage compositions and methods for preparing beverage compositions that contain additives, such as nutraceuticals, pharmaceuticals and supplements.

BACKGROUND

Non-polar compounds are not easily dissolved in aqueous solutions, such as water or other polar solvents. A number of non-polar compounds are used in compositions for human ingestion, for example, pharmaceuticals, nutraceuticals and/or dietary supplements. Exemplary of non-polar compounds used in such compositions are vitamins and minerals, fatty acids, and other non-polar compounds, non-polar active agents, and non-polar active ingredients.

Because of poor water solubility, inclusion of non-polar compounds in products for human consumption, for example, in supplements, foods and beverages, is problematic. Available compositions containing non-polar compounds, particularly beverage compositions containing non-polar compounds, and methods for formulating such compositions, are limited. Thus, there is a need to develop beverage compositions containing non-polar compounds and methods for making the compositions. Accordingly, it is among the objects herein to provide beverage compositions containing non-polar compounds, and methods for making the beverage compositions.

SUMMARY

Provided are beverages that contain additives, such as, but not limited to, polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemical, particularly phytosterols, that retain their organoleptic properties so that they retained after at least 1 month, two months, three months, 6 months, one year and longer, even when stored at room temperature, and when stored at lower temperatures, such as in a refrigerator at about or at 37-40° F. The retention of properties is effected by removing dissolved oxygen from the beverage. This can be achieved by adding carbonate and/or bicarbonate, and, also by adding $CO_2$ in a sufficient amount to displace the oxygen in the beverage, which then can be sealed for storage.

Also provided herein are beverages that retain their organoleptic properties. These beverages contain a sufficient amount of carbonate, bicarbonate and/or $CO_2$ to retain these properties. Additional components, such as ingestible acids and antioxidants also improve the organoleptic properties of the beverages upon storage.

Among the beverages provided herein are beverage compositions containing in a beverage base at least or at least about 0.05%, by weight, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals, such as phytosterols, and micronutrients, and a mixture of a bicarbonate or carbonate, an acid and an antioxidant, whereby the organoleptic properties of the beverage composition containing the one or a mixture of non-polar compounds are the same or about the same as the organoleptic properties of the beverage composition in the absence of the one or a mixture of non-polar compounds; the beverage base is at least 50%, by weight, or at least about 50%, by weight, of the composition; and the beverage composition is for direct ingestion. In some examples, the bicarbonate or carbonate is present in an amount between at or about 0.01% and at or about 7%, inclusive, by weight, of the composition; the acid is present in an amount between at or about 0.01% and at or about 5%, inclusive, by weight, of the composition; and the antioxidant is present in an amount between at or about 0.01% and at or about 3%, inclusive, by weight, of the composition.

In the provided beverage compositions, the total amount of the one or a mixture of non-polar compounds is between at or about 0.05% and at or about 20%; or between at or about 0.05% and at or about 15%; or between at or about 0.05% and at or about 10%; or between at or about 0.1% and at or about 10%, inclusive, by weight, of the composition, or is at least at or about 0.05%, 0.06%, 0.07%, 0.08%, 0.09%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8 0.85%, %, 0.9%, 0.95%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19% or 20%, by weight, of the composition. In some examples, the one or a mixture of non-polar compounds are present in an amount that provides at least at or about 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500 or 3000 mg, of the non-polar compound(s) per 0.24 liters of the beverage composition. In other examples, 0.24 liters (8 oz) of the beverage composition provides between at or about 1.5 to at or about 3.0 grams (g) of omega-6 fatty acids, between at or about 16 to at or about 800 milligrams (mg) docosahexaenoic acid (DHA) and eicosapentaenoic acid (EPA), between at or about 100 and at or about 500 mg phytosterols, between at or about 10 and at or about 200 mg Coenzyme Q10, between at or about 40 and at or about 400 micrograms (mcg) Vitamin A, and/or between at or about 200 and at or about 2000 international units (IU) Vitamin D3, per serving of the beverage composition. The beverage composition can be at least or about or 0.015 liters (L), 0.03 L, 0.06 L, 0.09 L, 0.12 L, 0.15 L, 0.18 L, 0.21 L, 0.24 L, 0.27 L, 0.30 L, 0.33 L, 0.36 L, 0.38 L, 0.41 L, 0.44 L, 0.47 L, 0.50 L, 0.53 L, 0.56 L or 0.59 L. The beverage composition can be at least or about or 1 ounce, 2 ounces, 3 ounces, 4 ounces, 5 ounces, 6 ounces, 7 ounces, 8 ounces, 9 ounces, 10 ounces, 11 ounces, 12 ounces, 13 ounces, 14 ounces, 15 ounces, 16 ounces, 16.9 ounces, 17 ounces, 18 ounces, 19 ounces or 20 ounces. For example, the beverage composition is at least or is 0.06 L (2 oz), 0.24 L (8 oz), 0.5 L (16.9 oz) or 0.59 L (20 oz).

In some examples of the provided beverage compositions, the bicarbonate or carbonate is selected from among potassium bicarbonate, sodium bicarbonate, potassium carbonate, sodium carbonate, calcium carbonate, magnesium carbonate and zinc carbonate. Exemplary of a bicarbonate is potassium bicarbonate. The bicarbonate or carbonate can be present in an amount between at or about 0.01% and at or about 7%; or between at or about 0.1% and at or about 5%; or between at or about 0.1% and at or about 4%; or between at or about 0.1% and at or about 2%; or between at or about 0.3% and at or about 1.8%; or between at or about 1% and at or about 6%; inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 5.5%, 6%, 6.5%, or 7%, by weight, of the composition.

In some examples of the provided beverage compositions, the acid is an ingestible acid that is selected from among citric acid, phosphoric acid, adipic acid, ascorbic acid, lactic acid, malic acid, fumaric acid, gluconic acid, succinic acid, tartaric acid and maleic acid. Exemplary of an acid is citric acid. The acid can be present in an amount between at or about 0.01% and at or about 5%; or between at or about 0.01% and at or about 3%; or between at or about 0.1% and at or about 3%; or between at or about 0.05% and at or about 4%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.1%, 2.2%, 2.3%, 2.4%, 2.5%, 3%, 3.5%, 4%, 4.5% or 5%, by weight, of the composition. In yet other examples, the acid is citric acid and the citric acid is present in an amount between at or about 0.05% and at or about 4%, inclusive, by weight, of the composition.

In some examples of the provided beverage compositions, the antioxidant is selected from among ascorbic acid, ascorbate or a coenzyme Q-containing compound. In some examples, the antioxidant is present in an amount between at or about 0.01% and at or about 3%; or between at or about 0.01% and at or about 2%; or between at or about 0.01% and at or about 1%; or between at or about 0.01% and at or about 0.5%; or between at or about 0.1% and at or about 1%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9% or 3%, by weight, of the composition. In one example, the antioxidant is vitamin C and the vitamin C is present in an amount between at or about 0.01% and at or about 0.5%, inclusive, by weight of the composition. In another example, the antioxidant is a coenzyme Q-containing compound and the coenzyme Q-containing compound is present in an amount between at or about 0.1% and at or about 1%, inclusive, by weight of the composition. In yet other examples, the acid is citric acid and the citric acid is present in an amount between at or about 0.05% and at or about 4%, inclusive, by weight, of the composition.

The provided beverage compositions contain one or a mixture of non-polar compounds. In some examples, the non-polar compound(s) is a polyunsaturated fatty acid that is selected from among omega-3 fatty acids, omega-6 fatty acids, omega-9 fatty acids and conjugated fatty acids. For example, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) is selected from among coenzyme Q-containing compounds, oil soluble vitamins, alpha lipoic acid, carotenoid-containing compounds, phytochemicals, such as phytosterols, and micronutrients. For example, the non-polar compound(s) is selected from among a coenzyme Q10 (CoQ10); an oil soluble vitamin that is selected from among vitamin B12, vitamin D3, vitamin A palmitate, vitamin E, vitamin B3, vitamin B5, vitamin B6 and mixtures thereof; a carotenoid-containing compound that is selected from among lycopene, lutein, zeaxanthin and mixtures of lutein and zeaxanthin; a phytochemical-containing compound that is selected from among phytosterols and resveratrol; and a micronutrient-containing compound that is selected from among yerba mate, *Ginkgo biloba* and ginseng.

The provided beverage compositions can contain additional ingredients, including but not limited to a beverage base, a pH adjuster, a sweetener, preservatives, non-polar solvents, co-surfactants, emulsion stabilizers, pH adjusters and flavoring agents. Typically, the provided beverage compositions contain a beverage base. In some examples, the beverage base contains one or more of a polar solvent, a juice, a juice concentrate, a juice extract, a flavor, a soda, a flavored soda, a carbonated water, a carbonated juice and mixtures thereof. Exemplary of a polar solvent is water. The beverage base can be present in an amount between at or about 55% and at or about 99% and at or about 99%; or between at or about 65% and at or about 99%; or between at or about 75% and at or about 99%; or between 80% and at or about 99%, inclusive, by weight, of the beverage composition; or is or is about 60%, 65%, 70%, 75%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% or 99%, by weight, of the composition.

In some examples the provided beverage compositions contain a sweetener, such as, for example, a sucralose, sucrose, lactose, fructose, an acesulfame salt, aspartame, saccharin, stevia, stevioside, and combinations thereof. An exemplary sweetener is sucralose. In some examples, the beverage compositions contain a pH adjuster that is a phosphoric acid. The pH adjuster can be present an amount between at or about 0.1% and at or about 3%; or between at or about 0.1% and at or about 2%; or between at or about 0.1% and at or about 1%, inclusive, by weight, of the beverage composition.

In some examples, the provided beverage compositions further contain a surfactant, preservative, non-polar solvent, co-surfactant, or emulsion stabilizer, or any combination thereof. For example, the beverage composition can contain a surfactant that is present in an amount between at or about 0.05% and at or about 3%; or between at or about 0.05% and at or about 2.2%; or between at or about 0.05% and at or about 1%; or between at or about 0.05% and at or about 0.5%; or between at or about 1% and at or about 2.5%, inclusive, by weight, of the beverage composition. In another example, the beverage composition contains a preservative that is present in an amount between at or about 0.001% and at or about 0.1%; or between at or about 0.001 and at or about 0.05%; or between at or about 0.001 and at or about 0.01%, inclusive, by weight, of the beverage composition. In another example, the beverage composition contains a non-polar solvent that is present in an amount between at or about 0.001% and at or about 0.1%; or between at or about 0.001% and at or about 0.05%, inclusive, by weight, of the beverage composition. In yet another example, the provided beverage compositions contain a co-surfactant that is present in an amount between at or about 0.001% and at or about 0.1%; or between at or about 0.001% and at or about 0.05%; or between at or about 0.001% and at or about 0.01%, inclusive, by weight, of the beverage composition. In another example, the provided beverage compositions contain an emulsion stabilizer that is present in an amount between at or about 0.0001% and at or about 0.01%, inclusive, by weight, of the beverage composition. In some examples, the beverage compositions contain a beverage concentrate that is dissolved therein.

Typically, the organoleptic properties of the beverage composition containing the one or a mixture of non-polar compounds are the same or about the same as the organoleptic properties of the beverage composition in the absence of the one or a mixture of non-polar compounds for at least at or about 1 month, 2 months, 3 months, 4 months, 5 months, 6 months, 7 months, 8 months, 9 months, 10 months, 11 months, 1 year or longer.

Also provided herein is a beverage composition that is produced by mixing a beverage concentrate, and a mixture of a bicarbonate or carbonate, an acid and an antioxidant, wherein the beverage composition contains at least at or about 0.05%, by weight, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals, such as phytosterols, and micronutrients, whereby the organoleptic properties of the beverage composition containing the concentrate are the same or about the same as the organoleptic properties of the beverage composition in the absence of the concentrate; and the beverage composition is for direct ingestion. In some examples, the bicarbonate or carbonate is present in an amount between at or about 0.01% and at or about 7%, inclusive, by weight, of the composition; the acid is present in an amount between at or about 0.01% and at or about 5%, inclusive, by weight, of the composition; and the antioxidant is present in an amount between at or about 0.01% and at or about 3%, inclusive, by weight, of the composition.

Also provided herein is a beverage composition containing in a beverage base a beverage concentrate, and a mixture of a bicarbonate or carbonate, an acid and an antioxidant, whereby the organoleptic properties of the beverage composition containing the beverage concentrate are the same or about the same as the organoleptic properties of the beverage composition in the absence of the beverage concentrate, wherein the beverage composition contains at least at or about 0.05%, by weight, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals, such as phytosterols, and micronutrients; the beverage base is present in an amount at of at least 50% by weight of the composition; and the beverage composition is for direct ingestion. In some examples, the bicarbonate or carbonate is present in an amount between at or about 0.01% and at or about 7%, inclusive, by weight, of the composition; the acid is present in an amount between at or about 0.01% and at or about 5%, inclusive, by weight, of the composition; and the antioxidant is present in an amount between at or about 0.01% and at or about 3%, inclusive, by weight, of the composition.

In the provided beverage compositions, the concentrate can be present in an amount between at or about 0.001% and at or about 10%; between at or about 0.001% and at or about 5%; between at or about 0.004% and at or about 5%; between at or about 0.004% and at or about 2%; between at or about 0.004% and at or about 1%; between at or about 0.2% and at or about 10%; or between at or about 0.2% and at or about 8%; or between at or about 0.2% and at or about 5%; or between at or about 0.2% and at or about 2%; or between at or about 0.2% and at or about 1%; or between at or about 0.2% and at or about 0.6%; or is or is about 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.5%, 2%, 2.5%, 3%, 4%, 5%, 6%, 7%, 8%, 9%, or 10%, by weight, of the composition.

In the provided beverage compositions, the concentrate can contain a surfactant in an amount between at or about 16% and at or about 30%, a polar solvent in an amount between at or about 60% and at or about 79%, and one or a mixture of non-polar compounds in an amount between at or about 5% and at or about 10%, by weight, of the concentrate; a surfactant in an amount between at or about 16% and at or about 30%, a polar solvent in an amount between at or about 60% and at or about 79%, and one or a mixture of non-polar compounds in an amount between at or about 3% and at or about 15%, by weight, of the concentrate; or a surfactant that is a PEG-derivative of vitamin E in an amount between at or about 65% and at or about 95% and one or a mixture of non-polar compounds in an amount between at or about 5% and at or about 35%, by weight, of the concentrate. In other examples, the concentrate contains one or more surfactants, one or a mixture of non-polar compounds in an amount up to at least 50%, by weight, of the concentrate and an emulsion stabilizer that is a fatty acid-modified carbohydrate-based macromolecule in an amount greater than at or about 1%, by weight, of the concentrate, wherein each of the one or more surfactants are present in an amount between at or about 3% and at or about 16%, by weight, of the concentrate, but when two or more surfactants are present, the total amount of surfactants, excluding the fatty acid-modified carbohydrate-based macromolecule, is between 16% or about 16% and 30% or about 30%, by weight, of the concentrate.

In such examples of the provided beverage compositions, the surfactant is selected from among a PEG-derivative of vitamin E, a polysorbate or polysorbate analog, a sucrose fatty acid ester and a mixture of sucrose fatty acid esters. In one example, the surfactant is a PEG-derivative of Vitamin E that is a tocopherol polyethylene glycol diester (TPGD), that is selected from among tocopherol polyethylene glycol succinate (TPGS), tocopherol sebacate polyethylene glycol, tocopherol dodecanodioate polyethylene glycol, tocopherol suberate polyethylene glycol, tocopherol azelaate polyethylene glycol, tocopherol citraconate polyethylene glycol, tocopherol methylcitraconate polyethylene glycol, tocopherol itaconate polyethylene glycol, tocopherol maleate polyethylene glycol, tocopherol glutarate polyethylene glycol, tocopherol glutaconate polyethylene glycol and tocopherol phthalate polyethylene glycol, or a TPGS analog. Exemplary of a TPGS is TPGS-1000 or D-α TPGS.

In another example, the surfactant is a sucrose fatty acid ester mixture that contains a sucrose fatty acid monoester In yet another example, the surfactant is a sucrose fatty acid ester mixture that contains sucrose stearate, sucrose laurate, sucrose palmitate, sucrose oleate, sucrose caprylate, sucrose decanoate, sucrose myristate, sucrose pelargonate, sucrose undecanoate, sucrose tridecanoate, sucrose pentadeconoate and sucrose heptadecanoate, or homologs thereof. In yet another example, the surfactant is a sucrose fatty acid ester surfactant that contains any one or more of sucrose monostearate, sucrose monolaurate, sucrose monooleate and sucrose monopalmitate. In another example, the surfactant is a polysorbate or polysorbate analog that is polysorbate 80 or a polysorbate 80 analog.

In some examples of the provided beverage compositions, the polar solvent is selected from among water, glycerin, propylene glycol, ethylene glycol, tetraethylene glycol, triethylene glycol and trimethylene glycol. In an exemplary example, the polar solvent is water. In some examples of the provided beverage compositions, the fatty acid-modified carbohydrate-based macromolecule is a fatty acid modified gum, a fatty acid modified starch or a fatty acid modified cellulose. For example, the fatty acid-modified carbohydrate-based macromolecule is a fatty acid modified gum that is an n-octenylsuccinic anhydride (OSAn-) modified gum acacia, or the fatty acid-modified carbohydrate-based macromolecule is a fatty acid modified starch that is an n-octenylsuccinic anhydride (OSAn-) modified corn starch.

In the provided beverage compositions, the total amount of the one or a mixture of non-polar compounds is between at or about 0.05% and at or about 20%; or between at or about 0.05% and at or about 15%; or between at or about 0.05% and at or about 10%; or between at or about 0.1% and at or about 10%, inclusive, by weight, of the composition, or is at least at or about 0.05%, 0.06%, 0.07%, 0.08%, 0.09%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8 0.85%, %, 0.9%, 0.95%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19% or 20%, by weight, of the composition. In some examples, the one or a mixture of non-polar compounds are present in an amount that provides at least at or about 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500 or 3000 mg, of the non-polar compound(s) per 0.24 liters of the beverage composition. In other examples, 0.24 liters (8 oz) of the beverage composition provides between at or about 1.5 to at or about 3.0 grams (g) of omega-6 fatty acids, between at or about 16 to at or about 800 milligrams (mg) docosahexaenoic acid (DHA) and eicosapentaenoic acid (EPA), between at or about 100 and at or about 500 mg phytosterols, between at or about 10 and at or about 200 mg Coenzyme Q10, between at or about 40 and at or about 400 micrograms (mcg) Vitamin A, and/or between at or about 200 and at or about 2000 international units (IU) Vitamin D3, per serving of the beverage composition. The beverage composition can be provided as a single serving in a total volume of 0.06 L (2 oz), 0.24 L (8 oz), 0.5 L (16.9 oz) or 0.59 L (20 oz).

In some examples of the provided beverage compositions, the bicarbonate or carbonate is selected from among potassium bicarbonate, sodium bicarbonate, potassium carbonate, sodium carbonate, calcium carbonate, magnesium carbonate and zinc carbonate. Exemplary of a bicarbonate is potassium bicarbonate. The bicarbonate or carbonate can be present in an amount between at or about 0.01% and at or about 7%; or between at or about 0.1% and at or about 5%; or between at or about 0.1% and at or about 4%; or between at or about 0.1% and at or about 2%; or between at or about 0.3% and at or about 1.8%; or between at or about 1% and at or about 6%; inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 5.5%, 6%, 6.5%, or 7%, by weight, of the composition.

In some examples of the provided beverage compositions, the acid is an ingestible acid selected from among citric acid, phosphoric acid, adipic acid, ascorbic acid, lactic acid, malic acid, fumaric acid, gluconic acid, succinic acid, tartaric acid and maleic acid. Exemplary of an acid is citric acid. The acid can be present in an amount between at or about 0.01% and at or about 5%; or between at or about 0.01% and at or about 3%; or between at or about 0.1% and at or about 3%; or between at or about 0.05% and at or about 4%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.1%, 2.2%, 2.3%, 2.4%, 2.5%, 3%, 3.5%, 4%, 4.5% or 5%, by weight, of the composition. In yet other examples, the acid is citric acid and the citric acid is present in an amount between at or about 0.05% and at or about 4%, inclusive, by weight, of the composition.

In some examples of the provided beverage compositions, the antioxidant is selected from among ascorbic acid, ascorbate or a coenzyme Q-containing compound. In some examples, the antioxidant is present in an amount between at or about 0.01% and at or about 3%; or between at or about 0.01% and at or about 2%; or between at or about 0.01% and at or about 1%; or between at or about 0.01% and at or about 0.5%; or between at or about 0.1% and at or about 1%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9% or 3%, by weight, of the composition. In one example, the antioxidant is vitamin C and the vitamin C is present in an amount between at or about 0.01% and at or about 0.5%, inclusive, by weight of the composition. In another example, the antioxidant is a coenzyme Q-containing compound and the coenzyme Q-containing compound is present in an amount between at or about 0.1% and at or about 1%, inclusive, by weight of the composition. In yet other examples, the acid is citric acid and the citric acid is present in an amount between at or about 0.05% and at or about 4%, inclusive, by weight, of the composition.

The provided beverage compositions contain one or a mixture of non-polar compounds. In some examples, the non-polar compound(s) is a polyunsaturated fatty acid that is selected from among omega-3 fatty acids, omega-6 fatty acids, omega-9 fatty acids and conjugated fatty acids. For example, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) is selected from among coenzyme Q-containing compounds, oil soluble vitamins, alpha lipoic acid, carotenoid-containing compounds and phytochemicals, such as phytosterols. For example, the non-polar compound(s) is selected from among a coenzyme Q10 (CoQ10); an oil soluble vitamin that is selected from among vitamin B12, vitamin D3, vitamin A palmitate, vitamin E, vitamin B3, vitamin B5, vitamin B6 and mixtures thereof; a carotenoid-containing compound that is selected from among lycopene, lutein, eaxanthin and mixtures of lutein and zeaxanthin; a phytochemical-containing compound that is selected from among phytosterols and resveratrol; a micronutrient-containing compound that is selected from among yerba mate, *Ginkgo biloba* and ginseng.

The provided beverage compositions can contain additional ingredients, including but not limited to a beverage base, a pH adjuster, a sweetener, preservatives, non-polar solvents, co-surfactants, emulsion stabilizers, pH adjusters and flavoring agents. Typically, the provided beverage compositions contain a beverage base. In some examples, the beverage base contains one or more of a polar solvent, a juice, a juice concentrate, a juice extract, a flavor, a soda, a flavored soda, a carbonated water, a carbonated juice, or combinations thereof. Exemplary of a polar solvent is water. The beverage base can be present in an amount between at or about 55% and at or about 99% and at or about 99%; or between at or about 65% and at or about 99%; or between at or about 75% and at or about 99%; or between 80% and at or about 99%, inclusive, by weight, of the beverage composition; or is or is about 60%, 65%, 70%, 75%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% or 99%, by weight, of the composition.

In some examples the provided beverage compositions contain a sweetener, such as, for example, a sucralose, sucrose, lactose, fructose, an acesulfame salt, aspartame, saccharin, stevia, stevioside, and combinations thereof. An exemplary sweetener is sucralose. In some examples, the beverage compositions contain a pH adjuster that is a phosphoric acid. The pH adjuster can be present in an amount between at or about 0.1% and at or about 3%; or between at or about 0.1% and at or about 2%; or between at or about 0.1% and at or about 1%, inclusive, by weight, of the beverage composition.

In some examples the surfactant is present in the provided beverage compositions in an amount between at or about 0.05% and at or about 3%; or between at or about 0.05% and at or about 2.2%; or between at or about 0.05% and at or about 1%; or between at or about 0.05% and at or about 0.5%; or between at or about 1% and at or about 2.5%, inclusive, by weight, of the beverage composition.

In some examples, the provided beverage compositions further contain a preservative, non-polar solvent, co-surfactant, flavoring agent or emulsion stabilizer, or any combination thereof. In some examples, the preservative is present in an amount between at or about 0.001% and at or about 0.1%; or between at or about 0.001 and at or about 0.05%; or between at or about 0.001 and at or about 0.01%, inclusive, by weight, of the beverage composition. In some examples, the non-polar solvent is present in an amount between at or about 0.001% and at or about 0.1%; or between at or about 0.001% and at or about 0.05%, inclusive, by weight, of the beverage composition. In some examples, the co-surfactant is present in an amount between at or about 0.001% and at or about 0.1%; or between at or about 0.001% and at or about 0.05%; or between at or about 0.001% and at or about 0.01%, inclusive, by weight, of the beverage composition. In some examples, the emulsion stabilizer is present in an amount between at or about 0.0001% and at or about 0.01%, inclusive, by weight, of the beverage composition.

Typically, the organoleptic properties of the beverage composition containing the one or a mixture of non-polar compounds are the same or about the same as the organoleptic properties of the beverage composition in the absence of the one or a mixture of non-polar compounds for at least at or about 1 month, 2 months, 3 months, 4 months, 5 months, 6 months, 7 months, 8 months, 9 months, 10 months, 11 months, 1 year or longer.

Also provide herein are methods for making the beverage compositions. In one example, the beverage composition for direct injection is prepared by (i) mixing water, a juice or juice concentrate, one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, wherein the bicarbonate or carbonate is added in an amount between at or about 0.01% and at or about 7%, inclusive, by weight, of the composition; the acid is added in an amount between at or about 0.01% and at or about 5%, inclusive, by weight, of the composition; the antioxidant is added in an amount between at or about 0.01% and at or about 3%, inclusive, by weight, of the composition; the organoleptic properties of the beverage composition containing the one or a mixture of non-polar compounds are the same or about the same as the organoleptic properties of the beverage composition in the absence of the one or a mixture of non-polar compounds; and the beverage composition is for direct ingestion.

In one example, the beverage composition for direct injection is prepared by (i) mixing water, one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, thereby generating a beverage composition, wherein the bicarbonate or carbonate is added in an amount between at or about 0.01% and at or about 7%, inclusive, by weight, of the composition; the acid is added in an amount between at or about 0.01% and at or about 5%, inclusive, by weight, of the composition; the antioxidant is added in an amount between at or about 0.01% and at or about 3%, inclusive, by weight, of the composition; the one or a mixture of non-polar compounds is added in an amount of at least at or about 0.05%, by weight, of the composition; the organoleptic properties of the beverage composition containing the one or a mixture of non-polar compounds are the same or about the same as the organoleptic properties of the beverage composition in the absence of the one or a mixture of non-polar compounds; and the beverage composition is for direct ingestion.

In one example, the beverage composition for direct injection is prepared by (i) mixing water, a juice or juice concentrate, one or a mixture of concentrates containing one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, thereby generating a beverage composition, wherein the bicarbonate or carbonate is added in an amount between at or about 0.01% and at or about 7%, inclusive, by weight, of the composition; the acid is added in an amount between at or about 0.01% and at or about 5%, inclusive, by weight, of the composition; the antioxidant is added in an amount between at or about 0.01% and at or about 3%, inclusive, by weight, of the composition; the one or a mixture of non-polar compounds is added in an amount of at least at or about 0.05%, by weight, of the composition; the organoleptic properties of the beverage composition containing the one or a mixture of non-polar compounds are the same or about the same as the organoleptic properties of the beverage composition in the absence of the one or a mixture of non-polar compounds; and the beverage composition is for direct ingestion.

In one example, the beverage composition for direct injection is prepared by (i) mixing water, one or a mixture of concentrates containing one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, thereby generating a beverage composition, wherein the bicarbonate or carbonate is added in an amount between at or about 0.01% and at or about 7%, inclusive, by weight, of the composition; the acid is added in an amount between at or about 0.01% and at or about 5%, inclusive, by weight, of the composition; the antioxidant is added in an amount between at or about 0.01% and at or about 3%, inclusive, by weight, of the composition; the one or a mixture of non-polar compounds is added in an amount of at least at or about 0.05%, by weight, of the composition; the organoleptic properties of the beverage composition containing the one or a mixture of non-polar compounds are the same or about the same as the organoleptic properties of the beverage composition in the absence of the one or a mixture of non-polar compounds; and the beverage composition is for direct ingestion.

In one example, the beverage composition for direct injection is prepared by (i) mixing water, a juice or juice concentrate, one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, thereby generating a beverage composition.

In one example, the beverage composition for direct injection is prepared by (i) mixing water, a juice or juice concentrate, one or more of a mixture of concentrates containing one or a mixture of non-polar compounds and an antioxidant; (ii) dissolving a carbonate or bicarbonate in the mixture of (i); (iii) adding a sweetener and one or more flavors; and (iv) adding an acid and pH adjuster and mixing until dissolved, thereby generating a beverage composition.

In some examples of the provided methods, 0.24 liters (8 ounces) of the beverage composition provides between at or about 1.5 to at or about 3.0 grams (g) of omega-6 fatty acids, between at or about 16 to at or about 800 milligrams (mg) docosahexaenoic acid (DHA) and eicosapentaenoic acid (EPA), between at or about 100 and at or about 500 mg phytosterols, between at or about 10 and at or about 200 mg Coenzyme Q10, between at or about 40 and at or about 400 micrograms (mcg) Vitamin A, and/or between at or about 200 and at or about 2000 international units (IU) Vitamin D3, per serving of the beverage composition. In some examples, the beverage composition can be at least or about or 0.015 liters (L), 0.03 L, 0.06 L, 0.09 L, 0.12 L, 0.15 L, 0.18 L, 0.21 L, 0.24 L, 0.27 L, 0.30 L, 0.33 L, 0.36 L, 0.38 L, 0.41 L, 0.44 L, 0.47 L, 0.50 L, 0.53 L, 0.56 L or 0.59 L. In other examples, the beverage composition can be at least or about or 1 ounce, 2 ounces, 3 ounces, 4 ounces, 5 ounces, 6 ounces, 7 ounces, 8 ounces, 9 ounces, 10 ounces, 11 ounces, 12 ounces, 13 ounces, 14 ounces, 15 ounces, 16 ounces, 16.9 ounces, 17 ounces, 18 ounces, 19 ounces or 20 ounces. In other examples, the beverage composition is provided as a single serving in a volume of about or at 0.01 L to about or at 0.59 L.

In some examples of the provided methods, the bicarbonate or carbonate is selected from among potassium bicarbonate, sodium bicarbonate, potassium carbonate, sodium carbonate, calcium carbonate, magnesium carbonate and zinc carbonate and is present in an amount between at or about 0.01% and at or about 5%; or between at or about 0.1% and at or about 4%; or between at or about 0.1% and at or about 2%; or between at or about 0.3% and at or about 1.8%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, by weight, of the composition.

In some examples of the provided methods, the acid is selected from among citric acid, phosphoric acid, adipic acid, ascorbic acid, lactic acid, malic acid, fumaric acid, gluconic acid, succinic acid, tartaric acid and maleic acid. Exemplary of an acid is citric acid. The acid can be present in an amount between at or about 0.01% and at or about 5%; or between at or about 0.01% and at or about 3%; or between at or about 0.1% and at or about 3%; or between at or about 0.05% and at or about 4%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.1%, 2.2%, 2.3%, 2.4%, 2.5%, 3%, 3.5%, 4%, 4.5% or 5%, by weight, of the composition. In some examples of the provided method, the acid is citric acid and is present in an amount between at or about 0.05% and at or about 4%, inclusive, by weight, of the composition.

In some examples of the provided methods, the antioxidant is selected from among ascorbic acid, ascorbate or a coenzyme Q-containing compound and is present in an amount between at or about 0.01% and at or about 3%; or between at or about 0.01% and at or about 2%; or between at or about 0.01% and at or about 1%; or between at or about 0.01% and at or about 0.5%; or between at or about 0.1% and at or about 1%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9% or 3%, by weight, of the composition. In one example of the provided method, the antioxidant is vitamin C and is present in an amount between at or about 0.01% and at or about 0.5%, inclusive, by weight of the composition. In another example of the provided method, the antioxidant is a coenzyme Q-containing compound and is present in an amount between at or about 0.1% and at or about 1%, inclusive, by weight of the composition. In some examples of the provided method, the acid is citric acid and is present in an amount between at or about 0.05% and at or about 4%, inclusive, by weight, of the composition.

In some examples of the provided method, the beverage composition is a single-serving shot, single-serving beverage or multi-serving beverage.

In some examples of the provided method, the one or a mixture of non-polar compound(s) is a polyunsaturated fatty acid that is selected from among omega-3 fatty acids, omega-6 fatty acids, omega-9 fatty acids and conjugated fatty acids. For example, the one or a mixture of non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples of the provided methods, the one or a mixture of non-polar compound(s) are selected from among coenzyme Q-containing compounds, oil soluble vitamins, alpha lipoic acid, carotenoid-containing compounds and phytochemicals. For example, the one or a mixture of non-polar compound(s) are a coenzyme Q10 (CoQ10); an oil soluble vitamin that is selected from among vitamin B12, vitamin D3, vitamin A palmitate, vitamin E, vitamin B3, vitamin B5, vitamin B6 and mixtures thereof; a carotenoid-containing compound that is selected from among lycopene, lutein, zeaxanthin and mixtures of lutein and zeaxanthin; a phytochemical-containing compound that is selected from among phytosterols and resveratrol; and/or a micronutrient-containing compound that is selected from among yerba mate, *Ginkgo biloba* and ginseng.

In some examples of the provided method, the one or a mixture of non-polar compounds are added directly to the beverage composition. In another example of the provided methods, the one or a mixture of non-polar compounds are contained in a concentrate or emulsion and the concentrate or emulsion is added to the beverage composition. In some examples, the beverage composition contains a beverage base that comprises one or more of water, a juice, a juice concentrate, a juice extract, a flavor, a soda, a flavored soda, a carbonated water, a carbonated juice or combinations thereof. The beverage base can be present in an amount between at or about 55% and at or about 99.9%; or between at or about 65% and at or about 99%; or between at or about 75% and at or about 99%; or between 80% and at or about 99%, inclusive, by weight, of the beverage composition; or is or is about 60%, 65%, 70%, 75%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% or 99%, by weight, of the composition.

In some examples of the provided method, a sweetener is added and the sweetener is selected from among sucralose, sucrose, lactose, fructose, an acesulfame salt, aspartame, saccharin, stevia, stevioside, and combinations thereof. In some examples, a pH adjuster is added and the pH adjuster is a phosphoric acid and is present an amount between at or about 0.1% and at or about 3%; or between at or about 0.1% and at or about 2%; or between at or about 0.1% and at or about 1%, inclusive, by weight, of the beverage composition. Typically, the organoleptic properties of the beverage composition in the presence of the one or a mixture of non-polar compounds are the same or about the same as the organoleptic properties of the beverage composition in the absence of the one or a mixture of non-polar compounds for at least at or about 1 week, 2 weeks, 3 weeks, 1 month, 2 months, 3 months, 4 months, 5 months, 6 months, 7 months, 8 months, 9 months, 10 months, 11 months, 1 year or longer.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; coenzyme Q10 in an amount between at or about 0.1% and at or about 1%, inclusive, by weight of the composition; and one or a mixture of non-polar compounds selected from among fish oil and vitamin D3 in an amount between at or about 0.1% and at or about 1%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; coenzyme Q10 in an amount between at or about 0.1% and at or about 1%, inclusive, by weight of the composition; and one or a mixture of non-polar compounds selected from among fish oil and vitamin D3 in an amount between at or about 0.5% and at or about 5%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.5% and at or about 1.5%, inclusive, by weight of the composition; vitamin C in an amount between at or about 0.01% and at or about 0.1%, inclusive, by weight of the composition; and one or a mixture of non-polar compounds selected from among fish oil, flaxseed oil, vitamin B12 and vitamin D3 in an amount between at or about 0.1% and at or about 2%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.5% and at or about 1.5%, inclusive, by weight of the composition; vitamin C in an amount between at or about 0.01% and at or about 0.1%, inclusive, by weight of the composition; and one or a mixture of non-polar compounds selected from among fish oil, resveratrol and vitamin D3 in an amount between at or about 0.1% and at or about 1%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.5% and at or about 1.5%, inclusive, by weight of the composition; vitamin C in an amount between at or about 0.01% and at or about 0.1%, inclusive, by weight of the composition; and one or a mixture of non-polar compounds selected from among fish oil, vitamin B12 and vitamin D3 in an amount between at or about 0.5% and at or about 5%, inclusive, by weight of the composition, whereby the beverage composition is for direct ingestion.

Also provided herein are beverage compositions containing a bicarbonate in an amount between at or about 1% and at or about 7%, inclusive, by weight of the composition; citric acid in an amount between at or about 0.5% and at or about 5%, inclusive, by weight of the composition; vitamin C in an amount between at or about 0.05% and at or about 0.5%, inclusive, by weight of the composition; and algal oil in an amount between at or about 5% and at or about 10%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.5% and at or about 1.5%, inclusive, by weight of the composition; vitamin C in an amount between at or about 0.01% and at or about 0.1%, inclusive, by weight of the composition; and fish oil in an amount between at or about 0.05% and at or about 0.5%, inclusive, by weight of the composition, whereby the beverage composition is for direct ingestion.

Also provided herein are beverage compositions containing a bicarbonate or carbonate in an amount between at or about 0.01% and at or about 5%, inclusive, by weight, of the composition; an acid in an amount between at or about 0.01% and at or about 5%, inclusive, by weight, of the composition; at least 0.05%, by weight, of the composition, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals and micronutrients, whereby the organoleptic properties of the beverage composition containing the one or mixture of non-polar compounds are the same or about the same as the organoleptic properties of the beverage composition in the absence of the one or more non-polar compounds; and the beverage composition is for direct ingestion.

In some examples of the provided beverage compositions the total amount of the one or a mixture of non-polar compounds is between at or about 0.05% and at or about 20%; or between at or about 0.05% and at or about 15%; or between at or about 0.05% and at or about 10%; or between at or about 0.1% and at or about 10%, inclusive, by weight, of the composition, or is at least at or about 0.05%, 0.06%, 0.07%, 0.08%, 0.09%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8 0.85%, %, 0.9%, 0.95%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19% or 20%, by weight, of the composition. In other examples of the provided beverage compositions the one or a mixture of non-polar compounds are present in an amount that provides at least at or about 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500 or 3000 mg, of the non-polar compound(s) per 0.24 liters of the beverage composition. In yet other examples of the beverage compositions, 0.24 liters (8 ounces) of the beverage composition provides between at or about 1.5 to at or about 3.0 grams (g) of omega-6 fatty acids, between at or about 16 to at or about 800 milligrams (mg) docosahexaenoic acid (DHA) and eicosapentaenoic acid (EPA), between at or about 100 and at or about 500 mg phytosterols, between at or about 10 and at or about 200 mg Coenzyme Q10, between at or about 40 and at or about 400 micrograms (mcg) Vitamin A, and/or between at or about 200 and at or about 2000 international units (IU) Vitamin D3, per serving of the beverage composition. For example, the beverage composition is 0.015 liters (L), 0.03 L, 0.06 L, 0.09 L, 0.12 L, 0.15 L, 0.18 L, 0.21 L, 0.24 L, 0.27 L, 0.30 L, 0.33 L, 0.36 L, 0.38 L, 0.41 L, 0.44 L, 0.47 L, 0.50 L, 0.53 L, 0.56 L or 0.59 L. For example, the beverage composition is 0.06 L, 0.24 L, 0.5 L or 0.59 L.

In some examples of the provided beverage compositions, the bicarbonate or carbonate is selected from among potassium bicarbonate, sodium bicarbonate, potassium carbonate, sodium carbonate, calcium carbonate, magnesium carbonate and zinc carbonate. In some examples, the bicarbonate or carbonate is present in an amount between at or about 0.01% and at or about 7%; or between at or about 0.1% and at or about 5%; or between at or about 0.1% and at or about 4%; or between at or about 0.1% and at or about 2%; or between at or about 0.3% and at or about 1.8%; or between at or about 1% and at or about 6%; inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 5.5%, 6%, 6.5%, or 7%, by weight, of the composition.

In some examples of the provided beverage compositions acid is an ingestible acid selected from among citric acid, phosphoric acid, adipic acid, ascorbic acid, lactic acid, malic acid, fumaric acid, gluconic acid, succinic acid, tartaric acid and maleic acid. Exemplary of an acid is citric acid. In some examples, the acid is present in an amount between at or about 0.01% and at or about 5%; or between at or about 0.01% and at or about 3%; or between at or about 0.1% and at or about 3%; or between at or about 0.05% and at or about 4%, inclusive, by weight, of the composition; or is or is about 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.6%, 0.7%, 0.8%, 0.9%, 1%, 1.05%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.1%, 2.2%, 2.3%, 2.4%, 2.5%, 3%, 3.5%, 4%, 4.5% or 5%, by weight, of the composition. In some examples, the acid is citric acid and is present in an amount between at or about 0.05% and at or about 4%, inclusive, by weight, of the composition.

The provided beverage compositions contain one or a mixture of non-polar compounds. In some examples, the non-polar compound(s) is a polyunsaturated fatty acid that is selected from among omega-3 fatty acids, omega-6 fatty acids, omega-9 fatty acids and conjugated fatty acids. For example, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) is selected from among coenzyme Q-containing compounds, oil soluble vitamins, alpha lipoic acid, carotenoid-containing compounds and phytochemicals. For example, the non-polar compound(s) is selected from among a coenzyme Q10 (CoQ10); an oil soluble vitamin that is selected from among vitamin B12, vitamin D3, vitamin A palmitate, vitamin E, vitamin B3, vitamin B5, vitamin B6 and mixtures thereof; a carotenoid-containing compound that is selected from among lycopene, lutein, eaxanthin and mixtures of lutein and zeaxanthin; a phytochemical-containing compound that is selected from among phytosterols and resveratrol; and a micronutrient-containing compound that is selected from among yerba mate, Ginkgo biloba and ginseng.

The provided beverage compositions can contain additional ingredients, including but not limited to a beverage base, a pH adjuster, a sweetener, preservatives, non-polar solvents, co-surfactants, emulsion stabilizers, pH adjusters and flavoring agents. Typically, the provided beverage compositions contain a beverage base. In some examples, the beverage base contains one or more of water, a juice, a juice concentrate, a juice extract, a flavor, a soda, a flavored soda, a carbonated water, a carbonated juice, or combinations thereof. The beverage base can be present in an amount between at or about 55% and at or about 99% and at or about 99%; or between at or about 65% and at or about 99%; or between at or about 75% and at or about 99%; or between 80% and at or about 99%, inclusive, by weight, of the beverage composition; or is or is about 60%, 65%, 70%, 75%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5% or 99%, by weight, of the composition.

In some examples the provided beverage compositions contain a sweetener, such as, for example, a sucralose, sucrose, lactose, fructose, an acesulfame salt, aspartame, saccharin, stevia, stevioside, and combinations thereof. An exemplary sweetener is sucralose. In some examples, the beverage compositions contain a pH adjuster that is a phosphoric acid. The pH adjuster can be present an amount between at or about 0.1% and at or about 3%; or between at or about 0.1% and at or about 2%; or between at or about 0.1% and at or about 1%, inclusive, by weight, of the beverage composition.

Typically, the organoleptic properties of the beverage composition containing the one or a mixture of non-polar compounds are the same or about the same as the organoleptic properties of the beverage composition in the absence of the one or a mixture of non-polar compounds for at least at or about 1 month, 2 months, 3 months, 4 months, 5 months, 6 months, 7 months, 8 months, 9 months, 10 months, 11 months, 1 year or longer.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; one or a mixture of non-polar compounds selected from among fish oil, flaxseed oil, vitamin B12 and vitamin D3 in an amount between at or about 0.1% and at or about 2%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; one or a mixture of non-polar compounds selected from among fish oil, resveratrol and vitamin D3 in an amount between at or about 0.1% and at or about 1%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; one or a mixture of non-polar compounds selected from among fish oil and vitamin D3 in an amount between at or about 0.05% and at or about 0.5%, inclusive, by weight of the composition, whereby the beverage composition is for direct ingestion.

Also provided herein are beverage compositions containing a bicarbonate in an amount between at or about 0.1% and at or about 2%, inclusive, by weight of the composition; citric acid in an amount between at or about 0.05% and at or about 2.5%, inclusive, by weight of the composition; one or a mixture of non-polar compounds selected from among fish oil, vitamin D3, yerba mate, Ginkgo biloba, ginseng, vitamin B1, vitamin B3, vitamin B5, vitamin B6 and vitamin B12 in an amount between at or about 0.05% and at or about 0.5%, inclusive, by weight of the composition, whereby the beverage composition is for direct ingestion.

Also provided herein is a container comprising any beverage composition provided herein. In some examples, the container is a single serving container or a multi-serving container, wherein a single serving of a beverage composition is or is about 2 ounces. In other examples, the container is a single serving container or a multi-serving container, wherein a single serving of a beverage composition is or is about 8 ounces.

Also provided herein are powder compositions containing one or a mixture of non-polar compounds in an amount between at or about 10% and at or about 50% by weight of the composition; an acid in an amount between at or about 0.1% and at or about 2% by weight of the composition; and a bicarbonate or carbonate in an amount between at or about 10% and at or about 50% by weight of the composition. In some examples, the one or a mixture of non-polar compounds is selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals and micronutrients and the amount of the one or more non-polar compounds is between at or about 10% and at or about 40%; or between at or about 10% and at or about at or about 30%; or between at or about 10% and at or about 35%; or between at or about 15% and at or about 40%; or between at or at least about 15% and at or about 35%; or between at or about 15% and at or about 30%; or between at or about 30% and at or about 40%, inclusive, by weight, of the composition, or is at least at or at least about 10%, 11%, 12%, 13%, 14%, 15%, 16%, 17%, 18%, 19%, 20%, 25%, 30%, 35% or 40%, by weight, of the composition.

In the provided powder compositions, the acid is an ingestible acid that is selected from among citric acid, phosphoric acid, adipic acid, ascorbic acid, lactic acid, malic acid, fumaric acid, gluconic acid, succinic acid, tartaric acid and maleic acid. An exemplary acid is citric acid. The acid can be present in an amount between at or about 0.1% and at or about 1%; or between at or about 0.1% and at or about 0.5%, inclusive, by weight, of the composition. In the provided powder compositions, the bicarbonate or carbonate is selected from among potassium bicarbonate, sodium bicarbonate, potassium carbonate, sodium carbonate, calcium carbonate, magnesium carbonate and zinc carbonate and is present in an amount between at or about 10% and at or about 40%; or between at or about 20% and at or about 50%; or between at or about 20% and at or about 40%; or between at or about 30% and at or about 50%; or between at or about 30% and at or about 40%, inclusive, by weight of the composition, or is at least or is at least about 10%, 15%, 20%, 25%, 26%, 27%, 28%, 29%, 30%, 31%, 32%, 33%, 34%, 35%, 36%, 37%, 38%, 39%, 40%, 41%, 42%, 43%, 44%, 45%, or 50%, by weight, of the composition.

In some examples of the powder compositions, the non-polar compound(s) is a polyunsaturated fatty acid that is selected from among omega-3 fatty acids, omega-6 fatty acids, omega-9 fatty acids and conjugated fatty acids. In one example, the powder compositions contains a non-polar compound that contains a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In some examples, the non-polar compound(s) is selected from among coenzyme Q-containing compounds, oil soluble vitamins, alpha lipoic acid, carotenoid-containing compounds, phytochemicals and micronutrients. In other examples, the non-polar compound(s) is selected from among a coenzyme Q10 (CoQ10); an oil soluble vitamin that is selected from among vitamin B12, vitamin D3, vitamin A palmitate, vitamin E, vitamin B1, vitamin B3, vitamin B5, vitamin B6 and mixtures thereof; a carotenoid-containing compound that is selected from among lycopene, lutein, zeaxanthin and mixtures of lutein and zeaxanthin; a phytochemical-containing compound that is selected from among phytosterols and resveratrol; and a micronutrient-containing compound that is selected from among yerba mate, *Ginkgo biloba* and ginseng.

In some example, the powder compositions further contain a surfactant that is selected from among a PEG-derivative of vitamin E, a polysorbate or polysorbate analog, a sucrose fatty acid ester and a mixture of sucrose fatty acid esters, and combinations thereof. In one example, the surfactant is a PEG-derivative of Vitamin E that is a tocopherol polyethylene glycol diester (TPGD) that is selected from among tocopherol polyethylene glycol succinate (TPGS), tocopherol sebacate polyethylene glycol, tocopherol dodecanodioate polyethylene glycol, tocopherol suberate polyethylene glycol, tocopherol azelaate polyethylene glycol, tocopherol citraconate polyethylene glycol, tocopherol methylcitraconate polyethylene glycol, tocopherol itaconate polyethylene glycol, tocopherol maleate polyethylene glycol, tocopherol glutarate polyethylene glycol, tocopherol glutaconate polyethylene glycol and tocopherol phthalate polyethylene glycol, or a TPGS analog. An exemplary TPGS is TPGS-1000 or D-α TPGS. In another example, the surfactant is a sucrose fatty acid ester mixture that contains a sucrose fatty acid monoester. For example, the surfactant contains a sucrose fatty acid ester mixture that contains sucrose stearate, sucrose laurate, sucrose palmitate, sucrose oleate, sucrose caprylate, sucrose decanoate, sucrose myristate, sucrose pelargonate, sucrose undecanoate, sucrose tridecanoate, sucrose pentadeconoate and sucrose heptadecanoate, or homologs thereof. For example, the surfactant is a sucrose fatty acid ester surfactant that contains any one or more of sucrose monostearate, sucrose monolaurate, sucrose monooleate and sucrose monopalmitate. In yet another example, the surfactant is a polysorbate or polysorbate analog that is polysorbate 80 or a polysorbate 80 analog. The surfactant can be present in an amount between at or about 10% and at or about 30%; or between at or about 10% and at or about 20%; or between at or about 15% and at or about 25%, inclusive, by weight of the composition, or is at least or is at least about 10%, 11%, 12%, 13%, 14%, 15%, 16%, 17%, 18%, 19%, 20%, 21%, 22%, 23%, 24%, 25%, 26%, 27%, 28%, 29% or 30%, by weight, of the composition.

In one example of the powder composition, the powder further contains a preservative, such as benzyl alcohol, that is present in an amount between at or about 0.01% and at or about 1%; or between at or about 0.1% and at or about 1%; or between at or about 0.1% and at or about 0.5%, inclusive, by weight, of the composition. In another example of the powder composition, the powder further contains an excipient selected from among maltodextrin and gum acacia. In one example, the excipient is maltodextrin and is present in an amount between at or about 15% and at or about 40%; or between at or about 20% and at or about 35%; or between at or about 25% and at or about 35%, inclusive, by weight, of the composition, or is at least or is at least about 20%, 21%, 22%, 23%, 24%, 25%, 26%, 27%, 28%, 29%, 30%, 31%, 32%, 33%, 34% or 35%, by weight, of the composition.

Also provided herein are emulsions containing an ingestible acid in an amount between at or about 0.05% and at or about 2%; a bicarbonate or carbonate in an amount between at or about 5% and at or about 25%; one or a mixture of non-polar compounds in an amount between at or about 1% and at or about 20%; and a polar solvent in an amount up to 60%, by weight, of the emulsion. The one or a mixture of non-polar compounds can be selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytochemicals and micronutrients and present in an amount between at or about 1% and at or about 15%; or between at or about 1% and at or about at or about 10%; or between at or about 5% and at or about 20%; or between at or about 5% and at or about 15%; or between at or about 5% and at or about 10%, inclusive, by weight, of the composition, or is at least at or at least about 1%, 2%, 3%, 4%, 5%, 6%, 7%, 8%, 9%, 10%, 11%, 12%, 13%, 14%, 15%, 16%, 17%, 18%, 19% or 20%, by weight, of the composition.

In the provided emulsions, the acid is an ingestible acid that is selected from among citric acid, phosphoric acid, adipic acid, ascorbic acid, lactic acid, malic acid, fumaric acid, gluconic acid, succinic acid, tartaric acid and maleic acid. Exemplary of an acid is citric acid. The acid can be present in an amount between at or about 0.05% and at or about 1.5%; or between at or about 0.05% and at or about 1%; or between at or about 0.1% and at or about 2%; or between at or about 0.1% and at or about 1%; or between at or about 0.1% and at or about 0.5%, inclusive, by weight, of the composition. In the provided emulsions, the bicarbonate or carbonate is selected from among potassium bicarbonate, sodium bicarbonate, potassium carbonate, sodium carbonate, calcium carbonate, magnesium carbonate and zinc carbonate and is present in an amount between at or about 5% and at or about 20%; or between at or about 10% and at or about 25%; or between at or about 10% and at or about 20%; or between at or about 15% and at or about 25%; or between at or about 15% and at or about 20%, inclusive, by weight of the composition, or is at least or is at least about 10%, 11%, 12%, 13%, 14%, 15%, 16%, 17%, 18%, 19% or 20%, by weight, of the composition.

The non-polar compound(s) in the provided emulsions can contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In one example, the non-polar compound(s) is selected from among coenzyme Q-containing compounds, oil soluble vitamins, alpha lipoic acid, carotenoid-containing compounds, phytochemicals and micronutrients. In another example, the non-polar compound(s) is selected from among a coenzyme Q10 (CoQ10); an oil soluble vitamin that is selected from among vitamin B12, vitamin D3, vitamin A palmitate, vitamin E, vitamin B1, vitamin B3, vitamin B5, vitamin B6 and mixtures thereof; a carotenoid-containing compound that is selected from among lycopene, lutein, zeaxanthin and mixtures of lutein and zeaxanthin; a phytochemical-containing compound that is selected from among phytosterols and resveratrol; and a micronutrient-containing compound that is selected from among yerba mate, *Ginkgo biloba* and ginseng.

The provided emulsions can further contain a surfactant that is selected from among a PEG-derivative of vitamin E, a polysorbate or polysorbate analog, a sucrose fatty acid ester and a mixture of sucrose fatty acid esters, and combinations thereof. In one example, the surfactant is a PEG-derivative of Vitamin E that is a tocopherol polyethylene glycol diester (TPGD) that is selected from among tocopherol polyethylene glycol succinate (TPGS), tocopherol sebacate polyethylene glycol, tocopherol dodecanodioate polyethylene glycol, tocopherol suberate polyethylene glycol, tocopherol azelaate polyethylene glycol, tocopherol citraconate polyethylene glycol, tocopherol methylcitraconate polyethylene glycol, tocopherol itaconate polyethylene glycol, tocopherol maleate polyethylene glycol, tocopherol glutarate polyethylene glycol, tocopherol glutaconate polyethylene glycol and tocopherol phthalate polyethylene glycol, or a TPGS analog. Exemplary of a TPGS is TPGS-1000 or D-α TPGS. In one example, the surfactant is present in an amount between at or about 5% and at or about 15%; or between at or about 5% and at or about 10%, inclusive, by weight of the composition, or is at least or is at least about 5%, 6%, 7%, 8%, 9%, 10%, 11%, 12%, 13%, 14% or 15%, by weight, of the composition.

In some examples of the provided emulsions, the polar solvent is water. The provided emulsions can further contain a preservative that is benzyl alcohol and is present in an amount between at or about 0.01% and at or about 1%; or between at or about 0.01% and at or about 0.1%, inclusive, by weight, of the composition. The provided emulsions can further contain an excipient selected from among maltodextrin and gum acacia. For example, the emulsion can contain an excipient that is maltodextrin and is present in an amount between at or about 5% and at or about 25%; or between at or about 5% and at or about 15%; or between at or about 10% and at or about 20%, inclusive, by weight, of the composition, or is at least or is at least about 5%, 6%, 7%, 8%, 9%, 10%, 11%, 12%, 13%, 14%, 15%, 16%, 17%, 18%, 19% or 20%, by weight, of the composition.

Also provided herein are powders produced by spray drying or lyophilizing an emulsion provided herein. Also provided herein are lyophilized or spray dried powders produced by lyophilizing or pray drying an emulsion provided herein.

Also provided herein is a method for stabilizing a beverage composition, wherein the method includes the steps of adding at least or at least about 0.05% up to and including at least or about 20%, by weight, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytosterols, resveratrol and micronutrients and a bicarbonate or carbonate to a beverage base, wherein the beverage base comprises at least or at least about 50%, by weight, of the composition, the bicarbonate or carbonate is present in an amount between at or about 0.01% and at or about 7%, inclusive, by weight, of the composition, the beverage composition is for direct ingestion, whereby, the organoleptic properties of the beverage composition containing the one or a mixture of non-polar compounds are the same or about the same as the organoleptic properties of the beverage composition in the absence of the one or a mixture of non-polar compounds for at least at or about 1 month. The organoleptic properties of the beverage composition can be selected from among taste, odor, appearance and combinations thereof. In some examples, the organoleptic properties of the beverage composition containing the one or a mixture of non-polar compounds are the same or about the same as the organoleptic properties of the beverage composition in the absence of the one or a mixture of non-polar compounds for at least at or about 1 month, 2 months, 3 months, 4 months, 5 months, 6 months, 7 months, 8 months, 9 months, 10 months, 11 months, 1 year or longer.

In the provided method for stabilizing a beverage composition, the bicarbonate or carbonate can be selected from among potassium bicarbonate, sodium bicarbonate, potassium carbonate, sodium carbonate, calcium carbonate, magnesium carbonate and zinc carbonate. In some examples, the method further includes adding an ingestible acid in an amount between at or about 0.01% and at or about 5%, inclusive, by weight, of the composition. In some examples, the method further includes adding an antioxidant in an amount between at or about 0.01% and at or about 3%, inclusive, by weight, of the composition. In the provided method, the ingestible acid can be selected from among citric acid, phosphoric acid, adipic acid, ascorbic acid, lactic acid, malic acid, fumaric acid, gluconic acid, succinic acid, tartaric acid and maleic acid. In some examples of the method, the ingestible acid is citric acid. In the provided method, the antioxidant can be selected from among ascorbic acid, ascorbate or a coenzyme Q-containing compound. In some examples, the antioxidant is vitamin C that is added in an amount between at or about 0.01% and at or about 0.5%, inclusive, by weight, of the composition. In other examples, the antioxidant is a coenzyme Q-containing compound that is added in an amount between at or about 0.1% and at or about 1%, inclusive, by weight, of the composition. In some examples, the acid is citric acid that is added in an amount between at or about 0.05% and at or about 4%, inclusive, by weight, of the composition.

In the provided method for stabilizing a beverage composition, the non-polar compound(s) can be a polyunsaturated fatty acid that is selected from among omega-3 fatty acids, omega-6 fatty acids, omega-9 fatty acids and conjugated fatty acids. In some examples, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) is selected from among coenzyme Q-containing compounds, oil soluble vitamins, alpha lipoic acid, carotenoid-containing compounds, phytosterols, resveratrol and micronutrients. For example, the non-polar compound(s) is selected from among one or more of a coenzyme Q10 (CoQ10); an oil soluble vitamin that is selected from among vitamin B12, vitamin D3, vitamin A palmitate, vitamin E, vitamin B1, vitamin B3, vitamin B5, vitamin B6 and mixtures thereof; a carotenoid-containing compound that is selected from among lycopene, lutein, zeaxanthin and mixtures of lutein and zeaxanthin; and a micronutrient-containing compound that is selected from among yerba mate, *Ginkgo biloba* and ginseng.

In the provided method for stabilizing a beverage composition, the beverage base contains one or more of a polar solvent, a juice, a juice concentrate, a juice extract, a flavor, a soda, a flavored soda, a carbonated water, a carbonated juice and mixtures thereof. An exemplary polar solvent is water. In some examples, the method includes further adding a sweetener, surfactant, preservative, non-polar solvent, co-surfactant, or emulsion stabilizer, or any combination thereof. In some examples of the method, the surfactant is added in an amount between at or about 0.05% and at or about 3%, inclusive, by weight, of the beverage composition. In some examples, the preservative is added in an amount between at or about 0.001% and at or about 0.1%, inclusive, by weight, of the beverage composition. In some examples, the non-polar solvent is added in an amount between at or about 0.001% and at or about 0.1%, inclusive, by weight, of the beverage composition.

Also provided herein is a method for preventing the oxidation of a polyunsaturated fatty acid in a beverage composition, wherein the method includes the steps of adding at least or at least about 0.05% up to and including at least or about 20%, by weight, of one or a mixture of polyunsaturated fatty acids, and a bicarbonate or carbonate or carbonation to a beverage base, wherein the beverage base comprises at least or at least about 50%, by weight, of the composition; the bicarbonate or carbonate or carbonation displaces oxygen in the beverage composition; and the beverage composition is for direct ingestion, whereby the organoleptic properties of the beverage composition containing the one or a mixture of polyunsaturated fatty acids are the same or about the same as the organoleptic properties of the beverage composition in the absence of the one or a mixture of non-polar compounds for at least at or about 1 month. The organoleptic properties of the beverage composition can be selected from among taste, odor, appearance and combinations thereof. In some examples, the organoleptic properties of the beverage composition containing the one or a mixture of non-polar compounds are the same or about the same as the organoleptic properties of the beverage composition in the absence of the one or a mixture of non-polar compounds for at least at or about 1 month, 2 months, 3 months, 4 months, 5 months, 6 months, 7 months, 8 months, 9 months, 10 months, 11 months, 1 year or longer.

In some examples of the method for preventing the oxidation of a polyunsaturated fatty acid in a beverage composition, the polyunsaturated fatty acid is selected from among omega-3 fatty acids, omega-6 fatty acids, omega-9 fatty acids and conjugated fatty acids. For example, the polyunsaturated fatty acid is selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In the provided method, the bicarbonate or carbonate can be selected from among potassium bicarbonate, sodium bicarbonate, potassium carbonate, sodium carbonate, calcium carbonate, magnesium carbonate and zinc carbonate and is added in an amount between at or about 0.01% and at or about 7%, inclusive, by weight, of the beverage composition. In some examples of the method, the beverage composition is carbonated.

In some examples of the provided method for preventing the oxidation of a polyunsaturated fatty acid in a beverage composition, the method further includes adding an ingestible acid that is selected from among citric acid, phosphoric acid, adipic acid, ascorbic acid, lactic acid, malic acid, fumaric acid, gluconic acid, succinic acid, tartaric acid and maleic acid. The ingestible acid can be added in an amount between at or about 0.01% and at or about 5%, inclusive, by weight, of the composition. In some examples of the provided method, the method further includes adding an antioxidant that is selected from among ascorbic acid, ascorbate or a coenzyme Q-containing compound and is added in an amount between at or about 0.01% and at or about 3%, inclusive, by weight, of the composition. In some examples, the antioxidant is vitamin C and is added in an amount between at or about 0.01% and at or about 0.5%, inclusive, by weight, of the composition. In some examples, the antioxidant is a coenzyme Q-containing compound and is added in an amount between at or about 0.1% and at or about 1%, inclusive, by weight, of the composition.

In the provided method for preventing the oxidation of a polyunsaturated fatty acid in a beverage composition, the beverage base can contain one or more of a polar solvent, a juice, a juice concentrate, a juice extract, a flavor, a soda, a flavored soda, a carbonated water, a carbonated juice and mixtures thereof. Exemplary of a polar solvent is water. In some examples of the method, the method further includes adding a sweetener. In some examples of the method, the method further includes packaging the beverage composition into a container and optionally, sealing the container to prevent oxygen from entering the container.

Provided herein is a method for preserving the organoleptic properties of a beverage including the steps of adding at least 0.01% bicarbonate or carbonate to a beverage, wherein the beverage contains non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytosterols, resveratrol and micronutrients; and the organoleptic properties of the beverage composition containing the one or a mixture of non-polar compounds are the same or about the same as the organoleptic properties of the beverage composition in the absence of the one or a mixture of non-polar compounds for at least at or about 1 month. In some examples, the organoleptic properties of the beverage composition containing the one or a mixture of non-polar compounds are the same or about the same as the organoleptic properties of the beverage composition in the absence of the one or a mixture of non-polar compounds for at least at or about 6 months. In other examples, the the organoleptic properties of the beverage composition containing the one or a mixture of non-polar compounds are the same or about the same as the organoleptic properties of the beverage composition in the absence of the one or a mixture of non-polar compounds for at least at or about 1 year. In some examples, the bicarbonate or carbonate can be selected from among potassium bicarbonate, sodium bicarbonate, potassium carbonate, sodium carbonate, calcium carbonate, magnesium carbonate and zinc carbonate and added or present in an amount between at or about 0.01% and at or about 7%, inclusive, by weight, of the beverage composition.

In some examples of the provide method for preserving the organoleptic properties of a beverage the non-polar compound(s) can be a polyunsaturated fatty acid that is selected from among omega-3 fatty acids, omega-6 fatty acids, omega-9 fatty acids and conjugated fatty acids. For example, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) is selected from among coenzyme Q-containing compounds, oil soluble vitamins, alpha lipoic acid, carotenoid-containing compounds, phytosterols, resveratrol and micronutrients. For example, the non-polar compound(s) is selected from among one or more of a coenzyme Q10 (CoQ10); an oil soluble vitamin that is selected from among vitamin B12, vitamin D3, vitamin A palmitate, vitamin E, vitamin B1, vitamin B3, vitamin B5, vitamin B6 and mixtures thereof; a carotenoid-containing compound that is selected from among lycopene, lutein, zeaxanthin and mixtures of lutein and zeaxanthin; and a micronutrient-containing compound that is selected from among yerba mate, *Ginkgo biloba* and ginseng.

Provided herein is a method for improving the organoleptic properties of a beverage that contains fatty acids, wherein the method includes replacing the oxygen that is dissolved in the beverage, whereby the organoleptic properties of the beverage are retained for at least a month, 2 months, 3, months, 4 months, five months, six months and longer when stored at room temperature. In some examples the beverage contains non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytosterols, resveratrol and micronutrients. In some examples, the method includes adding at least 0.01% bicarbonate or carbonate, or carbon dioxide to a beverage, whereby the organoleptic properties of the beverage composition containing the one or a mixture of non-polar compounds are the same or about the same as the organoleptic properties of the beverage composition in the absence of the one or a mixture of non-polar compounds for at least at or about 1 month, at least at or about 6 months or for at least at or about 1 year. In some examples, the bicarbonate or carbonate can be selected from among potassium bicarbonate, sodium bicarbonate, potassium carbonate, sodium carbonate, calcium carbonate, magnesium carbonate and zinc carbonate and can be added or present in an amount between at or about 0.01% and at or about 7%, inclusive, by weight, of the beverage composition.

In some examples of the method for improving the organoleptic properties of a beverage that contains fatty acids, the non-polar compound(s) can be a polyunsaturated fatty acid that is selected from among omega-3 fatty acids, omega-6 fatty acids, omega-9 fatty acids and conjugated fatty acids. For example, the non-polar compound(s) contain a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract. In other examples, the non-polar compound(s) can be selected from among coenzyme Q-containing compounds, oil soluble vitamins, alpha lipoic acid, carotenoid-containing compounds, phytosterols, resveratrol and micronutrients. For example, the non-polar compound(s) is selected from among one or more of a coenzyme Q10 (CoQ10); an oil soluble vitamin that is selected from among vitamin B12, vitamin D3, vitamin A palmitate, vitamin E, vitamin B1, vitamin B3, vitamin B5, vitamin B6 and mixtures thereof; a carotenoid-containing compound that is selected from among lycopene, lutein, zeaxanthin and mixtures of lutein and zeaxanthin; and a micronutrient-containing compound that is selected from among yerba mate, *Ginkgo biloba* and ginseng.

U.S. Patent Publication Nos. 20090297665, 20090317532, 20110236364, 20090297491 and 20120016026 are incorporated herein by reference.

DETAILED DESCRIPTION

Outline

A. DEFINITIONS
B. BEVERAGE COMPOSITIONS CONTAINING NON-POLAR COMPOUNDS
   1. Formulating the beverage compositions
      a. Ingredients and exemplary concentration ranges
      b. Volume
   2. Evaluation of the beverage compositions
      a. Organoleptic properties
         i. Taste and odor
         ii. Appearance
   3. Ingredients
      a. Stabilizers
         i. Bicarbonates or Carbonates
         ii. Acids
         iii. Antioxidants
      b. Non-Polar Compounds
         i. Polyunsaturated Fatty Acid (PUFA)-containing Compounds
            a. Omega-3 Fatty Acid Compounds
               i. DHA/EPA
                  (1) Fish Oils
                  (2) Algae Oils
               ii. Flax Seed Oil (Alpha-linolenic acid (ALA))
            b. Omega-6 Fatty Acid Compounds
               i. Borage Oil (Gamma-linolenic acid (GLA))
            c. Saw Palmetto Extract
            d. Conjugated Linoleic Acid (CLA)
         ii. Coenzyme Q Compounds
            a. Coenzyme Q10
         iii. Phytochemical-containing Compounds
            a. Phytosterols
            b. Resveratrol
         iv. Carotenoid-containing Compounds
            a. Carotenes
            b. Xanthophylls
         v. Micronutrient-containing Compounds
            a. Vitamins
            b. Alpha Lipoic Acid (Thioctic acid)
         vi. Concentrates or Emulsions
            a. Typical Ingredients
               i. Non-Polar Compounds
               ii. Surfactants
                   Sucrose Fatty Acid Ester surfactants
                   Vitamin E derived surfactants
                   PEG-derived surfactants
               iii. Additional Ingredients
            b. Exemplary Concentrates or Emulsions
            c. Other concentrates or emulsions
            d. Amount
      c. Beverage Base
         i. Water
         ii. Juices or Juice Concentrates
         iii. Flavors
      d. Sweeteners
      e. pH Adjusters
      f. Antifoaming Agents
C. POWDER AND EMULSION COMPOSITIONS
   1. Emulsion Compositions
   2. Powder Compositions
D. METHODS FOR STABILIZNG OR PRESERVING BEVERAGES
E. METHODS FOR GENERATING COMPOSITIONS
   1. Equipment for making the beverage compositions
      a. Scales
      b. Purifiers, including filters
      c. Vessels for mixing the ingredients
      d. Mixers
      e. Heating apparatuses
      f. Cooling apparatuses
      g. Transfer means
      h. Evaluation equipment
   2. General methods for making the beverage compositions
      a. Bench-top process
      b. Scaled-up process
   3. Emulsion and powder forms
F. EXAMPLES

Definitions

Unless defined otherwise, all technical and scientific terms used herein have the same meaning as is commonly understood by one of skill in the art to which the invention(s) belong. All patents, patent applications, published applications and publications, GENBANK sequences, websites and other published materials referred to throughout the entire disclosure herein, unless noted otherwise, are incorporated by reference in their entirety. In the event that there is a plurality of definitions for terms herein, those in this section prevail. Where reference is made to a URL or other such identifier or address, it is understood that such identifiers can change and particular information on the internet can come and go, but equivalent information is known and can be readily accessed, such as by searching the internet and/or appropriate databases. Reference thereto evidences the availability and public dissemination of such information.

As used herein, "organoleptic properties" refer to sensory attributes of a food or beverage, in particular the beverage compositions provided herein. Those of skill in the art understand such properties and they can be quantitated if needed. Organoleptic properties include, but are not limited to, taste, odor and/or appearance. Desirable organoleptic properties include those organoleptic properties that make a food or beverage composition desirable for consumption by an average human subject, such as a desirable odor, taste and/or appearance, or the lack of an undesirable odor, taste and/or appearance. Undesirable organoleptic properties include the presence of, for example, an undesirable taste, odor or appearance attribute, such as the presence of an "off-taste" or "off-odor," for example a fishy, grassy, metal or iron, sharp or tingling taste or odor, or the presence of an undesirable appearance attribute, such as separation or precipitation. In one example, the provided beverage compositions retain the same or about the same taste, odor and/or appearance as the same beverage composition that does not contain the one or more non-polar compounds, that is, the provided beverage compositions retain organoleptic properties desirable for consumption by an average human subject. Desirable and undesirable organoleptic properties can be measured by a variety of methods known to those skilled in the art, including, for example, organoleptic evaluation methods by which undesirable properties are detectable by sight, taste and/or smell and chemical tests, as well as by chemical analytical methods. For example, the provided beverage compositions retain the same or about the same organoleptic properties as the same beverage composition that does not contain the one or more non-polar compounds over a period of time, for example, at least or over 1, 2, 3, 4, 5, 6, or more days, at least or over 1, 2, 3, 4, or more weeks, at least or over 1, 2, 3, 4, 5, 6, 7, 8, 9, 10, 11, 12, or more months, or at least or over 1, 2, 3, 4, or more years.

In one example, the provided beverage compositions retain the same or about the same taste as the same beverage composition that does not contain the one or more non-polar compounds. In one example, the provided beverage compositions retain the same or about the same odor as the same beverage composition that does not contain the one or more non-polar compounds. In one example, the provided beverage compositions retain the same or about the same appearance as the same beverage composition that does not contain the one or more non-polar compounds. In one example, the beverage compositions retain the same organoleptic properties at room temperature, for example, at 25° C. or at about 25° C. In another example, the compositions retain the same organoleptic properties at between 19° C. or about 19° C. and 25° C. or about 25° C. In another example, the beverage compositions retain the same organoleptic properties at elevated temperatures, for example, at 40° C. or at about 40° C. In another example, the compositions retain the same organoleptic properties at refrigerated temperatures, for example, at 4° C. or about 4° C., or at frozen temperatures, for example, at −20° C. or about −20° C. Typically, retaining the same or about the same organoleptic properties means that the shelf life of beverage compositions that contain non-polar compounds is the same or about the same or longer than the beverage compositions not containing the non-polar compounds. Any or all of the above organoleptic properties, particularly the desirable organoleptic properties, are retained for the shelf life of the beverage composition that does not contain the non-polar compound(s) under conditions in which the beverage composition is normally stored. Generally, beverage compositions remain free from organoleptic changes for at least 6 months, unless the beverage composition that does not contain the non-polar compound has a shorter shelf life. The beverage composition will retain its desired organoleptic properties for this period of time.

As used herein, retaining the organoleptic properties refers to retention of these properties upon storage for a recited period of time, typically at room temperature.

As used herein, "clear" can be used to describe the appearance of a beverage composition provided herein. In one example, a clear liquid is one that does not appear cloudy by empirical observation (e.g., to the naked eye) and/or does not have undesirable attributes such as separation or precipitation. In one example, clarity is expressed relatively. For example, it can be desired that a particular composition is equally as clear, about as clear, or more clear than another composition (as measured empirically, or by measuring turbidity value or particle size). For example, clarity can be assessed relative to another beverage composition, typically a beverage composition not containing a non-polar compound. In one example, a liquid is clear if it is similar in appearance to another clear liquid, for example, a beverage. In another example, it can be desired that a composition appears more clear or as clear as another beverage composition, for example, by having no more visible particles, no more crystal formation and/or no more cloudiness than the other liquid. In one example, the provided compositions are clear. In another example, they are relatively clear or as clear as or about as clear as another composition that does not contain the non-polar compound.

As used herein, "shelf life" refers to a time period within which the provided compositions retain desirable organoleptic properties, for example, the ability of the provided compositions to retain desirable organoleptic properties for a period of time, for example, for at least or more than 1, 2, 3, 4, or more weeks, typically at least or more than 1, 2, 3, 4, 5, 6, 7, 8, 9, 10, 11, 12 or more months, or at least or over 1, 2, 3, 4 or more years. In one example, the compositions retain desirable organoleptic properties if they exhibit one or more of these described characteristics, over time, when kept at a particular temperature. In one example, the compositions retain desirable organoleptic properties at room temperature, for example, 25° C. or about 25° C. In another example, the compositions retain desirable organoleptic properties at between 19° C. and 25° C. In another example, the compositions retain desirable organoleptic properties at refrigerated temperatures, for example, 4° C. or about 4° C., or at frozen temperatures, for example, at −20° C. or about −20° C. In another example, the compositions retain desirable organoleptic properties at elevated temperatures, for example, at 40° C. or at about 40° C.

As used herein, a "beverage composition" refers to a composition, typically an aqueous ingestible composition, that contains one or more non-polar compounds, one or more stabilizers selected from acids, antioxidants and bicarbonates or carbonates, or mixtures thereof, and a beverage base that contains a polar solvent, such as water, a juice, a juice concentrate, a fruit juice extract or a fruit flavor. Typically, beverage compositions provided herein are provided for direct ingestion, that is they are directly consumed by a subject, e.g., a human.

As used herein, a "beverage base" refers to an aqueous composition to which one or more non-polar compounds can be added. A beverage base includes, but is not limited to, an aqueous composition that contains one or more of a polar solvent, typically water, a juice, such as a fruit juice, a fruit juice concentrate, a fruit juice extract, a fruit flavor, a soda, a flavored soda, a carbonated water, a carbonated juice and any combination thereof.

As used herein, a "fruit juice," "fruit juice concentrate," "fruit juice extract" or "fruit flavor" refer to fruit-based juices and flavors that impart taste or smell to the provided beverage compositions. Any juice or fruit flavor can be added to the provided beverage compositions, including, but not limited to, plum, prune, date, currant, fig, grape, raisin, cranberry, pineapple, peach, nectarine, banana, apple, pear, guava, apricot, Saskatoon berry, blueberry, plains berry, prairie berry, mulberry, elderberry, Barbados cherry (acerola cherry), choke cherry, chocolate, vanilla, caramel, coconut, olive, raspberry, strawberry, huckleberry, loganberry, dewberry, boysenberry, kiwi, cherry, blackberry, honey dew, green tea, cucumber, quince, buckthorn, passion fruit, sloe, rowan, gooseberry, pomegranate, persimmon, mango, rhubarb, papaya, litchi, lemon, orange, lime, tangerine, mandarin and grapefruit juices, or any combination thereof. Exemplary beverage compositions provided herein include combinations of juices or flavors that impart peach mango, peach, citrus, pomegranate blueberry, tropical berry, cherry chocolate, cherry vanilla, chocolate blueberry, chocolate caramel, cucumber, green tea, honey-dew melon, pineapple papaya, peach nectarine, raspberry lemonade, grape, orange tangerine, orange, lime and mixed berry flavors.

As used herein, a "flavor" is any ingredient that changes, typically improves, the taste and/or smell of the provided beverage compositions.

As used herein, "stabilize" means to increase the stability of the provided compositions or render such compositions stable.

As used herein, "stabilizer" or "stabilizing system" refers to bicarbonates or carbonates, acids and antioxidants, or combinations thereof, that are added to the provided beverage compositions such that the desired organoleptic properties of the beverage compositions in the presence of one or more non-polar compounds are the same as the organoleptic properties in the absence of the one or more non-polar compounds. Typically, stabilizers or stabilizing systems are food-approved, e.g., edible stabilizers, for example, stabilizers that are safe and/or approved for human consumption.

As used herein, an "antioxidant" refers to a stabilizer or one component of a stabilizing system that acts as an antioxidant, and that, when added to a beverage composition in combination with the other required components (i.e. acid and/or bicarbonate or carbonate) yields beverage compositions that retain one or more desired organoleptic properties, such as, but not limited to, the taste, smell, odor and/or appearance, of the beverage composition over time. Typically, antioxidants are food-approved, e.g., edible antioxidants, for example, antioxidants that are safe and/or approved for human consumption. Exemplary antioxidants include, but are not limited to, ascorbic acid, vitamin C, ascorbate and coenzyme Q-containing compounds, including, but not limited to, coenzyme Q10.

As used herein, an "acid" or "ingestible acid" refers to a stabilizer or one component of a stabilizing system that, when added to a beverage composition in combination with the other components (i.e antioxidant and/or bicarbonate or carbonate), yields beverage compositions that retain one or more desired organoleptic properties, such as, but not limited to, the taste, smell, odor and/or appearance, of the beverage composition over time. Typically, the acids are food-approved, e.g., edible acids or ingestible acids, for example, acids that are safe and/or approved for human consumption. Exemplary acids include, but are not limited to, citric acid, phosphoric acid, adipic acid, ascorbic acid, lactic acid, malic acid, fumaric acid, gluconic acid, succinic acid, tartaric acid and maleic acid.

As used herein, a "bicarbonate" or "carbonate" refers to a stabilizer or one component of a stabilizing system that, when added to a beverage composition in combination with the other components (i.e the acid and/or antioxidant) yields beverage compositions that retain one or more desired organoleptic properties, such as, but not limited to, the taste, smell, odor and/or appearance, of the beverage composition over time. Typically, bicarbonates or carbonates are food-approved, e.g., edible bicarbonates or carbonates, for example, bicarbonates or carbonates that are safe and/or approved for human consumption. Exemplary bicarbonates include, but are not limited to, potassium bicarbonate and sodium bicarbonate. Exemplary carbonates include, but are not limited to, potassium carbonate, sodium carbonate, calcium carbonate, magnesium carbonate and zinc carbonate.

As used herein, "carbonation" or "carbonated" refers to carbon dioxide dissolved in liquid, such as a beverage base, including water. A liquid, or beverage, can be carbonated by direct addition of carbon dioxide to the liquid or beverage.

As used herein, a "container" refers a vial, bottle, or other container that can hold one or more servings of a provided beverage composition. In one example, a serving of a beverage composition is 8 ounces (0.236588236 liters or about 0.24 L). In another example, a serving of a beverage composition is 2 ounces (0.0591470591 liters, i.e., about 0.06 liter). In one example, a container holds a single serving. In another example, a container holds or delivers a plurality servings, including 0.05, 1, 2, 3, 4, 5, 6, 7, 8, or more servings of a provided beverage composition.

As used herein, "non-polar compounds" include drugs, hormones, vitamins, nutrients and other lipophilic compounds that contain one or more non-polar active ingredients. Typically, the non-polar compounds used in the provided compositions are poorly water soluble, for example, water insoluble or compounds having low water solubility. Exemplary non-polar compounds contain non-polar active ingredients, for example, lipid-soluble drugs, hormones, essential fatty acids, such as polyunsaturated fatty acids (PUFA), e.g., omega-3, omega-6 and omega-9 fatty acids, vitamins, nutrients, nutraceuticals, minerals, micronutrients and other non-polar active ingredients. Additional exemplary non-polar compounds are described herein. The provided beverage compositions can be formulated with any non-polar compound, for example, containing any non-polar active ingredient.

As used herein, a "non-polar active ingredient" refers to a non-polar ingredient within a non-polar compound, that, when administered to a subject, for example, a human, induces or is proposed to induce a desired response, such as altering body function at the cellular, tissue, organ or other level, and/or altering the cosmetic appearance or other property, or a non-polar compound or ingredient that is ingested in order to achieve a desired effect. Non-polar active ingredients can be any synthetic or natural non-polar ingredient or compound, including a pharmaceutical, drug, therapeutic, nutritional supplement, herb, hormone or other ingredient. Non-polar active ingredients can include the non-polar active ingredients listed herein, as well as other pharmaceutically acceptable or food-grade active derivatives of the active ingredients, for example, salts, esters, amides, prodrugs, active metabolites, isomers, fragments and analogs. Active ingredients can include compounds proven to have a desired effect and also compounds thought to produce such effects, for example, compounds typically ingested for nutritional supplementation purposes.

As used herein, "nutraceutical" refers to a food or beverage product that provides a health or medical benefit. The provided beverage compositions are nutraceutical beverages in that they provide non-polar active ingredients, such as lipid-soluble drugs, hormones, essential fatty acids, such as polyunsaturated fatty acids (PUFA), e.g., omega-3, omega-6 and omega-9 fatty acids, vitamins, nutrients, minerals and other non-polar active ingredients.

As used herein, a "supplement" refers to a food or beverage nutrient that is intended to supplement a subject's diet, such as by providing a non-polar compound, such as a vitamin, mineral, fatty acid or amino acid. A supplement is intended to provide an essential nutrient.

As used herein, a "pharmaceutical" refers to any chemical substance intended for use in the medical diagnosis, cure, treatment or prevention of disease.

As used herein, "fatty acid" refers to straight-chain hydrocarbon molecules with a carboxyl (COOH) group at one end of the chain. Fatty acids differ by chain length, with short chain fatty acids having fewer than 6 carbon molecules, medium chain fatty acids having 6-12 carbon molecules, long chain fatty acids having more than 12 carbon molecules and very long chain fatty acids having more than 22 carbon molecules. Exemplary of fatty acids are saturated fatty acids, monounsaturated fatty acids, polyunsaturated fatty acids and essential fatty acids.

As used herein, "polyunsaturated fatty acid" and "PUFA" are used synonymously to refer to fatty acids that contain more than one carbon-carbon double bond in the carbon chain of the fatty acid. PUFAs, particularly essential fatty acids, are useful as dietary supplements.

As used herein, "essential fatty acids" are PUFAs that mammals, including humans, cannot synthesize using any known chemical pathway. Thus, essential fatty acids must be obtained from diet or by supplementation. Exemplary of essential PUFA fatty acids are omega-3 (ω3; n-3) fatty acids and omega-6 (ω-6; n-6) fatty acids.

As used herein, omega-3 (ω3; n-3) fatty acids are methylene interrupted polyenes, which have two or more cis double bonds, separated by a single methylene group and in which the first double bond appears at the third carbon from the last (ω) carbon. Omega-3 fatty acids are used as dietary supplements, for example, for disease treatment and prevention. In one example, the provided beverage compositions contain non-polar active ingredients that contain at least one omega-3 fatty acid. Exemplary of omega-3 fatty acids are alpha-linolenic acid (α-linolenic acid; ALA) (18:3ω3) (a short-chain fatty acid); stearidonic acid (18:4ω3) (a short-chain fatty acid); eicosapentaenoic acid (EPA) (20:5ω3); docosahexaenoic acid (DHA) (22:6ω3); eicosatetraenoic acid (24:4ω3); docosapentaenoic acid (DPA, clupanodonic acid) (22:5ω3); 16:3 ω3; 24:5 ω3 and nisinic acid (24:6ω3). Longer chain omega-3 fatty acids can be synthesized from ALA (the short-chain omega-3 fatty acid). Exemplary of non-polar active ingredients containing omega-3 fatty acids are non-polar active ingredients containing DHA and/or EPA, for example, containing fish oil, krill oil and/or algae oil, for example, microalgae oil, and non-polar active ingredients containing alpha-linolenic acid (ALA), for example, containing flaxseed oil.

As used herein, omega-6 (ω-6; n-6) fatty acids are methylene interrupted polyenes, which have two or more cis double bonds, separated by a single methylene group and in which the first double bond appears at the sixth carbon from the last (ω) carbon. In one example, the provided beverage compositions contain non-polar active ingredients that contain at least one omega-6 fatty acid. Exemplary of omega-6 fatty acids are linoleic acid (18:20)$_6$) (a short-chain fatty acid); gamma-linolenic acid (GLA) (18:3ω6); dihomo gamma linolenic acid (DGLA) (20:3ω6); eicosadienoic acid (20:2ω6); arachidonic acid (AA) (20:4ω6); docosadienoic acid (22:2ω6); adrenic acid (22:4ω6); and docosapentaenoic acid (22:5ω6). Exemplary of non-polar active ingredients containing omega-6 fatty acids are ingredients containing GLA, for example, borage oil. Also exemplary of PUFA-containing non-polar active ingredients are compounds containing conjugated fatty acids, for example, conjugated linoleic acid (CLA) and compounds containing saw palmetto extract.

As used herein, "algae oil" refers to any oil derived from marine dinoflagellates in, for example, microalgae, for example, *Crypthecodinium* sp., particularly, *Crypthecodinium cohnii*. In one example, algae oil is used as a non-polar compound, for example, as an active ingredient, in the provided beverage compositions. The algae oil typically contains DHA. In one example, the algae oil also is a source of EPA.

As used herein, "fish oil" refers to any oil derived from any fish, typically a cold water fish, for example, from fish tissue, for example, from frozen fish tissue, for example, from cod liver. In one example, fish oil is used as a non-polar compound, for example, an active ingredient, in the provided beverage compositions. The fish oil typically contains DHA. In one example, the fish oil also contains EPA.

As used herein, a "pH adjuster" is any compound, typically an acid or a base, that is capable of changing the pH of the provided compositions, for example, to reduce the pH of the composition or to increase the pH of the composition, typically without altering other properties of the composition, or without substantially altering other properties. pH adjusters are well known. Exemplary of the pH adjusters are acids, for example, phosphoric acid, and bases.

As used herein, "beverage concentrate," "concentrate" or "emulsion" refer to a colloidal dispersion of two immiscible liquids, for example, an oil and water (or other aqueous liquid, e.g., a polar solvent), one of which is part of a continuous phase and the other of which is part of a dispersed phase. Emulsions include oil-in-water and water-in-oil emulsions. Emulsions typically are oil-in-water emulsions (which include any oil soluble phase dispersed in any aqueous phase, also called the water phase), in which the oil phase is the dispersed phase and the water phase is the continuous phase. Emulsions typically are stabilized by one or more surfactants and/or co-surfactants and/or emulsion stabilizers. Surfactants form an interfacial film between the oil and water phase of the emulsion, providing stability. Typically, the emulsions or concentrates that can be added to the provided beverage compositions contain micelles, containing one or more surfactants surrounding a non-polar compound, which are dispersed in the water phase.

As used herein, a nanoemulsion is an emulsion in which the dispersed droplets, for example, the micelles, have a diameter (particle size) less than 1000 nm or less than about 1000 nm, typically, less than 500 nm or less than about 500 nm, typically less than 300 nm or about 300 nm, for example, less than 250 nm or about 250 nm, for example, less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

As used herein, "micelle" refers to aggregates formed by surfactants that typically form when the surfactant is present in an aqueous composition, typically when the surfactant is used at a concentration above the critical micelle concentration (CMC). In micelles, the hydrophilic portions of the surfactant molecules contact the aqueous or the water phase, while the hydrophobic portions form the core of the micelle, which can encapsulate non-polar ingredient(s), for example, non-polar compounds. Typically, surfactants and/or co-surfactants aggregate in the emulsions and the aqueous liquids to form micelles, which contain the non-polar compound(s). The hydrophilic portion(s) of the surfactant molecules are oriented toward the outside of the micelle, in contact with the aqueous medium, while the hydrophobic portion(s) of the surfactant molecules are oriented toward the center of the micelle, in contact with the non-polar compound(s), which is contained in the center of the micelle. The micelles can contain more than one surfactant. Typically, the micelles have a particle size of about 1000 nm, typically, less than 500 nm or less than about 500 nm, typically less than 300 or about 300 nm, for example, less than 250 nm or about 250 nm, for example, less than 200 nm or less than about 200 nm, for example, less than or less than about 5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90, 100, 110, 120, 130, 140, 150, 160, 170, 180, 190, or 200 nm.

As used herein, "surfactant" and "surface active agent" refer synonymously to synthetic and naturally occurring amphiphilic molecules that have hydrophobic portion(s) and hydrophilic portion(s). Due to their amphiphilic (amphipathic) nature, surfactants and co-surfactants typically can reduce the surface tension between two immiscible liquids, for example, the oil and water phases in an emulsion, stabilizing the emulsion. Any known surfactant or co-surfactant can be used in a concentrate or emulsion containing a non-polar compound (see, e.g., U.S. Pat. No. 6,267,985). A surfactant's HLB value is an indication of the molecular balance of the hydrophobic and lipophilic portions of the surfactant, which is an amphipathic molecule. Surfactant(s) typically have an HLB value between 12 and 20, inclusive, such as 12 or about 12 and 18, 19 or 20 or about 18, 19 or 20, 13 or about 13 and 20 or about 20, for example, 13 or about 13, 14 or about 14, 15 or about 15, 16 or about 16, 17 or about 17, 18 or about 18, 19 or about 19, and 20 or about 20, and typically between at or about 13 and at or about 18, more typically between at or about 15 and at or about 18. Exemplary of the surfactants include, but are not limited to, non-ionic surfactants, such as sugar ester surfactants and polyethylene glycol (PEG)-derived surfactants, such as sucrose fatty acid ester (SFAE) surfactants, PEG-derivatives of Vitamin E, and (PEG)-sorbitan fatty acid esters, which typically include sucrose fatty acid monoesters, such as sucrose monolaurate, sucrose monopalmitate, sucrose monostearate, and sucrose monooleate, tocotrienol or tocopherol PEG diesters, such as TPGS (e.g., TPGS 1000) and TPGS analogs, and PEG-sorbitan monooleates, such as Polyoxyethylene (20) sorbitan monooleate (also called polysorbate 80), as well as polysorbate 80 analogs, such as polysorbate 80 homologs and polysorbate 80 derivatives. Typically, the surfactant is a natural surfactant, for example, a surfactant that is G.R.A.S. (generally recognized as safe) by the FDA and/or Kosher certified.

As used herein, a "sucrose fatty acid ester" is a compound having the formula shown in Scheme I, below.

Scheme I

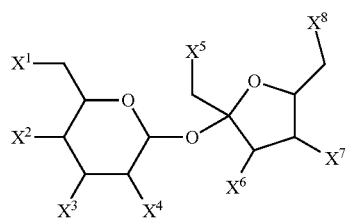

where each of $X^1$, $X^2$, $X^3$, $X^4$, $X^5$, $X^6$, $X^7$ and $X^8$ independently is:
an hydroxyl (—OH) group, or

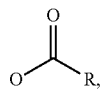

where:
each R is an alkyl group having 3-27 carbon atoms; and
when more than one of $X^1$, $X^2$, $X^3$, $X^4$, $X^5$, $X^6$, $X^7$ and $X^8$ is

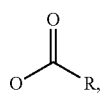

each R can be a different alkyl group (e.g., having different number of carbon atoms and/or different saturation), or can be the same alkyl group.

A sucrose fatty acid monoester has the structure set forth in Scheme I, where one of $X^1$, $X^2$, $X^3$, $X^4$, $X^5$, $X^6$, $X^7$ and $X^8$ (typically $X^1$) is:

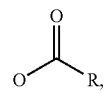

and the other seven of $X^1$, $X^2$, $X^3$, $X^4$, $X^5$, $X^6$, $X^7$ and $X^8$ are each, independently, —OH. Sucrose fatty acid diesters, sucrose fatty acid triesters, and sucrose fatty acid polyesters, respectively, are sucrose fatty acid esters having structures according to Scheme I, above, where two (diesters), three (triesters) or more (polyesters) of $X^1$, $X^2$, $X^3$, $X^4$, $X^5$, $X^6$, $X^7$ and $X^8$, (and typically $X^1$ and $X^8$) independently, are

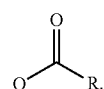

The sucrose fatty acid ester surfactants include mixtures, or blends, of sucrose fatty acid esters, which typically include monoesters, and can also include diesters, triesters and polyesters. Typically, the sucrose fatty acid ester surfactants contain sucrose fatty acid monoesters. The sucrose fatty acid ester surfactants include single fatty acid esters and also include homogeneous mixtures of sucrose esters, containing two or more sucrose fatty acid esters with different lengths of fatty acid carbon chains and/or members with different degrees of esterification. The sucrose fatty acid ester mixtures can include one or more sucrose fatty acid esters, such as, but not limited to, sucrose stearate, sucrose laurate, sucrose palmitate, sucrose oleate, sucrose caprylate, sucrose decanoate, sucrose myristate, sucrose pelargonate, sucrose undecanoate, sucrose tridecanoate, sucrose pentadecanoate and sucrose heptadecanoate, and homologs thereof.

An exemplary sucrose fatty acid monoester has the following structure:

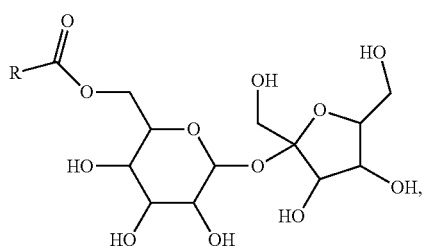

where R is an alkyl group having 3-27 carbons.

As used herein, a "PEG derivative of Vitamin E" is a compound containing one or more Vitamin E moieties (e.g., a tocopherol or tocotrienol) joined, for example by an ester, ether, amide or thioester bond, with one or more polyethylene glycol (PEG) moieties, via a linker, for example, a dicarboxylic or tricarboxylic acid. Exemplary of PEG derivatives of Vitamin E are tocopherol polyethylene glycol succinate (TPGS), TPGS analogs, TPGS homologs and TPGS derivatives.

As used herein, a "tocopherol polyethylene glycol diester" and "TPGD" refer to a PEG-derivative of tocopherol where the linker is a dicarboxylic acid (a carboxylic acid having two carboxy groups, e.g., succinic acid), such as succinic acid. Exemplary of dicarboxylic acids that can be used as linkers in these tocopherol and tocotrienol PEG diester surfactants are succinic acid, sebacic acid, dodecanedioic acid, suberic acid, or azelaic acid, citraconic acid, methylcitraconic acid, itaconic acid, maleic acid, glutaric acid, glutaconic acid, fumaric acids and phthalic acids. Exemplary of TPGDs are tocopherol succinate polyethylene glycol (TPGS), tocopherol sebacate polyethylene glycol, tocopherol dodecanodioate polyethylene glycol, tocopherol suberate polyethylene glycol, tocopherol azelaate polyethylene glycol, tocopherol citraconate polyethylene glycol, tocopherol methylcitraconate polyethylene glycol, tocopherol itaconate polyethylene glycol, tocopherol maleate polyethylene glycol, tocopherol glutarate polyethylene glycol, tocopherol glutaconate polyethylene glycol, and tocopherol phthalate polyethylene glycol, among others.

As used herein, "tocopherol polyethylene glycol succinate," "TPGS," "tocopheryl polyethylene glycol succinate surfactant" and "TPGS surfactant" refer to tocopherol polyethylene glycol (PEG) diesters, that are formed by joining, via esterification, tocopherol succinate, which itself is an ester made by esterification of tocopherol and succinic acid. The term tocopherol refers to any naturally occurring or synthetic form of vitamin E, and can refer to a single compound or a mixture. Examples of tocopherols include, for example, α-tocopherol, D-α-tocopherol, β-tocopherol, γ-tocopherol and δ-tocopherol. The PEG moiety of the TPGS surfactant can be any PEG moiety, for example, PEG moieties between 200 Da or about 200 Da and 20,000 Da or about 20,000 Da, typically between 200 Da or about 200 Da and 6000 Da or about 6000 Da, for example, between 600 Da or about 600 Da and 6000 Da or about 6000 Da, typically between 200 Da or about 200 Da and 2000 Da or about 2000 Da, between 600 Da or about 600 Da and 1500 Da or about 1500 Da, or between 600 Da or about 600 Da and 1000 Da or about 1000 Da, for example, 200 Da or about 200 Da, 300 Da or about 300 Da, 400 Da or about 400 Da, 500 Da or about 500 Da, 600 Da or about 600 Da, 800 Da or about 800 Da, and 1000 Da or about 1000 Da; and PEG moieties that are modified, for example, methylated PEG (m-PEG) and/or PEG moieties including other PEG analogs, e.g., PEG-NHS, PEG-aldehyde, PEG-SH, PEG-NH$_2$, PEG-CO$_2$H, and branched PEGs. Typically, the TPGS surfactant is GRAS (Generally Recognized As Safe) and Kosher certified.

Exemplary of the TPGS surfactants is TPGS-1000, which has a PEG moiety of 1000 Da. The TPGS can be any natural, water-soluble, tocopherol polyethylene glycol succinate, for example, the food grade TPGS sold under the name Eastman Vitamin E TPGS®, food grade, by Eastman Chemical Company, Kingsport, Tenn. This TPGS is water-soluble form of natural-source vitamin E, which is prepared by esterifying the carboxyl group of crystalline d-alpha-tocopheryl acid succinate with polyethylene glycol 1000 (PEG 1000), and contains between 260 and 300 mg/g total tocopherol. TPGS typically has a reported HLB value of between 12 or 13 or about 12 or 13 and 18 or about 18.

As used herein, "tocopherol polyethylene glycol succinate analog," "TPGS analog," and "TPGS analog surfactant" refer to compounds, other than TPGS, that are similar to a parent TPGS compound, but differ slightly in composition, for example, by the variation, addition or removal of an atom, one or more units (e.g., methylene unit(s) —(CH$_2$)$_n$) or one or more functional groups. TPGS analogs include Vitamin E derived surfactants, including PEG derivatives of Vitamin E, including vitamin E PEG diesters, such as, but not limited to, tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz), and polyoxyethanyl tocotrienyl sebacate (PTrienS) as well as other PEG derivatives of Vitamin E.

Exemplary of TPGS analogs are compounds, other than TPGS compounds, having the formula shown in Scheme II:

Scheme II

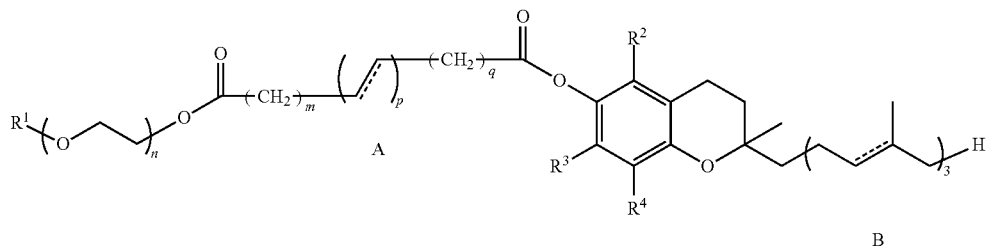

where R$^1$, R$^2$, R$^3$ and R$^4$ each independently is hydrogen (H) or methyl (CH$_3$); each dashed line is, independently, a single or double bond; n is an integer from 1 to 5000; m and q each independently are 0 or 1; and p is an integer from 1 to 20. For example, TPGS analogs include, but are not limited to, compounds having the formula in Scheme II, where, when the bonds represented by the dashed lines marked by "A" and "B" are single bonds, and m and q each equal 0, p is any integer from 2-20. TPGS analogs also include compounds where the dashed line at B or the dashed line at A, or both the dashed lines, represents at least one double bond. For example, TPGS analogs include a compound as in Scheme II, where when the dashed line in A represents only single bonds, the dashed line in "B" represents one or more double bond, e.g., tocotrienol PEG diesters. TPGS analogs also include compounds as in Scheme II, where when the dashed line marked "B" represents only single bonds, the dashed line marked "A" represents one or more double bonds; or when the dashed line labeled "A" does not represent double bonds, and m and q are each zero, p is greater than 1.

Also exemplary of TPGS analogs are compounds, other than TPGS compounds, having the formula shown in Scheme III:

Scheme III

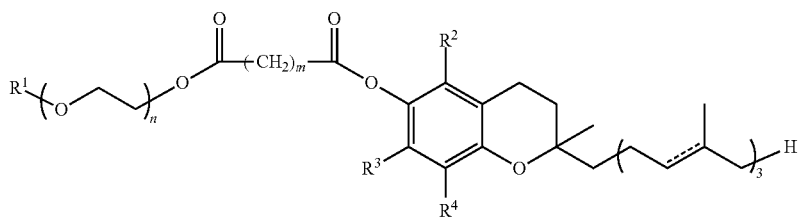

where R', $R^2$, $R^3$ and $R^4$ each independently is hydrogen (H) or methyl ($CH_3$); the bond represented by the dashed line is either a single or double bond; m is an integer from 1 to 20, and n is an integer from 1 to 5000.

Also exemplary of TPGS analogs include compounds other than TPGS, having PEG moieties that vary in chain length, according to the formula shown in Scheme IV:

Scheme IV

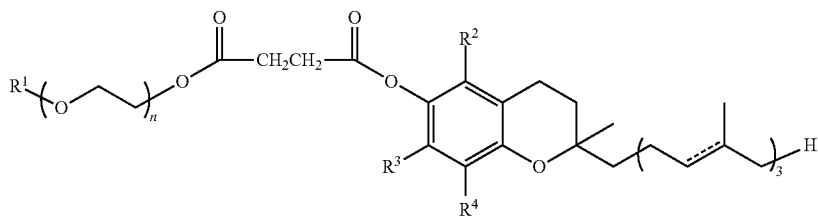

where $R^1$, $R^2$, $R^3$ and $R^4$ each independently is hydrogen (H) or methyl ($CH_3$), and n is an integer from 1 to 5000.

As used herein, "TPGS-1000 analogs" are compounds other than TPGS-1000 that are similar to a parent TPGS-1000 compound, but differ slightly in composition, for example, by the variation, addition or removal of an atom, one or more units (e.g., methylene unit(s) —$(CH_2)_n$) or one or more functional groups. Suitable TPGS-1000 analogs include, but are not limited to, other TPGS compounds, having PEG moiety(ies) that vary in chain length and molecular weight compared to TPGS-1000, including, for example, TPGS compounds having PEG moieties between 200 or about 200 Da and 20,000 Da or about 20,000 Da, typically between 200 Da or about 200 Da and 6000 Da or about 6000 Da, for example, between 600 Da or about 600 Da and 6000 Da or about 6000 Da, typically between 200 Da or about 200 Da and 2,000 Da or about 2,000 Da, between 600 Da or about 600 Da and 1500 Da or about 1500 Da, such as, but not limited to, 200, 300, 400, 500, 600, 800, and 1000 Da. Also exemplary of TPGS-1000 analogs are TPGS compounds having PEG moieties that are modified, for example, methylated PEG (m-PEG) and/or PEG moieties including other PEG analogs, e.g., PEG-NHS, PEG-aldehyde, PEG-SH, PEG-$NH_2$, PEG-$CO_2H$, and branched PEGs. Also exemplary of TPGS-1000 analogs are any TPGS analogs, e.g., Vitamin E derived surfactants, including PEG derivatives of Vitamin E, including vitamin E PEG diesters, such as, but not limited to, tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz) and polyoxyethanyl tocotrienyl sebacate (PTrienS) as well as other PEG derivatives of Vitamin E.

As used herein, "TPGS homologs" are analogs of TPGS that differ from a TPGS parent compound only by the presence or absence of a simple unit, such as a methylene unit, or some multiple of such units, e.g., —$(CH_2)_n$—. Typically, suitable TPGS homologs have similar surfactant properties compared to the parent compound (TPGS), for example, similar HLB values, for example, HLB values between 12 or 13 or about 12 or about 13 and 20 or about 20. Exemplary of TPGS homologs are tocopherol polyethylene glycol sebacate (PTS), tocopherol polyethylene glycol dodecanodioate (PTD), tocopherol polyethylene glycol suberate (PTSr), tocopherol polyethylene glycol azelaate (PTAz). Exemplary of TPGS homologs are compounds having the formula in Scheme II (above), where neither the A or B dashed line represents a double bond and where, when m and q each are 0, p is greater than 1.

As used herein, "TPGS-1000 homologs" are analogs of TPGS-1000 that differ from a TPGS-1000 parent compound only by the presence or absence of a simple unit, such as a methylene unit, or some multiple of such units, e.g., —$(CH_2)_n$—. Exemplary TPGS-1000 homologs have similar surfactant properties compared to the parent compound (TPGS-1000), for example, similar HLB values, for example, HLB values between 12, 13, or 14 or about 12, 13 or 14 and 18, 19 or 20 or about 18, 19 or 20. Exemplary TPGS-1000 homologs include TPGS-1000 homologs with slight variations in the length of the PEG chain moiety, and Me-TPGS-1000, which is a TPGS-1000 having a methyl cap on the PEG moiety.

As used herein, a "polyethylene glycol (PEG)-Sorbitan fatty acid ester" or "polysorbate" refer to esters derived from PEGylated sorbitan (derivative of sorbitol) esterified with one or more fatty acids. Polysorbates include, but are not limited to, PEG-sorbitan monooleates, such as Polyoxyethylene (20) sorbitan monooleate (also called polysorbate 80), as well as polysorbate 80 analogs, polysorbate 80 homologs and polysorbate 80 derivatives. Exemplary polysorbate 80 analog surfactants are those modified to include different fatty acid units, such as palmitic or stearic acid in place of oleic acid, e.g., polysorbate 40 (polyoxyethylene (20) sorbitan monopalmitate) and polysorbate 60 (polyoxyethylene (20) sorbitan monostearate). Additional polysorbate 80 analog surfactants are PEG-sorbitan di- and tri-esters, e.g., those modified to contain one or more additional fatty acid units, e.g., one or more additional oleic, palmitic or stearic acid units, such that the polysorbate 80 analog is a diester or triester, e.g., polyoxyethylene (20) sorbitan dioleate or polyoxyethylene (20) sorbitan trioleate. Also included are polyoxylethylene (2) sorbitan dipalmitate, polyoxylethylene (2) sorbitan tripalmitate, polyoxylethylene (2) sorbitan distearate and polyoxylethylene (2) sorbitan tristearate. In one aspect, the surfactant is a polysorbate 80 homolog, such as, for example, a polysorbate 80 homolog that differs from a polysorbate 80 parent compound by the addition or removal of one or more methylene unit(s), e.g., $-(CH_2)_n-$ in the fatty acid chain or by the addition or removal of one or more polyethyleneglycol units.

As used herein, analog refers to a chemical compound that is structurally similar to another compound (referred to as a parent compound), but differs slightly in composition, for example, by the variation, addition or removal of an atom, one or more units (e.g., methylene unit(s), $-(CH_2)_n-$) or one or more functional groups. The analog can have different chemical or physical properties compared with the original compound and/or can have improved biological and/or chemical activity. Alternatively, the analog can have similar or identical chemical or physical properties compared with the original compound and/or can have similar or identical biological and/or chemical activity. For example, the analog can be more hydrophilic or it can have altered reactivity as compared to the parent compound. The analog can mimic the chemical and/or biologically activity of the parent compound (i.e., it can have similar or identical activity), or, in some cases, can have increased or decreased activity. The analog can be a naturally or non-naturally occurring (e.g., synthetic) variant of the original compound. Other types of analogs include isomers (e.g., enantiomers, diastereomers) and other types of chiral variants of a compound, as well as structural isomers. The analog can be a branched or cyclic variant of a linear compound. For example, a linear compound can have an analog that is branched or otherwise substituted to impart certain desirable properties (e.g., improve hydrophobicity or bioavailability). Exemplary of the analogs used in the provided compositions and methods are sucrose fatty acid ester analogs, TPGS analogs and polysorbate 80 analogs, which can be used as surfactants in place of the sucrose fatty acid ester parent compound surfactants, TPGS or polysorbate 80 in the provided compositions.

As used herein, homolog refers to an analog that differs from the parent compound only by the presence or absence of a simple unit, such as a methylene unit, or some multiple of such units, e.g., $-(CH_2)_n-$. Typically, a homolog has similar chemical and physical properties as the parent compound. Exemplary of the homologs used in the provided compositions and methods are sucrose fatty acid ester homologs, TPGS homologs and polysorbate 80 homologs.

As used herein, $C_1-C_x$ includes $C_1-C_2$, $C_1-C_3$ ... $C_x$.

As used herein, the term "alkyl" and "alkyl group" refer to straight or branched chain substituted or unsubstituted hydrocarbon groups having any number of carbon atoms; number of carbon atoms can be specified, for example, 1 to 30 carbon atoms, 8 to 28 carbon atoms, 7 to 27 carbon atoms, 8 to 22 carbon atoms, 8 to 20 carbon atoms, 8 to 18 carbon atoms and 12 to 18 carbon atoms. An alkyl group can be a "saturated alkyl," meaning that it does not contain any alkene or alkyne groups or an "unsaturated alkyl," meaning that it contains at least one alkene or alkyne group, and optionally can be substituted. An alkyl group that includes at least one carbon-carbon double bond (C=C) also is referred to by the term "alkenyl;" alkenyl groups optionally can be substituted. An alkyl group that includes at least one carbon-carbon triple bond (C≡C) also is referred to by the term "alkynyl;" alkynyl groups optionally can be substituted.

As used herein, "hydrophilic" and "polar" refer synonymously to ingredients and/or compounds having greater solubility in aqueous liquids, for example, water, than in fats, oils and/or organic solvents (e.g., methanol, ethanol, ethyl ether, acetone and benzene).

As used herein, a "solvent" is an ingredient that can be used to dissolve another ingredient. Solvents include polar and non-polar solvents.

As used herein, "polar solvent" refers to a solvent which is more readily miscible with water and polar ingredients. The polarity of a solvent can be assessed by measuring a number of different parameters according to well known methods as described herein (see, e.g., Prizbytek, "High Purity Solvent Guide," Burdick and Jackson Laboratories, Inc., 1980). Polar solvents generally have high dielectric constants, typically dielectric constants greater than at or about 15, such as at or about 15, 16, 17, 18, 19, 20, 21, 22, 23, 24, 25, 26, 27, 28, 29, 30, 31, 32, 33, 34, 35, 40, 45, 50, 55, 60, 65, 70, 75, 80 85, 90, or greater than 90, and generally have high polarity indices, typically greater than at or about 3, such as at or about 3, 4, 5, 6, 7, 8 or 9 or greater than 9. Polar solvents generally have large dipole moments, typically greater than at or about 1.4 Debye, such as at or about, 1.4, 1.5, 1.6, 1.7, 1.8, 1.9, 2.0, 2.1, 2.2, 2.3, 2.4, 2.5, 2.6, 3.0, 3.5, 4 or greater than 4 Debye. Polar solvents include polar protic solvents and polar aprotic solvents. Exemplary polar solvents include, but are not limited to, water, glycerin, and propylene glycol.

As used herein, a "polar protic solvent" is a polar solvent containing a hydrogen atom attached to an electronegative atom, such that the hydrogen has a proton-like character and/or the bond between the hydrogen and electronegative atom is polarized. Exemplary polar protic solvents include, but are not limited to water, alcohols, including monohydric, dihydric and trihydric alcohols, including, but not limited to, methanol, ethanol, glycerin and propylene glycol. Dihydric alcohols are alcohols containing two hydroxyl groups. Exemplary dihydric alcohols include, but are not limited to, glycols, e.g., propylene glycol, ethylene glycol, tetraethylene glycol, triethylene glycol and trimethylene glycol. Trihydric alcohols are alcohols containing three hydroxyl groups. Exemplary trihydric alcohols include, but are not limited to glycerin, butane-1,2,3-triol, pentane-1,3,5-triol and 2-amino-2-hydroxymethyl-propane-1,3-diol. Monohydric alcohols are alcohols containing a single hydroxyl group, including but not limited to, methanol, ethanol, propanol, isopropanol, n-butanol and t-butanol.

As used herein, "emulsion stabilizer" refers to compounds that stabilize and/or emulsify and/or change the viscosity of a concentrate or emulsion. For example, the emulsion stabilizer prevents separation of the oil and water phases. Exemplary of emulsion stabilizers are fatty acid-modified carbohydrate-based macromolecule emulsion stabilizers, such as fatty-acid modified gums and starches. Exemplary of such emulsion stabilizers are modified gum acacias, for example, the modified gum acacia sold under the name Tic Pretested® Ticamulsion® A-2010 Powder, by Tic Gums, Inc., Belcamp, Md.; ester gums, for example, the ester gum sold under the name Ester Gum 8BG by Pinova/Hercules, Brunswick, Ga. (its preparation is described in U.S. Pat. No.

6,455,512); and modified corn starches, for example, the modified corn starch sold under the name Farmal™ MS 6135, from Corn Products International Inc., Westchester, Ill., available from Cosmetic Specialties, Inc., Haddon Heights, N.J.

As used herein, "modified carbohydrate emulsion stabilizer," "fatty acid-modified carbohydrate emulsion stabilizer" and "fatty acid-modified carbohydrate-based macromolecule emulsion stabilizer" refer synonymously to emulsion stabilizers with balanced hydrophobic and hydrophilic properties, particularly gums and starches that are modified by reaction with fatty acids (see also, discussion below). These are employed as co-emulsifiers with the surfactants, such as sucrose fatty acid esters (SFAE). The modified carbohydrate emulsion stabilizers, include, for example, gums and starches modified by reaction with any fatty acid chain containing from 6-30 carbons, such as an alkyl succinic anhydride, including n-octenyl succinic anhydride (OSAn), whereby the resulting modified gum or starch has hydrophobic (fatty acid chain) and hydrophilic (carbohydrate) properties and is an emulsion stabilizer.

As used herein, "hydrocolloid" refers to water-soluble gums, including starches, gums, celluloses, modified celluloses, carboxymethyl cellulose, dextrans, dextrins, inulin, glycogen, hemicellulose, gum arabic, agar, karaya gum, tragacanth gum, pectin, carrageenan, alginates, tamarind seed gum, xanthan gum, konjac gum, guar gum, gum acacia, and locust bean (or carob seed) gum. These water-soluble gums are reacted with an alkane- or alkene-substituted dicarboxylic acid anhydride to produce a fatty acid-modified carbohydrate-based emulsion stabilizer.

As used herein, a "non-polar solvent" refers to oils and other non-polar ingredients that dissolve non-polar compounds. Exemplary non-polar solvents include, but are not limited to, oils (in addition to the non-polar active ingredient), for example, Vitamin E oil, oleic acid, flaxseed oil, CLA, Borage Oil, D-limonene, canola oil, corn oil, MCT oil and oat oil. Other oils also can be used. Exemplary of the Vitamin E oil is the oil sold by ADM Natural Health and Nutrition, Decatur, Ill., under the name Novatol™ 5-67 Vitamin E (D-alpha-Tocopherol; ADM product code 410217). This Vitamin E oil contains at least 67.2% Tocopherol and approximately 32.8% soybean oil. In one example, the non-polar solvent is referred to, synonymously as "non-polar solubilizer." More than one non-polar solvent can be used.

As used herein, "soluble fiber" refers to any soluble dietary fiber that can be readily fermented in the colon, typically a plant based dietary fiber, for example, a soluble fiber from legumes, vegetables, such as broccoli and carrots, root vegetables, such as potatoes, sweet potatoes and onions, oats, rye, chia, barley and fruits, such as prunes, plums, berries, bananas, apples and pears. Typically, soluble dietary fiber contains non-starch polysaccharides, such as arabinoxylans, cellulose, dextrans, inulin, beta-glucans, fructooligosaccharides, oligosaccharides and polysaccharides. For example, soluble fibers include but are not limited to fructooligosaccharides, for example, inulins, for example, inulins found in chicory, Jerusalem artichoke, dahlia, garlic, leeks and onions, fructans and water-soluble soybean fiber. Exemplary of a soluble fiber that can be used in the provided concentrates is an inulin, for example, Oliggo-Fiber Instant Inulin (Fibruline® Instant) (supplied by Cosucra-Groupe Warcoing SA, Belgium, sold by Gillco Products, San Marcos, Calif.), containing chicory inulin.

As used herein, "preservative" and "preservativer" are used synonymously to refer to ingredients that can improve stability of emulsions or concentrates. Preservatives, particularly food and beverage preservatives, are well known. Any known preservative can be used in the provided emulsions or concentrates. Exemplary of the preservatives that can be used in the provided emulsions or concentrates are oil soluble preservatives, for example, benzyl alcohol, Benzyl Benzoate, Methyl Paraben, Propyl Paraben, antioxidants, for example, Vitamin E, Vitamin A Palmitate and Beta Carotene. Typically, a preservative is selected that is safe for human consumption, for example, in foods and beverages, for example, a GRAS certified and/or Kosher-certified preservative, for example, benzyl alcohol.

As used herein, "co-surfactant" is used to refer to a surfactant, typically a phospholipid, that is used, in a concentrate or emulsion, in combination with a surfactant (e.g., a primary surfactant), for example, to improve the emulsification of the provided compositions and/or compounds, for example, to emulsify the ingredients. Typically, the co-surfactant is a lipid, for example, a phospholipid, for example, phosphatidylcholine. In one example, the co-surfactant has an HLB value of between 7 or about 7 and 8 or about 8. Typically, the co-surfactant represents a lower percent, by weight (w/w), of the concentrates or emulsions compared to the surfactant.

As used herein, a "phospholipid" is an amphipathic, phosphate-containing lipid, for example, a molecule containing one phosphate, a glycerol and one or more fatty acids. In one example, one or more phospholipids is used as a co-surfactant in the emulsions or concentrates. Exemplary of the phospholipids are lecithin, including phosphatidylcholine (PC), phosphatidylethanolamine (PE), distearoylphosphatidylcholine (DSPC), phosphatidylserine (PS), phosphatidylglycerol (PG), phosphatidic acid (PA), phosphatidylinositol (PI), sphingomyelin (SPM) or a combination thereof. Typically, the phospholipid is phosphatidylcholine (PC), which sometimes is referred to by the general name "lecithin." Exemplary of the phospholipids are the phospholipids sold by Lipoid, LLC, Newark, N.J., for example, Purified Egg Lecithins, Purified Soybean Lecithins, Hydrogenated Egg, Soybean Lecithins, Egg Phospholipids, Soybean Phospholipids, Hydrogenated Egg and Soybean Phospholipids, Synthetic Phospholipids, PEG-ylated Phospholipids and phospholipid blends sold by Lipoid, LLC. Exemplary of the phosphatidylcholine is the phosphatidylcholine composition sold by Lipoid, LLC, under the name Lipoid S100, which is derived from soy extract and contains greater than 95% or greater than about 95% phosphatidylcholine.

As used herein, an "additive" includes anything that one can add to a food, beverage, or other human consumable, to enhance one or more of its nutritional, pharmaceutical, dietary, health, nutraceutical, health benefit, energy-providing, treating, holistic, or other properties. For example, provided herein are beverage compositions and methods for preparing beverage compositions that include one or more additives, typically oil based additives (e.g., non-polar compounds), such as nutraceuticals, pharmaceuticals, vitamins, typically oil soluble vitamins, for example, vitamins, such as Vitamin D, Vitamin E, and Vitamin A, minerals, fatty acids, such as essential fatty acids, e.g., polyunsaturated fatty acids, for example, omega-3 fatty acids, omega-6 fatty acids and omega-9 fatty acids, for example, alpha-linolenic acid (ALA), docosahexaenoic acid (DHA), eicosapentaenoic acid (EPA), gamma-linolenic acid (GLA), conjugated linoleic acid (CLA), oleic acid, saw palmetto extract, flaxseed oil, fish oil, algae oil, phytosterols, resveratrol, lipoic acid, carotenoids, for example lutein, zeaxanthin and lycopene, and coenzymes, for example, coenzyme Q10 (CoQ10) and other additives.

As used herein, an "effective amount" of an additive, such as a non-polar compound, such as a non-polar compound, refers to the quantity and/or concentration of the additive necessary for preventing, curing, ameliorating, arresting or partially arresting a symptom of a disease or disorder, or the quantity and/or concentration desired by an individual for intake, such as daily intake, and/or nutritional supplementation, for example, an amount sufficient to enhance the nutritional, pharmaceutical, nutraceutical, health or energy property of a food, beverage, or other consumable. In some examples, it is desired that the provided compositions contain an effective amount of a particular non-polar compound, for example, a particular amount per volume or weight of the composition.

In one example, an effective amount is an amount of non-polar compound that provides between at or about 1.5 to at or about 3.0 grams (g) of omega-6 fatty acids, between at or about 16 to at or about 250 milligrams (mg), for example, between at or about 32 to at or eur about 800 mg docosahexaenoic acid (DHA) and eicosapentaenoic acid (EPA), between at or about 100 and at or about 500 mg phytosterols, between at or about 10 and at or about 200 mg, for example, between at or about 50 and at or about 200 mg coenzyme Q10, between at or about 40 and at or about 400 micrograms (mcg) Vitamin A, or between at or about 200 and at or about 2000 international units (IU), for example between at or about 400 and at or about 800 IU Vitamin D3, per 0.236588236 liters (8 ounces) of a beverage composition.

In one example, an effective amount is a concentration or amount where at least 25 mg or about 25 mg, typically at least 35 mg, for example, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 325, 350, 375, 400, 425, 450, 475, 500, 550, 600, 700, 800, 900, 1000, 1500, 2000, 2500, 3000 mg, or more, of the non-polar compound is contained in at least 0.236588236 liters (8 ounces) of a beverage composition.

As used herein, a "serving" of a food or beverage refers to a typical serving or the food or beverage, as determined by the USDA Center for Nutrition Policy and Promotion, typically for example, 1 teaspoon (0.166667 ounce, 4.7249 g), 1 tablespoon (0.5 fluid ounce, 14.1747 g), 2 tablespoons (1 fluid ounce, 28.3495 g), 0.25 cup (2 fluid ounces, 56.6990 g), 0.5 cup (4 fluid ounces, 113.398 g), 0.75 cup (6 fluid ounces, 170.097 g) or 1 cup (8 fluid ounces, 226.796 g, 0.236588236 liters), of the beverage, for example, 8 fluid ounces of a beverage for direct injection.

As used herein, "water insoluble" refers to a property of a compound, none of which dissolves when the compound is mixed with water, for example, when mixed with water at room temperature, for example, between 19° C. and 25° C. or between about 19° C. and 25° C. In one example, the non-polar compounds are water insoluble. In another example, the non-polar compounds in the provided compositions are slightly soluble in water, for example, having low water solubility.

As used herein, low water solubility refers water solubility of less than 30 or about 30 mg/mL, typically less than 20 mg/mL or about 20 mg/mL, typically, less than 10 mg/mL or about 10 mg/mL, typically less than 1 mg/mL or about 1 mg/mL, for example, solubility in water of 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 mg/mL or less, for example, when mixed with water at room temperature, for example, between 19° C. and 25° C. or between about 19° C. and 25° C. As used herein, poorly water soluble can be used to refer to compounds, for example, non-polar compounds that are water insoluble or have low water solubility.

As used herein, "room temperature" and "ambient temperature" are used to describe a temperature that is common in one or more enclosed spaces in which human beings typically are or reside. Room temperature can vary, but generally refers to temperatures between 19° C. or about 19° C. and 25° C. or about 25° C. When a composition is stored at room temperature, it should be understood it is generally kept at a temperature within this range or about within this range.

As used herein, "refrigerated temperature" refers to a temperature that is common in a refrigerator, for example, a household or restaurant refrigerator, for example, a temperature that is cooler than room temperature, but typically a few degrees above the freezing point of water (32° F. or about 32° F., or 0° C. or about 0° C.). Typically, refrigerated temperatures are between about 10° C. or about 10° C. and 0° C. or about 0° C., for example, 4° C. or about 4° C. When a composition is stored at a refrigerated temperature, it should be understood that it is kept at a temperature common to household or industrial refrigerators.

As used herein, "frozen temperature" refers to a temperature around or below the freezing point of water, e.g., a temperature commonly used in a household freezer, for example, 0° F. or about 0° F., for example, −19° C. or about −19° C. or −20° C. or about −20° C., or colder.

As used herein, "elevated temperature" refers to a temperature above room temperature, e.g., above 25° C. or about 25° C., for example 40° C. or about 40° C., or higher.

As used herein, "w/w," "weight per weight," "by weight," "% by weight" and "weight percent" are used synonymously used to express the ratio of the mass of one component of a composition compared to the mass of the entire composition. For example, when the amount of a particular ingredient represents 1%, by weight (w/w) of a composition, the mass of that ingredient is 1% of the mass of the entire composition. Similarly, when the amount of an ingredient is 50% (w/w) of the composition, the mass of that ingredient is 50% of the entire mass of the composition. Similarly, when a composition and/or a compound contains 10%, by weight of an ingredient, the mass of the ingredient is 10% of the total mass of the composition or compound. When only a concentration, amount, or percentage (without units) is listed, it is to be understood that the concentration or percentage is a concentration or percentage, by weight.

Similarly, as used herein "v/v," "volume per volume," "percent by volume" and "volume percent" are used synonymously to express the ratio of the volume of one component of a composition and the volume of the entire composition.

As used herein, "not more than" and "NMT" refer to a quantity that is less than or equal to the listed quantity. Similarly, "not less than" and "NLT" refer to a quantity that is greater than or equal to the listed quantity.

As used herein, natural is used to refer to a composition, and/or ingredients in the composition, that can be found in nature and is not solely man-made. For example, benzyl alcohol is a natural preservative. In one example, the natural composition/ingredient is GRAS and/or Kosher—certified. Typically, the provided compositions are natural, semi-natural and/or contain one or more natural ingredients.

As used herein, "G.R.A.S." and "GRAS" are used synonymously to refer to compounds, compositions and ingredients that are "Generally Regarded as Safe" by the USDA, FDA for use as additives, for example, in foods, beverages and/or other substance for human consumption, for example, any substance that meets the criteria of sections 201(s) and 409 of the U.S. Federal Food, Drug and Cosmetic Act. Typically, the compositions provided herein are GRAS certified.

As used herein, "kosher" is used to refer to substances that conform to Jewish Kosher dietary laws, for example, substances that do not contain ingredients derived from non-kosher animals or ingredients that were not made following kosher procedures. Typically, the compositions provided herein are Kosher certified.

As used herein, "vessel" refers to any container, for example, tanks, pots, vials, flasks, cylinders and beakers, that can be used to contain the ingredients and/or phases of the provided compositions, during the methods for making the compositions. In one example (e.g., for the provided scaled-up methods), the vessel is a tank, which is used to mix and/or heat one or more ingredients. In another example, the tank is a packaging or holding tank, which holds the provided compositions after formation. A number of tanks are available for mixing ingredients. Typically, the tanks are cleaned, for example, rinsed, soaped and/or sanitized according to known procedures, prior to use and between uses. Typically, the tanks are equipped with one or more mixers, for example, a standard mixer and/or homogenizer, which are used to mix the ingredients added to the tank. In one example, the tank further is equipped with a heating and/or cooling device. For example, the tank can be a water-jacketed tank. The temperature of the water jacketed tank is controlled through the water-jacket, for example, to heat the contents, for example, while mixing.

As used herein, transfer refers to any equipment, combination of equipment and/or system that can be used to transfer liquid, for example, from one tank to another tank, in the provided methods for making the compositions. Exemplary of the transfer means are a transfer pump and appropriate fittings, for example, sanitary fittings, ball valves and transfer hoses, for example, food grade hoses.

As used herein, a "mixer" is any piece of equipment or combination of equipment that can be used to mix ingredients in the provided methods for making the compositions, for example, standard mixers and homogenizers (shears). For example, mixers can be used to mix the ingredients of the water phase, the oil phase, and/or to mix the additional ingredients.

As used herein, "standard mixers" are mixers that are used to combine a group of ingredients, for example, to mix one or more ingredients. Standard mixers can be any mixers that move the material, for example, the ingredients, during heating, for example, to promote dissolving of the ingredients.

As used herein, "homogenizer" and "shear" are used to refer to mixers that typically have high shear, which can be used, for example, to form an emulsion. The homogenizers typically are capable of high-shear mixing.

As used herein, a "cooling apparatus" is any piece of equipment or combination of equipment that can be used with the provided methods to cool the compositions, for example, during mixing and/or homogenizing. Exemplary of the cooling apparatuses are coolers (chillers), for example, recirculating coolers which can be attached, for example, to the tanks used in the provided methods, for example, remotely or by a tank mounted in the cooler, to recirculate fluid from the tank, through the chiller and back to the tank, in order to rapidly cool and maintain the temperature of the mixture during mixing. Typically, the cooling apparatus can be used to cool the liquid to between 25° C. or about 25° C. and 45° C. or about 45° C., for example, 25, 26, 27, 28, 29, 30, 31, 32, 33, 34, 35, 36, 37, 38, 39, 40, 41, 42, 43, 44 or 45° C., typically between 25° C. and 43° C., for example, 26.5° C.

As used herein, rapid cooling refers to a process by which a composition is cooled to a desired temperature, for example, between 25° C. or about 25° C. and 45° C. or about 45° C., typically between 25° C. and 43° C., for example, 26.5° C., in less than 2 hours or about 2 hours, typically less than 1 hour or about 1 hour, for example, in at least between 30 minutes or about 30 minutes and 60 minutes or about 60 minutes, for example, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 minutes.

As used herein, low heat refers to a temperature between 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C., for example, not more than 85° C. or about 85° C., typically not more than 60° C. or about 60° C., typically, 60° C. or about 60° C.

As used herein, unit dose form refers to physically discrete units suitable for human and animal subjects and packaged individually as is known in the art.

As used herein, a "subject" includes an animal, typically a mammal, typically a human.

As used herein, "consisting essentially of" refers to a beverage composition that includes the listed ingredients and that can also include added optional ingredients so long as the optional ingredients do not change the fundamental nature of beverage composition and do not change the functional characteristics of the compositions, such as the ability of the beverage composition containing the non-polar compound to retain the same organoleptic properties over time as the same composition not containing the non-polar compound.

As used herein, the singular forms "a," "an" and "the" include plural referents unless the context clearly dictates otherwise. Thus, for example, reference to compound a composition comprising a non-polar compound includes compositions that contain one non-polar compound and compositions containing a plurality thereof.

As used herein, ranges and amounts can be expressed as "about" a particular value or range. About also includes the exact amount. Hence "about 5 grams" means "about 5 grams" and also "5 grams." It also is understood that ranges expressed herein include whole numbers within the ranges and fractions thereof. For example, a range between 5 grams and 20 grams includes whole number values such as 5, 6, 7, 8, 9, 10, 11, 12, 13, 14, 15, 16, 17, 18, 19 and 20 grams, and fractions within the range, for example, but not limited to, 5.25, 6.72, 8.5, and 11.95 grams.

As used herein, "optional" or "optionally" means that the subsequently described event or circumstance does or does not occur and that the description includes instances where said event or circumstance occurs and instances where it does not. For example, an optionally variant portion means that the portion is variant or non-variant. In another example, an optional ligation step means that the process includes a ligation step or it does not include a ligation step.

B. BEVERAGE COMPOSITIONS CONTAINING NON-POLAR COMPOUNDS

Provided herein are beverage compositions containing non-polar compounds and methods for making the beverage compositions. Non-polar compounds are poorly water soluble (e.g., having low water solubility or being water-insoluble). Thus, it generally can be difficult to formulate non-polar compounds into compositions for human consumption, particularly beverage compositions. Poor water solubility of non-polar compounds also can contribute to their poor bioavailability. Many non-polar compounds are also unstable in compositions formulated for human consumption, such as beverage compositions. Unstable non-polar compounds in a beverage composition can contribute to undesirable organoleptic properties (e.g., taste, odor and appearance) of the beverage composition. Beverage compositions containing non-polar compounds that retain one or more organoleptic properties as compared to a beverage composition that does not contain the non-polar compounds and methods for formulating the beverage compositions are provided herein. The beverage compositions provided herein can be formulated in a variety of volumes and sizes, including, but not limited to, a single-serving shot or beverage, or a multi-serving beverage.

There remains a need for compositions, such as beverage compositions, containing non-polar compounds that are suitable and desirable for human consumption after formulation. For example, beverage compositions containing non-polar compounds that retain one or more organoleptic properties after formulation as compared to beverage compositions in the absence of the non-polar compounds are needed.

Among the provided compositions are such beverage compositions that contain non-polar compounds and retain one or more organoleptic properties after formulation as compared to the same beverage composition that does not contain non-polar compounds. For example, beverage compositions are provided that contain non-polar compounds and retain one or more organoleptic properties, including odor, taste and appearance (e.g., clarity), after formulation, as compared to the same beverage composition that does not contain the non-polar compounds. The provided beverage compositions (and methods for making the beverage compositions) can be formulated using any non-polar compound suitable or desirable for human consumption, including the non-polar compounds (e.g., non-polar active ingredients) described herein and other known non-polar compounds.

The beverage compositions provided herein can be made using any non-polar compound. The non-polar compounds typically are non-polar active ingredients, for example, pharmaceuticals, nutraceuticals, vitamins and minerals. The non-polar active ingredients can include, but are not limited to, polyunsaturated fatty acid (PUFA)-containing compounds, such as compounds containing omega-3 fatty acids, for example, compounds containing alpha-linolenic acid (ALA), docosahexaenoic acid (DHA) and/or eicosapentaenoic acid (EPA), e.g., oils derived from fish and microalgae, krill and/or flaxseed extract and compounds containing omega-6 fatty acids, for example, compounds containing gamma-linolenic acid (GLA), e.g., borage oil; saw palmetto oil-containing compounds; conjugated fatty acid-containing compounds, such as compounds containing conjugated linoleic acid (CLA); coenzyme Q-containing compounds, such as compounds containing coenzyme Q10 (i.e., CoQ10, ubidecarenone or ubiquinone), typically oxidized CoQ10; vitamin-containing compounds, such as compounds containing vitamin A, vitamin B (e.g., vitamin B complex, vitamin B6, vitamin B3, vitamin B5 or vitamin B12), vitamin C, vitamin D, particularly Vitamin D3, or vitamin E; phytochemical-containing compounds, such as compounds containing phytoalexins, for example, compounds containing resveratrol (3,5,4'-trihydroxystilbene); phytosterol-containing compounds, i.e., plant sterol-containing compounds; micronutrients, such as *Ginkgo biloba* and ginseng; and yerba mate. Additional exemplary non-polar active ingredients are described herein. Any non-polar compound can be used in the provided beverage compositions. The non-polar compounds can be added individually as a separate ingredient of the beverage composition. Alternatively, the non-polar compounds can be added to the beverage composition as part of a stabilized concentrate.

Typically, the beverage compositions provided herein contain one or more compounds used to stabilize the non-polar compounds in the beverage compositions, such as a stabilizer or stabilizing system. The stabilizer or stabilizing system can aid in retaining one or more organoleptic properties of the beverage compositions, for example the clarity, taste or odor, after addition of the non-polar compounds. The stabilizing system contains, for example, an antioxidant, a carbonate, and an acid, or any combination thereof. In some examples, the stabilizing system contains a carbonate and an acid. In some examples, a carbonated beverage, such as a soda, flavored soda, carbonated water or carbonated juice, is used as the stabilizer place of the carbonate or bicarbonate. The carbonated beverage can be combined with the acid and/or the antioxidant. The beverage compositions provided herein containing non-polar compounds and a stabilizer or stabilizing system can retain one or more organoleptic properties of the beverage composition for a period of time after formulation. Generally, one or more of the organoleptic properties of the beverage composition can be retained for at least or about at least 6 months, 7 months, 8 months, 9 months, 10 months, 11 months, or one year. In some embodiments, the beverage compositions can retain one or more organoleptic properties for at least or about at least 1 week, at least or about at least 2 weeks, at least or about at least 1 month, at least or about at least 2 months, at least or about at least 3 months, at least or about at least 4 months, at least or about at least 5 months, at least or about at least 6 months, at least or about at least 7 months, at least or about at least 8 months, at least or about at least 9 months, at least or about at least 10 months, at least or about at least 11 months, at least or about at least one year, or more.

The beverage compositions provided herein are formulated so that in the presence of the non-polar compound one or more organoleptic properties are retained, such as taste, odor and/or clarity, as compared to the same beverage composition that does not contain the non-polar compounds. In exemplary beverage compositions provided herein, the organoleptic property is the ability of the beverage composition to retain the same or about the same taste in the presence of one or more non-polar compounds. In other exemplary beverage compositions provided herein, it can be desired that the beverage composition emits the same or about the same odor in the presence of one or more non-polar compounds. In yet other exemplary compositions provided herein, the organoleptic property relates to the beverage composition retaining a clear or partially clear appearance in the presence of one or more non-polar compounds.

1. Formulations

In the methods for formulating the beverage compositions provided herein, ingredients and amounts thereof are selected so that the resulting beverage compositions containing non-polar compounds retain one or more organoleptic properties as compared to the beverage composition in the absence of the non-polar ingredient. When formulating the beverage compositions, selected ingredients and starting amounts are used to make initial beverage compositions, which are evaluated and modified, if necessary.

After evaluation, the ingredients, and/or concentrations thereof, can be adjusted in order to retain one or more organoleptic properties in the final beverage composition containing non-polar compounds as compared to the same beverage composition that does not contain non-polar compounds. In some cases, following evaluation, it can be determined that additional ingredients (not included in the initial formulation) are needed for retaining one or more organoleptic properties of a particular beverage composition. This process can be repeated until a beverage composition is generated that retains one or more organoleptic properties after formulation as compared to the same beverage composition that does not contain the non-polar compounds.

a. Ingredients and Exemplary Concentration Ranges

Each of the provided beverage compositions contains one or more non-polar compounds. Suitable non-polar compounds include, but are not limited to, the exemplary non-polar compounds described herein below. Typically, the non-polar compound is a non-polar active ingredient, for example, an oil-based active ingredient such as a polyunsaturated fatty acid (PUFA); a coenzyme Q; a vitamin; a phytochemical; or a micronutrient. The non-polar compounds can be added individually as a separate ingredient of the beverage composition or as part of a stabilized concentrate.

In the beverage compositions provided herein, the total amount of non-polar compounds as a percentage (%) by weight of the beverage compositions provided herein (wt %) can be, e.g., between from or between about from 0.01% to 20%, such as 0.01% to 20%, 0.01% to 15%, 0.01% to 10%, 0.01% to 5%, 0.01% to 1%, 0.01% to 0.5%, 0.01% to 0.4%, 0.01% to 0.3%, 0.01% to 0.2%, 0.01% to 0.1%, 0.01% to 0.05%, 0.1% to 20%, 0.1% to 15%, 0.1% to 10%, 0.1% to 5%, 0.1% to 1%, 0.1% to 0.5%, 0.1% to 0.4%, 0.1% to 0.3%, 0.1% to 0.2%, 0.5% to 20%, 0.5% to 15%, 0.5% to 10%, 0.5% to 5%, 0.5% to 1%, 1% to 20%, 1% to 15%, 1% to 10%, 1% to 5%, 1% to 3%, 3% to 20%, 3% to 15%, 3% to 10%, 3% to 5%, 5% to 20%, 5% to 15%, 5% to 10%, 10% to 20%, 10% to 15%, 15% to 20%, by weight, of the beverage composition. For example, the total amount of the one or more non-polar compounds in the beverage compositions is between at or about 0.01% and at or about 20%; between at or about 0.01% and at or about 15%; between at or about 0.01% and at or about 10%; between at or about 0.05% and at or about 20%; between at or about 0.05% and at or about 15%; between at or about 0.05% and at or about 10%; between at or about 0.05% and at or about 5%; or between at or about 0.1% and at or about 10%, inclusive, by weight, of the beverage composition.

For example, the total amount of the one or more non-polar compounds in the beverage compositions is or is about 0.01%, 0.42%, 0.43%, 0.44%, 0.05%, 0.052%, 0.052%, 0.055%, 0.057%, 0.06%, 0.07%, 0.075%, 0.078%, 0.08%, 0.09%, 0.1%, 0.108%, 0.109%, 0.11%, 0.12%, 0.129%, 0.3%, 0.04%, 0.428%, 0.43%, 0.45%, 0.465%, 0.498%, 0.5%, 0.549%, 0.55%, 0.56%, 0.6%, 0.64%, 0.692%, 0.694%, 0.7%, 0.8%, 0.875%, 0.894%, 0.9%, 0.945%, 0.95%, 1%, 1.055%, 1.1%, 1.106%, 1.108%, 1.25%, 1.5%, 2%, 2.5%, 3%, 3.489%, 3.5%, 3.75%, 3.818%, 4%, 5%, 6%, 7%, 8%, 8.5%, 8.541%, 8.6%, 9%, 10%, 11%, 12%, 13%, 14%, 15%, 16%, 17%, 18%, 19% or 20%, by weight, of the beverage composition.

In some examples, an individual non-polar compound is present in an amount of at or about 0.001%, 0.002%, 0.003%, 0.004%, 0.006%, 0.01%, 0.02%, 0.025%, 0.028%, 0.03%, 0.04%, 0.05%, 0.051%, 0.053%, 0.055%, 0.06%, 0.07%, 0.08%, 0.09%, 0.1%, 0.15%, 0.2%, 0.208%, 0.21%, 0.25%, 0.3%, 0.4%, 0.424%, 0.45%, 0.466%, 0.5%, 0.55%, 0.585%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.35%, 3.359%, 3.39%, 3.4%, 3.432%, 3.45%, 3.5%, 3.6%, 3.7%, 3.8%, 3.9%, 4%, 5%, 6%, 7%, 8%, 8.25%, 8.333%, 8.5%, 9%, 10%, 11%, 12%, 13%, 14%, 15%, 16%, 17%, 18%, 19% or 20%, by weight, of the beverage composition.

The beverage compositions provided herein contain at least 25 mg or about 25 mg, typically at least 35 mg, of the non-polar compound, for example, the non-polar active ingredient, per 8 fluid ounces or about 8 fluid ounces, at least 8 fluid ounces or at least about 8 fluid ounces of the beverage composition, or less than 8 ounces or less than about 8 ounces, such as, for example per 2 fluid ounces or about 2 fluid ounces, or per serving size, of the beverage composition. For example, at least or about at least 25, 30, 35, 40, 41, 42, 43, 44, 45, 50, 55, 60, 65, 70, 75, 80, 85, 90, 91, 92, 93, 94, 95, 100, 110, 120, 130, 140, 150, 160, 161, 162, 163, 164, 165, 170, 180, 190, 200, 210, 211, 212, 213, 214, 215, 220, 230, 235, 240, 250, 260, 270, 280, 290, 300, 310, 325, 350, 375, 400, 425, 450, 475, 500, 525, 550, 575, 600, 625, 650, 675, 700, 725, 750, 775, 800, 825, 850, 875, 900, 925, 950, 975, 1000, 1050, 1090, 1091, 1092, 1093, 1094, 1095, 1100, 1125, 1135, 1150, 1200, 1250, 1300, 1350, 1400, 1450, 1500 mg, or more, of the non-polar compound per 2 fluid ounces or about 2 fluid ounces, or per 8 fluid ounces or about 8 fluid ounces, or per serving of the beverage composition.

The beverage composition further contains at least one stabilizer, and typically contains more than one stabilizer (i.e., a stabilizing system). The stabilizer or stabilizing system can be an antioxidant, a carbonate or bicarbonate, an acid, or any combination thereof. Typically the stabilizer or stabilizing system are food-approved, i.e., edible or ingestible, stabilizers, for example, stabilizers that are safe and/or approved for human consumption.

In the beverage compositions provided herein, the total amount of stabilizers as a percentage (%) by weight of the beverage compositions provided herein (wt %) can be, e.g., between from or between about from 0.01% to 20%, such as between or between about from 0.01% to 20%, 0.01% to 15%, 0.01% to 10%, 0.01% to 5%, 0.01% to 1%, 0.01% to 0.5%, 0.01% to 0.4%, 0.01% to 0.3%, 0.01% to 0.2%, 0.01% to 0.1%, 0.01% to 0.05%, 0.1% to 20%, 0.1% to 15%, 0.1% to 10%, 0.1% to 5%, 0.1% to 1%, 0.1% to 0.5%, 0.1% to 0.4%, 0.1% to 0.3%, 0.1% to 0.2%, 0.5% to 20%, 0.5% to 15%, 0.5% to 10%, 0.5% to 5%, 0.5% to 1%, 1% to 20%, 1% to 15%, 1% to 10%, 1% to 5%, 1% to 3%, 3% to 20%, 3% to 15%, 3% to 10%, 3% to 5%, 5% to 20%, 5% to 15%, 5% to 10%, 10% to 20%, 10% to 15%, 15% to 20%, by weight, of the beverage composition. For example, the total amount of the one or more stabilizers in the beverage compositions is between at or about 0.01% and at or about 20%; between at or about 0.01% and at or about 15%; between at or about 0.01% and at or about 10%; between at or about 0.01% and at or about 5%; between at or about 0.01% and at or about 3%; between at or about 0.1% and at or about 10%; or between at or about 0.1% and at or about 5%, inclusive, by weight, of the beverage composition.

For example, the total amount of the one or more stabilizers in the beverage compositions is or is about 0.01%, 0.02%, 0.03%, 0.04%, 0.05%, 0.06%, 0.07%, 0.08%, 0.09%, 0.1%, 0.2%, 0.3%, 0.4%, 0.5%, 0.525%, 0.528%, 0.53%, 0.55%, 0.6%, 0.7%, 0.8%, 0.9%, 0.952%, 1%, 1.1%, 1.2%, 1.217%, 1.3%, 1.37%, 1.4%, 1.5%, 1.6%, 1.7%, 1.75%, 1.792%, 1.8%, 1.9%, 1.94%, 2%, 2.1%, 2.12%, 2.2%, 2.222%, 2.25%, 2.646%, 2.273%, 2.3%, 2.4%, 2.45%, 2.487%, 2.5%, 2.6%, 2.646%, 2.65%, 2.697%, 2.7%, 2.73%, 2.75%, 2.784%, 2.8%, 2.9%, 3%, 3.07%, 3.1%, 3.25%, 3.494%, 3.5%, 3.75%, 3.917%, 4%, 4.341%, 5%, 6%, 7%, 8%, 8.5%, 8.567%, 9%, 10%, 11%, 12%, 13%, 14%, 15%, 16%, 17%, 18%, 19% or 20%, by weight, of the beverage composition.

In some examples, an individual stabilizer is present in an amount of at or about 0.01%, 0.025%, 0.03%, 0.04%, 0.041%, 0.05%, 0.051%, 0.053%, 0.055%, 0.06%, 0.07%, 0.08%, 0.09%, 0.1%, 0.104%, 0.15%, 0.173%, 0.2%, 0.208%, 0.3%, 0.4%, 0.424%, 0.45%, 0.5%, 0.5157%, 0.6%, 0.6698%, 0.672%, 0.696%, 0.7%, 0.8%, 0.826%, 0.9%, 0.944%, 0.95%, 0.951%, 1%, 1.036%, 1.073%, 1.1%, 1.115%, 1.2%, 1.271%, 1.3%, 1.375%, 1.398%, 1.4%, 1.5%, 1.6%, 1.695%, 1.7%, 1.8%, 1.9%, 2%, 2.1%, 2.2%, 2.222%, 2.3%, 2.4%, 2.5%, 2.6%, 2.7%, 2.8%, 2.9%, 3%, 3.1%, 3.2%, 3.3%, 3.35%, 3.359%, 3.4%, 3.5%, 3.6%, 3.7%, 3.8%, 3.9%, 4%, 5%, 6%, 7%, 8%, 9%, 10%, 11%, 12%, 13%, 14%, 15%, 16%, 17%, 18%, 19% or 20%, by weight, of the beverage composition.

When one or more antioxidants are included as stabilizers in the beverage compositions provided herein, the total amount of antioxidant as a percentage (%) by weight of the compositions provided herein (wt %) can be, e.g., between from or between about from 0.01% to 3%, such as between or between about 0.01% to 3%, 0.01% to 2%, 0.01% to 1%, 0.01% to 0.9%, 0.01% to 0.8%, 0.01% to 0.7%, 0.01% to 0.6%, 0.01% to 0.5%, 0.01% to 0.4%, 0.01% to 0.3%, 0.01% to 0.2%, 0.01% to 0.1%, 0.01% to 0.05%, 0.05% to 3%, 0.05% to 2%, 0.05% to 1%, 0.05% to 0.9%, 0.05% to 0.8%, 0.05% to 0.7%, 0.05% to 0.6%, 0.05% to 0.5%, 0.05% to 0.4%, 0.05% to 0.3%, 0.05% to 0.2%, 0.05% to 0.1%, 0.1% to 3%, 0.1% to 2%, 0.1% to 1%, 0.1% to 0.9%, 0.1% to 0.8%, 0.1% to 0.7%, 0.1% to 0.6%, 0.1% to 0.5%, 0.1% to 0.4%, 0.1% to 0.3%, 0.1% to 0.2%, 0.5% to 3%, 0.5% to 2%, 0.5% to 1%, 0.5% to 0.9%, 0.5% to 0.8%, 0.5% to 0.7%, 0.5% to 0.6%, 1% to 3%, 1% to 2%, or 2% to 3%, by weight, of the beverage composition. For example, the total amount of the one or more antioxidants in the beverage compositions is between at or about 0.01% and at or about 2%; between at or about 0.01% and at or about 1%; between at or about 0.01% and at or about 0.5%; or between at or about 0.1% and at or about 1%, inclusive, by weight, of the composition.

In some examples, an antioxidant is present in an amount of at or about 0.01%, 0.02%, 0.025%, 0.03%, 0.04%, 0.041%, 0.05%, 0.051%, 0.053%, 0.055%, 0.06%, 0.07%, 0.08%, 0.09%, 0.1%, 0.15%, 0.2%, 0.208%, 0.25%, 0.3%, 0.35%, 0.4%, 0.424%, 0.45%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9% or 3%, by weight, of the beverage composition.

When one or more carbonates or bicarbonates are included as stabilizers in the beverage compositions provided herein, the total amount of carbonate or bicarbonate as a percentage (%), by weight, of the compositions provided herein (wt %) can be, e.g., between from or between from about 0.01% to 7%, such as between or between about from 0.01% to 7%, 0.01% to 6%, 0.01% to 5%, 0.01% to 4%, 0.01% to 3%, 0.01% to 2%, 0.01% to 1%, 0.01% to 0.9%, 0.01% to 0.8%, 0.01% to 0.7%, 0.01% to 0.6%, 0.01% to 0.5%, 0.01% to 0.4%, 0.01% to 0.3%, 0.01% to 0.2%, 0.01% to 0.1%, 0.01% to 0.05%, 0.05% to 7%, 0.05% to 6%, 0.05% to 5%, 0.05% to 4%, 0.05% to 3%, 0.05% to 2%, 0.05% to 1%, 0.05% to 0.9%, 0.05% to 0.8%, 0.05% to 0.7%, 0.05% to 0.6%, 0.05% to 0.5%, 0.05% to 0.4%, 0.05% to 0.3%, 0.05% to 0.2%, 0.05% to 0.1%, 0.1% to 7%, 0.1% to 6%, 0.1% to 5%, 0.1% to 4%, 0.1% to 3%, 0.1% to 2%, 0.1% to 1%, 0.1% to 0.9%, 0.1% to 0.8%, 0.1% to 0.7%, 0.1% to 0.6%, 0.1% to 0.5%, 0.1% to 0.4%, 0.1% to 0.3%, 0.1% to 0.2%, 0.5% to 7%, 0.5% to 6%, 0.5% to 5%, 0.5% to 4%, 0.5% to 3%, 0.5% to 2%, 0.5% to 1%, 0.5% to 0.9%, 0.5% to 0.8%, 0.5% to 0.7%, 0.5% to 0.6%, 1% to 7%, 1% to 6%, 1% to 5%, 1% to 4%, 1% to 3%, 1% to 2%, 2% to 7%, 2% to 6%, 2% to 5%, 2% to 4%, 2% to 3%, 3% to 7%, 3% to 6%, 3% to 5%, 3% to 4%, 4% to 7%, 4% to 6%, or 4% to 5%, by weight, of the beverage composition. For example, the total amount of the one or more carbonates or bicarbonates in the beverage compositions is between at or about 0.01% and at or about 7%; 0.01% and at or about 6%; 0.01% and at or about 5%; between at or about 0.1% and at or about 4%; between at or about 0.1% and at or about 2%; or between at or about 0.3% and at or about 1.8%, inclusive, by weight, of the composition.

In some examples, a carbonate or bicarbonate is present in an amount of at or about 0.01%, 0.02%, 0.025%, 0.03%, 0.04%, 0.05%, 0.06%, 0.07%, 0.08%, 0.09%, 0.1%, 0.15%, 0.173%, 0.2%, 0.25%, 0.3%, 0.35%, 0.4%, 0.424%, 0.45%, 0.5%, 0.6%, 0.696%, 0.7%, 0.8%, 0.9%, 1%, 1.1%, 1.115%, 1.2%, 1.271%, 1.3%, 1.398%, 1.4%, 1.5%, 1.6%, 1.695%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.5%, 5%, 5.5%, 6%, 6.5% or 7%, by weight, of the beverage composition.

When one or more acids are included as stabilizers in the beverage compositions provided herein, the total amount of acid as a percentage (%) by weight of the compositions provided herein (wt %) can be, e.g., between from or between from about 0.01% to 5%, such as between or between about from 0.01% to 5%, 0.01% to 4%, 0.01% to 3%, 0.01% to 2%, 0.01% to 1%, 0.01% to 0.9%, 0.01% to 0.8%, 0.01% to 0.7%, 0.01% to 0.6%, 0.01% to 0.5%, 0.01% to 0.4%, 0.01% to 0.3%, 0.01% to 0.2%, 0.01% to 0.1%, 0.01% to 0.05%, 0.05% to 5%, 0.05% to 4%, 0.05% to 3%, 0.05% to 2%, 0.05% to 1%, 0.05% to 0.9%, 0.05% to 0.8%, 0.05% to 0.7%, 0.05% to 0.6%, 0.05% to 0.5%, 0.05% to 0.4%, 0.05% to 0.3%, 0.05% to 0.2%, 0.05% to 0.1%, 0.1% to 5%, 0.1% to 4%, 0.1% to 3%, 0.1% to 2%, 0.1% to 1%, 0.1% to 0.9%, 0.1% to 0.8%, 0.1% to 0.7%, 0.1% to 0.6%, 0.1% to 0.5%, 0.1% to 0.4%, 0.1% to 0.3%, 0.1% to 0.2%, 0.5% to 5%, 0.5% to 4%, 0.5% to 3%, 0.5% to 2%, 0.5% to 1%, 0.5% to 0.9%, 0.5% to 0.8%, 0.5% to 0.7%, 0.5% to 0.6%, 1% to 5%, 1% to 4%, 1% to 3%, 1% to 2%, 2% to 5%, 2% to 4%, 2% to 3%, 3% to 5%, 3% to 4%, or 4% to 5%, by weight, of the beverage composition. For example, the total amount of the one or more acids in the beverage compositions is between at or about 0.01% and at or about 5%; between at or about 0.01% and at or about 3%; between at or about 0.1% and at or about 3%; or between at or about 0.05% and at or about 4%, inclusive, by weight, of the composition.

In some examples, an acid is present in an amount of at or about 0.01%, 0.02%, 0.025%, 0.03%, 0.04%, 0.05%, 0.06%, 0.07%, 0.08%, 0.09%, 0.1%, 0.104%, 0.15%, 0.2%, 0.25%, 0.3%, 0.35%, 0.4%, 0.45%, 0.5%, 0.5157%, 0.6%, 0.6698%, 0.672%, 0.7%, 0.8%, 0.826%, 0.9%, 0.944%, 0.95%, 0.951%, 1%, 1.036%, 1.073%, 1.1%, 1.2%, 1.3%, 1.375%, 1.4%, 1.5%, 1.6%, 1.7%, 1.8%, 1.9%, 2%, 2.1%, 2.2%, 2.222%, 2.3%, 2.4%, 2.5%, 2.6%, 2.7%, 2.8%, 2.9%, 3%, 3.1%, 3.2%, 3.3%, 3.35%, 3.359%, 3.4%, 3.5%, 3.6%, 3.7%, 3.8%, 3.9%, 4%, 4.5%, or 5%, by weight, of the beverage composition.

The beverage compositions further contain a beverage base. The beverage base can include, but is not limited to, a polar solvent, for example water (e.g., filtered water); a carbonated beverage, for example, a carbonated water, soda, flavored soda or carbonated juice; a juice, for example a fruit, vegetable or berry juice, such as a juice blend, a dried juice, a juice concentrate, a juice extract, a juice puree or a carbonated juice; a milk; a fruit flavor or flavoring agent, for example, natural and synthetic flavors, such as fruit flavors, botanical flavors, spice flavors or other flavors; or any combination thereof. Typically, a high amount (i.e., a large wt %) of the beverage composition is a beverage base. For example, at least 50%, 55%, 60%, 65%, 70%, 75%, 80%, 85%, 90%, 95% or more of the beverage composition is a beverage base.

In the beverage compositions provided herein, the total amount of the beverage base as a percentage (%) by weight of the beverage compositions provided herein (wt %) can be, e.g., between from or between about from 50% to 99.5%, such as 50% to 99.5%, 50% to 99%, 50% to 95%, 50% to 90%, 50% to 85%, 50% to 80%, 50% to 75%, 50% to 70%, 50% to 65%, 50% to 60%, 50% to 55%, 55% to 99.5%, 55% to 99%, 55% to 95%, 55% to 90%, 55% to 85%, 55% to 80%, 55% to 75%, 55% to 70%, 55% to 65%, 55% to 60%, 60% to 99.5%, 60% to 99%, 60% to 95%, 60% to 90%, 60% to 85%, 60% to 80%, 60% to 75%, 60% to 70%, 60% to 65%, 65% to 99.5%, 65% to 99%, 65% to 95%, 65% to 90%, 65% to 85%, 65% to 80%, 65% to 75%, 65% to 70%, 70% to 99.5%, 70% to 99%, 70% to 95%, 70% to 90%, 70% to 85%, 70% to 80%, 70% to 75%, 75% to 99.5%, 75% to 99%, 75% to 95%, 75% to 90%, 75% to 85%, 75% to 80%, 80% to 99.5%, 80% to 99%, 80% to 95%, 80% to 90%, 80% to 85%, 85% to 99.5%, 85% to 99%, 85% to 95%, 85% to 90%, 90% to 99.5%, 90% to 99%, 90% to 95%, 95% to 99.5%, or 95% to 99%, by weight, of the beverage composition. For example, the total amount of the beverage base in the beverage compositions is between at or about 55% and at or about 99.5%; between at or about 65% and at or about 99%; between at or about 70% and at or about 99%; between at or about 75% and at or about 99%; between at or about 80% and at or about 99%; or between at or about 90% and at or about 99%, inclusive, by weight of the beverage composition.

In some examples, the beverage base is present in an amount of at or about 50%, 55%, 60%, 65%, 70%, 75%, 80%, 81%, 82%, 83%, 83.62%, 84%, 85%, 86%, 87%, 88%, 88.699%, 89%, 90%, 90.5%, 91%, 91.5%, 92%, 92.5%, 92.624%, 93%, 93.31%, 93.5%, 94%, 94.09%, 94.45%, 94.5%, 94.67%, 94.8%, 94.93%, 95%, 95.03%, 95.35%, 95.5%, 95.71%, 95.79%, 95.82%, 95.83%, 95.92%, 95.94%, 95.98%, 95.99%, 96%, 96.14%, 96.21%, 96.32%, 96.34%, 96.38%, 96.5%, 96.68%, 96.75%, 96.77%, 97%, 97.5%, 97.89%, 98%, 98.125%, 98.13%, 98.49%, 98.5%, 98.52%, 99% or 99.5%, by weight, of the beverage composition.

One or more, typically more than one, additional ingredients can be added to the beverage composition. Additional ingredients that can be added to the beverage composition include, but are not limited to, preservatives, non-polar solvents, co-surfactants, emulsion stabilizers, pH adjusters and flavoring agents. For example, the beverage compositions provided herein can contain a pH adjuster, for example, citric acid or phosphoric acid, in addition to and different from the acid stabilizer, or a sweetener, such as sucralose.

The appropriate concentration ranges for the additional ingredients are described in individual sections below. Typically, the concentration of the additional ingredients depends, in part, on the concentrations of the non-polar active ingredient, the stabilizing system and the beverage base. Typically, the concentrations of these three ingredients (non-polar compound, stabilizing system and beverage base) are the focus of the formulating methods. For example, when it is determined that modifications to ingredient concentrations in the initial beverage composition should be made, it typically is the concentrations of one or more of these three ingredients that are adjusted.

In one example, it can be desirable to add one or more of the additional ingredients after evaluation of the initial beverage composition, for example, in order to adjust the beverage composition with respect to one or more organoleptic properties.

b. Volume

Typically, the beverage compositions provided herein are prepared by diluting the non-polar compounds and stabilizing system into the beverage base, for example, into one or more polar solvents, e.g., water; or juices, e.g., fruit juice, fruit juice concentrate, fruit juice extract, or fruit flavor; or any combination thereof. The desired volume per weight, volume per volume or weight per volume can be used to calculate the correct amount of an ingredient to be measured and added to the beverage composition.

The beverage compositions provided herein can be formulated to provide any desired volume of the final beverage composition. The total volume of the final beverage composition can be determined by, for example, the desired serving size of the beverage composition. The volume of the final beverage composition can be determined by, for example, the desired amount of servings in the final beverage composition. In some embodiments, the beverage compositions provided herein can be formulated as a single-serving shot or beverage. In other embodiments, the beverage compositions provided herein can be formulated as a multi-serving beverage.

In some embodiments, the total volume of the beverage compositions provided herein can be determined by the desired serving size of the beverage composition. The desired serving size can be, for example, between 0.5 ounces (oz.) or about 0.5 oz. and 20 oz. or about 20 oz., such as between or about between from 0.5 oz. to 20 oz., 0.5 oz. to 16 oz., 0.5 oz. to 12 oz., 0.5 oz. to 8 oz, 0.5 oz. to 7 oz., 0.5 oz. to 6 oz., 0.5 oz. to 5 oz., 0.5 oz. to 4 oz., 0.5 oz. to 3 oz., 0.5 oz. to 2 oz., 0.5 oz. to 1 oz., 1 oz. to 20 oz., 1 oz. to 16 oz., 1 oz. to 12 oz., 1 oz. to 8 oz, 1 oz. to 7 oz., 1 oz. to 6 oz., 1 oz. to 5 oz., 1 oz. to 4 oz., 1 oz. to 3 oz., 1 oz. to 2 oz., 2 oz. to 20 oz., 2 oz. to 16 oz., 2 oz. to 12 oz., 2 oz. to 8 oz, 2 oz. to 7 oz., 2 oz. to 6 oz., 2 oz. to 5 oz., 2 oz. to 4 oz., 2 oz. to 3 oz., 3 oz. to 20 oz., 3 oz. to 16 oz., 3 oz. to 12 oz., 3 oz. to 8 oz, 3 oz. to 7 oz., 3 oz. to 6 oz., 3 oz. to 5 oz., 3 oz. to 4 oz., 4 oz. to 20 oz., 4 oz. to 16 oz., 4 oz. to 12 oz., 4 oz. to 8 oz, 4 oz. to 7 oz., 4 oz. to 6 oz., 4 oz. to 5 oz., 5 oz. to 20 oz., 5 oz. to 16 oz., 5 oz. to 12 oz., 5 oz. to 8 oz, 5 oz. to 7 oz., 5 oz. to 6 oz., 6 oz. to 20 oz., 6 oz. to 16 oz., 6 oz. to 12 oz., 6 oz. to 8 oz, 6 oz. to 7 oz., 7 oz. to 20 oz., 7 oz. to 16 oz., 7 oz. to 12 oz., 7 oz. to 8 oz., 8 oz. to 20 oz., 8 oz. to 16 oz., 8 oz. to 12 oz., 12 oz. to 20 oz., 12 oz. to 16 oz., or 16 oz. to 20 oz. serving size. For example, the serving size can be at or about 0.5, 1, 2, 3, 4, 5, 6, 7, 8, 9, 10, 11, 12, 13, 14, 15, 16, 17, 18, 19, or 20 oz. In one example, the desired serving size of the beverage composition is 2.0 oz.

In another example, the desired serving size of the beverage composition is 8.0 oz. In yet another example, the desired serving size of the beverage composition is 16.0 oz.

In some embodiments, the total volume of the beverage compositions provided herein can be determined by the desired serving size of the beverage composition. The desired serving size can be, for example, between 0.015 liters (L) or about 0.015 liters (L) and 0.59 L or about 0.59 L, such as between or about between from 0.015 L to 0.59 L, 0.015 L to 0.47 L, 0.015 L to 0.35 L, 0.015 L to 0.24 L, 0.015 L to 0.21 L, 0.015 L to 0.18 L, 0.015 L to 0.15 L, 0.015 L to 0.12 L, 0.015 L to 0.089 L, 0.015 L to 0.059 L, 0.015 L to 0.030 L, 0.030 L to 0.59 L, 0.030 L to 0.47 L, 0.030 L to 0.35 L, 0.030 L to 0.24 L, 0.030 L to 0.21 L, 0.030 L to 0.18 L, 0.030 L to 0.15 L, 0.030 L to 0.12 L, 0.029 L to 0.089 L, 0.029 L to 0.059 L, 0.059 L to 0.59 L, 0.059 L to 0.47 L, 0.059 L to 0.35 L, 0.059 L to 0.24 L, 0.059 L to 0.21 L, 0.059 L to 0.18 L, 0.059 L to 0.15 L, 0.059 L to 0.12 L, 0.059 L to 0.089 L, 0.089 L to 0.59 L, 0.089 L to 0.47 L, 0.089 L to 0.35 L, 0.089 L to 0.24 L, 0.089 L to 0.21 L, 0.089 L to 0.18 L, 0.089 L to 0.15 L, 0.089 L to 0.12 L, 0.12 L to 0.59 L, 0.12 L to 0.47 L, 0.12 L to 0.35 L, 0.12 L to 0.24 L, 0.12 L to 0.21 L, 0.12 L to 0.18 L, 0.12 L to 0.15 L, 0.15 L to 0.59 L, 0.15 L to 0.47 L, 0.15 L to 0.35 L, 0.15 L to 0.24 L, 0.15 L to 0.21 L, 0.15 L to 0.18 L, 0.18 L to 0.59 L, 0.18 L to 0.47 L, 0.18 L to 0.35 L, 0.18 L to 0.24 L, 0.18 L to 0.21 L, 0.21 L to 0.59 L, 0.21 L to 0.47 L, 0.21 L to 0.35 L, 0.21 L to 0.24 L, 0.24 L to 0.59 L, 0.24 L to 0.47 L, 0.24 L to 0.35 L, 0.35 L to 0.59 L, 0.35 L to 0.47 L, or 0.47 L to 0.59 L serving size. For example, the serving size can be at or about 0.015 L, 0.029 L, 0.059 L, 0.089 L, 0.12 L, 0.15 L, 0.18 L, 0.21 L, 0.24 L, 0.27 L, 0.30 L, 0.33 L, 0.35 L, 0.38 L, 0.41 L, 0.44 L, 0.47 L, 0.503 L, 0.53 L, 0.56 L or 0.59 L. In one example, the desired serving size of the beverage composition is 0.059 L. In another example, the desired serving size of the beverage composition is 0.24 L.

In other embodiments, the total volume of the beverage compositions provided herein can be determined, for example, by the desired amount of servings in the final beverage composition. The desired amount of servings can be, for example, between 1 serving or about 1 serving and 10 servings or about 10 servings, such as between or about between 1 to 10, 1 to 9, 1 to 8, 1 to 7, 1 to 6, 1 to 5, 1 to 4, 1 to 3, 1 to 2.5, 1 to 2, 1 to 1.5, 1.5 to 10, 1.5 to 9, 1.5 to 8, 1.5 to 7, 1.5 to 6, 1.5 to 5, 1.5 to 4, 1.5 to 3, 1.5 to 2.5, 1.5 to 2, 2 to 10, 2 to 9, 2 to 8, 2 to 7, 2 to 6, 2 to 5, 2 to 4, 2 to 3, 2 to 2.5, 3 to 10, 3 to 9, 3 to 8, 3 to 7, 3 to 6, 3 to 5, 3 to 4, 4 to 10, 4 to 9, 4 to 8, 4 to 7, 4 to 6, 4 to 5, 5 to 10, 5 to 9, 5 to 8, 5 to 7, 5 to 6, 6 to 10, 6 to 9, 6 to 8, 6 to 7, 7 to 10, 7 to 9, 7 to 8, 8 to 10, 8 to 9, or 9 to 10 servings. For example, the amount of desired servings can be at least or about at least 1, 1.5, 2, 2.5, 3, 4, 5, 6, 7, 8, 9, or 10 servings. In one example, the desired amount of servings in the final beverage composition is 1. In another example, the desired amount of servings in the final beverage composition is 2. In yet another example, the desired amount of servings in the final beverage composition is 2.5.

2. Evaluation of the Beverage Compositions

Properties of the beverage compositions containing the non-polar compounds can be evaluated using a number of different evaluation means. For example, the organoleptic properties, such as taste, odor, and clarity, of the beverage compositions provided herein can be evaluated. Evaluation of the organoleptic properties can be used to determine, for example, the desirability of the beverage composition for human consumption, such as for a beverage composition that exhibits or is lacking a particular taste and/or smell, for example, lack of a "fishy" taste/smell. Several of the organoleptic properties can be evaluated empirically, for example, by observing the beverage compositions immediately after formulation or over time, or by smelling and/or tasting the beverage compositions.

a. Organoleptic Properties

The beverage compositions provided herein retain one or more organoleptic properties, such as taste, odor, and/or appearance, e.g., clarity, in the presence of non-polar compounds as compared to the same beverage composition that does not contain non-polar compounds. These organoleptic properties can be evaluated using a number of methods, such as empirical methods, quantitative methods, or qualitative methods. The organoleptic properties of the beverage compositions provided herein can be evaluated, for example, by measuring the stability, or shelf life, of the beverage composition.

The beverage compositions containing non-polar compounds provided herein are able to retain one or more organoleptic properties as compared to the same beverage that does not contain the non-polar compounds, for example, the provided beverage compositions are able to remain free from one or more changes over a period of time, for example, 1, 2, 3, 4, 5, 6, 7, or more days, 1, 2, 3, 4, 5, 6, 8, 12, 18, 24, 36, or more weeks, 1, 2, 3, 4, 5, 6, 8, 12, 18, 24, 36, or more months, or 1, 2, 3, 4, or more years. In one example, the beverage compositions exhibit the same degree of clarity over a period of time as beverage compositions that do not contain the non-polar compound(s). In another example, the beverage compositions containing non-polar compounds retain one or more organoleptic properties over a period of time, when kept at a particular temperature, as compared to beverage compositions that do not contain non-polar compounds.

Typically, the provided beverage compositions containing the non-polar compounds are free from one or more changes in the organoleptic properties over a period of time, for example, 1, 2, 3, 4, 5, 6, 7, or more days, 1, 2, 3, 4, 5, 6, 8, 12, 18, 24, 36, or more weeks, 1, 2, 3, 4, 5, 6, 8, 12, 18, 24, 36, or more months, or 1, 2, 3, 4, or more years. In one example, the beverage compositions containing non-polar compounds retain the organoleptic properties at room temperature, for example, at 25° C. or at about 25° C. In another example, the beverage compositions retain the organoleptic properties at an elevated temperature, for example, at 40° C. or at about 40° C.

The organoleptic properties of the beverage compositions provided herein can be evaluated qualitatively, for example, according to the ICH (International Conference on Harmonisation of Technical Requirements for Registration of Pharmaceuticals for Human Use) stability test guidelines. The organoleptic properties of the beverages provided herein can be evaluated after storage for a desired period of time under a desired set of conditions. For example, the organoleptic properties can be evaluated after a desired period of time has elapsed, such as immediately after formulation of the beverage composition or after an extended period of time, such as at or about 1, 2, 3, 4, 5, 6, or 7 days, at or about 1, 2, 3, 4, 5, 6, 8, 12, 18, 24, or 36 weeks, at or about 1, 2, 3, 4, 5, 6, 8, 12, 18, 24, or 36 months, or at or about 1, 2, 3, or 4 years. The organoleptic properties can be evaluated at one or more desired periods of time, for example, at intervals.

The beverage compositions can be stored under various conditions, such as at different temperatures and relative humidity levels. The beverage compositions can be stored, for example, under standard conditions, e.g., at or about 25° C. and at or about 65% relative humidity. The beverage compositions can be stored under accelerated conditions, such as those conditions that simulate long term storage conditions, for example, storage at or about 40° C. and at or about 75% relative humidity. The organoleptic properties of the beverage compositions provided herein can be evaluated, for example, after storage for a desired period of time under the desired storage conditions.

i. Taste and Odor

The beverage compositions containing non-polar compounds provided herein retain one or more organoleptic properties, e.g., taste, odor, or a combination thereof, after formulation, as compared to the same beverage composition that does not contain the non-polar compounds. The beverage compositions containing non-polar compounds provided herein can exhibit, for example, a lack of an undesirable taste or odor attribute, or a lack of an "off-taste" or "off-odor." For example, the beverage compositions containing non-polar compounds provided herein do hot have an undesirable taste or odor attribute, or an "off-taste" or "off-odor." Undesirable taste and odor attributes include, for example, flavors and aromas such as fishy, grass, metal or iron, sharp or tingling, and any other taste or odor attribute that is warranted. The taste and odor attributes can be evaluated by, for example, a tasting panel. Evaluation of taste and/or odor can be assessed empirically for the beverage compositions containing non-polar compounds alone, or alternatively by comparison of the beverage compositions containing non-polar compounds to a beverage composition not containing the non-polar compounds. In one example, the beverage composition is evaluated on a qualitative scale, such as on a scale of 0 to 10, where 0 indicates that no undesirable taste and/or odor attributes were detected, 1 indicates a low level of undesirable taste and/or odor attributes were detected, and 10 indicates a high level of undesirable taste and/or odor attributes were detected.

In one example, the beverage compositions containing non-polar compounds retain the same or about the same taste after formulation as compared to the same beverage compositions that do not contain the non-polar compounds. In another example, the beverage compositions containing non-polar compounds retain the same or about the same odor after formulation as compared to the same beverage compositions that do not contain the non-polar compounds. In another example, the beverage compositions containing non-polar compounds retain the same or about the same taste and the same or about the same odor after formulation as compared to the same beverage compositions that do not contain the non-polar compounds.

ii. Appearance

The appearance, e.g., clarity, of the beverage compositions provided herein can be evaluated by a number of methods, such as qualitatively or quantitatively. The appearance of the beverage compositions can be evaluated, for example, by observation or by measuring turbidity. A desirable appearance can be attributed to a beverage composition when the beverage composition exhibits, for example, a lack of an undesirable color or a lack of an undesirable appearance attribute. Undesirable appearance attributes include, but are not limited to, for example, separation, precipitation, ringing, or any other appearance attribute that is undesired. Desirable appearance attributes can include beverage compositions that are, for example, transparent, i.e., clear, or cloudy. For example, a beverage composition can be considered clear if it contains no particles or few particles that are observable with the naked eye. A clear liquid is not necessarily colorless. For example, a yellow liquid that contains no (or few) visible particles or cloudiness can be clear.

The appearance attributes, such as clarity, of a beverage composition containing non-polar compounds can be expressed in relation to the clarity of another beverage composition, for example, the same beverage composition that does not contain the non-polar compounds. For example, the beverage compositions containing the non-polar compounds can be as clear or about as clear as the same beverage composition that does not contain the non-polar compounds. The beverage compositions containing non-polar compounds provided herein retain appearance attributes after formulation in comparison to other beverage compositions that do not include the non-polar compounds, such as by exhibiting the same appearance or about the same appearance as the same beverage composition that does not contain the non-polar compounds.

The beverage compositions containing non-polar compounds provided herein retain appearance attributes after formulation, for example, the beverage compositions containing the non-polar compounds are free from variation in appearance after a desired period of time, such as immediately after formulation and/or after storage for an extended period of time. For example, the beverage compositions provided herein retain appearance attributes, such as by remaining transparent, i.e., clear, or cloudy, after formulation.

In one example, the beverage compositions containing non-polar compounds retain the same or about the same appearance after formulation as compared to beverage compositions that do not contain the non-polar compounds. In another example, the beverage compositions containing non-polar compounds retain the same or about the same appearance and the same or about the same odor after formulation as compared to beverage compositions that do not contain the non-polar compounds. In a further example, the beverage compositions containing non-polar compounds retain the same or about the same appearance and the same or about the same taste after formulation as compared to beverage compositions that do not contain the non-polar compounds. In other examples, the beverage compositions containing non-polar compounds retain the same or about the same appearance, the same or about the same odor, and the same or about the same taste after formulation as compared to beverage compositions that do not contain the non-polar compounds.

3. Ingredients

The beverage compositions provided herein contain non-polar compounds that are suitable and desirable for human consumption. The beverage compositions provided herein further contain one or more stabilizers (i.e., stabilizing system). Additionally, the beverage compositions provided herein contain a beverage base. Additional ingredients, such as sweeteners, pH adjusters and antifoaming agents are also contemplated.

a. Stabilizers

The beverage compositions provided herein contain one or more stabilizers, or a stabilizing system. Stabilizers include any compound used to stabilize the non-polar compounds in the beverage compositions. The stabilizer or stabilizing system can aid in retaining one or more organoleptic properties of the beverage compositions, for example the appearance, taste or odor. The beverage compositions provided herein containing non-polar compounds and a stabilizer or stabilizing system can retain one or more organoleptic properties of the beverage composition for a period of time after formulation, such as at or about 1, 2, 3, 4, 5, 6, or 7 days, at or about 1, 2, 3, 4, 5, 6, 8, 12, 18, 24, or 36 weeks, at or about 1, 2, 3, 4, 5, 6, 8, 12, 18, 24, or 36 months, or at or about 1, 2, 3, or 4 years. The stabilizers include, but are not limited to, carbonates and bicarbonates, acids, antioxidants, and any combination thereof. Typically the stabilizer or stabilizing system are food-approved, i.e., edible or ingestible, stabilizers, for example, stabilizers that are safe and/or approved for human consumption.

In general, the beverage compositions contain more than one stabilizer. Typically, the total amount of stabilizers included in the provided beverage compositions is less than 20% or about 20%, typically less than 10% or about 10%, for example, less than 20%, 15%, 10%, 5%, 4.5%, 4%, 3.5%, 3%, 2.5%, 2%, 1.5%, 1%, 0.5% or 0.1%, by weight, of the beverage composition.

i. Bicarbonates or Carbonates

Exemplary of a stabilizer used in the provided beverage compositions is a bicarbonate or carbonate, for example, any edible or food-approved bicarbonate or carbonate. Examples of suitable bicarbonates and carbonates include sodium bicarbonate, potassium bicarbonate, sodium carbonate, potassium carbonate, calcium carbonate, magnesium carbonate, zinc carbonate, and any combination thereof. In some examples, the carbonate or bicarbonate is a carbonated beverage, such as a soda, flavored soda, carbonated water or carbonated juice. Alternatively, the beverage can be carbonated by the addition of carbon dioxide. Additional suitable bicarbonates and carbonates for use in the provided beverage compositions will be apparent to those skilled in the art.

Typically, the amount of bicarbonate or carbonate used in the provided beverage compositions is between or between about 0.01% and 7%, by weight, of the composition, for example, between at or about 0.01% and at or about 6%, between at or about 0.01% and at or about 5%, between at or about 0.01% and at or about 4%, between at or about 0.01% and at or about 3%, between at or about 0.01% and at or about 2 between at or about 0.01% and at or about 1%, between at or about 0.1% and at or about 7%, between at or about 0.1% and at or about 6%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 7%, between at or about 0.5% and at or about 6%, between at or about 0.5% and at or about 5%, between at or about 0.5% and at or about 4%, between at or about 0.5% and at or about 3%, between at or about 0.5% and at or about 2%, between at or about 0.5% and at or about 1%, between at or about 1% and at or about 7%, between at or about 1% and at or about 6%, between at or about 1% and at or about 5%, between at or about 1% and at or about 4%, between at or about 1% and at or about 3%, between at or about 1% and at or about 2%, between at or about 2% and at or about 7%, between at or about 2% and at or about 5%, between at or about 2% and at or about 4%, between at or about 3% and at or about 7%, between at or about 3% and at or about 5%, between at or about 4% and at or about 7%, between at or about 6% and at or about 7%, between at or about 5% and at or about 7%, or between at or about 5% and at or about 6%, by weight, of the beverage composition. In some examples, the amount of bicarbonate or carbonate used in the provided beverage compositions is less than 7% or about 7%, typically less than 5% or about 5%, for example at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.2%, 6.5%, 6.7%, or 7%, by weight, of the beverage composition.

ii. Acids

In one example, the stabilizer used in the beverage compositions contains one or more acids, for example, any compound added to the beverage composition that can lower the pH of the composition. The acid can be, for example, an edible, ingestible or food-approved acid. Exemplary of suitable acids for use in the provided beverage compositions are citric acid, phosphoric acid, adipic acid, ascorbic acid, lactic acid, malic acid, fumaric acid, gluconic acid, succinic acid, tartaric acid, maleic acid, and any combination thereof. In one example, the acid is citric acid.

Typically, the amount of acid added to the provided beverage compositions is between or between about 0.01% and 5%, by weight, of the composition, for example, between at or about 0.01% and at or about 4%, between at or about 0.01% and at or about 3%, between at or about 0.01% and at or about 2 between at or about 0.01% and at or about 1%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 5%, between at or about 0.5% and at or about 4%, between at or about 0.5% and at or about 3%, between at or about 0.5% and at or about 2%, between at or about 0.5% and at or about 1%, between at or about 1% and at or about 5%, between at or about 1% and at or about 4%, between at or about 1% and at or about 3%, between at or about 1% and at or about 2%, between at or about 2% and at or about 5%, between at or about 2% and at or about 4%, between at or about 2% and at or about 3%, between at or about 3% and at or about 5%, between at or about 3% and at or about 4%, or between at or about 4% and at or about 5%, by weight, of the beverage composition. In some examples, the amount of acid added to the provided beverage compositions is less than 5% or about 5%, typically less than 4% or about 4%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9% or 5%, by weight, of the beverage composition.

iii. Antioxidants

In one example, the stabilizer used in the beverage compositions contain an antioxidant, for example, a molecule that is capable of inhibiting the oxidation of other molecules. Antioxidants may include molecules that scavenge free radicals. Suitable antioxidants include those that are used as ingredients in dietary supplements. The antioxidant can be a natural antioxidant or a synthetic antioxidant.

Examples of antioxidants include, but are not limited to hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, vitamins and vitamin cofactors, such as vitamin A, vitamin C, vitamin E, vitamin E phosphate and ubiquinone (ubidecarenone, coenzyme Q, coenzyme Q10), ascorbic acid, citric acid, rosemary oil, minerals, such as mineral selenium and manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gulamine, oxalic acid, tocopherol-derived compounds, di-alpha-tocopheryl phosphate, tocotrienols, butylated hydroxyanisole, butylated hydroxyoluene, ethylenediaminetetraacetic acid, tert-butylhydroquinone, acetic acid, pectin, tocotrienol, tocopherol, coenzyme Q10 (CoQ10), zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms theaflavin and its gallate forms, thearubigins, isolavone phytoestrogens, genistein, daidzein, glycitein, anythocyanins, cyaniding, delphinidin, malvidin, pelargonidin and peonidin. In one example, the antioxidant is vitamin C. In another example, the antioxidant is a coenzyme Q-containing compounds, such as ubiquinone (ubidecarenone, coenzyme Q, coenzyme Q10).

Typically, the amount of antioxidant added to the provided beverage compositions is between at or about 0.01% and at or about 3%, for example, between at or about 0.01% and at or about 2.5%, between at or about 0.01% and at or about 2%, between at or about 0.01% and at or about 1.5%, between at or about 0.01% and at or about 1%, between at or about 0.01% and at or about 0.5%, between at or about 0.05% and at or about 3%, between at or about 0.05% and at or about 2.5%, between at or about 0.05% and at or about 2%, between at or about 0.05% and at or about 1.5%, between at or about 0.05% and at or about 1%, between at or about 0.05% and at or about 0.5%, between at or about 0.1% and at or about 3%, between at or about 0.1% and at or about 2.5%, between at or about 0.1% and at or about 2%, between at or about 0.1% and at or about 1.5%, between at or about 0.1% and at or about 1%, between at or about 0.1% and at or about 0.5%, between at or about 0.5% and at or about 3%, between at or about 0.5% and at or about 2.5%, between at or about 0.5% and at or about 2%, between at or about 0.5% and at or about 1.5%, between at or about 0.5% and at or about 1%, between at or about 1% and at or about 3%, between at or about 1% and at or about 2.5%, between at or about 1% and at or about 2%, between at or about 1% and at or about 1.5%, between at or about 1.5% and at or about 3%, between at or about 1.5% and at or about 2.5%, between at or about 1.5% and at or about 2%, between at or about 2% and at or about 3%, between at or about 2% and at or about 2.5%, between at or about 2.5% and at or about 3%, by weight, of the beverage composition. In some examples, the amount of antioxidant added to the provided beverage compositions is less than 5% or about 5%, typically less than 3% or about 2%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0%, by weight, of the beverage composition.

b. Non-Polar Compounds

The beverage compositions provided herein contain one or more non-polar compounds. Non-polar compounds include any lipophilic or lipid soluble compounds that have greater solubility in organic solvents (e.g., ethanol, methanol, ethyl ether, acetone, and benzene) and in fats and oils, than in aqueous liquids, for example, water. Typically, the non-polar compounds are poorly water soluble, for example, water insoluble or compounds having low water solubility. The non-polar compounds include, but are not limited to, drugs, hormones, vitamins, nutrients and other lipophilic compounds. Exemplary non-polar compounds are listed herein below. Non-polar compounds can be added directly to the beverage compositions, or alternatively, a concentrate or emulsion containing the non-polar compounds and one or more additional ingredients, such as a surfactant, can be added to the beverage composition. Exemplary non-polar compounds, and concentrates and emulsions, are described in further detail herein below.

Exemplary of non-polar compounds that can be used in the provided beverage compositions are:

Non-polar compounds containing essential fatty acids, for example, polyunsaturated fatty acids (PUFAs), for example, gamma-linolenic acid (GLA), for example, borage oil and evening primrose (*Oenothera biennis*) oil, blackcurrant seed oil, hemp seed oil, and spirulina extract; compounds containing omega-3 fatty acids, for example, natural and synthetic omega-3 fatty acids, for example, compounds containing omega-3 polyunsaturated long-chain fatty acids, including Eicosapentaenoic acid (EPA) (20:5ω3); Docosahexaenoic acid (DHA) (22:6ω3); Eicosatetraenoic acid (24:4ω3); Docosapentaenoic acid (DPA, Clupanodonic acid) (22:5ω3); 16:3 ω3; 24:5 ω3 and/or nisinic acid (24:6ω3), for example, fish oil, algae oil, hill oil, canola oil, flaxseed oil, soybean oil and walnut oil; compounds containing short-chain omega-3 fatty acids, for example, Alpha-Linolenic acid (α-Linolenic acid; ALA) (18:3ω3) and Stearidonic acid (18:4ω3), esters of an omega-3 fatty acid and glycerol, for example, monoglycerides, diglycerides and triglycerides, esters of an omega-3 fatty acid and a primary alcohol, for example, fatty acid methyl esters and fatty acid esters, precursors of omega-3 fatty acid oils, for example, EPA precursor, DHA precursor, derivatives such as polyglycolized derivatives or polyoxyethylene derivatives, oils containing the omega-3 fatty acids, for example, fish oil (marine oil), for example, highly purified fish oil concentrates, *perilla* oil, hill oil, and algae oil, for example, microalgae oil; compounds containing omega-6 fatty acids, for example, compounds containing Linoleic acid (18:2ω6) (a short-chain fatty acid); Gamma-linolenic acid (GLA) (18:3ω6); Dihomo gamma linolenic acid (DGLA) (20:3ω6); Eicosadienoic acid (20:2ω6); Arachidonic acid (AA) (20:4ω6); Docosadienoic acid (22:2ω6); Adrenic acid (22:4ω6); and/or Docosapentaenoic acid (22:5ω6), for example, borage oil, corn oil, cottonseed oil, grapeseed oil, peanut oil, primrose oil, for example, evening primrose *Oenothera biennis*) oil, blackcurrant seed oil, hemp seed oil, spirulina extract, safflower oil, sesame oil and soybean oil;

Other fatty acids, for example, triglycerides, including medium chain triglycerides, polar lipids, for example, ether lipids, phosphoric acid, choline, fatty acids, glycerol, glycolipids, triglycerides, and phospholipids (e.g., phosphatidylcholine (lecithin), phosphatidylethanolamine, and phosphatidylinositol); saw palmetto extract; and ethyl linoleate; and herb oils, for example, garlic oils and scordinin; short-chain saturated fatty acids (4:0-10:0), Lauric acid (12:0), Myristic acid (14:0), Pentadecanoic acid (15:0), Palmitic acid (16:0), Palmitoleic acid (16:1 ω7), Heptadecanoic acid (17:0), Stearic acid (18:0), Oleic acid (18:1 ω9), Arachidic acid (20:0);

Micronutrients, for example, vitamins, minerals, co-factors, for example, coenzyme Q10 (CoQ10, also called ubiquinone), ubiquinol, tumeric extract (cucuminoids), saw palmetto lipid extract (saw palmetto oil), echinacea extract, hawthorn berry extract, ginseng extract, *Ginkgo biloba*, lipoic acid (thioctic acid), ascorbyl palmitate, kava extract, St. John's Wort (hypericum, Klamath weed, goat weed), extract of quercitin, dihydroepiandrosterone, and indol-3-carbinol;

Carotenoids, including hydrocarbons and oxygenated, alcoholic derivatives of hydrocarbons, for example, beta carotene, mixed carotenoids complex, lutein, lycopene, Zeaxanthin, Cryptoxanthin, for example, beta-crytoxanthin, beta carotene, mixed carotenoids complex, astaxanthin, bixin, canthaxanthin, capsanthin, capsorubin, apo-carotenal, beta-12'-apo-carotenal, "Carotene" (mixture of alpha and beta-carotene), gamma carotene, ciolerythrin, zeaxanthin, and esters of hydroxyl- or carboxyl-containing members thereof;

Fat-soluble vitamins, for example, Vitamins A, B, C, D, E and K, and corresponding provitamins and vitamin derivatives such as esters with an action resembling that of vitamin A, B, C, D, E or K, for example, retinol (vitamin A) and pharmaceutically acceptable derivatives thereof, for example, palmitate ester of retinol and other esters of retinol, for example, Vitamin A Palmitate, vitamin B, including vitamin B12, calciferol (vitamin D) and its pharmaceutically acceptable derivatives thereof and precursors of vitamin D, d-alpha tocopherol (vitamin E) and derivatives thereof, including pharmaceutical derivatives thereof, for example, Tocotrienols, d-alpha tocopherol acetate and other esters of d-alpha tocopherol, and ascorbyl palmitate, a fat-soluble version of vitamin C;

Phytochemicals, including phytoestrogens, for example, genistein and daidzein, for example, isoflavones, for example, soy isoflavones, flavonoids, phytoalexins, for example, Resveratrol (trans-3,5,4'-trihydroxystilbene), red clover extract, and phytosterols;

Lipid-soluble drugs, including natural and synthetic forms of immunosuppressive drugs, such as Cyclosporin, protease inhibitors such as Ritonavir, macrolide antibiotics and oil soluble anesthetics such as Propofol, natural and synthetic forms of steroidal hormones, for example, estrogens, estradiols, progesterone, testosterone, cortisone, phytoestrogens, dehydroepiandrosterone (DHEA), growth hormones and other hormones; and Oil-soluble acids and alcohols, for example, tartaric acid, lactylic acid, butylated hydroxyanisole, butylated hydroxytoluene, lignin, sterols, polyphenolic compounds, oryzanol, cholesterol, phytosterols, flavonoids, such as quercetin and resveratrol, and diallyl disulfides.

The beverage compositions provided herein, the total amount of non-polar compounds as a percentage (%) by weight of the beverage compositions provided herein (wt %) can be, e.g., between from or between from about 0.01% to 20%, such as 0.01% to 20%, 0.01% to 15%, 0.01% to 10%, 0.01% to 5%, 0.01% to 1%, 0.01% to 0.5%, 0.01% to 0.4%, 0.01% to 0.3%, 0.01% to 0.2%, 0.01% to 0.1%, 0.01% to 0.05%, 0.1% to 20%, 0.1% to 15%, 0.1% to 10%, 0.1% to 5%, 0.1% to 1%, 0.1% to 0.5%, 0.1% to 0.4%, 0.1% to 0.3%, 0.1% to 0.2%, 0.5% to 20%, 0.5% to 15%, 0.5% to 10%, 0.5% to 5%, 0.5% to 1%, 1% to 20%, 1% to 15%, 1% to 10%, 1% to 5%, 1% to 3%, 3% to 20%, 3% to 15%, 3% to 10%, 3% to 5%, 5% to 20%, 5% to 15%, 5% to 10%, 10% to 20%, 10% to 15%, 15% to 20%, by weight, of the beverage composition. In some examples, the total amount of non-polar compounds is or is about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19% 19.5% or 20%, by weight, of the beverage composition.

The beverage compositions provided herein contain at least 25 mg or about 25 mg, typically at least 35 mg, of the non-polar compound, for example, the non-polar active ingredient, per 8 fluid ounces or about 8 fluid ounces, at least 8 fluid ounces or at least about 8 fluid ounces of the beverage composition, or less than 8 ounces or less than about 8 ounces, such as, for example per 2 fluid ounces or about 2 fluid ounces, or per serving size, of the beverage composition. For example, at least or about at least 25, 30, 35, 40, 41, 42, 43, 44, 45, 50, 55, 60, 65, 70, 75, 80, 85, 90, 91, 92, 93, 94, 95, 100, 110, 120, 130, 140, 150, 160, 161, 162, 163, 164, 165, 170, 180, 190, 200, 210, 211, 212, 213, 214, 215, 220, 230, 235, 240, 250, 260, 270, 280, 290, 300, 310, 325, 350, 375, 400, 425, 450, 475, 500, 525, 550, 575, 600, 625, 650, 675, 700, 725, 750, 775, 800, 825, 850, 875, 900, 925, 950, 975, 1000, 1050, 1090, 1091, 1092, 1093, 1094, 1095, 1100, 1125, 1135, 1150, 1200, 1250, 1300, 1350, 1400, 1450, 1500 mg, or more, of the non-polar compound per serving size, e.g., at least 2 fluid ounces or at least about 2 fluid ounces, or at least 8 fluid ounces or at least about 8 fluid ounces of the beverage composition.

Typically, the beverage compositions provided herein contain one or more non-polar compounds at an amount such that a serving of the beverage provides a specific amount of non-polar active ingredient. For example, the beverage compositions provided herein provide between at or about 1.5 to at or about 3.0 grams (g) of omega-6 fatty acids per serving, between at or about 16 to at or about 250 milligrams (mg), for example, between at or about 32 to at or about 250 mg docosahexaenoic acid (DHA) and eicosapentaenoic acid (EPA) per serving, between at or about 100 and at or about 500 mg phytosterols per serving, between at or about 10 and at or about 200 mg, for example, between at or about 50 and at or about 200 mg coenzyme Q10 per serving, between at or about 40 and at or about 400 micrograms (mcg) Vitamin A per serving, or between at or about 200 and at or about 2000 international units (IU), for example between at or about 400 and at or about 800 IU Vitamin D3 per serving of beverage, for example, per 8 ounces of the beverage composition.

i. Polyunsaturated Fatty Acid (PUFA)-Containing Compounds

Exemplary of the non-polar compounds contained in the beverage compositions are compounds containing fatty acids, for example, compounds containing polyunsaturated fatty acids (PUFAs). Fatty acids are straight-chain hydrocarbon molecules with a carboxyl (COOH) group at one end of the chain. PUFAs are fatty acids that contain more than one carbon-carbon double bond in the carbon chain of the fatty acid. PUFAs, particularly essential fatty acids, are useful as dietary supplements.

Different nomenclatures can be used to describe fatty acid molecules. Lipid nomenclature, for example, 18:3 ω-3, indicates the carbon chain length, number of double bonds and the position along the carbon chain of the first carbon-carbon double bond in a fatty acid. Using this nomenclature, each carbon along the chain is labeled according to its position relative to one end of the chain. For example, the first carbon away from the carboxylate end is named α, the second is named β, and so forth. The last carbon in the molecule (furthest from the carboxy group) always is labeled ω (or omega, or n). The number of carbons and the number of double bonds are listed first in the lipid name of a fatty acid, separated by a colon. For example, the name "18:3" indicates that the molecule has eighteen (18) carbons and three (3) double bonds. Following these numbers, the position at which the first double bond appears, relative to the last (ω) carbon, is listed. For example, the nomenclature, 18:3 ω-3 (or 18:3 omega-3; or 18:3 n-3), describes a fatty acid with eighteen (18) carbons and three (3) double bonds, the first of which occurs at the third carbon away from the omega carbon.

Alternatively, chemical nomenclature can be used. The chemical name of a fatty acid describes the position of each double bond. In the chemical naming, the carbons are numbered, beginning with 1, starting with the carbon that is part of the carboxy (COOH) group. Thus, with this numbering system, the α carbon is labeled "2." The chemical name of the fatty acid lists the first carbon (from the COOH end) to participate in each double bond.

Certain PUFAs are called essential fatty acids because mammals, including humans, cannot synthesize them using any known chemical pathway, and must obtain them from diet or by supplementation. (U.S. Pat. No. 6,870,077; Covington, *American Family Physician* (2004), 70(1): 133-140). The essential PUFAs are the omega-3 (ω3; n-3) fatty acids and the omega-6 (ω-6; n-6) fatty acids. Omega-3 and omega-6 fatty acids are methylene interrupted polyenes, which have two or more cis double bonds, separated by a single methylene group. Exemplary of omega-3 fatty acids are Alpha-Linolenic acid (α-Linolenic acid; ALA) (18:3 ω3) (a short-chain fatty acid); Stearidonic acid (18:4ω3) (a short-chain fatty acid); Eicosapentaenoic acid (EPA) (20:5 ω3); Docosahexaenoic acid (DHA) (22:6 ω3); Eicosatetraenoic acid (24:4 ω3); Docosapentaenoic acid (DPA, Clupanodonic acid) (22:5 ω3); 16:3 ω3; 24:5 ω3; and nisinic acid (24:6 ω3). Longer chain Omega-3 fatty acids can be synthesized from ALA (the short-chain omega-3 fatty acid). Exemplary of omega-6 fatty acids are Linoleic acid (18:2 ω6) (a short-chain fatty acid); Gamma-linolenic acid (GLA) (18:3 ω6); Dihomo gamma linolenic acid (DGLA) (20:3 ω6); Eicosadienoic acid (20:2 ω6); Arachidonic acid (AA) (20:4 ω6); Docosadienoic acid (22:2 ω6); Adrenic acid (22:4 ω6); and Docosapentaenoic acid (22:5 ω6).

While the longer chain omega-3 and omega-6 essential fatty acids can be synthesized from ALA (the short-chain omega-3 fatty acid) and Linolenic acid (LA), respectively, evidence suggests that conversion of these short chain fatty acids in humans is slow. Thus, a major source of long chain essential PUFAs is dietary (see e.g., Ross et al. (2007) *Lipids in Health and Disease* 6:21; Lands (1992) *FASEB* 6(8): 2530). Dietary supplements containing PUFAs, particularly essential PUFAs, are desirable for protection against cardiovascular disease, inflammation and mental illnesses (see e.g., Ross et al. (2007) *Lipids in Health and Disease* 6:21; Lands (1992) *FASEB* 6(8): 2530; U.S. Pat. No. 6,870,077). Evidence suggests that essential fatty acids, particularly EPA and DHA, in the form of food and nutritional supplements, play a role in preventing a number of disease states, including cardiovascular diseases, inflammation, mental health and behavioral diseases and disorders (see e.g., Ross et al. (2007) *Lipids in Health and Disease* 6:21; Lands (1992) *FASEB* 6(8): 2530; U.S. Pat. No. 6,870,077; Covington (2004) *American Family Physician* 70(1): 133-140).

Omega-9 fatty acids are non-essential PUFAs. Exemplary of omega-9 fatty acids are Oleic acid (which is monounsaturated) (18:1 ω9); Eicosenoic acid (20:1 ω9); Mead acid (20:3 ω9); Erucic acid (22:1 ω9); and Nervonic acid (24:1 ω9). Exemplary of an omega-9 fatty acid is oleic acid, for example, Oleic Acid 70% Food Grade Kosher Vegetable-Based, 100% Natural, sold by KIC Chemicals, Inc., Armonk, N.Y., containing at least 70% oleic acid and not more than 18% other fatty acids.

Conjugated fatty acids are PUFAs with two or more conjugated double bonds. Conjugated fatty acids can be used as nutritional supplements. Exemplary of conjugated fatty acids are Conjugated Linoleic acid (CLA), for example, 18:2 ω7, 18:2 ω6; Conjugated Linolenic acid, for example, 18:3ω6, 18:3ω5; and other conjugated fatty acids, for example, 18:3 ω3, 18:4 ω3, and 20:5 ω6.

a. Omega-3 Fatty Acid Compounds

Exemplary of the PUFA-containing active ingredients that can be used in the provided beverage compositions are compounds that contain one or more omega-3 (ω3; n-3) fatty acids, for example, compounds containing DHA and/or EPA fatty acids, for example, marine oils, for example, fish oil, krill oil and algae oil; and compounds containing ALA fatty acids, for example, flax seed oil.

Typically, oils and aqueous compositions containing long-chained polyunsaturated fatty acids (PUFA) are susceptible to oxidation, making them unstable and giving them an unpleasant taste. The ingredients and relative concentrations thereof, as well as the methods for making the beverage compositions, contribute to the organoleptic properties of DHA/EPA-containing beverage compositions. In one example, ingredients and methods minimize the "fishy" odor and/or taste of DHA/EPA compositions and increase their stability over time. In one aspect, the compounds in the beverage compositions have low oxidation, contributing to the organoleptic properties.

i. DHA/EPA

Exemplary of non-polar active ingredients that contain one or more omega-3 fatty acids, which can be used in the provided compositions, are compounds containing DHA and/or EPA, for example, marine oil, for example, fish oil, krill oil and algae oil. Any oil containing DHA and/or EPA can be used. In one example, the non-polar active ingredient contains between 10% or about 10% and 40% or about 40% DHA. In another example, the non-polar active ingredient contains between 25% or about 25% and 35% or about 35% DHA. In another example, the non-polar active ingredient contains at least 70% or about 70%, by weight (w/w), DHA, for example, at least 75% or about 75%, at least 80% or about 80%, at least 85% or about 85%, or at least 90% or about 90%, by weight (w/w), DHA. In another example, the non-polar active ingredient contains between 5% or about 5% and 20% or about 20% EPA, for example, at or about 5, 6, 7, 8, 9, 10, 11, 12, 13, 14, 15, 16, 17, 18, 19 or 20%, by weight (w/w), EPA. In another example, the non-polar active ingredient contains not more than 10% or about 10% EPA or less than 10% or about 10% EPA. In another example, the non-polar active ingredient contains DHA and EPA, for example, DHA representing at least 20% or about 20%, by weight of the non-polar active ingredient and EPA representing not more than 13% or about 13% of the non-polar active ingredient, for example, not more than 10% or about 10%, by weight of the non-polar active ingredient. In another example, the non-polar active ingredient contains DHA, representing at least 35% or about 35% of the non-polar active ingredient and EPA representing not more than 13% or about 13% of the non-polar active ingredient, for example, not more than 10% or about 10% of the non-polar active ingredient. In another example, the non-polar active ingredient contains DHA and EPA, for example, DHA representing at least 70% or about 70% of the non-polar active ingredient and EPA representing not more than 13% or about 13% of the non-polar active ingredient, for example, not more than 10% or about 10% of the non-polar active ingredient. In another example, the non-polar active ingredient contains DHA and EPA, for example, DHA representing at least 9% or about 9% of the non-polar active ingredient, for example, at least 11% or about 11% or the non-polar active ingredient and EPA representing at least 15% or about 15% of the non-polar active ingredient, for example, at least 17% or about 17% of the non-polar active ingredient. Omega-3 containing non-polar active ingredients are typically added to the compositions in amounts such that when diluted in a beverage, one serving of the beverage provides an amount of the DHA and EPA between at or about 16 and at or about 250 mg, typically between at or about 32 and at or about 250 mg, between at or about 50 and at or about 150 mg, between at or about 100 and at or about 250 mg, for example, at or about 16, at or about 32, at or about 50, at or about 100, at or about 150, at or about 200 or at or about 250 mg, per serving of the beverage, such as for example, 8 ounces of a beverage.

(1) Fish Oils

Exemplary of the PUFA-containing non-polar active ingredients that can be used in the provided beverage compositions are oils derived from fish, which contain DHA, EPA or DHA and EPA. Particularly, cold water marine fish are a known source of Omega-3 fatty acids (U.S. Pat. No. 4,670,285). Suitable fish oil containing DHA, EPA or DHA and EPA can be obtained from any of a number of commercial sources, for example, fish oils available from Hormel Foods Specialty Products, any of which can be used with the provided beverage compositions.

Fish oils typically are extracted from fish tissue, for example, frozen fish tissue. In one example, the fish oil is a tasteless fish oil, for example, a cod liver oil, which has been isolated from fish, for example, from cod liver, and then refined and deodorized, or in some other way treated so its taste becomes neutral, for example, as described in International Publication Nos. WO 2000/23545 and WO 12004/098311. In one example, these fish oils are isolated from frozen fish tissue by a process that minimizes oxidation. Exemplary of such a tasteless fish oil is Denomega™ 100, Borregaard Ingredients, Sarpsborg, Norway; distributed by Denomega Nutritional Oils AS, Boulder, Colo. Typically, the tasteless fish oil, for example, cod liver oil, contains between 25% or about 25% and 35% or about 35% Omega-3 fatty acids, for example, 34% Omega-3 fatty acids. In one example, the fish oil, for example, the Denomega™ 100 oil, contains 13% or about 13% DHA and 13% or about 13% EPA.

Also exemplary of the fish oils that can be included in the provided compositions are fish oils containing high amounts of Omega-3 fatty acids, for example, high amounts of DHA. One example of such a fish oil contains at least about 85% DHA, typically greater than 85% DHA and at least about 90% Omega-3 fatty acids, typically greater than, 90% Omega-3 fatty acids. In another example, the fish oil can contain 98% PUFA, 89% Omega-3 fatty acids, about 70% DHA, about 10% EPA, 8.9% Omega-6 fatty acids and 0.7% Omega-9 fatty acids.

Exemplary of a fish oil containing high amounts of Omega-3 fatty acids that can used as the non-polar compound in the provided compositions is an Omega-3 Fish Oil EE (O3C Nutraceuticals, supplied by Jedwards International Inc., Quincy, Mass.), which contains 89% Omega-3 fatty acids, 8.9% Omega-6 fatty acids, 0.7% Omega-9 fatty acids, 0.1% saturated fatty acids, 1.0% monounsaturated fatty acids, 74.5% Docosahexanoic (DHA) fatty acids, 9.3% Eicosapentaenoic (EPA) fatty acids and 98% polyunsaturated fatty acids (PUFA). This fish oil also contains 0.1% (16:0) palmitic acid, 0.1% (16:1 ω7) palmitoleic acid, 0.1% (18:0) stearic acid, 0.6% (18:1 ω9) oleic acid, 0.1% (18:1 ω7) oleic acid, 0.3% (18:2 ω6) linoleic acid, 0.2% (18:3 ω3) linolenic acid, 0.2% (18:4 ω3) octadecatetraenoic acid, 0.1% (20:1 ω9) eicosanoic acid, 0.1% (20:2 ω6) eicosadienoic acid, 0.2% (20:3 ω6) Eicosatrienoic Acid, 2.4% (20:4 ω6) arachidonic acid, 0.6% (20:4 ω3) arachidonic acid, 0.1% (22:1 ω11) erucic acid, 0.6% (21:5 ω3) uncosapentaenoic acid, 0.5% (22:4 ω6) docosatetraenoic acid, 5.4% (22:5 ω6), docosapentaenoic acid, 3.6% (22:5 ω3) docosapentaenoic acid and 0.9% other fatty acids.

Also exemplary of a fish oil containing high amounts of Omega-3 fatty acids that can be used in the provided compositions is Omega Concentrate 85 DHA TG Ultra (O3C Nutraceuticals AS, Oslo, Norway), which contains greater than 85% DHA (C22:6n-3) and greater than 90% total omega-3 fatty acids and is isolated from fatty fish species Eugraulidae, Clupeidae and Scombridae families. This fish oil is produced by purifying and concentrating the oils from these fish with gentle technologies to increase the concentration of omega-3 fatty acid DHA.

Any fish oil containing DHA and/or EPA can be used as the non-polar compound in the provided compositions. Exemplary of the fish oils that can be included in the provided compositions is Eterna™ Omegasource™ Oil (supplied by Hormel Foods Specialty Products Division, Austin, Minn.), which contains at least 30% Omega-3 fatty acids (DHA, EPA and ALA), is odorless, virtually free of cholesterol and bland in flavor. This fish oil contains about 28% DHA and EPA, typically 17% EPA and 11% DHA, and additionally contains 4.5% Omega-6 fatty acids. Also exemplary of the fish oils that can be included in the provided compositions are Omega 30 TG Food Grade (Non-GMO) MEG-3™ Fish Oil (supplied by Ocean Nutrition Canada, Dartmouth, Nova Scotia, Canada), a Kosher fish oil which contains about 30% DHA/EPA and Marinol C-38 (supplied by Lipid Nutrition B.V., Channahon, Ill.), which contains about 52% omega-3 fatty acids, including at least 38% DHA/EPA, more specifically includes about 22% EPA and 14% DHA. Also exemplary of the fish oils are other fish oils made by O3C Nutraceuticals, AS and other fish oils supplied by Jedwards, International, Inc. Also exemplary of a fish oil is Marinol D-40 (supplied by Lipid Nutrition B.V., Channahon, Ill.), which contains about 40% DHA and 7% EPA.

Also exemplary of the fish oils are krill oils, made according to International Publication No. WO 2007/080515.

(2) Algae Oil

Also exemplary of non-polar compounds containing Omega-3 PUFAs, particularly DHA (and optionally EPA), that can be used as the non-polar compound in the provided beverage compositions are oils derived from microorganisms, for example, oils derived from marine dinoflagellates, for example, microalgae, for example, *Crypthecodinium* sp, particularly, *Crypthecodinium cohnii*. Microalgae oils, such as algal oil, are an excellent source of omega-3 fatty acids, particularly DHA (see e.g., U.S. Pat. Nos. 5,397,591, 5,407, 957, 5,492,938 and 5,711,983). Exemplary of oils derived from microalgae are the oils disclosed in, and oils made according to the methods described in, U.S. Pat. Nos.

5,397,591, 5,407,957, 5,492,938 and 5,711,983 and U.S. Publication number 2007/0166411, including DHASCO® and DHASCO-S® (Martek Biosciences Corporation).

For example, U.S. Pat. No. 5,397,591 describes, inter alia, single cell edible oils (algae oils) (and methods for making the oils), which contain at least 70% triglycerides, which contain about 20-35% DHA and lack EPA, isolated from *Crypthecodinium cohnii*, generally containing more than 70% triglycerides, having 15-20% myristic acid; 20-2 5% palmitic acid; 10-15% oleic acid; 30-40% DHA and 0-10% other triglycerides. U.S. Pat. No. 5,407,957 describes, inter alia, algae oils (and methods for making the oils) derived from *Crypthecodinium cohnii*, generally containing greater than about 90% triglycerides, at least 35% DHA by weight (w/w), in one example, having 15-20% myristic acid, 20-25% palmitic acid, 10-15% oleic acid, 40-45% DHA, and 0-5% other oils. U.S. Pat. No. 5,492,938 describes, inter alia, single cell edible oils (and methods for making the oils) containing at least 70% triglycerides, which contain about 20-35% DHA and lack EPA, isolated from *Crypthecodinium cohnii*, in one example, containing more than 70% triglycerides, having 15-20% myristic acid; 20-25% palmitic acid; 10-15% oleic acid; 30-40% DHA; 0-10% other triglycerides. U.S. Pat. No. 5,711,983 describes, inter alia, single cell edible oils (and methods for making the oils) containing at least 70% triglycerides, which contain about 20-35% DHA and lack EPA, isolated from *Crypthecodinium cohnii*, in one example, containing more than 70% triglycerides, having 15-20% myristic acid; 20-25% palmitic acid; 10-15% oleic acid; 30-40% DHA and 0-10% other triglycerides.

Also exemplary of suitable microalgae oils are those disclosed, for example, in U.S. Pat. No. 6,977,166 and U.S. Publication Number US 2004/0072330.

Exemplary of an algal oil that can be included in the provided compositions is Martek DHA™-S (supplied by Martek Biosciences Corporation, Columbia, Md.), derived from the marine alga *Schizochytrium* sp., containing not less than 35% DHA. This algal oil additionally contains 16.1% (22:5 ω6) docosapentaenoic acid, 1.3% (20:5 ω3) eicosapentaenoic acid, 0.6% (20:4 ω6) arachidonic acid, 1.6% (18:2 ω6) linoleic acid, 16.9% (18:1 ω9) oleic acid and 19.8% other fatty acids. Also exemplary of an algal oil that can be included in the provided compositions is Docosahexaenoic acid (supplied by VB Medicare Private Limited, Bangalore, Ind.), derived from the marine alga *Schizochytrium* sp., containing not less than 35% DHA. Any oil derived from dinoflagellate, for example, microalgae, which contains DHA, and optionally EPA, is suitable as an algae oil for use with the provided compositions, for example, V-Pure algae oil (Water4Life, Switzerland), which contains EPA and DHA.

ii. Flax Seed Oil—Alpha-Linolenic Acid (ALA)

Also exemplary of the Omega-3 containing non-polar compounds used in the provided beverage compositions is flaxseed oil (flaxseed oil, linseed Oil). Flaxseed oils, which are good sources of omega-3 fatty acids, particularly alpha-linolenic acid, have been used as nutritional supplements. Flaxseed oils are produced by pressing the flax seed and refining the oil from the flax seeds. Exemplary of a flaxseed oil that can be used as the non-polar compound in the provided compositions is flaxseed oil derived from *Linum usitatissimum* L., for example, flaxseed oil supplied by Sanmark LLC, Greensboro, N.C. (Sanmark Limited, Dalian, Liaoning Province, China), which contains not less than (NLT) 50% C18:3 alpha-linolenic acid, and further contains other fatty acids, for example, 3-8% C16:0 Palmitic acid, 2-8% C18:0 Stearic acid, 11-24% C18:1 Oleic acid, 11-24% C18:2 linoleic acid and 0-3% other fatty acids. Also exemplary of suitable flaxseed oil is a flaxseed oil containing 6% Palmitic acid, 2.5% stearic acid, 0.5% arachidic acid, 19% oleic acid, 24.1% linoleic acid, 47.4% linolenic acid, and 0.5% other fatty acids. Also exemplary of flaxseed oil that can be used as the non-polar compound in the provided compositions is Barlean's Organic Flaxseed Oil (supplied by Barlean's Organic Oils, Ferndale, Wash.), containing not less than 55% alpha-linolenic acid, and further contains other fatty acids, for example, 5.5% C16:0 Palmitic acid, 5% C18:0 Stearic acid, 17% C18:1 Oleic acid, 17% C18:2 linoleic acid and 0-1% other fatty acids. The fatty acid composition of flaxseed oil can vary. Any flaxseed oil can be used as the non-polar compound in the provided compositions. In one example, the flaxseed oil contains at least 45% alpha-linolenic acid or at least about 45% alpha-linolenic acid. In another example, the flaxseed oil contains at least 65% or about 65% or 70% or about 70% alpha-linolenic acid. Exemplary of a flaxseed containing greater than 65% linolenic acid content (of total fatty acid content), for example, 70-80% or 70-75%, is the flaxseed described in U.S. Pat. No. 6,870,077.

b. Omega-6 Fatty Acid Compounds

Also exemplary of the non-polar compounds used in the provided beverage compositions are compounds containing omega-6 PUFAs, for example, gamma-linolenic acid (GLA), for example, borage oil and evening primrose (*Oenothera biennis*) oil, blackcurrant seed oil, hemp seed oil, fungal oil and spirulina extract. Any oil containing omega-6 fatty acids can be used in the provided compositions.

i. Borage Oil (Gamma-Linolenic Acid (GLA))

Exemplary of the omega-6 containing non-polar compounds that can be used in the provided beverage compositions are compounds containing GLA, for example, borage oil. GLA is an omega-6 PUFA, which primarily is derived from vegetable oils, for example, evening primrose (*Oenothera biennis*) oil, blackcurrant seed oil, hemp seed oil, and spirulina extract. GLA has been used as a nutritional supplement. It has been proposed that GLA has a role in treating various chronic diseases and in particular that it has anti-inflammatory effects (Fan and Chapkin, (1998) *The Journal of Nutrition* 1411-1414). In one example, the non-polar active ingredient contains at least about 22% or about 22%, by weight (w/w), GLA, for example, at or about 22, 23, 24, 25, 26, 27, 28, 29, 30, 31, 32, 33, 34, 35, 36, 37, 38, 39, 40, 50, 60%, or more, by weight (w/w), GLA. Omega-6 containing non-polar active ingredients are typically added to the compositions in amounts such that when diluted in a beverage, one serving of the beverage provides an amount of the GLA between at or about 1.5 and at or about 3 g, typically between at or about 1.5 and at or about 2 g, between at or about 1.5 and at or about 2.5 g, between at or about 2 and at or about 2.5 g, between at or about 2 and at or about 3 g, between at or about 2.5 and at or about 3, for example, at or about 1.5, at or about 2, at or about 2.5 or at or about 3 g, per serving of the beverage, such as for example, 8 ounces of a beverage.

Borage (*Borago officinalis*), also known as "starflower," is an herb with seeds containing high amounts of GLA. Exemplary of a borage oil that is used as a non-polar active ingredient in the provided beverage compositions is the borage oil supplied by Sanmark LLC, Greensboro, N.C. (Sanmark Limited, Dalian, Liaoning Province, China), derived by pressing and isolating oil from the seeds of *Borago officinalis* L. This oil contains not less than (NLT) 22% C18:3 gamma-linolenic acid (GLA), between 9 and 12% C16:0 Palmitic acid, between 3% and 5% C18:0 Stearic acid, between 15% and 20% C18:1 Oleic acid, between 35% and 42% C18:2 linoleic acid, between 3% and 5% C20:1 Ocosenoic acid, between 1% and 4% C22:1 Docosenoic acid and between 0% and 4% other fatty acids. Other borage oils can be used. Other GLA-containing oils also can be used as the non-polar compound.

c. Saw Palmetto Extract

Also exemplary of the non-polar compounds used in the provided beverage compositions is saw palmetto extract, a lipophilic extract of the ripe berries of the American dwarf palm (also called *Serenoa repens* or *Sabal serrulata*), which has been used to treat genitourinary and other diseases and to enhance sperm production, breast size and libido, as a mild diuretic, a nerve sedative, an expectorant and a digestive tract tonic, and particularly to treat benign prostate hyperplasia (BPH) (Ernst (2002) *Academia and Clinic* 136: 42-53; Gordon and Shaughnessy (2003) *Complementary and Alternative Medicine* 76(6):1281-1283). Saw palmetto extract is commercially available from a number of sources. Any saw palmetto lipid extract can be used in the provided beverage compositions. Exemplary of the saw palmetto extract that can be used in the provided compositions is Saw Palmetto Lipophilic Extract, commercially available from Natural Medicinals, Inc., Felda, Fla. This Saw Palmetto Lipophilic Extract is carbon dioxide extracted and, in one example, contains, 85.9% total fatty acids, including 0.8% Caproic acid, 2% Caprylic acid, 2.4% Capric acid, 27.1 Lauric acid, 10.3 Myristic acid, 8.1% Palmitic acid, 0.2% Palmitoleic acid, 2% Stearic acid, 26.7 Oleic acid, 4.9% Linoleic acid, 0.7% linolenic acid, 0.42%; 0.42% phytosterols, including 0.42% beta Sitosterol, 0.09% Campesterol, 0.03% Stigmasterol; and 0.2% moisture. Other sources of saw palmetto extract can be used.

d. Conjugated Linoleic Acid (CLA)

Also exemplary of the PUFA non-polar compounds that can be used in the provided beverage compositions are non-polar compounds containing conjugated fatty acids. Conjugated fatty acids are PUFAs with two or more conjugated double bonds. Conjugated fatty acids can be used as nutritional supplements. Exemplary of the active ingredients containing conjugated fatty acids are compounds containing Conjugated Linoleic acid (CLA), for example, 18:2 ω7, 18:2 ω6; Conjugated Linolenic acid, for example, 18:30ω6, 18:3ω5; and other conjugated fatty acids, for example, 18:3 ω3, 18:4 ω3, and 20:5 ω6. CLA refers to a family of linoleic acid isomers found primarily in meat and dairy products of ruminants. Typically, the CLA compounds contain a mixture of different CLA isomers, for example, C18:2 CLA c9,t11, CLA t10, c12 and other CLA isomers. Exemplary of the CLA that can be used as an active ingredient in the provided compositions is CLA (80%) commercially available from Sanmark, LTD (Dalian, Liaoning Province, China; product code 01057-A80). This CLA is clear white to pale yellow oil and has the following fatty acid composition: NMT (not more than) 9.0% C16:0 Palmitic acid, NMT 4.0% Stearic acid, NMT 15.0% C18:1 Oleic acid, NMT 3.0% C18:2 Linoleic acid, NLT (not less than) 80% C18:2 CLA (including the following isomers: NLT 37.5% C18:2 CLA c9,t11, 37.5% C18:2 CLA t10, c12, and NMT 5.0% other CLA isomers); and NMT 5.0% other fatty acids. Also exemplary of the CLA that can be used as an active ingredient in the provided compositions is Clarinol G-80 (supplied by Lipid Nutrition B.V., Channahon, Ill.), containing about 80% CLA, including about 40% C18:2 CLA c9,t11 and 40% C18:2 CLA t10,c12. Also exemplary of the CLA that can be used as an active ingredient in the provided compositions is Tonalin TG 80 (supplied by Cognis Corporation, La Grange, Ill.), containing about 80% CLA, including about 40% C18:2 CLA c9,t11 and 40% C18:2 CLA t10,c12, additionally containing about 13% oleic acid, 2% palmitic acid, 3% stearic acid and less than 1% linoleic acid. Any CLA containing compounds can be used in the provided beverage compositions.

ii. Coenzyme Q Compounds

Exemplary of the non-polar active ingredients are compounds containing coenzyme Q, for example, coenzyme Q10 (also called CoQ10, ubiquinone, ubidecarenone, ubiquinol and vitamin Q10). Coenzyme Q compounds are benzoquinone compounds containing isoprenyl units. The number of isoprenyl units in each of the different CoQ species is indicated with a number following CoQ. For example, CoQ10 contains 10 isoprenyl units. Coenzyme Q10 is a predominant coenzyme Q species.

Coenzyme Q can exist in two different forms: an oxidized form and a reduced form. When the oxidized form of a coenzyme Q species is reduced by one equivalent, it becomes a ubisemiquinone, denoted QH, which contains a free radical on one of the oxygens in the benzene ring of the benzoquinone. Oxidized and reduced coenzyme Q containing compounds can be used as active ingredients in the provided compositions.

Coenzyme Q-containing non-polar compounds are typically added to the compositions in amounts such that when diluted in a beverage, one serving of the beverage provides between at or about 10 and at or about 200 mg, typically, between at or about 10 and at or about 100 mg, between at or about 10 and at or about 150 mg, between at or about 50 and at or about 150 mg, between at or about 50 and at or about 200 mg, between at or about 100 and at or about 200 mg, for example, at or about 10, at or about 20, at or about 50, at or about 100, at or about 150 or at or about 200 mg coenzyme Q, for example coenzyme Q10, per serving of the beverage, such as for example, 8 ounces of a beverage.

a. Coenzyme Q10

Exemplary of the coenzyme Q containing non-polar compounds that can be used in the provided beverage compositions are non-polar compounds containing coenzyme Q10. Coenzyme Q10 (also called CoQ10, ubiquinone, ubidecarenone, ubiquinol, and vitamin Q10) is a benzoquinone compound that contains 10 isoprenoid units. The "Q" in the name refers to quinone and the 10 refers to the number of isoprenoid units. CoQ10 typically refers to the oxidized form of CoQ10, which also is referred to as ubidecarenone, as opposed to the reduced form of CoQ10. Both reduced and oxidized CoQ10 are exemplary of the coenzyme Q species that can be used as active ingredients in the provided compositions.

CoQ10 has electron-transfer ability and is present in cellular membranes, such as those of the endoplasmic reticulum, peroxisomes, lysosomes, vesicles and the mitochondria. A decrease in natural CoQ10 synthesis has been observed in sick and elderly people. Because of this observation and its potent antioxidant properties, CoQ10 is used as a dietary supplement and a treatment for diseases such as cancer and heart disease. CoQ10, however, exhibits relatively poor bioavailability. CoQ10 containing compounds are available commercially. Any CoQ10 compound or reduced CoQ10 compound can be used with the provided beverage compositions. Exemplary of the CoQ10 compounds that can be used as active ingredients are coenzyme Q10 compounds containing greater than 98% or greater than about 98% ubidecarenone, for example, the compound sold under the name Kaneka Q10™ (USP Ubidecarenone) by Kaneka Nutrients, L.P., Pasadena, Tex. The compound sold under the name Kaneka Q10™ is fermented entirely from yeast and is identical to the body's own CoQ10 and free from the cis isomer found in some synthetically produced CoQ10 compounds. Any CoQ10 compound can be used in the provided compositions.

iii. Phytochemical-Containing Compounds

Exemplary of the non-polar compounds used as active ingredients in the provided beverage compositions are phytochemical-containing compounds, for example, phytosterols (plant sterols), phytoestrogens, for example, genistein and daidzein, flavonoids, for example, isoflavones, for example, soy isoflavones, phytoalexins, for example, Resveratrol (trans-3,5,4'-trihydroxystilbene) and red clover extract.

Typically, phytochemical-containing compounds are added to the compositions in amounts such that when diluted in a beverage, one serving of the beverage provides between at or about 0.5 and at or about 10 mg, typically, between at or about 1 and at or about 10 mg, between at or about 1 and at or about 5 mg, for example, at or about 0.5, at or about 1, at or about 2, at or about 3, at or about 4, at or about 5 mg, at or about 6 mg, at or about 7 mg, at or about 8 mg, at or about 9 mg or at or about 10 mg phytochemical-containing compound, for example phytochemical-containing compound, per serving of the beverage, such as for example, 8 ounces of a beverage.

a. Phytosterols

Exemplary of the phytochemical-containing compounds used as active ingredients in the provided compositions are phytosterols (plant sterols). Plant sterols are structurally similar to cholesterol and have been found to reduce the absorption of dietary cholesterol, which can affect the levels of serum cholesterol. According to the U.S. Food and Drug Administration (FDA), two servings per day, each containing 0.4 grams of plant sterols, for a total daily intake of at least 0.8 grams, as part of a diet low in saturated fat and cholesterol, may reduce the risk of heart disease. Thus, plant sterols are used in nutritional supplements.

Phytosterol non-polar compounds are typically added to the compositions in amounts such that when diluted in a beverage, one serving of the beverage provides between at or about 100 and at or about 1000 mg, typically between at or about 100 and at or about 500 mg, between at or about 100 and at or about 800 mg, between at or about 300 and at or about 500 mg, between at or about 300 and at or about 800 mg, between at or about 500 and at or about 1000 mg, for example, at or about 100, at or about 200, at or about 300, at or about 400, at or about 500, at or about 600, at or about 700, at or about 800, at or about 900 or at or about 1000 mg phytosterols, per serving of the beverage, such as for example, 8 ounces of a beverage.

Any phytosterol-containing compound can be used as an active ingredient in the provided compositions. Exemplary of the phytosterol-containing compounds that can be used as active ingredients in the provided compositions are compounds containing plant sterols, for example, the compound sold under the name CardioAid™, distributed by B&D Nutrition and manufactured by ADM Natural Health and Nutrition, Decatur, Ill. This compound contains Kosher, Pareve, and Halal plant sterols that are produced under current food GMPs. The sterols are PCR negative and the material is derived from genetically modified organisms (GMOs). This phytosterol compound contains a minimum of 95% plant sterols, which can include up to 5 plant sterols. The compound can contain, for example, 40-58% Beta sitosterol, 20-30% Campesterol, 14-22% Stigmasterol, 0-6% Brassicasterol and 0-5% Sitostanol. The compound further can contain tocopherols, for example, 0-15 mg/g tocopherols. The compound is tested and is negative for microorganisms, such as Salmonella, E. coli and Staphylococcus aureus.

b. Resveratrol

Exemplary of the phytochemical-containing compounds used as active ingredients in the provided beverage compositions is resveratrol. Resveratrol, or trans-resveratrol (trans-3,5,4'-trihydroxystilbene), is a phytoalexin naturally produced by several plants, such as the Japanese knotweed, and also is found in the skin and seeds of grapes, numerous berries, including mulberry, blueberries, bilberries and cranberries, and in peanuts. This polyphenolic compound can act as an antioxidant and additionally aid in cancer prevention and reduction of cardiovascular disease.

Any resveratrol-containing compound can be used as an active ingredient in the provided compositions. Exemplary of the resveratrol-containing compounds that can be used as active ingredients in the provided compositions are compounds containing trans-resveratrol, for example the compounds sold under the name ReserveNature™, sold by Jiaherb, Shaanxi, China. This compound contains trans-resveratrol from the botanical source Polygonum cuspidatum (Japanese knotweed). This resveratrol compound contains a minimum of 98.5% trans resveratrol and does not contain emodin. The compound is tested and is negative for microorganisms, such as Salmonella, E. coli, yeast and mold.

iv. Carotenoid-Containing Compounds

Exemplary of the non-polar compounds used as active ingredients in the provided beverage compositions are carotenoid-containing compounds, for example, carotenoids, including hydrocarbons (carotenes) and oxygenated, alcoholic derivatives of hydrocarbons (xanthophylls), for example, beta carotene, mixed carotenoids complex, lutein, Zeaxanthin, cryptoxanthin, for example, beta-crytoxanthin, lycopene, beta carotene, mixed carotenoids complex, astaxanthin, bixin, canthaxanthin, capsanthin, capsorubin, apocarotenal, beta-12'-apo-carotenal, "Carotene" (mixture of alpha and beta-carotene), gamma carotene, ciolerythrin, zeaxanthin, and esters of hydroxyl- or carboxyl-containing members thereof. Carotenoids are efficient free-radical scavengers, or anti-oxidants, and are capable of enhancing the vertebrate immune system.

Typically, carotenoid-containing compounds are used in the provided compositions within a concentration range of between 0% or about 0% and 10% or about 10%, typically between 0% or about 0% and 5% or about 5%, for example, at or about 1%, 2%, 3%, 4%, 5%, 6%, 7%, 8%, 9% or 10%, w/w, of the beverage composition.

a. Carotenes

Exemplary of the carotenoid-containing compounds used as active ingredients in the provided beverage compositions are carotenes, for example, alpha-carotene, beta-carotene and lycopene. Any carotene-containing compound can be used as an active ingredient in the provided compositions. Exemplary of the carotene-containing compounds that can be used as active ingredients in the provided compositions is lycopene, sold by Zhejiang Medicine CO., LTD, Xinchang Pharmaceutical Factory, Xinchang, China, a purple or red crystalline powder containing not less than 70% all E-lycopene, not more than 23% 5-Z-lycopene and not more than 9% related substances.

b. Xanthophylls

Exemplary of the carotenoid-containing compounds used as active ingredients in the provided beverage compositions are xanthophylls, for example, neoxanthin, violaxanthin, α- and β-cryptoxanthins, lutein and zeaxanthin. Xanthophylls, or phylloxanthins, are oxygen containing carotenoids that are typically yellow pigments. Any carotene-containing compound can be used as an active ingredient in the provided compositions. Exemplary of the carotene-containing compounds that can be used as active ingredients in the provided compositions are lutein and zeaxanthin, sold under the name Xanmax®-80 (Lutein crystals), by Katra Phytochem (India) Private Limited, Bangalore, India, containing 80% lutein and 4.5% zeaxanthin.

v. Micronutrient-Containing Compounds

Exemplary of the non-polar compounds used as active ingredients in the provided beverage compositions are micronutrient-containing compounds, for example, vitamins, including Vitamins A, B, C, D, E and K, and corresponding provitamins and vitamin derivatives with an action resembling that of vitamin A, B, C, D, E, or K, and alpha lipoic acid (thioctic acid), yerba mate, ginseng and *Ginkgo biloba*.

a. Vitamins

Exemplary of the vitamins used as active ingredients in the provided beverage compositions are fat-soluble vitamins, for example, Vitamins A, B, C, D, E and K, and corresponding provitamins and vitamin derivatives such as esters with an action resembling that of vitamin A, B, C, D, E or K for example, retinol (vitamin A) and pharmaceutically acceptable derivatives thereof, for example, palmitate ester of retinol and other esters of retinol, for example, Vitamin A Palmitate; B vitamins, for example, thiamin (vitamin B1), riboflavin (vitamin B2), niacin (vitamin B3), pantothenic acid (vitamin B5), pyridoxine (vitamin B6), biotin (vitamin B7), folic acid or folate (vitamin B9), and cyanocobalamin, cobalamin, or reduced forms of cobalamin (vitamin B12); calciferol (vitamin D) and its pharmaceutically acceptable derivatives thereof, for example, for example, cholecalciferol (Vitamin D3), and precursors of vitamin D; d-alpha tocopherol (vitamin E) and derivatives thereof, including pharmaceutical derivatives thereof, for example, Tocotrienols, d-alpha tocopherol acetate and other esters of d-alpha tocopherol; and ascorbyl palmitate, a fat-soluble version of vitamin C.

Any vitamin can be used as an active ingredient in the provided compositions. Exemplary of the vitamins that can be used as active ingredients in the provided compositions are vitamin A palmitate, for example, vitamin A palmitate containing 1.7 mIU/g, produced by DSM Nutritional Products, Inc., Belvidere, N.J., and distributed through Stauber Performance Ingredients, Inc., Fullerton, Calif.; vitamin D3, for example, vitamin D3 in corn oil, containing about 1 mIU/g, produced by DSM Nutritional Products, Inc., Belvidere, N.J., and distributed through Stauber Performance Ingredients, Inc., Fullerton, Calif.; vitamin B12; vitamin B1; vitamin B3; vitamin B5; and vitamin B6.

Typically, vitamin non-polar active ingredients are included in the provided compositions within a concentration range of between 0.0001% or about 0.0001% and 1% or about 1%, more typically between at or about 0.001% and at or about 0.1%, for example, at or about 0.0001%, 0.0005%, 0.0008%, 0.0009%, 0.001%, 0.002%, 0.003%, 0.004%, 0.005%, 0.01%, 0.02%, 0.03%, 0.04%, 0.05%, 0.1%, 0.5% or 1%, w/w, of the beverage composition. Vitamin non-polar active ingredients are typically added to the beverage compositions in amounts such that one serving of the beverage provides an amount of the vitamin that corresponds to the dietary reference intakes. For example, vitamin A is added such that a serving of the beverage provides between at or about 10 to at or about 2000 micrograms (mcg), for example, between at or about 20 to at or about 900 mcg, more typically between at or about 40 to at or about 400 mcg of vitamin A per serving, for example, between at or about 40 and at or about 200 mcg, or between at or about 100 and at or about 400 mcg, or between at or about 100 and at or about 300 mcg per serving. For example, the beverage composition can contain 40 or about 40, 50 or about 50, 60 or about 60, 70 or about 70, 80 or about 80, 90 or about 90, 100 or about 100, 110 or about 110, 120 or about 120, 130 or about 130, 140 or about 140, 150 or about 150, 200 or about 200, 250 or about 250, 300 or about 300, 350 or about 350, or 400 or about 400 mcg Vitamin A per serving. In another example, vitamin D3 is added such that a serving of the beverage composition provides between at or about 100 to at or about 2000 International Units (IU), for example, between at or about 100 to at or about 1000 IU, more typically, between at or about 400 and at or about 800 IU, per serving, for example between at or about 400 and at or about 600 or between at or about 500 and at or about 800, or between at or about 600 and at or about 800 IU per serving. For example, the beverage composition can contain 400 or about 400, 450 or about 450, 500 or about 500, 550 or about 550, 600 or about 600, 650 or about 650, 700 or about 700, 750 or about 750 or 800 or about 800 IU Vitamin D3 per serving. In another example, vitamin B12 is added such that a serving of the beverage composition provides between at or about 1 and 12 mcg, such as 1 or about 1, 2 or about 2, 2.4 or about 2.4, 3 or about 3, 4 or about 4, 5 or about 5, 6 or about 6, 8 or about 8, 10 or about 10 or 12 or about 12 mcg vitamin B12 per serving. In another example, vitamin B1 is added such that a serving of the beverage composition provides between at or about 0.2 and 1.4 mg, such as 0.2 or about 0.2, 0.3 or about 0.3, 0.4 or about 0.4, 0.5 or about 0.5, 0.6 or about 0.6, 0.7 or about 0.7, 0.8 or about 0.8, 0.9 or about 0.9, 1.0 or about 1.0, 1.1 or about 1.1, 1.2 or about 1.2, 1.3 or about 1.3 or 1.4 or about 1.4 mg vitamin B1 per serving. In another example, vitamin B3 is added such that a serving of the beverage composition provides between at or about 2 and 18 mg, such as 2 or about 2, 3 or about 3, 4 or about 4, 5 or about 5, 6 or about 6, 7 or about 7, 8 or about 8, 9 or about 9, 10 or about 10, 11 or about 11, 12 or about 12, 13 or about 13, 14 or about 14, 15 or about 15, 16 or about 16, 17 or about 17 or 18 or about 18 mg vitamin B3 per serving. In another example, vitamin B5 is added such that a serving of the beverage composition provides between at or about 1.7 and 7 mg, such as 1.7 or about 1.7, 1.8 or about 1.8, 1.9 or about 1.9, 2 or about 2, 3 or about 3, 4 or about 4, 5 or about 5, 6 or about 6 or 7 or about 7 mg vitamin B5 per serving. In another example, vitamin B6 is added such that a serving of the beverage composition provides between at or about 0.1 and 2.0 mg, such as 0.1 or about 0.1, 0.2 or about 0.2, 0.3 or about 0.3, 0.4 or about 0.4, 0.5 or about 0.5, 0.6 or about 0.6, 0.7 or about 0.7, 0.8 or about 0.8, 0.9 or about 0.9, 1.0 or about 1.0, 1.1 or about 1.1, 1.2 or about 1.2, 1.3 or about 1.3, 1.4 or about 1.4, 1.5 or about 1.5, 1.6 or about 1.6, 1.7 or about 1.7, 1.8 or about 1.8, 1.9 or about 1.9 or 2.0 or about 2.0 mg vitamin B6 per serving.

b. Alpha Lipoic Acid

The alpha lipoic acid active ingredients include Alpha Lipoic Acid, sold by NutriChem Resources Company, Walnut, Calif., and Alpha Lipoic Acid, sold by Zhejiang Medicines & Health Products Import & Export Co., Ltd, Hangzhou, China and other alpha lipoic acids. Typically, alpha lipoic acid is used in the provided compositions within a concentration range of between 0% or about 0% and 10% or about 10%, typically between 0% or about 0% and 5% or about 5%, for example, at or about 1%, 2%, 3%, 4%, 5%, 6%, 7%, 8%, 9% or 10%, w/w, of the beverage composition.

vi. Concentrates or Emulsions

In some examples, the non-polar compounds used in the beverage compositions provided herein are beverage concentrates or beverage emulsions that contain one or more non-polar compounds and additional ingredients that stabilize the non-polar compounds in aqueous environments. Beverage emulsions or concentrates typically are stabilized by one or more surfactants and/or co-surfactants and/or emulsion stabilizers. Exemplary concentrates for use in the provided beverage compositions are those described in U.S. Pat. Pub. Nos. 20090297665, 20090317532, 20110236364, 20090297491 and 20120016026, which are incorporated herein by reference, and herein below.

a. Typical Ingredients

Typically, beverage concentrates or emulsions contain non-polar compounds, including any described herein above, and surfactants. Concentrates or emulsions used in the beverage compositions provided herein may contain additional ingredients, including, but not limited to, polar solvents, emulsion stabilizers or co-emulsifiers, co-surfactants, phospholipids, non-polar solvents, soluble fiber, flavors, sweeteners, preservatives and pH adjusters.

i. Non-Polar Compounds

Any non-polar compound described herein above can be provided in a beverage concentrate or emulsion. For example, concentrates or emulsions used in the beverage compositions provided herein can contain polyunsaturated fatty acids, including omega-3 fatty acids, omega-6 fatty acids, omega-9 fatty acids and conjugated fatty acids and saw palmetto compounds. In one example, the concentrates or emulsions used in the beverage compositions provided herein contain omega-3 fatty acid compounds containing ALA, DHA and/or EPA, for example, oils derived from fish and microalgae, krill and/or flaxseed extract. In another example, the concentrates or emulsions used in the beverage compositions provided herein can contain omega-6 fatty acid compounds containing GLA, for example, borage oil. In yet another example, concentrates or emulsions used in the beverage compositions provided herein can contain omega-9 fatty acids, such as oleic acid. In a further example, concentrates or emulsions used in the beverage compositions provided herein can contain conjugated fatty acid compounds, such as conjugated linoleic acid (CLA). In other examples, the concentrates or emulsions used in the beverage compositions provided herein can contain coenzyme Q-containing compounds, for example, coenzyme Q10 (CoQ10), typically oxidized CoQ10 (ubidecarenone)-containing compounds; phytochemical-containing compounds, for example, phytosterols (plant sterols), resveratrol, and carotenoids, for example, lycopene, lutein and zeaxanthin; fat-soluble vitamins, for example, vitamin A palmitate, vitamin B12, vitamin E and vitamin D3; and alpha lipoic acid (thioctic acid). Additional exemplary non-polar active ingredients are described herein.

ii. Surfactants

In addition to the non-polar compounds, the beverage concentrates or emulsions that can be used in the provided beverage compositions contain at least one surfactant. Surfactants (and co-surfactants) are molecules that contain hydrophobic and hydrophilic portions. Typically, the surfactant has an HLB value between 13 or about 13 and 20 or about 20, more typically between 15 or about 15 and 18 or about 18, for example, 13, 14, 15, 16, 17, 18, 19, 20, about 13, about 14, about 15, about 16, about 17, about 18, about 19 or about 20. Exemplary of suitable surfactants are sugar ester surfactants, such as sucrose fatty acid ester (SFAE) surfactants, vitamin E derived surfactants containing a polyethylene glycol (PEG) moiety, such as tocopherol polyethylene glycol succinate (TPGS), and PEG-derived surfactants, such as PEG-sorbitan fatty acid esters, such as polysorbate 80. Typically, the surfactant is a natural surfactant, for example, a surfactant that is GRAS (generally recognized as safe) certified by the FDA and/or Kosher certified.

Sucrose Fatty Acid Ester Surfactants

Exemplary sugar derived surfactants include, but are not limited to, sugar fatty acid esters including fatty acid esters of sucrose, glucose, maltose and other sugars, esterified to fatty acids of varying lengths (e.g., containing a varying numbers of carbons). The fatty acids typically have carbon chains between 8 and 28 carbons in length, and typically between 8 and 20, or between 8 and 18 or between 12 and 18, such as, but not limited to, stearic acid (18 carbons), oleic acid (18 carbons), palmitic acid (16 carbons), myristic acid (14 carbons) and lauric acid (12 carbons). Typically, the sugar ester surfactants are sucrose ester surfactants, typically sucrose fatty acid ester surfactants having the following formula shown in Scheme I below.

Scheme I

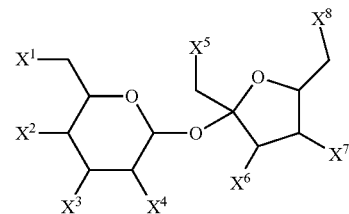

where each of $X^1$, $X^2$, $X^3$, $X^4$, $X^5$, $X^6$, $X^7$ and $X^8$ independently is:

a hydroxyl (—OH) group, or where:

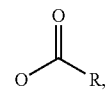

each R is an alkyl group having 3-27 carbon atoms; and when more than one of $X^1$, $X^2$, $X^3$, $X^4$, $X^5$, $X^6$, $X^7$ and $X^8$ is

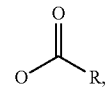

each R can be a different alkyl group (e.g., having different number of carbon atoms and/or different saturation), or can be the same alkyl group.

Typically, in the provided sucrose fatty acid ester surfactants, each R has between 7 and 27 carbon atoms, and typically between 7 and 19 atoms, such as 7, 8, 9, 10, 11, 12, 13, 14, 15, 16, 17, 18, or 19 carbon atoms or between 7 and 17 carbon atoms.

An alkyl group can be a straight chain or branched alkyl group, can be substituted or unsubstituted, and can be a saturated "saturated alkyl group," meaning that it does not contain any alkene or alkyne groups; or an "unsaturated alkyl group," meaning that it contains at least one alkene or alkyne group. An alkyl group that includes at least one carbon-carbon double bond (C=C) also is referred to by the term "alkenyl," and alkenyl groups optionally can be substituted. An alkyl group that includes at least one carbon-carbon triple bond (CC) also is referred to by the term "alkynyl," and alkynyl groups optionally can be substituted.

Typically, the sucrose fatty acid ester surfactants contain sucrose fatty acid monoesters, having the structure set forth in Scheme I, where one of $X^1$, $X^2$, $X^3$, $X^4$, $X^5$, $X^6$, $X^7$ and $X^8$ (typically $X^1$) is

and the other seven of $X^1$, $X^2$, $X^3$, $X^4$, $X^5$, $X^6$, $X^7$ and $X^8$ are each, independently, —OH. An exemplary monoester has the following structure:

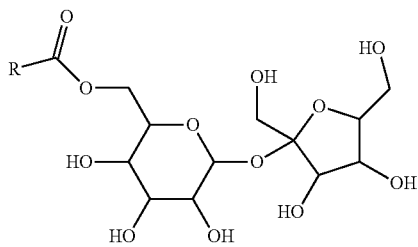

where R is an alkyl group having 3-27 carbons, and typically 7-27 carbons.

The sucrose fatty acid esters include blends of sucrose fatty acid esters, which typically include monoesters, and can also include diesters, triesters and polyesters, which have structures according to Scheme I, above, where two (diesters), three (triesters) or more (polyesters) of $X^1$, $X^2$, $X^3$, $X^4$, $X^5$, $X^6$, $X^7$ and $X^8$, (and typically $X^1$ and $X^8$) independently, are

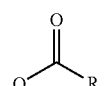

Vitamin E Derived Surfactants

Exemplary Vitamin E-derived surfactants include, but are not limited to, surfactants such as tocopherol and/or tocotrienol-derived surfactants, in which the Vitamin E moiety represents the hydrophobic region of the surfactant, and is attached, via a linker, to another moiety, such as a polyethylene glycol (PEG) moiety, that provides the hydrophilic portion of the surfactant. Vitamin-E derived surfactants include, but are not limited to, tocopherol derived surfactants, including polyalkylene glycol derivatives of tocopherol, typically polyethylene glycol (PEG) derivatives of tocopherol, such as tocopherol polyethylene glycol succinate (TPGS), TPGS analogs, TPGS homologs and TPGS derivatives. Alternatively, the surfactants can be other PEG derivatives having similar properties, for example, PEG derivatives of sterols, e.g. a cholesterol or a sitosterol (including, for example, any of the PEG derivatives disclosed in U.S. Pat. No. 6,632,443) or PEG-derivatives of other fat-soluble vitamins, for example, some forms of Vitamin A (e.g. Retinol) or Vitamin D (e.g. Vitamin D1-D5).

Exemplary of the vitamin E polyethylene glycol diesters made with dicarboxylic acids are compounds having the following formula shown in scheme II below (and homologs, analogs and derivatives thereof):

Scheme II

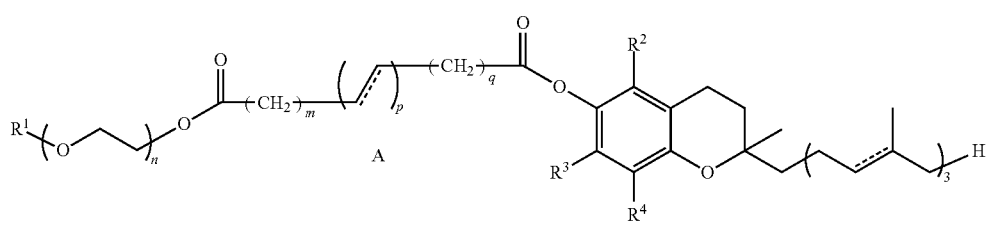

where $R^1$, $R^2$, $R^3$ and $R^4$ each independently is H or Me; each dashed line is independently a single or double bond; n is an integer from 1-5000; m and q each independently are 0 or 1; and p is an integer from 1-20. In one example, the surfactant is a compound where, when both m and q are 0, p is an integer between 2-20.

In one example, the surfactant has the following formula shown in Scheme III below (including homologs, analogs and derivatives thereof):

Scheme III

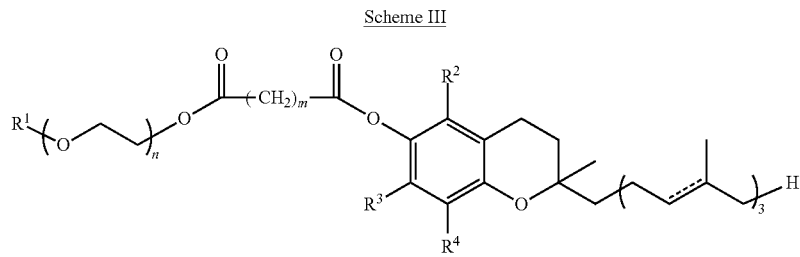

where $R^1$, $R^2$, $R^3$ and $R^4$ each independently is hydrogen (H) or methyl ($CH_3$); the bond represented by the dashed line is either a single or double bond; m is an integer from 1 to 20, and n is an integer from 1 to 5000.

In another example, the surfactant is a TPGS analog, such as, but not limited to, a compound other than TPGS having the formula shown in Scheme IV:

Scheme IV

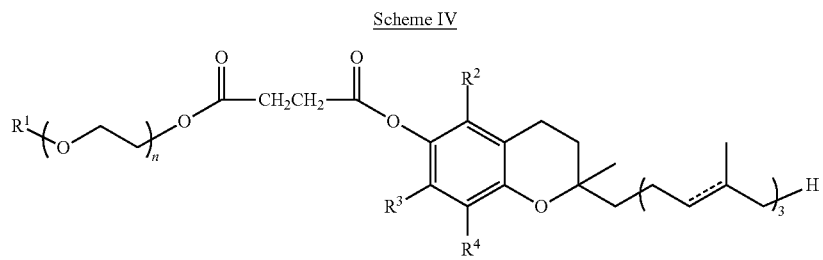

where $R^1$, $R^2$, $R^3$ and $R^4$ each independently is hydrogen (H) or methyl ($CH_3$); the bond represented by the dashed line is either a single or double bond, and n is an integer from 1 to 5000.

PEG-Derived Surfactants

Exemplary PEG-derived surfactants include but are not limited to PEG-sorbitan fatty acid esters, such as polysorbates, including polyoxyethylene (20) sorbitan monooleate (also called polysorbate 80) and analogs and homologs of polysorbate 80, such as, for example, polysorbate 20 (polyoxyethylene (20) sorbitan monolaurate), polysorbate 40 (polyoxyethylene (20) sorbitan monopalmitate) and polysorbate 60 (polyoxyethylene (20) sorbitan monostearate).

Polysorbates are compounds belonging to the family of oily liquids containing esters derived from PEGylated sorbitan (derivative of sorbitol) esterified with one or more fatty acids. Exemplary polysorbate surfactants are Polysorbate 20 (polyoxyethylene (20) sorbitan monolaurate; sold under the trade name Tween 20®); polysorbate 40 (Tween 40® or polyoxyethylene (20) sorbitan monopalmitate); polysorbate 60 (Tween 60® or polyoxyethylene (20) sorbitan monostearate); and polysorbate 80 (Tween 80® or polyoxyethylene (20) sorbitan monooleate). With the parenthetically indicated naming convention for the polysorbates above, the number 20 following "polyoxyethylene" refers to the number of oxyethylene —($CH_2CH_2O$)— groups in the molecule. With the naming convention beginning with "polysorbate" (e.g. "polysorbate 80), the number refers to the type of fatty acid used to esterify the polyoxyethylene sorbitan to generate the polysorbate. For example, the number 20 indicates monolaurate; the number 40 indicates monopalmitate; the number 60 indicates monostearate; and the number 80 indicates monooleate. In one example, the surfactant(s) used in the provided compositions are polysorbate surfactants, including polysorbate 80, for example, the polysorbate 80 sold under the trademark, Tween 80®.

The PEG used in the PEG-derived surfactants can be any of a plurality of known PEG moieties. Exemplary of suitable PEG moieties are PEG moieties having varying chain lengths, and varying molecular weights, for example, PEG 1000, PEG 200, PEG 500, and PEG 20,000. The numbers following individual PEG moieties indicate the molecular weight (in daltons (Da)) of the PEG moieties. The PEG moiety of the surfactant typically has a molecular weight of between 200 Da or about 200 Da and 20,000 Da or about 20,000 Da, typically between 200 Da and 6000 Da, for example, between 600 Da or about 600 Da and 6000 Da or about 6000 Da, typically between 200 Da or about 200 Da and 2000 Da or about 2000 Da, between 600 Da or about 600 Da and 1500 Da or about 1500 Da, or 200, 300, 400, 500, 600, 800, or 1000 Da.

Also exemplary of suitable PEG moieties are PEG moieties that are modified, for example, methylated PEG (m-PEG), which is a PEG chain capped with a methyl group. Other known PEG analogs also can be used. The PEG moieties can be selected from among any reactive PEG, including, but not limited to, PEG-OH, PEG-NHS, PEG-aldehyde, PEG-SH, PEG-$NH_2$, PEG-$CO_2H$, and branched PEGs.

iii. Additional Ingredients

Concentrates or emulsions used in the beverage compositions provided herein may contain additional ingredients, including, but not limited to, polar solvents, emulsion stabilizers or co-emulsifiers, co-surfactants, non-polar solvents, soluble fiber, flavors or flavoring agents, sweeteners, preservatives and pH adjusters. Additional ingredients can be included in the concentrates or emulsions at any concentrate or percentage as long as the concentrate or emulsion provides a sufficient amount of one or more non-polar compounds.

Polar solvents include, but are not limited to, water (e.g., filtered water), or propylene glycol, ethylene glycol, tetraethylene glycol, triethylene glycol, trimethylene glycol, methanol, ethanol, propanol, isopropanol, n-butanol and t-butanol, other alcohols, acids, including but not limited to acetic acid and formic acid, acetone, acetonitrile, butyl acetate, dimethylformamide, dimethyl sulfoxide, dioxane, ethyl acetate, tetrahydrofuran and hexamethylphosphoric triamide or other edible aqueous liquid, or combinations thereof. Emulsion stabilizers or co-emulsifiers include, but are not limited to, fatty acid-modified carbohydrate-based macromolecules, such as an n-octenyl succinic anhydride modified gum arabic, for example, the modified gum acacia sold under the name Tic Pretested® Ticamulsion A-2010 Powder, by Tic Gums, Inc., Belcamp, Md. Other fatty acid-modified carbohydrate-based macromolecules include, for example, polysaccharides, celluloses, and starches, such as natural gums or modified gums, including but not limited to gum acacia, or gum arabic, modified gum acacia, ester gum, guar gum, modified guar gum, xanthan gum, sodium alginate, and gum ghatti, including mixtures of gums or blends of similar gums, and other gums, for example, sugar beet pectin; cellulose derivatives, for example, cetyl hydroxyethylcelluloses, hydroxypropylmethylcelluloses, modified hydroxypropylmethylcelluloses, hydroxyethylcelluloses and modified hydroxyethylcelluloses; and starches and modified starches, for example, maize or corn starches and modified corn starches.

Co-surfactants include, but are not limited to, phospholipids, for example, phosphatidylcholine; Preservatives include, but are not limited to, natural preservatives, for example, benzyl alcohol; Non-polar solvents include, but are not limited to, an oil other than the non-polar compound, for example, vitamin E oil, oleic acid or flaxseed oil; Soluble fibers include, but are not limited to, fructo-oligosaccharides, for example, inulins, for example, inulins found in chicory, Jerusalem artichoke, dahlia, garlic, leeks and onions, fructans and water-soluble soybean fiber. Exemplary of a soluble fiber is an inulin, for example, Oliggo-Fiber Instant Inulin (Fibruline® Instant) (supplied by Cosucra-Groupe Warcoing SA, Belgium, sold by Gillco Products, San Marcos, Calif.), containing chicory inulin; pH adjusters include, but are not limited to, citric acid or phosphoric acid; Flavoring agents include, but are not limited to, D-limonene or lemon oil; Sweeteners include, but are not limited to sucralose; and Antifoaming agents, such as Tramfloc 1147, sold by Tramfloc Inc, Forney, Tex., containing an emulsion of polydimethylsiloxane fluid and amorphous silica.

b. Exemplary Concentrates or Emulsions

Exemplary beverage concentrates or emulsions containing non-polar compounds that can be used in the provided beverage compositions include, for example, liquid and solid nanoemulsion concentrates described in U.S. Pat. Pub. Nos. 20090297665, 20090317532, 20110236364, 20090297491 and 20120016026. Typically, the concentrates or emulsions contain non-polar compounds, surfactants and other ingredients, including but not limited to, polar solvents, emulsion stabilizers or co-emulsifiers, co-surfactants, phospholipids, non-polar solvents, soluble fiber, flavors, sweeteners, preservatives and pH adjusters.

In some examples, the non-polar compounds used in the beverage compositions provided herein are liquid nanoemulsion concentrates that contain a surfactant in an amount between at or about 16% and at or about 30%, a polar solvent in an amount between at or about 60% and at or about 79%, and a non-polar compound in an amount between at or about 5% and at or about 10%, by weight, of the concentrate. In one example, the surfactant is a PEG-derivative of vitamin E, as described in U.S. Pat. Pub. No. 20090297665. In another example, the surfactant is a polysorbate or a polysorbate analog, as described in U.S. Pat. Pub. No. 20090317532. In another example, the surfactant is a sucrose fatty acid ester, as described in U.S. Pat. Pub. No. 20110236364.

In other examples, the non-polar compounds used in the beverage compositions provided herein are liquid nanoemulsion concentrates that contain a surfactant that is a PEG-derivative of vitamin E in an amount between at or about 65% and at or about 95% and a non-polar compound in an amount between at or about 5% and at or about 35%, by weight, of the concentrate, as described in U.S. Pat. Pub. No. 20090297491.

In further examples, the non-polar compounds used in the beverage compositions provided herein are liquid nanoemulsion concentrates that contain one or more surfactants, one or more non-polar compounds in an amount up to at least 50%, by weight, of the concentrate and an emulsion stabilizer that is a fatty acid-modified carbohydrate-based macromolecule in an amount greater than at or about 1%, by weight, of the concentrate, as described in U.S. Pat. Pub. No. 20120016026. In one example, each of the one or more surfactants are present in an amount between at or about 3% and at or about 16%, by weight, of the concentrate, but when two or more surfactants are present, the total amount of surfactants, excluding the fatty acid-modified carbohydrate-based macromolecule, is between 16% or about 16% and 30% or about 30%, by weight, of the concentrate. The one or more surfactants can be selected from among PEG-derivatives of vitamin E, polysorbates or polysorbate analogs and sucrose fatty acid esters.

c. Other Concentrates or Emulsion

Any concentrate or emulsion containing one or more non-polar compounds can be used in the beverage compositions provided herein. Concentrates and emulsions include, but are not limited to, those provided in U.S. Pat. Nos. 6,180,130, 6,391,370, U.S. Patent Pub. Nos. 20100104730, 20090018186, 20080058418, 20070298156, 20070298083, 20050208082, 20090297665, International Patent Pub. Nos. WO2011127163, WO2011149854, WO2010021820, WO2008030949, WO2007149591, WO 199636316, WO 2007016073, WO 2005105290, WO 2008039564, WO 2010008762, WO 2009029046 and European Patent Pub. No. EP 1972334.

d. Amount

The concentrate can be present In the provided beverage compositions in an amount between at or about 0.001% and at or about 10%, for example, between at or about 0.001% and at or about 5%; between at or about 0.001% and at or about 2%; between at or about 0.001% and at or about 1%; between at or about 0.001% and at or about 0.1%; between at or about 0.001% and at or about 0.01%; between at or about 0.004% and at or about 5%; between at or about 0.004% and at or about 2%; between at or about 0.004% and at or about 1%; between at or about 0.004% and at or about 0.1%; between at or about 0.01% and at or about 5%;

between at or about 0.01% and at or about 2%; between at or about 0.01% and at or about 1%; between at or about 0.01% and at or about 0.5%; between at or about 0.1% and at or about 5%; between at or about 0.1% and at or about 2%; between at or about 0.1% and at or about 1%; between at or about 0.2% and at or about 10%; or between at or about 0.2% and at or about 8%; or between at or about 0.2% and at or about 5%; or between at or about 0.2% and at or about 2%; or between at or about 0.2% and at or about 1%; or between at or about 0.2% and at or about 0.6%, by weight, of the composition. In some examples, the concentrate is present in an amount of at or about at 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.4%, 1.5%, 1.6%, 1.7%, 1.8%, 1.9%, 2%, 2.5%, 3%, 4%, 5%, 6%, 7%, 8%, 9%, or 10%, by weight, of the composition.

c. Beverage Base

The beverage compositions provided herein contain a beverage base. The beverage base can include, but is not limited to a polar solvent, for example water (e.g., filtered water); a juice, for example a fruit, vegetable or berry juice, such as a juice blend, a dried juice, a juice concentrate, a juice extract, a juice puree, a milk; a fruit flavor or flavoring agent, for example, natural and synthetic flavors, such as fruit flavors, botanical flavors, spice flavors, other flavors; a carbonated beverage, such as a soda, flavored soda, carbonated water, carbonated juice or other carbonated beverage; or any combination thereof.

In general, a high amount (i.e., a large wt %) of the beverage composition is a beverage base. Typically, the amount of beverage base included in the provided beverage compositions is more than 55% or about 55%, typically more than 75% or about 75%, for example, at or about 55%, 60%, 65%, 70%, 75%, 80%, 85%, 90%, 90.5%, 91%, 91.5%, 92%, 92.5%, 93%, 93.5%, 94%, 94.5%, 95%, 95.5%, 96%, 96.5%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8% or 99.9% by weight of the beverage composition.

i. Water

Exemplary of a beverage base used in the provided beverage compositions is a polar solvent, for example, water. In one example, the water is a purified water, such as water that is purified prior to adding it to the beverage composition, for example, by charcoal filter, ion exchange, reverse osmosis, UV sterilization and/or filtering using a filter, for example, a 50-100 micron filter. Typically, when a filter is used, it is an end point of use filter, which filters the water before it reaches the tank in the provided process. Alternatively, previously filtered water can be added to the beverage compositions.

Generally, a high amount (i.e., a large wt %) of the beverage base of the beverage compositions provided herein is a polar solvent, such as water. Typically, the amount of water included in the provided beverage compositions is more than 55% or about 55%, typically more than 75% or about 75%, for example, 55%, 60%, 65%, 70%, 75%, 80%, 85%, 90%, 90.5%, 91%, 91.5%, 92%, 92.5%, 93%, 93.5%, 94%, 94.5%, 95%, 95.5%, 96%, 96.5%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8% or 99.9%, by weight of the beverage composition.

ii. Juices or Juice Concentrates

In one example, the beverage base included in the provided beverage compositions further contains one or more juices, such as a juice blend, a dried juice, a juice concentrate, a juice extract, a juice puree, a milk, or any combination thereof. Any juice or combination of juices can be added to the beverage compositions, for example, any fruit, vegetable, or berry juice. Multiple different fruit, vegetable and/or berry juices can be combined in the beverage compositions to generate a beverage composition having the desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, coconut, olive, raspberry, strawberry, huckleberry, loganberry, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin and grapefruit. Numerous additional and alternative juices suitable for use in the provided beverage compositions will be apparent to those skilled in the art.

Typically, the amount of juice used in the provided beverage compositions is less than 5% or about 5%, typically less than 3% or about 3%, for example, at or about 0.0%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0%, by weight, of the beverage composition.

iii. Flavors

In one example, the beverage base included in the provided beverage compositions further contains one or more flavors or flavoring agents, for example, any compound to add flavor to the beverage composition, including the beverages and shots. The flavor or flavoring agent can be, for example, natural and synthetic flavors, fruit flavors, botanical flavors, spice flavors, other flavor, and mixtures thereof. Several flavors are well known. Any flavor can be added to the beverage compositions, for example, any flavor sold by Mission Flavors (Foothill Ranch, Calif.) or Creative Flavor Concepts (Irvine, Calif.). Exemplary of flavors that can be used are fruit flavors, including citrus flavors and other fruit flavors, such as guava, kiwi, peach, mango, papaya, pineapple, banana, strawberry, raspberry, blueberry, orange, coconut, grapefruit, tangerine, mandarin orange, tangelo, pomelo, apple, grape, cherry, tomato, passion fruit, apricot, lemon, lime and lemon-lime; vegetable flavors, such as carrot; botanical flavors, such as cola flavors and tea flavors; spice flavors, such as *cassia*, clove, cinnamon, pepper, ginger, vanilla spice, cardamom, coriander, root beer, birch beer, sassafras, and ginseng; coffee flavors, such as coffee, latte, and cappuccino; mint flavors; chocolate flavors, such as chocolate and fudge; dairy flavors; vanilla flavors; butterscotch flavors; nut flavors, such as almond, peanut, and other nuts; methyl salicylate (wintergreen oil, sweet birch oil); citrus oils and other flavors.

Typically, the flavors are safe and/or desirable for human consumption, for example, GRAS or Kosher-certified flavors. Exemplary of flavoring agents that can be used in the compositions are pomegranate grape (Code F0233), mixed berry (Code F3090), peach mango (Code F0079) and citrus (Code F4721), all sold by Creative Flavor Concepts (Irvine, Calif.); peach (PH-147), vanilla (CA-158), cherry (CH-172) and mixed berry (MB-106), all sold by Mission Flavors and Fragrances, Inc. (Foothill Ranch, Calif.); blackberry (Code 125-00875) sold by Cargill; and any other suitable flavor or flavoring agent that is apparent to those skilled in the art.

Typically, the concentration of flavor or flavoring agent added to the provided beverage compositions is less than 5% or about 5%, typically less than 3% or about 3%, for example, at or about 0.0%, 0.01%, 0.02%, 0.03%, 0.04%, 0.05%, 0.06%, 0.07%; 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0%, by weight, of the beverage composition.

iv. Carbonated Beverages

In one example, the beverage base included in the provided beverage compositions further contains one or more carbonated beverages, such as a soda, carbonated water, carbonated juice, flavored soda, or any combination thereof. Any carbonated beverage can be added to the beverage compositions, for example, any soda, carbonated water or carbonated juice. Multiple different sodas, carbonated waters and carbonated juices can be combined in the beverage compositions to generate a beverage composition having the desired flavor. Numerous additional and alternative carbonated beverages suitable for use in the provided beverage compositions will be apparent to those skilled in the art.

Generally, when the beverage base contains a carbonated beverage, such as a soda, flavored soda, carbonated water or carbonated juice, the carbonated beverage is used in place of the polar solvent. Thus, a high amount (i.e., a large wt %) of the beverage base of the beverage compositions provided herein is a carbonated beverage. Typically, the amount of carbonated beverage included in the provided beverage compositions is more than 55% or about 55%, typically more than 75% or about 75%, for example, 55%, 60%, 65%, 70%, 75%, 80%, 85%, 90%, 90.5%, 91%, 91.5%, 92%, 92.5%, 93%, 93.5%, 94%, 94.5%, 95%, 95.5%, 96%, 96.5%, 97%, 97.1%, 97.2%, 97.3%, 97.4%, 97.5%, 97.6%, 97.7%, 97.8%, 97.9%, 98%, 98.1%, 93:2%, 98.3%, 98.4%, 98.5%, 98.6%, 98.7%, 98.8%, 98.9%, 99%, 99.1%, 99.2%, 99.3%, 99.4%, 99.5%, 99.6%, 99.7%, 99.8% or 99.9%, by weight, of the beverage composition.

d. Sweeteners

In one example, one or more sweeteners are added to the beverage compositions at an appropriate concentrate to achieve a desired level of sweetness. Sweeteners are well known. Typically, the sweeteners are safe and/or desirable for human consumption, for example, GRAS or Kosher-certified sweeteners. Exemplary sweeteners that can be used in the provided beverage compositions are sucralose, such as Sucralose FCC VI Grade, manufactured by Changzhou Tianhua Imports & Exports Co., Ltd, sold by Ausvita, stevia, such as Stevia Leaf Powder Extract, Product code STE091 sold by MiniStar International Inc., and Xylitol, sold by Nutra Food Ingredients. Additional sweeteners that can be used in the provided beverage compositions include, but are not limited to, sucrose, lactose, fructose, an acesulfame salt, aspartame, saccharin, stevia, stevioside, and combinations thereof.

e. pH Adjusters

In one example, one or more pH adjusters are added to the provided beverage compositions at an appropriate concentration to achieve a desired pH. Typically, the pH adjuster is added to adjust the pH of the beverage composition to within a range of 2.0 or about 2.0 to 4.0 or about 4.0, for example, to a pH of 3.8. One or more of a plurality of pH adjusting agents can be used. Typically, the pH adjusting agent is safe for human consumption, for example, GRAS certified. Exemplary of a pH adjuster is phosphoric acid, such as Food Grade 80% Phosphoric Acid, sold by Univar.

Typically, the concentration of pH adjuster added to the provided beverage compositions, including the beverages and shots, is less than 3% or about 3%, typically less than 1.5% or about 1.5%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.11%, 2.12%, 2.13%, 2.14%, 2.1415%, 2.15%, 2.16%, 2.17%, 2.18%, 2.19%, 2.2%, 2.3%, 2.4%, 2.5%, 2.6%, 2.7%, 2.8%, 2.9% or 3.0% by weight of the beverage composition.

f. Antifoaming Agents

In one example, an antifoaming agent is added to the provided beverage compositions, typically when adding the stabilizer and/or stabilizing system, according to the provided methods. Typically, the antifoaming agent is added dropwise to the provided beverage composition to prevent air bubbles from forming. Any antifoaming agent can be used in the provided concentrates. Exemplary of an antifoaming agent that can be added is Tramfloc 1147, sold by Tramfloc Inc, Forney, Tex., containing an emulsion of polydimethylsiloxane fluid and amorphous silica.

C. POWDER AND EMULSION COMPOSITIONS

Provided herein are emulsion compositions containing non-polar compounds and methods for making the emulsion compositions. Provided herein are powder compositions containing non-polar compounds and methods for making the powder compositions. Typically, the provided emulsion and powder compositions provided that contain non-polar compounds and retain one or more organoleptic properties, including, odor, taste and appearance (e.g., clarity), after formulation, as compared to the same compositions that do not contain the non-polar compounds. The provided compositions (and methods for making the compositions) can be formulated using any non-polar compound suitable or desirable for human consumption, including the non-polar compounds (e.g., non-polar active ingredients) described herein and other known non-polar compounds.

The emulsion and powder compositions provided herein can be made using any non-polar compound. The non-polar compounds typically are non-polar active ingredients, for example, pharmaceuticals, nutraceuticals, vitamins and minerals. The non-polar active ingredients can include, but are not limited to, polyunsaturated fatty acid (PUFA)-containing compounds, such as compounds containing omega-3 fatty acids, for example, compounds containing alpha-linolenic acid (ALA), docosahexaenoic acid (DHA) and/or eicosapentaenoic acid (EPA), e.g., oils derived from fish and microalgae, hill and/or flaxseed extract and compounds containing omega-6 fatty acids, for example, compounds containing gamma-linolenic acid (GLA), e.g., borage oil; saw palmetto oil-containing compounds; conjugated fatty acid-containing compounds, such as compounds containing conjugated linoleic acid (CLA); coenzyme Q-containing compounds, such as compounds containing coenzyme Q10

(i.e., CoQ10, ubidecarenone or ubiquinone), typically oxidized CoQ10; vitamin-containing compounds, such as compounds containing vitamin A, vitamin B (e.g., vitamin B complex, vitamin B6, vitamin B3, vitamin B5 or vitamin B12), vitamin C, vitamin D, particularly Vitamin D3, or vitamin E; phytochemical-containing compounds, such as compounds containing phytoalexins, for example, compounds containing resveratrol (3,5,4'-trihydroxystilbene); phytosterol-containing compounds, i.e., plant sterol-containing compounds; micronutrients, such as *Ginkgo biloba* and ginseng; and yerba mate. Additional exemplary non-polar active ingredients are described herein above. Any non-polar compound can be used in the provided emulsion and powder compositions.

Typically, the emulsion and powder compositions provided herein contain one or more compounds used to stabilize the non-polar compounds in the emulsion and powder compositions, such as a stabilizer or stabilizing system. The stabilizer or stabilizing system can aid in retaining one or more organoleptic properties of the compositions, for example the clarity, taste or odor, after addition of the non-polar compounds. The stabilizing system contains, for example, a carbonate and an acid, e.g., an ingestible acid. The emulsion and powder compositions provided herein containing non-polar compounds and a stabilizer or stabilizing system can retain one or more organoleptic properties of the emulsion or powder composition for a period of time after formulation. Generally, one or more of the organoleptic properties of the emulsion composition can be retained for at least or about at least 6 months, 7 months, 8 months, 9 months, 10 months, 11 months, or one year. In some embodiments, the emulsion compositions can retain one or more organoleptic properties for at least or about at least 1 week, at least or about at least 2 weeks, at least or about at least 1 month, at least or about at least 2 months, at least or about at least 3 months, at least or about at least 4 months, at least or about at least 5 months, at least or about at least 6 months, at least or about at least 7 months, at least or about at least 8 months, at least or about at least 9 months, at least or about at least 10 months, at least or about at least 11 months, at least or about at least one year, or more.

The emulsion and powder compositions provided herein are formulated so that in the presence of the non-polar compound one or more organoleptic properties is retained, such as taste and/or odor, as compared to the same emulsion or powder composition that does not contain non-polar compounds. In exemplary emulsion and powder compositions provided herein, the organoleptic property is the ability of the emulsion or powder composition to retain the same or about the same taste in the presence of one or more non-polar compounds. In other exemplary emulsion and powder compositions provided herein, it can be desired that the emulsion or powder composition emits the same or about the same odor in the presence of one or more non-polar compounds.

In the methods for formulating the emulsion and powder compositions provided herein, ingredients and amounts thereof are selected so that the resulting beverage compositions containing non-polar compounds retain one or more organoleptic properties as compared to the emulsion or powder composition in the absence of the non-polar ingredient. When formulating the emulsion or powder compositions, selected ingredients and starting amounts are used to make initial emulsion or powder compositions, which are evaluated and modified, if necessary.

After evaluation, the ingredients, and/or concentrations thereof, can be adjusted in order to retain one or more organoleptic properties in the final emulsion or powder composition containing non-polar compounds as compared to the same emulsion or powder composition that does not contain non-polar compounds. In some cases, following evaluation, it can be determined that additional ingredients (not included in the initial formulation) are needed for retaining one or more organoleptic properties of a particular emulsion or powder composition. This process can be repeated until a emulsion or powder composition that retains one or more organoleptic properties after formulation as compared to the same emulsion or powder composition that does not contain the non-polar compounds is generated.

1. Emulsion Compositions

Each of the provided emulsion compositions contains one or more non-polar compounds. Suitable non-polar compounds include, but are not limited to, the exemplary non-polar compounds described herein below. Typically, the non-polar compound is a non-polar active ingredient, for example, an oil-based active ingredient such as a polyunsaturated fatty acid (PUFA); a coenzyme Q; a vitamin; a phytochemical; or a micronutrient.

In the emulsion compositions provided herein, the total amount of non-polar compounds as a percentage (%) by weight of the emulsion compositions provided herein (wt %) can be, e.g., between from or between about from 1% to 20%, such as 1% to 15%, 1% to 10%, 1% to 8%, 1% to 6%, 1% to 5% %, 1% to 3%, 3% to 20%, 3% to 15%, 3% to 10%, 3% to 8%, 3% to 6%, 5% to 20%, 5% to 15%, 5% to 10%, 5% to 9%, 5% to 8%, 5% to 7%, 5% to 6%, by weight, of the composition. For example, the total amount of the one or more non-polar compounds in the emulsion compositions is between at or about 1% and at or about 15%; or between at or about 1% and at or about at or about 10%; or between at or about 5% and at or about 20%; or between at or about 5% and at or about 15%; or between at or about 5% and at or about 10%, inclusive, by weight, of the composition. For example, the total amount of the one or more non-polar compounds in the emulsion compositions is or is about 1%, 1.5%, 2%, 2.5%, 3%, 3.5%, 4%, 4.5%, 5%, 5.5%, 5.68%, 6%, 6.5%, 7%, 7.5%, 8%, 8.5%, 9%, 9.5%, 10%, 11%, 12%, 13%, 14%, 15%, 16%, 17%, 18%, 19% or 20%, by weight, of the composition. Exemplary non-polar compounds that can be included in the provided emulsion compositions are described in Section B.3.b. above.

The emulsion composition further contains a stabilizing system that includes a carbonate or bicarbonate and an acid. Typically the stabilizers in the stabilizing system are food-approved, i.e., edible, stabilizers, for example, stabilizers that are safe and/or approved for human consumption.

One or more carbonates or bicarbonates are included as stabilizers in the emulsion compositions provided herein. The total amount of carbonate or bicarbonate as a percentage (%), by weight, of the compositions provided herein (wt %) can be, e.g., between from or between from about 5% and 25%, such as between or between about 5% and 20%, 5% and 15%, 5% and 12%, 5% and 10%, 8% and 25%, 8% and 20%, 8% and 15%, 8% and 12%, 10% and 25%, 10% and 20% or 10% and 15%, by weight, of the emulsion composition. For example, the total amount of the one or more carbonates or bicarbonates in the emulsion compositions is between at or about 5% and at or about 20%; or between at or about 10% and at or about 25%; or between at or about 10% and at or about 20%; or between at or about 15% and at or about 25%; or between at or about 15% and at or about 20%, by weight of the composition. In some examples, a carbonate or bicarbonate is present in an amount of at or about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 21%, 22%, 23%, 24% or 25%, by weight, of the composition. Exemplary of suitable bicarbonates and carbonates include sodium bicarbonate, potassium bicarbonate, sodium carbonate, potassium carbonate, calcium carbonate, magnesium carbonate, zinc carbonate, and any combination thereof. Additional suitable bicarbonates and carbonates for use in the provided emulsion compositions will be apparent to those skilled in the art.

One or more acids are included as stabilizers in the emulsion compositions provided herein. The total amount of acid as a percentage (%), by weight, of the compositions provided herein (wt %) can be, e.g., between from or between from about 0.05% and 2%, such as between or between about 0.05% and at or about 1.5%; or between at or about 0.05% and at or about 1%; or between at or about 0.1% and at or about 2%; or between at or about 0.1% and at or about 1%; or between at or about 0.1% and at or about 0.5%, by weight of the composition. In some examples, a carbonate or bicarbonate is present in an amount of at or about 0.5%, 0.6%, 0.7%, 0.8%, 0.9%, 1%, 1.1%, 1.2%, 1.3%, 1.4%, 1.5%, 1.6%, 1.7%, 1.8%, 1.9% or 2%, by weight, of the composition. Exemplary of a suitable acids for use in the provided emulsion compositions are citric acid, phosphoric acid, adipic acid, ascorbic acid, lactic acid, malic acid, fumaric acid, gluconic acid, succinic acid, tartaric acid, maleic acid, and any combination thereof. In one example, the acid is citric acid.

The emulsion compositions also contain a polar solvent, for example, water. The total amount of polar solvent as a percentage (%), by weight, of the compositions provided herein (wt %) can be, e.g., up to at or about 60%, for example, 10%, 15%, 20%, 25%, 30%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60%, by weight of the composition. Polar solvents include, but are not limited to, water (e.g., filtered water), or propylene glycol, ethylene glycol, tetraethylene glycol, triethylene glycol, trimethylene glycol, methanol, ethanol, propanol, isopropanol, n-butanol and t-butanol, other alcohols, acids, including but not limited to acetic acid and formic acid, acetone, acetonitrile, butyl acetate, dimethylformamide, dimethyl sulfoxide, dioxane, ethyl acetate, tetrahydrofuran and hexamethylphosphoric triamide or other edible aqueous liquid, or combinations thereof.

The emulsion compositions can also contain an excipient, surfactant and a preservative. The total amount of excipient as a percentage (%), by weight, of the compositions provided herein (wt %) can be, e.g., between from or between from about 5% and 25%, such as between or between about 5% and 20%, 5% and 15%, 5% and 12%, 5% and 10%, 8% and 25%, 8% and 20%, 8% and 15%, 8% and 13%, 10% and 25%, 10% and 20% or 10% and 15%, by weight, of the emulsion composition. For example, the total amount of the one or more carbonates or bicarbonates in the emulsion compositions is between at or about 5% and at or about 25%; or between at or about 5% and at or about 15%; or between at or about 10% and at or about 20%, by weight of the composition. In some examples, an excipient is present in an amount of at or about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 21%, 22%, 23%, 24% or 25%, by weight, of the composition. Excipients include, but are not limited to, diluents (sometimes referred to as fillers) including, for example, microcrystalline cellulose, mannitol, lactose, calcium phosphate, dextrates, maltodextrin, starch, sucrose, and pregelatinized starch; disintegrants including, for example, crospovidone, sodium starch glycolate, croscarmellose sodium, starch, pregelatinized starch, and carboxymethylcellulose sodium; binders including, for example, starch, hydroxypropyl cellulose, hydroxypropylmethyl cellulose, pregelatinized starch, guar gum, alginic acid, acacia, carboxymethylcellulose sodium, and polyvinyl pyrrolidone; glidants including, for example, colloidal silicon dioxide and talc; and lubricants/antiadherents including, for example, magnesium stearate, calcium stearate, stearic acid, sodium stearyl fumarate, glyceryl monostearate, hydrogenated vegetable oil, and talc. In one particular example, the excipients are selected from any one or more of maltodextrin and gum acacia.

The total amount of surfactant as a percentage (%), by weight, of the compositions provided herein (wt %) can be, e.g., between or between about 5% and 15%, such as between or between about 5% and 12%, 5% and 10%, 7% and 15%, 7% and 12%, 7% and 10%, 8% and 12%, by weight, of the composition. In some example, the amount of surfactant in the present in the emulsion composition is or is about 5%, 6%, 7%, 8%, 9%, 10%, 11%, 12%, 13%, 14% or 15%, by weight, of the composition. Exemplary surfactants that can be included in the provided emulsion compositions are set forth in Section B.3.b.vi.a.ii. above.

The total amount of preservative as a percentage (%), by weight, of the compositions provided herein (wt %) can be, e.g., between or between about 0.01% and at or about 1%; or between at or about 0.01% and at or about 0.1%, by weight, of the composition. Preservatives include, but are not limited to, natural preservatives, for example, benzyl alcohol.

The emulsion compositions can be evaluated for their organoleptic properties as described in section B.2 above, including for organoleptic properties, such as taste and odor. The emulsion compositions can be spray dried as described herein below to form powder compositions.

2. Powder Compositions

Each of the provided powder compositions contains one or more non-polar compounds. Suitable non-polar compounds include, but are not limited to, the exemplary non-polar compounds described herein below. Typically, the non-polar compound is a non-polar active ingredient, for example, an oil-based active ingredient such as a polyunsaturated fatty acid (PUFA); a coenzyme Q; a vitamin; a phytochemical; or a micronutrient.

In the powder compositions provided herein, the total amount of non-polar compounds as a percentage (%) by weight of the powder compositions provided herein (wt %) can be, e.g., between from or between about from 10% to 50%, such as 10% to 40%, 10% and 30%, 10% and 25%, 10% and 20%, 10% and 15%, 12% and 50%, 12% and 40%, 12% and 30%, 12% and 25%, 12 and 20%, 12% and 15%, 15% and 20%, 15% and 30%, 20% and 30%, 20% and 40%, by weight, of the composition. For example, the total amount of the one or more non-polar compounds in the powder compositions is between at or about 10% and at or about 40%; or between at or about 10% and at or about at or about 30%; or between at or about 10% and at or about 35%; or between at or about 15% and at or about 40%; or between at or at least about 15% and at or about 35%; or between at or about 15% and at or about 30%; or between at or about 30% and at or about 40%, inclusive, by weight, of the composition. For example, the total amount of the one or more non-polar compounds in the powder compositions is or is about 10%, 11%, 12%, 13%, 14%, 15%, 16%, 17%, 18%, 19%, 20%, 25%, 30%, 35%, 40%, 45% or 50%, by weight, of the composition. Exemplary non-polar compounds that can be included in the provided powder compositions are described in Section B.3.b. above.

The powder composition further contains a stabilizing system that includes a carbonate or bicarbonate and an acid. Typically the stabilizers in the stabilizing system are food-approved, i.e., edible, stabilizers, for example, stabilizers that are safe and/or approved for human consumption.

One or more carbonates or bicarbonates are included as stabilizers in the powder compositions provided herein. The total amount of carbonate or bicarbonate as a percentage (%), by weight, of the compositions provided herein (wt %) can be, e.g., between from or between from about 10% and 50%, such as between or between about 5% and 45%, 5% and 40%, 5% and 35%, 5% and 30%, 5% and 25%, 5% and 20%, 5% and 15%, 5% and 10%, 10% and 45%, 10% and 40%, 10% and 35%, 10% and 30%, 10% and 25%, 10% and 20% or 10% and 15%, 15% and 45%, 15% and 40%, 15% and 35%, 15% and 30%, 20% and 45%, 20% and 40%, 20% and 35%, 30% and 45%, 30% and 40%, 35% and 40%, by weight, of the powder composition. For example, the total amount of the one or more carbonates or bicarbonates in the powder compositions is between at or about 10% and at or about 40%; or between at or about 20% and at or about 50%; or between at or about 20% and at or about 40%; or between at or about 30% and at or about 50%; or between at or about 30% and at or about 40%, by weight of the composition. In some examples, a carbonate or bicarbonate is present in an amount of at or about 5%, 10%, 15%, 20%, 25%, 26%, 27%, 28%, 29%, 30%, 31%, 32%, 33%, 34%, 35%, 36%, 37%, 38%, 39%, 40%, 41%, 42%, 43%, 44%, 45% or 50%, by weight, of the composition. Exemplary of suitable bicarbonates and carbonates include sodium bicarbonate, potassium bicarbonate, sodium carbonate, potassium carbonate, calcium carbonate, magnesium carbonate, zinc carbonate, and any combination thereof. Additional suitable bicarbonates and carbonates for use in the provided powder compositions will be apparent to those skilled in the art.

One or more acids are included as stabilizers in the powder compositions provided herein. The total amount of acid as a percentage (%), by weight, of the compositions provided herein (wt %) can be, e.g., between from or between from about 0.1% and 2%, such as between about 0.1% and at or about 1.5%, 0.1% and at or about 1%, or between at or about 0.1% and at or about 0.5%, or between at or about 0.5% and at or about 2%, or between at or about 0.5% and at or about 1%, or between at or about 1% and at or about 2%, by weight of the composition. In some examples, a carbonate or bicarbonate is present in an amount of at or about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9% or 2%, by weight, of the composition. Exemplary of a suitable acids for use in the provided powder compositions are edible or ingestible acids, including but not limited to, citric acid, phosphoric acid, adipic acid, ascorbic acid, lactic acid, malic acid, fumaric acid, gluconic acid, succinic acid, tartaric acid, maleic acid, and any combination thereof. In one example, the acid is citric acid.

The powder compositions can also contain an excipient, surfactant and a preservative. The total amount of excipient as a percentage (%), by weight, of the compositions provided herein (wt %) can be, e.g., between from or between from about 15% and 40%, such as between or between about 15% and 35%, 15% and 30%, 15% and 25%, 20% and 40%, 20% and 35%, 20% and 30%, 20% and 25%, 25% and 40%, 25% and 35%, 25% and 30%, 30% and 40% or 35% and 40%, by weight, of the powder composition. For example, the total amount of the excipients in the powder compositions is between at or about 15% and at or about 40%; or between at or about 20% and at or about 35%; or between at or about 25% and at or about 35%, by weight of the composition. In some examples, an excipient is present in an amount of at or about 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40%, by weight, of the composition. Excipients include, but are not limited to, diluents (sometimes referred to as fillers) including, for example, microcrystalline cellulose, mannitol, lactose, calcium phosphate, dextrates, maltodextrin, starch, sucrose, and pregelatinized starch; disintegrants including, for example, crospovidone, sodium starch glycolate, croscarmellose sodium, starch, pregelatinized starch, and carboxymethylcellulose sodium; binders including, for example, starch, hydroxypropyl cellulose, hydroxypropylmethyl cellulose, pregelatinized starch, guar gum, alginic acid, acacia, carboxymethylcellulose sodium, and polyvinyl pyrrolidone; glidants including, for example, colloidal silicon dioxide and talc; and lubricants/antiadherents including, for example, magnesium stearate, calcium stearate, stearic acid, sodium stearyl fumarate, glyceryl monostearate, hydrogenated vegetable oil, and talc. In one particular example, the excipients are selected from any one or more of maltodextrin and gum acacia.

The total amount of surfactant as a percentage (%), by weight, of the compositions provided herein (wt %) can be, e.g., between or between about 10% and 30%, such as between or between about 10% and 25%, 10% and 20%, 10% and 15%, 15% and 30%, 15% and 25%, 15% and 20%, 20% and 30% or 20% and 25%, by weight, of the composition. In some example, the amount of surfactant in the present in the powder composition is or is about 10%, 11%, 12%, 13%, 14%, 15%, 16%, 17%, 18%, 19%, 20%, 21%, 22%, 23%, 24%, 25%, 26%, 27%, 28%, 29% or 30%, by weight, of the composition. Exemplary surfactants that can be included in the provided powder compositions are set forth in Section B.3.vi.a.ii. above.

The total amount of preservative as a percentage (%), by weight, of the compositions provided herein (wt %) can be, e.g., between or between about 0.01% and at or about 1%; or between at or about 0.01% and at or about 0.5%; or between at or about 0.01% and at or about 0.1%, by weight, of the composition. Preservatives include, but are not limited to, natural preservatives, for example, benzyl alcohol.

The powder compositions can be evaluated for their organoleptic properties as described in section B.2 above, including for organoleptic properties, such as taste and odor.

D. METHODS FOR STABILIZING OR PRESERVING BEVERAGES

Provided herein are methods for stabilizing a beverage containing one or more non-polar compounds, including methods for stabilizing a beverage composition containing a polyunsaturated fatty acid, by adding a bicarbonate, carbonate or carbon dioxide to the beverage. In some examples of the provided methods, the bicarbonate, carbonate or carbon dioxide displaces oxygen from the beverage thus preventing the oxidation of the one or more non-polar compounds resulting in the preservation of one or more organoleptic properties of the beverage. In some examples of the provided methods, the bicarbonate, carbonate or carbon dioxide are added to a beverage containing a beverage base and one or more non polar compounds. In some examples of the methods, the bicarbonate, carbonate or carbon dioxide are added directly to any beverage containing one or more non-polar compounds. Also provided herein are methods for preventing the oxidation of a polyunsaturated fatty acid in a beverage containing one or a mixture of polyunsaturated fatty acids by adding a bicarbonate, carbonate or carbon dioxide to the beverage resulting in the preservation of one or more organoleptic properties of the beverage. Also provided herein are methods for preserving the organoleptic properties of a beverage containing one or more non-polar compounds by adding a bicarbonate, carbonate or carbon dioxide to the beverage resulting in the preservation of one or more organoleptic properties of the beverage. Also provided herein is a method for displacing oxygen in a beverage by adding a bicarbonate, carbonate or carbon dioxide to the beverage, whereby the bicarbonate, carbonate or carbon dioxide displaces the oxygen in the beverage and results in the preservation of one or more organoleptic properties of the beverage. Also provided herein is a method for improving the organoleptic properties of a beverage that contains fatty acids by replacing the oxygen that is dissolved in the beverage such that the organoleptic properties of the beverage are retained for at least a month, 2 months, 3, months, 4 months, five months, six months and longer when stored at room temperature.

A beverage stabilized by the methods provided herein retains one or more organoleptic properties, such as taste, odor, and/or appearance, e.g., clarity, in the presence of the one or more non-polar compounds as compared to the same beverage that does not contain the one or more non-polar compounds. These organoleptic properties can be evaluated using a number of methods, such as empirical methods, quantitative methods, or qualitative methods, including those described in Section B.2.a. above. The organoleptic properties of the beverage compositions provided herein can be evaluated, for example, by measuring the stability, or shelf life, of the beverage composition.

The beverages containing non-polar compounds produced by the methods provided herein are able to retain one or more organoleptic properties as compared to the same beverage that does not contain the non-polar compounds, for example, the provided beverages are able to remain free from one or more changes over a period of time, for example, 1, 2, 3, 4, 5, 6, 7, or more days, 1, 2, 3, 4, 5, 6, 8, 12, 18, 24, 36, or more weeks, 1, 2, 3, 4, 5, 6, 8, 12, 18, 24, 36, or more months, or 1, 2, 3, 4, or more years. In one example, the beverages exhibit the same degree of clarity over a period of time as beverages that do not contain the non-polar compound(s). In another example, the beverages containing non-polar compounds retain one or more organoleptic properties over a period of time, when kept at a particular temperature, as compared to beverages that do not contain non-polar compounds. In one example, the beverages containing non-polar compounds retain the organoleptic properties at room temperature, for example, at 25° C. or at about 25° C. In another example, the beverages retain the organoleptic properties at an elevated temperature, for example, at 40° C. or at about 40° C. Organoleptic properties that can be retained in the beverages made by the provided methods, including taste and odor, and appearance, are discussed in section B.2.a.i and B.2.a.ii. above.

Exemplary bicarbonate or carbonates include, for example, any edible or food-approved bicarbonate or carbonate. Examples of suitable bicarbonates and carbonates for use in the provded methods include sodium bicarbonate, potassium bicarbonate, sodium carbonate, potassium carbonate, calcium carbonate, magnesium carbonate, zinc carbonate, and any combination thereof. In some examples, the carbonate or bicarbonate is a carbonated beverage, such as a soda, flavored soda, carbonated water or carbonated juice. Alternatively, the beverage can be carbonated by the addition of carbon dioxide. Additional suitable bicarbonates and carbonates for use in the provided methods will be apparent to those skilled in the art.

Typically, the amount of bicarbonate or carbonate used in the provided methods is between or between about 0.01% and 7%, by weight, of the beverage, for example, between at or about 0.01% and at or about 6%, between at or about 0.01% and at or about 5%, between at or about 0.01% and at or about 4%, between at or about 0.01% and at or about 3%, between at or about 0.01% and at or about 2 between at or about 0.01% and at or about 1%, between at or about 0.1% and at or about 7%, between at or about 0.1% and at or about 6%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 7%, between at or about 0.5% and at or about 6%, between at or about 0.5% and at or about 5%, between at or about 0.5% and at or about 4%; between at or about 0.5% and at or about 3%, between at or about 0.5% and at or about 2%, between at or about 0.5% and at or about 1%, between at or about 1% and at or about 7%, between at or about 1% and at or about 6%, between at or about 1% and at or about 5%, between at or about 1% and at or about 4%, between at or about 1% and at or about 3%, between at or about 1% and at or about 2%, between at or about 2% and at or about 7%, between at or about 2% and at or about 5%, between at or about 2% and at or about 4%, between at or about 3% and at or about 7%, between at or about 3% and at or about 5%, between at or about 4% and at or about 7%, between at or about 6% and at or about 7%, between at or about 5% and at or about 7%, or between at or about 5% and at or about 6%, by weight, of the beverage. In some examples, the amount of bicarbonate or carbonate used in the provided methods is less than 7% or about 7%, typically less than 5% or about 5%, for example at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.2%, 6.5%, 6.7%, or 7%, by weight, of the beverage.

In some examples, the methods further include addition of an acid and/or antioxidant. The acid can be, for example, an edible, ingestible or food-approved acid. Exemplary of suitable acids for use in the provided beverage compositions are citric acid, phosphoric acid, adipic acid, ascorbic acid, lactic acid, malic acid, fumaric acid, gluconic acid, succinic acid, tartaric acid, maleic acid, and any combination thereof. In one example, the acid is citric acid.

Typically, the amount of acid used in the provided methods is between or between about 0.01% and 5%, by weight, of the composition, for example, between at or about 0.01% and at or about 4%, between at or about 0.01% and at or about 3%, between at or about 0.01% and at or about 2 between at or about 0.01% and at or about 1%, between at or about 0.1% and at or about 5%, between at or about 0.1% and at or about 4%, between at or about 0.1% and at or about 3%, between at or about 0.1% and at or about 2%, between at or about 0.1% and at or about 1%, between at or about 0.5% and at or about 5%, between at or about 0.5% and at or about 4%, between at or about 0.5% and at or about 3%, between at or about 0.5% and at or about 2%, between at or about 0.5% and at or about 1%, between at or about 1% and at or about 5%, between at or about 1% and at or about 4%, between at or about 1% and at or about 3%, between at or about 1% and at or about 2%, between at or about 2% and at or about 5%, between at or about 2% and at or about 4%, between at or about 2% and at or about 3%, between at or about 3% and at or about 5%, between at or about 3% and at or about 4%, or between at or about 4% and at or about 5%, by weight, of the beverage. In some examples, the amount of acid used in the provided methods is less than 5% or about 5%, typically less than 4% or about 4%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9% or 5%, by weight, of the beverage.

In some examples, the methods further include addition of an Antioxidants, for example, include molecules that are capable of inhibiting the oxidation of other molecules. Antioxidants may include molecules that scavenge free radicals. Suitable antioxidants include those that are used as ingredients in dietary supplements. The antioxidant can be a natural antioxidant or a synthetic antioxidant. Examples of antioxidants include, but are not limited to hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, vitamins and vitamin cofactors, such as vitamin A, vitamin C, vitamin E, vitamin E phosphate and ubiquinone (ubidecarenone, coenzyme Q, coenzyme Q10), ascorbic acid, citric acid, rosemary oil, minerals, such as mineral selenium and manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gulamine, oxalic acid, tocopherol-derived compounds, di-alpha-tocopheryl phosphate, tocotrienols, butylated hydroxyanisole, butylated hydroxyoluene, ethylenediaminetetraacetic acid, tert-butylhydroquinone, acetic acid, pectin, tocotrienol, tocopherol, coenzyme Q10 (CoQ10), zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms theaflavin and its gallate forms, thearubigins, isotlavone phytoestrogens, genistein, daidzein, glycitein, anythocyanins, cyaniding, delphinidin, malvidin, pelargonidin and peonidin. In one example, the antioxidant is vitamin C. In another example, the antioxidant is a coenzyme Q-containing compounds, such as ubiquinone (ubidecarenone, coenzyme Q, coenzyme Q10).

Typically, the amount of antioxidant used in the provided methods is between at or about 0.01% and at or about 3%, for example, between at or about 0.01% and at or about 2.5%, between at or about 0.01% and at or about 2%, between at or about 0.01% and at or about 1.5%, between at or about 0.01% and at or about 1%, between at or about 0.01% and at or about 0.5%, between at or about 0.05% and at or about 3%, between at or about 0.05% and at or about 2.5%, between at or about 0.05% and at or about 2%, between at or about 0.05% and at or about 1.5%, between at or about 0.05% and at or about 1%, between at or about 0.05% and at or about 0.5%, between at or about 0.1% and at or about 3%, between at or about 0.1% and at or about 2.5%, between at or about 0.1% and at or about 2%, between at or about 0.1% and at or about 1.5%, between at or about 0.1% and at or about 1%, between at or about 0.1% and at or about 0.5%, between at or about 0.5% and at or about 3%, between at or about 0.5% and at or about 2.5%, between at or about 0.5% and at or about 2%, between at or about 0.5% and at or about 1.5%, between at or about 0.5% and at or about 1%, between at or about 1% and at or about 3%, between at or about 1% and at or about 2.5%, between at or about 1% and at or about 2%, between at or about 1% and at or about 1.5%, between at or about 1.5% and at or about 3%, between at or about 1.5% and at or about 2.5%, between at or about 1.5% and at or about 2%, between at or about 2% and at or about 3%, between at or about 2% and at or about 2.5%, between at or about 2.5% and at or about 3%, by weight, of the beverage. In some examples, the amount of antioxidant used in the provded methods is less than 5% or about 5%, typically less than 3% or about 2%, for example, at or about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0%, by weight, of the beverage.

Exemplary of non-polar compounds are any of those set forth in Section B.3.b. above. The non-polar compounds can be added individually to the beverage, or alternatively, the non-polar compounds can be added as part of a concentrate containing the non-polar compounds, such as any concentrate described in Section B.3.b.vi above. The beverage can contain a beverage base, such as any described in Section 3.c. above, and additionally can include any sweetener, pH adjuster or antifoaming agent provided herein.

E. METHODS FOR GENERATING COMPOSITIONS

Also provided are methods for making the beverage compositions, including single-serving shots and multi-serving beverages. Also provided are methods for making the powder and emulsion compositions. General equipment and steps of the methods are detailed below. In one example, the general methods for making the compositions are performed using a bench-top manufacturing process, which is used for making relatively smaller-sized batches of the compositions. In another example, the general methods for making the compositions are performed using a scaled-up manufacturing processes, which is used for making relatively larger batches of the compositions. The bench-top process can be scaled up to the scaled-up process. Any compositions made using the bench-top method can be made using the scaled-up process, by scaling up the method.

1. Equipment for Making the Concentrates

Various equipment, for example, vessels for mixing the compositions, for example, tanks; scales; mixers, including standard mixers and homogenizers; heating and cooling apparatuses, including water-jacketed tanks, hot plates, water baths and chillers (coolers), including recirculating coolers; transfer apparatuses, for example, transfer means, for example, pumps, hoses, sanitary fittings; ball valves;

purifiers, for example, filters, for example, carbon filters, ion exchange equipment, reverse osmosis equipment, end-point filters and end product filters; evaluation means, for example, pH and temperature meters; and other equipment, is used in various steps of the provided methods for making the compositions. The choice of equipment depends on a plurality of factors, including batch size and manufacturing process.

a. Scales

One or more scales are typically used to measure the ingredients before adding them to the appropriate vessel. Alternatively, the ingredients can be weighed in the vessel, for example, in a tank on top of a scale.

Any of a plurality of well-known, commercially sold scales can be used to weigh the ingredients. Choice of scale(s) can depend on a number of factors, including the mass of the final concentrate being made and the ingredient being weighed. In one example, multiple scales are used to weigh the various ingredients of the concentrate. In general, relatively larger capacity (weight) scale(s) are used in making larger batches of concentrate while relatively smaller capacity scale(s) are used in making smaller batches.

Exemplary of the scales used with the provided methods to weigh the ingredients are a Toledo Scale (Model GD13x/USA), a Sartorius Basic Analytical Scale (Model BA110S) which is a basic series analytical scale with a 110 g capacity and a resolution of 0.1 mg; and an OHAUS Scale (Model CS2000), which is a compact portable digital scale having a 2000 g capacity and a resolution of 1 g.

b. Purifiers, Including Filters

Purifiers, typically more than one purifier, for example, filters, are used in the provided methods to remove impurities in the ingredients prior to their addition to the composition and/or from the final composition and/or an intermediate phase of the composition. For example, the water used in the compositions typically is purified water. In one example, one or more purifiers, for example, carbon filters, ion exchange purifiers, reverse osmosis purifiers, and/or end point filters are used to filter water, for example, city water, prior to its addition to the water phase, for example, to remove impurities, for example, sediment, from the water.

Exemplary of the purifiers that can be used with the provided methods are filters, for example, 100 micron filters and carbon filters, which are filters that use activated carbon to remove impurities by chemical adsorption. Carbon filtering typically is used for water purification and is particularly effective at filtering out chlorine, sediment, volatile organic compounds and other impurities. Typically, the particles removed by carbon filters are between about 0.5 microns and about 50 microns. Other filters are well known and can be used with the provided methods.

Also exemplary of the purifiers that can be used in the provided methods are reverse osmosis purifiers, which use mechanical pressure to purify liquids, for example, water. In one example, the pressure forces the water through a semi-permeable membrane to remove impurities.

Also exemplary of the purifiers that can be used in the provided methods are ion exchange purifiers, for example, an ion exchange purifier using a resin bed, for example, a zeolite resin bed, to replace salts, e.g., cations, for example, magnesium and calcium, with other cations, for example, sodium and potassium cations. Such purifiers can be purchased, for example, from Aquapure Filters, Clarkston, Mich.

In another example, an end product filter (e.g., a 100 micron FSI filter, Product Number BPEM 100-5GP). This filter is used to filter any impurities out of the final product (e.g., the final beverage composition). Other filters are known and can be used with the provided methods.

c. Vessels for Mixing the Ingredients

One or more vessels, for example, tanks, for example, water-jacketed tanks; pots; and/or beakers, for example, Pyrex® beakers, are used in the provided methods to contain the ingredient(s) of the compositions, for example, during mixing and/or heating or cooling. Typically, one vessel is used for mixing and heating the ingredients. In one example, an additional vessel, for example, a holding and/or packaging tank, is used for holding and/or packaging the beverage composition and/or for addition/mixing of additional ingredients to the composition.

A number of vessels are available for mixing ingredients. Typically, the vessels are cleaned, for example, rinsed, soaped and/or sanitized according to known procedures, prior to use and between uses.

In one example, typically used with the bench-top process, the vessel is a container, for example, a bench-top container, for example, flasks, beakers, for example, Pyrex® beakers, vials, measuring containers, bottles and/or other bench-top containers.

In another example, typically used with the scaled-up manufacturing process, the vessels are tanks, for example, composition tanks and holding/packaging tanks. Typically, the tanks are equipped with one or more mixers, for example, a standard mixer and/or homogenizer, which are used to mix the ingredients added to the tank. In one example, the tank further is equipped with a heating and/or cooling device. For example, the tank can be a water jacketed tank. The temperature of the water-jacketed tank is controlled through the water-jacket, for example, to heat the contents, for example, while mixing.

Exemplary of the tanks that can be used with the provided methods are water-jacketed tanks, for example, the Overly 550 Gallon water jacketed tank (Model 10576501G), which has a 550 gallon capacity, the Schweitzers 450 gallon tank (Model #5214-C), which has a 450 gallon tank and the Royal 190 gallon water jacketed tank (Model 9977-5), which has a 190 gallon capacity. Other tanks are well known and can be used with the provided methods for mixing the beverage compositions.

d. Mixers

Mixers are used in the provided methods to blend, mix and/or emulsify the beverage compositions and/or various ingredients of the compositions. In one example, the mixers are used to keep the ingredients and/or mixture circulating to maintain temperature, viscosity and/or other parameters of the mixture. Exemplary of the mixers that can be used in the provided methods are standard mixers, which can be used, for example, to mix the ingredients to maintain a homogeneous mixture while heating. Exemplary of the standard mixers is a LIGHTNIN® mixer (LIGHTNIN, Rochester, N.Y.), for example, Model Numbers XJC 117 and ND-2. In one example, the LIGHTNIN® mixers are fixed-mount, gear drive high-flow mixers, for use with closed tanks. Another example of a standard mixer is a mixer sold by IKA®, for example, overhead IKA® mixers, for example, model Nos. RW-14 Basic and RE-16S, which are laboratory stirrers and can be used to mix ingredients, for example, to generate the oil and water phases. In one example, the mixer(s) are attached to the vessels, for example, the tanks, for example, mounted or clamped onto the tanks, for example, the top of the tanks. In another example, the mixers are placed in the vessels for mixing.

Also exemplary of the mixers used with the provided methods are homogenizers (also called shears), which typically are used to form the emulsion by emulsifying the oil and water phases after they are combined. The homogenizers typically provide high shear dispersion of solids and emulsification of immiscible liquids at high shear rates. Exemplary of the homogenizers that can be used in the provided methods are high-shear homogenizers, for example, reversible homogenizers sold by Arde Barinco, Inc., Norwood, N.J., for example, Model CJ-50, which is a 3600 rpm mixer having a 6 inch rotor diameter, a tip speed of 5575 ft/minute and an emersion depth of 33 inches and has six separate openings at the bottom and top, which concentrates the liquid into six chambers, reducing the surface volume and creating a shear effect; and Model CJ-4E, which is a 10,000 rpm mixer with fan-cooled motor, optimized for 1 to 5 gallon batch sizes, having a 1.875 inch rotor diameter, a tip speed of 4920 rpm and an immersion depth of 16 inches. Other homogenizers, for example, other reversible homogenizers sold by Arde Barinco Inc., can be used with the provided methods.

In one example, the homogenizer is attached to the top of the vessel, for example, the tank, for example, by clamps or by channel locks and an electrical hoist. In another example, the homogenizer is placed in the vessel. The Arde Barinco reversible homogenizers contain axial flow impellers, which create two distinct mixing actions, depending on direction. Downward "vortex flow" pulls solids from top and bottom of the mixture, while upward "umbrella flow" controls mixing at the highest shear and recirculation rates without splashing or incorporation of air. The reversible homogenizers typically are equipped with an adjustable baffle plate, which can be adjusted to control the type of mixing, for example at different times during emulsification.

A number of additional mixers are well known and can be used with the provided methods. Exemplary of the mixers that can be used with the provided methods are shears, inline mixers/mixing, Ribbon, Plow/Paddle Blenders Forberg Mixers, Conveyors, Bag Dumps & Compactors, V-Blenders, Blade Mixers, Double Cone Mixers, Continuous Mixers, Speedflow Mixers, Batch Mixers, Double Ribbon Blenders, Paddle and Ribbon Mixers with Choppers, Plow Blenders/Turbulent Mixers, Fluidizing Forberg-Type Mixers, Air Mixers, Active Mixers, Passive Mixers, Top Entry Mixers, Side Entry Mixers, Static Mixers, Fixed Entry Mixers, Portable Mixers—direct and gear drive, Sanitary Mixers, Drum Mixers, Bulk Container (IBC) Mixers, Lab Stirrers, Variable Speed Mixers, dough mixer, vertical mixer, spiral mixer, twin arm mixer, fork mixer, double spiral mixer, all agitators, agitator mixers, Banbury Mixers, Rubber Mixers, Blondheim Mixers, Churn Mixers, Conical Mixers, Continuous Mixers, Disperser Mixers, Pan Mixers, Emulsifier Mixers, Hobart Mixers, Liquifier Mixers, Littleford Mixers, Meat Mixers, Plow Mixers, Mixmuller Mixers, Nauta Mixers, Oakes Mixers, Planetary Mixers, Pony Mixers, PUG Mixers, Ribbon Mixers, Ross Mixers, Rotary Mixers, Sigma Mixers, Single Arm Mixers, Tote Bin Mixers, Tumble Mixers, Vacuum Mixers, Turbolizer Mixers, Twin Shell Mixers, V-Type Mixers, Zig-Zag Mixers side arm mixers, hand-held mixers, stir rods, stir bars, magnetic mixers and overhead mixers, for example, mechanical and/or electric overhead mixers.

e. Heating Apparatuses

One or more, typically more than one, heating apparatuses are used in the provided methods to control the temperature of the ingredients, typically while mixing.

In one example, the heating apparatuses are water-jackets. In this example, the vessels used to mix the ingredients are water jacketed tanks. The water jacket can be controlled, for example, using a control panel, to adjust the temperature of the contents of the vessel.

Alternatively, other heating apparatuses can be used to heat the compositions. Exemplary of heating apparatuses that can be used with the provided methods are immersible and/or submersible heaters, for example, 12 KW or 13 KW sanitary heaters, which are food-grade heaters that are immersed into the tanks while mixing, typically for applications requiring high heat, for example, temperatures greater than 60° C. or about 60° C., or greater than 80° C. or about 80° C. Also exemplary of heating apparatuses are stoves, for example, propane stoves. Also exemplary of the heating apparatuses are hot plates, for example, the Thermolyne hot plate, model number 846925 and model number SP46615. Typically, the heater is capable of heating the mixture to between 45° C. or about 45° C. and 85° C. or about 85° C., for example, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84 or 85° C. Typically, the heater is capable of heating the mixture to 60° C. or about 60° C., for example, providing low heat.

f. Cooling Apparatuses

One or more cooling apparatuses can be used with the provided methods, for example, to cool the ingredients during mixing. Exemplary of the cooling apparatuses are chillers, for example, recirculating coolers, which can be attached to the vessel, for example, remotely or by a tank mounted in the cooler, to recirculate fluid from the tank, through the chiller and back to the tank, in order to rapidly cool and maintain the temperature of the mixture during mixing. Exemplary of an open-loop chiller that can be attached to the tank and used with the provided methods are chillers sold by Turmoil, West Swanzey, N.H., for example, open or closed-loop coolers, for example, model No. OC-1000 RO. Other cooling apparatuses are well known and can be used with the provided methods.

Also exemplary of the cooling apparatuses are water baths and ice baths, for example, water baths and/or ice baths in which the vessel(s) are placed, for example, during mixing.

Typically, the cooling apparatus can be used to cool the liquid to between 25° C. or about 25° C. and 45° C. or about 45° C., for example, 25, 26, 27, 28, 29, 30, 31, 32, 33, 34, 35, 36, 37, 38, 39, 40, 41, 42, 43, 44 or 45° C., typically between 25° C. and 43° C., typically between 25° C. and 30° C., for example, 26.5° C. Typically, the cooling is rapid cooling, for example, cooling to between 25° C. or about 25° C. and 45° C. or about 45° C., for example, between 25° C. and 30° C., for example, 26.5° C., in between 15 minutes or about 15 minutes and 2 hours or about 2 hours, typically, between 30 minutes or about 30 minutes and 60 minutes or about 60 minutes, for example, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 minutes.

g. Transfer Means

Transfer means are used with the provided methods to transfer liquid from one vessel to another vessel, for example, to transfer the contents of one or more vessels to one or more other vessels, for example, to transfer the composition to bottling containers. Exemplary of the equipment used for the transfer means are transfer pumps and associated accessories, for example, ball valves, sanitary fittings (for example, sanitary fittings sold by Granger, Inc., Lake Forrest, Ill.) and transfer hoses (for example, hoses sold by Sani-Tech West, Oxnard, Calif.), for example, food grade hoses attached to the transfer pumps. Exemplary of the transfer pumps that can be used with the provided methods is the Teel Pump (Model 2P377B), Grainger, Inc. Lake Forest, Ill., a self-priming pump having a power rating of 2 HP, 60 Hz voltage 208-230/460 AC, speed of 3450 rpm. Other pumps, for example, other self-priming pumps from Grainger, Inc., can be used as part of the transfer means in the provided methods. Alternatively, transfer means can include means for manually transferring the liquid to another vessel, for example, by pouring, pipetting and/or other well-known methods of manually transferring liquids. Typically, the beverage compositions are hot filled into a packaging container, such as an 2, 4, 6, 8, 12, 16, or ounce bottle.

h. Evaluation Equipment

Evaluation equipment is used to evaluate one or more properties of the compositions, for example, the final compositions. For example, evaluation equipment can be used to measure one or more parameters of the compositions, for example, the temperature and the pH of the liquids. Exemplary of the evaluation equipment are pH meters and temperature meters. Exemplary of the pH/temperature meters is the pH and temperature meter sold by Hanna Instruments, (model number HI 8314), which can be used to measure the temperature and the pH of the mixture(s). Also exemplary of temperature meters are temperature probes, for example, digital and/or water-proof temperature probes, for example, temperature probes sold by Cooper-Atkins, Middlefield, Conn., for example, the digital waterproof temperature probe (Model # DPP400W) from Cooper-Atkins. Other evaluation equipment for evaluating liquids and/or beverage compositions is well known and can be used with the provided methods.

2. General Methods for Making the Beverage Compositions

In general, the provided methods for making the beverage compositions include steps for combining the beverage base ingredients and other ingredients to form the beverage compositions. In general, the provided methods for making the powder and emulsion compositions include steps for combining the ingredients to form the beverage compositions. In some examples, the methods include additional steps, such as evaluation, addition of further ingredients, packaging and filtering. The provided methods can be performed using a bench-top manufacturing process (typically for small batch sizes). Alternatively, the methods can be performed using a scaled-up manufacturing process (typically for larger batch sizes). Each of the provided compositions can be made using either a scaled-up process or a bench-top process. In one example, after the composition first is made using the bench-top process and the method is scaled up to make larger quantities of the composition using the scaled-up process. When formulating the compositions according to the provided methods, the initial composition typically is made by a bench-top method. In one example of the formulation methods, a selected formulation then is made using a scaled-up process. Any of the compositions provided herein can be made with the provided methods, using either manufacturing process. Any method described herein, where the bench-top method is used, can be scaled-up for production of the compositions using the scaled-up process.

Generally, to make a beverage composition, water or carbonated beverage, juice (when included), non-polar active ingredients and Vitamin C (when included) are added to a Pyrex beaker and mixed until dissolved using an standard mixer. Antifoaming agent and carbonate or bicarbonate are added and the solution is mixed and heated to 80° C. Sweeteners and flavors are added while mixing and maintaining a temperature of 80° C. Finally, citric acid, phosphoric acid and antifoaming agent are added together while mixing, and the solution is hot filled into a container and sealed. The container is cooled to 30° C. and stored at room temperature. The final pH of each flavored water is approximately 3.80.

3. Emulsions and Powder Forms

The compositions also can be provided in powder form, i.e., powder that is made by converting the provided emulsion into a powder, using one of several well-known methods (e.g., spray-drying and/or milling). Generally, to make an emulsion composition, a concentrate was made by adding a surfactant, preservative and non-polar compound to a Pyrex beaker and mixing while heating followed by homogenization. To make a water phase, water, maltodextrin, acid and bicarbonate were added to a water phase vessel and heated while stirring. The concentrate is then added into the water phase and homogenized to form the emulsion. Generally, to make an powder composition the emulsion is spray dried.

In one example, the powder form is a free-flowing powder. Free-flowing powders can be obtained using techniques well known in the art, such as, but not limited to, spray drying, freeze drying or absorption plating. In one example, in order to achieve a free flowing powder, the protein derivative is formulated with an excipient such as lactose or starch. For example, the formulation can be a spray dried lactose formulation (see e.g., U.S. Pat. No. 4,916,163).

The methods for forming the powders include spray drying. Spray drying processes and spray drying equipment are described generally in Perry's Chemical Engineers' Handbook, pages 20-54 to 20-57 (Sixth Edition 1984). More details on spray drying processes and equipment are reviewed by Marshall, "Atomization and Spray-Drying," 50 Chem. Eng. Prog. Monogr. Series 2 (1954), and Masters, Spray Drying Handbook (Fourth Edition 1985). Methods for spray drying are well known (see, e.g. U.S. Pat. Nos. 5,430,021 and 6,534,085 and U.S. Application Publication No. US 2007/0184117). In general, spray drying is used to dry a heated liquid by passing it through hot gas. One or more spray nozzles is used to atomize the liquid in a cooling tower or chamber. As the material is atomized (sprayed), the surface tension causes a uniform spherical particle to form, which is passed through the cooling chamber and hardens into a solid intact sphere. The spray dried particles can be between at or about 0.5 microns and at or about 100 microns, and typically are less than at or about 10 microns, typically less than at or about 5 microns, and typically less than at or about, or at or about, 1 micron.

Provided are methods for spray drying the emulsion compositions to form powder compositions. In the spray drying methods, the emulsion compositions can be heated, e.g. to a temperature between at or about 100 and at or about 150° F., typically between 110° F. and 140° F., e.g. at or about 110, 115, 120, 125, 130, 135 or 140° F. The compositions can be mixed while heating, such as with any of the mixers described herein, for example, homogenizers (e.g. reversible homogenizers and piston-driven homogenization). The homogenized mixture then is subject to spray drying using a spray dryer.

Exemplary of the spray dryers are cyclone spray dryers. During spray drying with cyclone spray dryers, the homogenized mixture is pumped into an atomizing device where it is broken into small droplets. Upon contact with a stream of hot air, the moisture is removed very rapidly from the droplets while still suspended in the drying air. The dry powder is separated from the moist air in cyclones by centrifugal action. The centrifugal action is caused by the great increase in air speed when the mixture of particles and air enters the cyclone system. The dense powder particles are forced toward the cyclone walls while the lighter, moist air is directed away through the exhaust pipes. The powder settles to the bottom of the cyclone where it is removed through a discharging device. Sometimes the air-conveying ducts for the dry powder are connected with cooling systems which admit cold air for transport of the product through conveying pipes. Cyclone dryers have been designed for large production schedules capable of drying ton-lots of powder per hour.

As will be appreciated by one of skill in the art, the inlet temperature and the outlet temperature of the spray drier are not critical but will be of such a level to provide the desired particle size, of less than at or about 1 micron, and to result in a powder that has a desired property. Typically, the ability of the free flowing powder to yield a clear (or relatively clear) liquid dilution composition upon dilution in an aqueous medium is the desired property that is evaluated. In this regard, the inlet and outlet temperatures are adjusted depending on the melting characteristics of the liquid emulsion components and the composition of the homogenized liquid emulsion concentrate/excipient mixture. The inlet temperature is between at or about 60° C. and at or about 170° C. with outlet temperatures between at or about 40° C. to at or about 120° C. Typically inlet temperatures are from at or about 90° C. to at or about 120° C. and outlet temperatures are from at or about 60° C. to at or about 90° C. The flow rate which is used in the spray drying equipment will generally be at or about 3 mL per minute to at or about 15 mL per minute. The atomizer air flow rate will vary between values of at or about 25 L per minute to at or about 50 L per minute. Commercially available spray dryers are well known to those of skill in the art, and suitable settings for any particular dispersion can be readily determined by one of skill in the art without undue experimentation. Operating conditions such as inlet temperature and outlet temperature, feed rate, atomization pressure, flow rate of the drying air, and nozzle configuration can be adjusted in accordance with the manufacturer's guidelines.

In some examples, the dry powder is stored into a capsule form or is pressed into a tablet. For use as tablets, the compositions typically contain multiple other excipients. These excipients include tablet disintegrants, such as corn starch, glidants, such as silicon dioxide, and lubricants such as magnesium stearate. Ordinarily these compositions contain minor amounts by weight of glidants and lubricants, e.g., each two percent (2%) or less by weight. Tablet disintegrants are optionally present, and, if present, are included in sufficient amounts to assure that the tablet disintegrates upon ingestion. For example, disintegrants, such as corn starch, can be employed at concentrations of from about zero to about 30 percent by weight of the composition.

Free flowing powders also can be used to administer the active agent by inhalation using a dry powder inhaler. Such dry powder inhalers typically administer the active agent as a free-flowing powder that is dispersed in a patient's airstream during inspiration. In order to achieve a free flowing powder, the active agent is typically formulated with a suitable excipient such as lactose or starch. For example, such a dry powder formulation can be made, for example, by combining the lactose with the active agent and then dry blending the components. Alternatively, if desired, the active agent can be formulated without an excipient. The pharmaceutical composition is then typically loaded into a dry powder dispenser, or into inhalation cartridges or capsules for use with a dry powder delivery device. Examples of dry powder inhaler delivery devices include Diskhaler (GlaxoSmithKline, Research Triangle Park, N.C.) (see, e.g., U.S. Pat. No. 5,035,237); Diskus (GlaxoSmithKline) (see, e.g., U.S. Pat. No. 6,378,519; Turbuhaler (AstraZeneca, Wilmington, Del.) (see, e.g., U.S. Pat. No. 4,524,769); Rotahaler (GlaxoSmithKline) (see, e.g., U.S. Pat. No. 4,353,365) and Handihaler (Boehringer Ingelheim). Further examples of suitable DPI devices are described in U.S. Pat. Nos. 5,415,162, 5,239,993, and 5,715,810 and references cited therein.

The following examples are included for illustrative purposes only and are not intended to limit the scope of the invention.

F. EXAMPLES

Example 1

Liquid Nanoemulsion Concentrates

Examples A-H below set forth liquid nanoemulsion concentrates containing fish oil, flaxseed oil, algal oil, vitamin D3, resveratrol and coenzyme Q10. The concentrates were generated as described in U.S. Patent Publication Nos. 20090297665, 20090317532, 20110236364 and 20120016026.

Each of Tables 1-6B below sets forth the milligrams (mg) per serving (serving size is indicated) of each ingredient in the concentrate, the percentage, by weight (of the total concentrate), for each ingredient and the amount (g) of each ingredient per batch of the indicated batch size (g). Also indicated in each table, in the "phase" column, is whether each ingredient was added to the water phase ("water"), the oil phase ("oil") or was added later, to the emulsion that was formed by emulsifying the oil and water phases ("emulsion").

Each of the liquid nanoemulsion concentrates was made using a bench-top process using the following general steps (variations indicated for each example below). The indicated amount of each ingredient was weighed using a Toledo Scale (Model GD13x/USA), Sartorius Basic Analytical Scale (Model BA110S) or an OHAUS Scale (Model CS2000). Selection of scale(s) depended on the weight of the particular ingredient(s).

To make the water phase, water phase ingredients (indicated by "water" in each table in the "phase" column) were added, in the indicated amounts (g/batch), to a water phase vessel (a Pyrex® beaker), and mixed using a standard mixer (IKA® model No. RE-16 1S, which is an overhead mixer (laboratory stirrer) compatible with the bench-top process). While mixing, the water phase ingredients were heated using a heating apparatus. The heating apparatus was a hot plate (a Thermolyne hot Plate Model # SP46615, Barnstead International, Dubuque, Iowa). Except where indicated, when the water phase included water and an emulsion stabilizer, these ingredients were added sequentially, in the following order: 1) water; 2) emulsion stabilizer. The water phase ingredients were heated with the hot plate until the temperature reached 60° C. The water phase then was maintained at 60° C. before combining and emulsifying the water and oil phases. A temperature meter (temperature probe (Model # DPP400W, Cooper-Atkins)) was used to evaluate (measure) the temperature of the water phase.

The oil phase ingredients (indicated by "oil" in each table in the "phase" column) were added to an oil phase vessel (a Pyrex® beaker), and mixed using a standard mixer (IKA® model No. RE-16 1S, which is an overhead mixer (laboratory stirrer) compatible with the bench-top process). As the oil phase ingredients were mixed, they were heated using a heating apparatus. The heating apparatus was a hot plate (a Thermolyne hot Plate Model # SP46615, Barnstead International, Dubuque, Iowa). The oil phase ingredients were heated until the mixture reached 60° C. The oil phase was mixed at this temperature until all the ingredients had dissolved, and maintained at 60° C. before mixing with the water phase. A temperature meter (temperature probe (Model # DPP400W, Cooper-Atkins)) was used to evaluate (measure) the temperature of the oil phase.

After both phases had reached 60° C. and the oil phase components had dissolved, the phases were combined and emulsified using the following steps. A reversible homogenizer (Arde Barinco, Inc.; Model CJ-4E) was placed in the water phase vessel and turned on at 850-1200 RPM. The oil phase then was transferred to the water phase vessel by pouring the oil phase from the oil phase vessel into the water phase vessel. Mixing with the homogenizer was continued, with adjustment of the baffle plate on the homogenizer to achieve and maintain an emulsion, for example, by moving the baffle plate further into the forming emulsion and/or out of the forming emulsion.

Homogenization of the forming emulsion was continued at between 850 and 1200 rpm, with rapid cooling. Rapid cooling was effected by placing the water phase vessel (beaker), containing the forming emulsion, in a water bath, to cool the forming emulsion until the temperature of the liquid reached between 25° C. and 43° C. (specific temperatures indicated; typically taking between about 30 and about 60 minutes).

After emulsifying and rapidly cooling, additional ingredients were added, where indicated in the individual Examples/Tables. For example, any ingredient that was added subsequent to the emulsifying step (instead of to one of the individual phases) is indicated by the word "emulsion" in the "phase" column. The emulsion was mixed while adding any additional ingredients, using the standard mixer (IKA® model No. RE-16 1S). Exemplary of additional ingredients that were added in the following examples are pH adjusters (e.g., citric acid). In several examples (where indicated), the pH of the emulsion was measured using a pH and temperature meter (Hanna Instruments, model HI 8314).

When needed, the pH was adjusted with the appropriate amount of a pH adjuster (amount indicated in tables), for example, citric acid or phosphoric acid, until the emulsion reached a pH of between 2.6 and 3.2. Each of the concentrates produced in the following Examples had a pH of between about 2.6 and 3.2. As a final step, the concentrates were filtered using a 100 micron end-product filter, before further evaluation, dilution and/or use.

In addition to the ingredients set forth in each example below, each concentrate additionally contained one or more of the following ingredients:

A TPGS surfactant that was Vitamin E TPGS®, sold by Eastman Chemical Company; Water, which was city water, which was purified prior to addition to the water phase vessel, by passage through using the following purifiers, sequentially in the following order: a carbon filter, an ion exchange purifier, a reverse osmosis purifier and an end-point filter (a 100 micron end-point filter); a Preservative that was a natural (GRAS-certified) preservative, benzyl alcohol; and an Emulsion Stabilizer that was the SALADIZER® brand emulsion stabilizer, obtained from TIC Gums, Inc., Belcamp, Md.

A. Fish Oil Concentrate Containing 3% Omega-3 EPA & DHA

Table 1 below sets forth the ingredients used to make a fish oil concentrate containing 3% omega-3 EPA and DHA. The fish oil was a fish oil containing about 30% DHA/EPA (sold under the name Omega 30 TG Food Grade (Non-GMO) MEG-3™ Fish Oil by Ocean Nutrition Canada Limited, Nova Scotia, Mass.).

To make the oil phase using the method described above, the following oil phase ingredients were added sequentially, in the following order, to the oil phase vessel: 1) surfactant; 2) preservative; 3) non-polar active ingredient; and 4) emulsion stabilizer.

TABLE 1

Fish oil concentrate

| Ingredient | mg/serving | Phase | Percent (by weight) of concentrate | g/batch |
|---|---|---|---|---|
| Omega 30 TG Food Grade (Non-GM) MEG-3 ™ Fish Oil* (non-polar active ingredient) | 240 | Oil | 12 | 36 |
| Water | 1238.76 | Water | 61.938 | 185.81 |
| SALADIZER ® brand emulsion stabilizer (blend of xanthan gum, guar gum and sodium alginate) | 1.200 | Water | 0.06 | 0.18 |
| Tocopherol Polyethylene Glycol Succinate (surfactant) | 504.0 | Oil | 25.20 | 75.60 |
| SALADIZER ® brand emulsion stabilizer (blend of xanthan gum, guar gum and sodium alginate) | 0.44 | Oil | 0.0220 | 0.07 |
| Benzyl alcohol (preservative) | 10.000 | Oil | 0.50 | 1.50 |
| Citric Acid (pH adjuster) | 5.60 | Emulsion | 0.28 | 0.84 |
| Totals | 2000.000 | | 100.0000 | 300 |

*This ingredient was added at 5% overage to insure the final composition contained the stated amount of this ingredient.

B. Flaxseed Oil Concentrate Containing 5% Omega-3 ALA

Table 2 below sets forth the ingredients used to make a flaxseed oil concentrate containing 5% omega-3 ALA. The flaxseed oil was a flaxseed oil compound, obtained from Sanmark LLC, Greensboro, N.C. (Sanmark Limited, Dalian, Liaoning Province, China), which contains not less than (NLT) 50% C18:3 alpha-linolenic acid.

To make the oil phase using the method described above, the following oil phase ingredients were added sequentially, in the following order, to the oil phase vessel: 1) surfactant; 2) preservative; 3) non-polar active ingredient; and 4) emulsion stabilizer.

TABLE 2

Flaxseed oil concentrate

| Ingredient | mg/serving | Phase | Percent (by weight) of concentrate | g/batch |
|---|---|---|---|---|
| Flax Seed Oil 50% Omegas (non-polar active ingredient) | 210 | Oil | 10.50 | 31.50 |
| Water | 1268.76 | Water | 63.438 | 190.314 |
| SALADIZER ® brand emulsion stabilizer (blend of xanthan gum, guar gum and sodium alginate) | 1.200 | Water | 0.06 | 0.18 |
| Tocopherol Polyethylene Glycol Succinate (surfactant) | 504.0 | Oil | 25.20 | 75.60 |
| SALADIZER ® brand emulsion stabilizer (blend of xanthan gum, guar gum and sodium alginate) | 0.44 | Oil | 0.0220 | 0.07 |
| Benzyl alcohol (preservative) | 10.000 | Oil | 0.50 | 1.50 |
| Citric Acid (pH adjuster) | 5.60 | Emulsion | 0.28 | 0.84 |
| Totals | 2000.000 | | 100.0000 | 300 |

C. Algal Oil Concentrate Containing 3.5% Omega-3 DHA & EPA

Table 3 below sets forth the ingredients used to make an algal oil concentrate containing 3.5% omega-3 EPA and DHA. The algal oil was an algal oil containing about 40% DHA (sold under the name V Pure® DHA 40% Standard TAG Oil), which was derived from the microalgae.

To make the oil phase using the method described above, the following oil phase ingredients were added sequentially, in the following order, to the oil phase vessel: 1) surfactant; 2) preservative; 3) non-polar active ingredient; and 4) emulsion stabilizer.

D. Vitamin D3 Concentrate

Table 4 below sets forth the ingredients used to make a concentrate containing 100,000 IU vitamin D3. The vitamin D3 was a vitamin D3 obtained from DSM Nutritional Products, Parsippany, N.J.

To make the oil phase using the method described above, the following oil phase ingredients were added sequentially, in the following order, to the oil phase vessel: 1) surfactant, 2) preservative; 3) non-polar active ingredient; and 4) emulsion stabilizer.

TABLE 3

Algal oil concentrate

| Ingredient | mg/serving | Phase | Percent (by weight) of concentrate | g/batch |
|---|---|---|---|---|
| Algal Oil* (~40% DHA/EPA by area/ ~35% DHA/EPA by weight) (non-polar active ingredient) | 210 | Oil | 10.50 | 31.50 |
| Water | 1268.76 | Water | 63.438 | 190.31 |
| SALADIZER ® brand emulsion stabilizer (blend of xanthan gum, guar gum and sodium alginate) | 1.200 | Water | 0.06 | 0.18 |
| Tocopherol Polyethylene Glycol Succinate (surfactant) | 504.0 | Oil | 25.20 | 75.60 |
| SALADIZER ® brand emulsion stabilizer (blend of xanthan gum, guar gum and sodium alginate) | 0.44 | Oil | 0.0220 | 0.07 |
| Benzyl alcohol (preservative) | 10.000 | Oil | 0.50 | 1.50 |
| Citric Acid (pH adjuster) | 5.60 | Emulsion | 0.28 | 0.84 |
| Totals | 2000.000 | | 100.0000 | 300 |

*This ingredient was added at 5% overage to insure the final composition contained the stated amount of this ingredient.

TABLE 4

| Vitamin D3 concentrate | | | | |
|---|---|---|---|---|
| Ingredient | mg/serving | Phase | Percent (by weight) of concentrate | g/batch |
| Vitamin D3* (non-polar active ingredient) | 210 | Oil | 10.50 | 787.50 |
| Water | 1268.76 | Water | 63.438 | 4757.85 |
| SALADIZER ® brand emulsion stabilizer (blend of xanthan gum, guar gum and sodium alginate) | 1.200 | Water | 0.06 | 4.5 |
| Tocopherol Polyethylene Glycol Succinate (surfactant) | 504.0 | Oil | 25.20 | 1890.00 |
| SALADIZER ® brand emulsion stabilizer (blend of xanthan gum, guar gum and sodium alginate) | 0.44 | Oil | 0.0220 | 1.65 |
| Benzyl alcohol (preservative) | 10.000 | Oil | 0.50 | 37.50 |
| Citric Acid (pH adjuster) | 5.60 | Emulsion | 0.28 | 21.00 |
| Totals | 2000.000 | | 100 | 7500 |

*This ingredient was added at 5% overage to insure the final composition contained the stated amount of this ingredient.

E. Resveratrol Concentrate

Table 5 below sets forth the ingredients used to make a concentrate containing 4% resveratrol. The resveratrol was a resveratrol, containing trans-resveratrol, sold under the name ReserveNature™, sold by Jiaherb, Shaanxi, China, containing trans-resveratrol from the botanical source *Polygonum cuspidatum*. The resveratrol non-polar active ingredient was added at an amount of 10.75%, by weight of the final concentrate, whereby the concentrate contained 10% resveratrol.

To make the oil phase using the method described above, the following oil phase ingredients were added sequentially, in the following order, to the oil phase vessel: 1) surfactant; 2) preservative; 3) non-polar active ingredient; and 4) emulsion stabilizer.

Q10 was a coenzyme Q10 (CoQ10) compound, sold under the name Kaneka Q10™ (USP Ubidecarenone) by Kaneka Nutrients, L.P., Pasadena, Tex., which contains greater than 98% ubidecarenone (ubiquinone). The concentrate also contains a co-surfactant that was a phosphatidylcholine co-surfactant, sold under the trade name S-100, by Lipoid, LLC, Newark, N.J. This phosphatidylcholine co-surfactant was derived from soy extract and contained greater than 95% phosphatidylcholine. The concentrate also contains a non-polar solvent that was a Vitamin E oil, sold by ADM Natural Health and Nutrition, Decatur, Ill., under the name Novatol™ 5-67 Vitamin E (D-alpha-Tocopherol; ADM product code 410217). This oil contained at least 67.2% Tocopherol and approximately 32.8% soybean oil.

To make the oil phase using the method described above, the following oil phase ingredients were added sequentially,

TABLE 5

| Resveratrol concentrate | | | | |
|---|---|---|---|---|
| Ingredient | mg/serving | Phase | Percent (by weight) of concentrate | g/batch |
| Trans Resveratrol 98% (non-polar active ingredient) | 88.0 | Oil | 4.4000 | 22.00 |
| Rice Bran Oil | 190.13 | Oil | 9.507 | 47.53 |
| Water | 1200 | Water | 60.00 | 300.00 |
| SALADIZER ® brand emulsion stabilizer (blend of xanthan gum, guar gum and sodium alginate) | 6.8 | Water | 0.34 | 1.70 |
| Tocopherol Polyethylene Glycol Succinate (surfactant) | 500 | Oil | 25.00 | 125.00 |
| SALADIZER ® brand emulsion stabilizer (blend of xanthan gum, guar gum and sodium alginate) | 1.270 | Oil | 0.06 | 0.32 |
| Benzyl alcohol (preservative) | 10.00 | Oil | 0.5000 | 2.50 |
| Citric Acid (pH adjuster) | 3.800 | Emulsion | 0.1900 | 0.95 |
| Totals | 2000.000 | | 100 | 500 |

F. Coenzyme Q10 Concentrate

Table 6 below sets forth the ingredients used to make a concentrate containing 5% coenzyme Q10. The coenzyme in the following order, to the oil phase vessel: 1) surfactant; 2) preservative; 3) non-polar active ingredient; and 4) emulsion stabilizer.

TABLE 6

Coenzyme Q10 concentrate

| Ingredient | mg/serving | Phase | Percent (by weight) of concentrate | g/batch |
|---|---|---|---|---|
| CoQ10 (non-polar active ingredient) | 105.0 | Oil | 5.25 | 26.25 |
| Vitamin E oil (5-67) (non-polar solvent) | 75.00 | Oil | 3.750 | 18.75 |
| Water | 1285 | Water | 64.24 | 321.19 |
| SALADIZER ® brand emulsion stabilizer (blend of xanthan gum, guar gum and sodium alginate) | 6.800 | Water | 0.34 | 1.70 |
| Tocopherol Polyethylene Glycol Succinate (surfactant) | 500.0 | Oil | 25.00 | 125.00 |
| Phosphatidylcholine S-100 (co-surfactant) | 13.38 | Oil | 0.6690 | 3.345 |
| SALADIZER ® brand emulsion stabilizer (blend of xanthan gum, guar gum and sodium alginate) | 1.270 | Oil | 0.06 | 0.32 |
| Benzyl alcohol (preservative) | 10.00 | Oil | 0.5000 | 2.50 |
| Citric Acid (pH adjuster) | 3.800 | Emulsion | 0.19 | 0.95 |
| Totals | 2000.00 | | 100 | 500 |

G. Fish Oil Concentrate Containing 2% Omega-3 EPA & DHA

Table 6A below sets forth the ingredients used to make a fish oil concentrate containing 2% omega-3 EPA and DHA. The fish oil was a fish oil containing about 30% DHA/EPA (sold under the name Omega 30 TG Food Grade (Non-GMO) MEG-3™ Fish Oil by Ocean Nutrition Canada Limited, Nova Scotia, Mass.).

To make the oil phase using the method described above, the following oil phase ingredients were added sequentially, in the following order, to the oil phase vessel: 1) surfactant; 2) preservative; 3) non-polar active ingredient; and 4) emulsion stabilizer.

H. Fish Oil Concentrate Containing 2% Omega-3 EPA & DHA

Table 6B below sets forth the ingredients used to make a fish oil concentrate containing 2% omega-3 EPA and DHA. The fish oil was a fish oil containing about 30% DHA/EPA (sold under the name Omega 30 TG Food Grade (Non-GMO) MEG-3™ Fish Oil by Ocean Nutrition Canada Limited, Nova Scotia, Mass.).

To make the oil phase using the method described above, the following oil phase ingredients were added sequentially, in the following order, to the oil phase vessel: 1) surfactant; 2) preservative; 3) non-polar active ingredient; and 4) emulsion stabilizer.

TABLE 6A

Fish oil concentrate

| Ingredient | mg/serving | Phase | Percent (by weight) of concentrate | g/batch |
|---|---|---|---|---|
| Omega 30 TG Food Grade (Non-GM) MEG-3 ™ Fish Oil* (non-polar active ingredient) | 180 | Oil | 9.00 | 27.00 |
| Water | 1298.76 | Water | 64.938 | 194.81 |
| SALADIZER ® brand emulsion stabilizer (blend of xanthan gum, guar gum and sodium alginate) | 1.200 | Water | 0.06 | 0.18 |
| Tocopherol Polyethylene Glycol Succinate (surfactant) | 504.0 | Oil | 25.20 | 75.60 |
| SALADIZER ® brand emulsion stabilizer (blend of xanthan gum, guar gum and sodium alginate) | 0.44 | Oil | 0.022 | 0.07 |
| Benzyl alcohol (preservative) | 10.000 | Oil | 0.50 | 1.50 |
| Citric Acid (pH adjuster) | 5.60 | Emulsion | 0.28 | 0.84 |
| Totals | 2000.000 | | 100.0000 | 300 |

*This ingredient was added at 5% overage to insure the final composition contained the stated amount of this ingredient.

TABLE 6B

Fish oil concentrate

| Ingredient | mg/serving | Phase | Percent (by weight) of concentrate | g/batch |
|---|---|---|---|---|
| Omega 30 TG Food Grade (Non-GM) MEG-3 ™ Fish Oil* (non-polar active ingredient) | 170 | Oil | 8.50 | 25.5 |
| Water | 1308.76 | Water | 65.438 | 196.314 |
| SALADIZER ® brand emulsion stabilizer (blend of xanthan gum, guar gum and sodium alginate) | 1.200 | Water | 0.06 | 0.2 |
| Tocopherol Polyethylene Glycol Succinate (surfactant) | 504.0 | Oil | 25.5 | 75.60 |
| SALADIZER ® brand emulsion stabilizer (blend of xanthan gum, guar gum and sodium alginate) | 0.44 | Oil | 0.022 | 0.066 |
| Benzyl alcohol (preservative) | 10.000 | Oil | 0.50 | 1.5 |
| Citric Acid (pH adjuster) | 5.60 | Emulsion | 0.2800 | 0.8400 |
| Totals | 2000.000 | | 100.0000 | 300 |

*This ingredient was added at 5% overage to insure the final composition contained the stated amount of this ingredient.

Example 2

Flavored Waters

In this example, flavored waters were generated containing various non-polar active ingredients, including omega-3 polyunsaturated fatty acids, such as fish oil and flaxseed oil, vitamin D3, vitamin B12, resveratrol and coenzyme Q10. Pomegranate blueberry and tropical berry flavored waters were generated containing 32 mg DHA EPA, 68 mg ALA, 1,000 IU vitamin D3 and 100% RDI Vitamin B12. Mixed berry and peach mango waters were generated containing 32 mg DHA EPA, 2 mg resveratrol and 1,000 IU vitamin D3. Citrus and peach mango waters were generated containing 32 mg DHA EPA, 50 mg coenzyme Q10 and 1,000 IU vitamin D3. Pomegranate blueberry water was generated containing 250 mg DHA EPA, 1,000 IU vitamin D3 and 100% RDI Vitamin B12. Peach mango water was generated containing 250 mg DHA EPA, 50 mg coenzyme Q10 and 1,000 IU vitamin D3. Each of the waters contained bicarbonate, citric acid and/or vitamin C (ascorbic acid) as a stabilizing system for the non-polar active ingredients. Section A sets forth a general procedure for preparation of the flavored waters. Sections B and C set forth various flavored waters.

A. General Procedure for Preparation

Tables 7-39 below set forth ingredients that were used to make exemplary flavored waters, described in further detail in Sections B and C below, according to the provided methods.

Each of the waters set forth in Sections B and C was made using a bench-top process of the provided methods. To make larger batch sizes, the bench-top process can be scaled up to make any of the exemplary waters in Sections B and C, using a scaled up manufacturing process of the methods provided herein.

The bench-top process for making the waters in Sections B and C was performed using the following general steps (further details, including exact ingredients, are provided in the individual examples):

Water, juice (when included), non-polar active ingredients and Vitamin C (when included) were added to a Pyrex beaker and mixed until dissolved using an standard mixer (IKA® model No. RE-16 1S, which is an overhead mixer (laboratory stirrer) compatible with the bench-top process). Antifoaming agent (Tramfloc 1147, sold by Tramfloc Inc, Forney, Tex.) and potassium or sodium bicarbonate were added and the solution was mixed and heated to 80° C. using a hot plate (Thermolyne hot Plate Model # SP46615, Barnstead International, Dubuque, Iowa). Sweeteners and flavors were added while mixing and maintaining a temperature of 80° C. Finally, citric acid, phosphoric acid and antifoaming agent were added together while mixing, and the solution was hot filled into a container and sealed. The container was cooled to 30° C. and stored at room temperature. The final pH of each flavored water was approximately 3.80.

The ingredients in the exemplified water compositions included:

Non-polar active ingredients, including: Fish oil concentrate, containing 3% omega-3 EPA & DHA, described in Example 1A above; Flaxseed oil concentrate, containing 5% omega-3 ALA, described in Example 1B above; Algal oil concentrate, containing 3.5% omega-3 DHA & EPA, described in Example 1C above; Vitamin D3 concentrate, containing 100,000 IU vitamin D3, described in Example 1D above; Resveratrol concentrate, containing 4% resveratrol, described in Example 1E above; coenzyme Q10 concentrate, containing 5% coenzyme Q10, described in Example 1F above; Vitamin B12;

Potassium bicarbonate, produced by Armand Products Company, distributed by Stauber Performance Ingredients, Fullerton, Calif.; Citric Acid, which was anhydrous granular citric acid, from RZBC Imp. & Exp., Co., Ltd, Shandong, China; Ascorbic Acid (Vitamin C), produced by Northeast General Pharmaceutical Factory, Shenyang China, distributed by MiniStar Int'l Inc.;

Juice concentrates, including Red Tart Cherry Concentrate (Montmorency Tart Cherries), sold by Shoreline Fruit, Traverse City, Mich., Blueberry Juice Concentrate, sold by Schare and Associates, Long Beach, N.Y., and cranberry juice extract; Flavors, including pomegranate grape (Code F0233), mixed berry (Code F3090), peach mango (Code F0079) and citrus (Code F4721), all sold by Creative Flavor Concepts, Irvine, Calif.; peach (PH-147), vanilla (CA-158), cherry (CH-172) and mixed berry (MB-106), all sold by Mission Flavors and Fragrances, Inc., Foothill Ranch, Calif.; and natural blackberry (Code 125-00875) sold by Cargill; and banana (14).

Sucralose, which was Sucralose FCC VI Grade, manufactured by Changzhou Tianhua Imports & Exports Co., Ltd, sold by Ausvita; Food Grade 80% Phosphoric Acid, sold by Univar; An antifoaming agent that was Tramfloc 1147, sold by Tramfloc Inc, Forney, Tex.; and Water, which was city water, which was purified prior to addition to the water phase vessel, by passage through using the following purifiers, sequentially in the following order: a charcoal filter, a particle filter, a water softener, a reverse osmosis purifier, a UV sterilizer and an end-point filter (a 50 micron end-point filter).

B. Flavored Waters Containing Potassium Bicarbonate and Citric Acid

The flavored waters set forth in Tables 7-26 below contain varying amounts of potassium bicarbonate and citric acid.

1. Waters Containing 1 g Bicarbonate and 244.6 Mg Citric Acid

The formulations below contain 1 g potassium bicarbonate and 0.2446 g citric acid. Each water was generated as described in Section A above.

a. Tropical Berry Water

Table 7 below sets forth the ingredients to make an 16 ounce batch (8 oz. serving size) of Tropical Berry water containing 68 mg ALA, 32 mg EPA DHA, 1,000 IU Vitamin D3 and 100% RDI of Vitamin B12, per 8 ounce serving.

TABLE 7

Tropical Berry Water

| Ingredient | g per batch | g per serving | Percent (by weight) |
| --- | --- | --- | --- |
| Water | 460.0108952 | 230.0054476 | 97.45994 |
| Cherry Juice-Concentrate | 1.4227 | 0.71135 | 0.301 |
| Vitamin D3 concentrate (100,000 IU/g) (non-polar active ingredient) | 0.02 | 0.01 | 0.004 |
| Fish Oil Concentrate (Omega-3, 3% EPA DHA) (non-polar active ingredient) | 2.2 | 1.1 | 0.466 |
| Flaxseed oil concentrate (Omega-3, 5% ALA) (non-polar active ingredient) | 2.76 | 1.38 | 0.585 |
| Vitamin B12 (2.4 mcg) (non-polar active ingredient) | 0.0000048 | 0.0000024 | 0.00000102 |
| Mixed Berry Flavor (F3090) (flavor) | 0.6078 | 0.3039 | 0.129 |
| Potassium Bicarbonate (stabilizer) | 2 | 1 | 0.424 |
| Phosphoric Acid (pH adjuster, to pH of 3.75-3.80) | 2.4510 | 1.2255 | 0.519 |
| Citric Acid (stabilizer) | 0.4892 | 0.2446 | 0.104 |
| Sucralose (sweetener) | 0.0384 | 0.0192 | 0.008 |
| Total | 472 | 236 | 100 | b. Mixed Berry Water

Table 8 below sets forth the ingredients to make an 16 ounce batch (8 oz. serving size) of Mixed Berry flavored water containing 32 mg EPA DHA, 2 mg resveratrol and 1,000 IU Vitamin D3, per 8 ounce serving.

TABLE 8

Mixed Berry Water

| Ingredient | g per batch | g per serving | Percent (by weight) |
| --- | --- | --- | --- |
| Water | 462.9833 | 231.49165 | 98.09 |
| Blueberry Juice Concentrate | 1.4227 | 0.71135 | 0.301 |
| Vitamin D3 concentrate (100,000 IU/g) (non-polar active ingredient) | 0.02 | 0.01 | 0.004 |
| Fish Oil Concentrate (Omega-3, 3% EPA DHA) (non-polar active ingredient) | 2.2 | 1.1 | 0.466 |
| Resveratrol concentrate (4%) (non-polar active ingredient) | 0.13 | 0.065 | 0.028 |
| Mixed Berry Flavor (F3090) (flavor) | 0.6078 | 0.3039 | 0.129 |
| Citric Acid (stabilizer) | 0.4892 | 0.2446 | 0.104 |
| Potassium Bicarbonate (stabilizer) | 2 | 1 | 0.424 |
| Phosphoric Acid (pH adjuster, to pH of 3.75-3.80) | 2.1086 | 1.0543 | 0.447 |
| Sucralose (sweetener) | 0.0384 | 0.0192 | 0.008 |
| Total | 472 | 236 | 100 | c. Peach Mango Water

Table 9 below sets forth the ingredients to make an 8 ounce batch (8 oz. serving size) of Peach Mango water containing 32 mg EPA DHA, 2 mg resveratrol and 1,000 IU Vitamin D3, per 8 ounce serving.

TABLE 9

Peach Mango Water

| Ingredient | g per batch | g per serving | Percent (by weight) |
| --- | --- | --- | --- |
| Water | 462.0923 | 231.04615 | 97.90 |
| Cherry Juice Concentrate | 1.4227 | 0.71135 | 0.301 |
| Vitamin D3 concentrate (100,000 IU/g) (non-polar active ingredient) | 0.02 | 0.01 | 0.004 |
| Fish Oil Concentrate (Omega-3, 3% EPA DHA) (non-polar active ingredient) | 2.2 | 1.1 | 0.466 |
| Resveratrol concentrate (4%) (non-polar active ingredient) | 0.13 | 0.065 | 0.028 |
| Peach Mango Flavor (F0079) (flavor) | 0.5932 | 0.2966 | 0.126 |
| Peach (PH-147) Mission (flavor) | 0.776 | 0.388 | 0.164 |
| Citric Acid (stabilizer) | 0.4892 | 0.2446 | 0.104 |
| Potassium Bicarbonate (stabilizer) | 2 | 1 | 0.424 |
| Phosphoric Acid (pH adjuster, to pH of 3.75-3.80) | 2.2382 | 1.1191 | 0.474 |
| Sucralose (sweetener) | 0.0384 | 0.192 | 0.081 |
| Total | 472 | 236 | 100 | d. Citrus Water

Table 10 below sets forth the ingredients to make an 8 ounce batch (8 oz. serving size) of Citrus water containing 32 mg EPA DHA, 50 mg coenzyme Q10 and 1,000 IU Vitamin D3, per 8 ounce serving.

TABLE 10

Citrus Water

| Ingredient | g per batch | g per serving | Percent (by weight) |
| --- | --- | --- | --- |
| Water | 462.5258 | 231.2629 | 97.99 |
| Fish Oil Concentrate (Omega-3, 3% EPA DHA) (non-polar active ingredient) | 2.2 | 1.1 | 0.466 |

TABLE 10-continued

Citrus Water

| Ingredient | g per batch | g per serving | Percent (by weight) |
|---|---|---|---|
| Vitamin D3 concentrate (100,000 IU/g) (non-polar active ingredient) | 0.02 | 0.01 | 0.004 |
| Coenzyme Q10 concentrate (5%) (non-polar active ingredient) | 2 | 1 | 0.424 |
| Citrus Flavor (F4721) (flavor) | 0.64800 | 0.324 | 0.137 |
| Potassium Bicarbonate (stabilizer) | 2 | 1 | 0.424 |
| Phosphoric Acid (pH adjuster, to pH of 3.75-3.80) | 2.0760 | 1.038 | 0.440 |
| Citric Acid (stabilizer) | 0.4892 | 0.2446 | 0.104 |
| Sucralose (sweetener) | 0.0410 | 0.0205 | 0.009 |
| Total | 472 | 236 | 100 | e. Peach Mango Water

Table 11 below sets forth the ingredients to make an 8 ounce batch (8 oz. serving size) of Peach Mango water containing 32 mg EPA DHA, 50 mg coenzyme Q10 and 1,000 IU Vitamin D3, per 8 ounce serving.

TABLE 11

Peach Mango Water

| Ingredient | g per batch | g per serving | Percent (by weight) |
|---|---|---|---|
| Water | 460.3285 | 230.16425 | 97.53 |
| Cherry Juice Concentrate | 1.4227 | 0.72 | 0.305 |
| Fish Oil Concentrate (Omega-3, 3% EPA DHA) (non-polar active ingredient) | 2.2 | 1.1 | 0.466 |
| Vitamin D3 concentrate (100,000 IU/g) (non-polar active ingredient) | 0.02 | 0.01 | 0.004 |
| Coenzyme Q10 concentrate (5%) (non-polar active ingredient) | 2 | 1 | 0.424 |
| Peach (PH-147) (flavor) | 0.7760 | 0.3880 | 0.164 |
| Peach Mango (F0079) | 0.5932 | 0.2966 | 0.126 |
| Potassium Bicarbonate (stabilizer) | 2 | 1 | 0.424 |
| Phosphoric Acid (pH adjuster, to pH of 3.75-3.80) | 2.1320 | 1.066 | 0.452 |
| Citric Acid (stabilizer) | 0.4892 | 0.2446 | 0.104 |
| Sucralose (sweetener) | 0.0384 | 0.0192 | 0.008 |
| Total | 472 | 236 | 100 |

2. Waters Containing 1 g Bicarbonate and 2.2285 g Citric Acid

The formulation below contains 1 g potassium bicarbonate and 2.2285 g citric acid. Each water was generated as described in Section A above.

a. Pomegranate Blueberry Water

Table 12 below sets forth the ingredients to make an 16 ounce batch (8 oz. serving size) of Pomegranate Blueberry water containing 68 mg ALA, 32 mg EPA DHA, 1,000 IU Vitamin D3 and 100% RDI of Vitamin B12, per 8 ounce serving.

TABLE 12

Pomegranate Blueberry Water

| Ingredient | g per batch | g per serving | Percent (by weight) |
|---|---|---|---|
| Water | 452.2845952 | 226.1422976 | 95.82 |
| Blueberry juice concentrate (Schare & Assoc.) | 3.5832 | 1.7916 | 0.759 |

TABLE 12-continued

Pomegranate Blueberry Water

| Ingredient | g per batch | g per serving | Percent (by weight) |
|---|---|---|---|
| Vitamin D3 concentrate (100,000 IU/g) (non-polar active ingredient) | 0.02 | 0.01 | 0.004 |
| Fish Oil Concentrate (Omega-3, 3% EPA DHA) (non-polar active ingredient) | 2.2 | 1.1 | 0.466 |
| Flaxseed oil concentrate (Omega-3, 5% ALA) (non-polar active ingredient) | 2.76 | 1.38 | 0.585 |
| Vitamin B12 (2.4 mcg) (non-polar active ingredient) | 0.0000048 | 0.0000024 | 0.00000102 |
| Pomegranate Grape (FO233) (flavor) | 0.4738 | 0.2369 | 0.100 |
| Potassium Bicarbonate (stabilizer) | 2 | 1 | 0.424 |
| Phosphoric Acid (pH adjuster, to pH of 3.75-3.80) | 4.1830 | 2.0915 | 0.886 |
| Citric Acid (stabilizer) | 4.457 | 2.2285 | 0.944 |
| Sucralose (sweetener) | 0.0384 | 0.0192 | 0.008 |
| Total | 472 | 236 | 100 |

3. Waters Containing 3 g Bicarbonate and 2.2446 g Citric Acid

The formulations below contain 3 g potassium bicarbonate and 2.2446 g citric acid. Each water was generated as described in Section A above.

a. Pomegranate Blueberry Water

Table 13 below sets forth the ingredients to make an 8 ounce batch (8 oz. serving size) of Pomegranate Blueberry water containing 68 mg ALA, 32 mg EPA DHA, 1,000 IU Vitamin D3 and 100% RDI of Vitamin B12, per 8 ounce serving.

TABLE 13

Pomegranate Blueberry Water

| Ingredient | g per batch | g per serving | Percent (by weight) |
|---|---|---|---|
| Water | 225.1927976 | 225.1927976 | 95.42 |
| Blueberry juice concentrate (Schare & Assoc.) | 0.7200 | 0.7200 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Pomegranate Grape (FO233) (flavor) | 0.2369 | 0.2369 | 0.100 |
| Potassium Bicarbonate (stabilizer) | 3 | 3 | 1.271 |

TABLE 13-continued

Pomegranate Blueberry Water

| Ingredient | g per batch | g per serving | Percent (by weight) |
|---|---|---|---|
| Phosphoric Acid (pH adjuster, to pH of 3.75-3.80) | 2.0915 | 2.0915 | 0.886 |
| Citric Acid (stabilizer) | 2.2446 | 2.2446 | 0.951 |
| Sucralose (sweetener) | 0.0242 | 0.0242 | 0.010 |
| Total | 236 | 236 | 100 | b. Tropical Berry Water

Table 14 below sets forth the ingredients to make an 8 ounce batch (8 oz. serving size) of Tropical Berry water containing 68 mg ALA, 32 mg EPA DHA, 1,000 IU Vitamin D3 and 100% RDI of Vitamin B12, per 8 ounce serving.

TABLE 14

Tropical Berry Water

| Ingredient | g per batch | g per serving | Percent (by weight) |
|---|---|---|---|
| Water | 225.1257976 | 225.1257976 | 95.39 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Mixed Berry Flavor (F3090) (flavor) | 0.3039 | 0.3039 | 0.129 |
| Potassium Bicarbonate (stabilizer) | 3 | 3 | 1.271 |
| Phosphoric Acid (pH adjuster, to pH of 3.75-3.80) | 2.0915 | 2.0915 | 0.886 |
| Citric Acid (stabilizer) | 2.2446 | 2.2446 | 0.951 |
| Sucralose (sweetener) | 0.0192 | 0.0192 | 0.008 |
| Total | 236 | 236 | 100 | c. Mixed Berry Water

Table 15 below sets forth the ingredients to make an 16 ounce batch (8 oz. serving size) of Mixed Berry flavored water containing 32 mg EPA DHA, 2 mg resveratrol and 1,000 IU Vitamin D3, per 8 ounce serving.

TABLE 15

Mixed Berry Water

| Ingredient | g per batch | g per serving | Percent (by weight) |
|---|---|---|---|
| Water | 226.4408 | 226.4408 | 95.95 |
| Blueberry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |

TABLE 15-continued

Mixed Berry Water

| Ingredient | g per batch | g per serving | Percent (by weight) |
|---|---|---|---|
| Resveratrol concentrate (4%) (non-polar active ingredient) | 0.065 | 0.065 | 0.028 |
| Mixed Berry Flavor (F3090) (flavor) | 0.3039 | 0.3039 | 0.129 |
| Citric Acid (stabilizer) | 2.2446 | 2.2446 | 0.951 |
| Potassium Bicarbonate (stabilizer) | 3 | 3 | 1.271 |
| Phosphoric Acid (pH adjuster, to pH of 3.75-3.80) | 2.0915 | 2.0915 | 0.886 |
| Sucralose (sweetener) | 0.0242 | 0.0242 | 0.010 |
| Total | 236 | 236 | 100 | d. Peach Mango Water

Table 16 below sets forth the ingredients to make an 8 ounce batch (8 oz. serving size) of Peach Mango water containing 32 mg EPA DHA, 2 mg resveratrol and 1,000 IU Vitamin D3, per 8 ounce serving.

TABLE 16

Peach Mango Water

| Ingredient | g per batch | g per serving | Percent (by weight) |
|---|---|---|---|
| Water | 226.0601 | 226.0601 | 95.79 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Peach Mango Flavor (F0079) (flavor) | 0.2966 | 0.2966 | 0.126 |
| Peach (PH-147) Mission (flavor) | 0.388 | 0.388 | 0.164 |
| Citric Acid (stabilizer) | 2.2446 | 2.2446 | 0.951 |
| Potassium Bicarbonate (stabilizer) | 3 | 3 | 1.271 |
| Phosphoric Acid (pH adjuster, to pH of 3.75-3.80) | 2.0915 | 2.0915 | 0.886 |
| Sucralose (sweetener) | 0.0242 | 0.0242 | 0.010 |
| Total | 236 | 236 | 100 | e. Citrus Water

Table 17 below sets forth the ingredients to make an 8 ounce batch (8 oz. serving size) of Citrus water containing 32 mg EPA DHA, 50 mg coenzyme Q10 and 1,000 IU Vitamin D3, per 8 ounce serving.

TABLE 17

Citrus Water

| Ingredient | g per batch | g per serving | Percent (by weight) |
|---|---|---|---|
| Water | 226.2057 | 226.2057 | 95.85 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Citrus Flavor (F4721) (flavor) | 0.324000 | 0.324 | 0.137 |
| Potassium Bicarbonate (stabilizer) | 3 | 3 | 1.271 |

TABLE 17-continued

Citrus Water

| Ingredient | g per batch | g per serving | Percent (by weight) |
|---|---|---|---|
| Phosphoric Acid (pH adjuster, to pH of 3.75-3.80) | 2.0915 | 2.0915 | 0.886 |
| Citric Acid (stabilizer) | 2.2446 | 2.2446 | 0.951 |
| Sucralose (sweetener) | 0.0242 | 0.0242 | 0.010 |
| Total | 236 | 236 | 100 | f. Peach Mango Water

Table 18 below sets forth the ingredients to make an 8 ounce batch (8 oz. serving size) of Peach Mango water containing 32 mg EPA DHA, 50 mg coenzyme Q10 and 1,000 IU Vitamin D3, per 8 ounce serving.

TABLE 18

Peach Mango Water

| Ingredient | g per batch | g per serving | Percent (by weight) |
|---|---|---|---|
| Water | 225.1251 | 225.1251 | 95.39 |
| Cherry Juice Concentrate | 0.72 | 0.72 | 0.305 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Peach (PH-147) (flavor) | 0.3880 | 0.3880 | 0.164 |
| Peach Mango (F0079) | 0.2966 | 0.2966 | 0.126 |
| Potassium Bicarbonate (stabilizer) | 3 | 3 | 1.271 |
| Phosphoric Acid (pH adjuster, to pH of 3.75-3.80) | 2.0915 | 2.0915 | 0.886 |
| Citric Acid (stabilizer) | 2.2446 | 2.2446 | 0.951 |
| Sucralose (sweetener) | 0.0242 | 0.0242 | 0.010 |
| Total | 236 | 236 | 100 |

4. Waters Containing 4 g Bicarbonate and 3.2446 g Citric Acid

The formulations below contain 4 g potassium bicarbonate and 3.2446 g citric acid. Each water was generated as described in Section A above.

a. Pomegranate Blueberry Water

Table 19 below sets forth the ingredients to make an 8 ounce batch (8 oz. serving size) of Pomegranate Blueberry water containing 68 mg ALA, 32 mg EPA DHA, 1,000 IU Vitamin D3 and 100% RDI of Vitamin B12, per 8 ounce serving.

TABLE 19

Pomegranate Blueberry Water

| Ingredient | g per batch | g per serving | Percent (by weight) |
|---|---|---|---|
| Water | 222.7561976 | 222.7561976 | 94.39 |
| Blueberry juice concentrate (Schare & Assoc.) | 0.7200 | 0.7200 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |

TABLE 19-continued

Pomegranate Blueberry Water

| Ingredient | g per batch | g per serving | Percent (by weight) |
|---|---|---|---|
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Pomegranate Grape (FO233) (flavor) | 0.2369 | 0.2369 | 0.100 |
| Potassium Bicarbonate (stabilizer) | 4 | 4 | 1.695 |
| Phosphoric Acid (pH adjuster, to pH of 3.75-3.80) | 2.5281 | 2.5281 | 1.071 |
| Citric Acid (stabilizer) | 3.2446 | 3.2446 | 1.375 |
| Sucralose (sweetener) | 0.0242 | 0.0242 | 0.010 |
| Total | 236 | 236 | 100 | b. Peach Mango Water

Table 20 below sets forth the ingredients to make an 8 ounce batch (8 oz. serving size) of Peach Mango water containing 32 mg EPA DHA, 2 mg resveratrol and 1,000 IU Vitamin D3, per 8 ounce serving.

TABLE 20

Peach Mango Water

| Ingredient | g per batch | g per serving | Percent (by weight) |
|---|---|---|---|
| Water | 223.6127 | 223.6127 | 94.75 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Peach Mango Flavor (F0079) (flavor) | 0.2966 | 0.2966 | 0.126 |
| Peach (PH-147) Mission (flavor) | 0.388 | 0.388 | 0.164 |
| Citric Acid (stabilizer) | 3.2446 | 3.2446 | 1.375 |
| Potassium Bicarbonate (stabilizer) | 4 | 4 | 1.695 |
| Phosphoric Acid (pH adjuster, to pH of 3.75-3.80) | 2.5389 | 2.5389 | 1.076 |
| Sucralose (sweetener) | 0.0242 | 0.0242 | 0.010 |
| Total | 236 | 236 | 100 | c. Peach Mango Water

Table 21 below sets forth the ingredients to make an 8 ounce batch (8 oz. serving size) of Peach Mango water containing 32 mg EPA DHA, 50 mg coenzyme Q10 and 1,000 IU Vitamin D3, per 8 ounce serving.

TABLE 21

Peach Mango Water

| Ingredient | g per batch | g per serving | Percent (by weight) |
|---|---|---|---|
| Water | 222.6379 | 222.6379 | 94.34 |
| Cherry Juice Concentrate | 0.72 | 0.72 | 0.305 |
| Fish Oil Concentrate (Omega-3, 3% EPA DHA) (non-polar | 1.1 | 1.1 | 0.466 |

TABLE 21-continued

Peach Mango Water

| Ingredient | g per batch | g per serving | Percent (by weight) |
|---|---|---|---|
| active ingredient) | | | |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Peach (PH-147) (flavor) | 0.3880 | 0.3880 | 0.164 |
| Peach Mango (F0079) | 0.2966 | 0.2966 | 0.126 |
| Potassium Bicarbonate (stabilizer) | 4 | 4 | 1.695 |
| Phosphoric Acid (pH adjuster, to pH of 3.75-3.80) | 2.5787 | 2.5787 | 1.093 |
| Citric Acid (stabilizer) | 3.2446 | 3.2446 | 1.375 |
| Sucralose (sweetener) | 0.0242 | 0.0242 | 0.010 |
| Total | 236 | 236 | 100 |

5. Waters Containing 4 g Bicarbonate and 5.2446 g Citric Acid

The formulations below contain 4 g potassium bicarbonate and 5.2446 g citric acid. Each water was generated as described in Section A above.

a. Pomegranate Blueberry Water

Table 22 below sets forth the ingredients to make an 8 ounce batch (8 oz. serving size) of Pomegranate Blueberry water containing 68 mg ALA, 32 mg EPA DHA, 1,000 IU Vitamin D3 and 100% RDI of Vitamin B12, per 8 ounce serving.

TABLE 22

Pomegranate Blueberry Water

| Ingredient | g per batch | g per serving | Percent (by weight) |
|---|---|---|---|
| Water | 221.9625976 | 221.9625976 | 94.05 |
| Blueberry juice concentrate (Schare & Assoc.) | 0.7200 | 0.7200 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Pomegranate Grape (FO233) (flavor) | 0.2369 | 0.2369 | 0.100 |
| Potassium Bicarbonate (stabilizer) | 4 | 4 | 1.695 |
| Phosphoric Acid (pH adjuster, to pH of 3.75-3.80) | 1.3217 | 1.3217 | 0.560 |
| Citric Acid (stabilizer) | 5.2446 | 5.2446 | 2.222 |
| Sucralose (sweetener) | 0.0242 | 0.0242 | 0.010 |
| Total | 236 | 236 | 100 | b. Peach Mango Water

Table 23 below sets forth the ingredients to make an 8 ounce batch (8 oz. serving size) of Peach Mango water containing 32 mg EPA DHA, 2 mg resveratrol and 1,000 IU Vitamin D3, per 8 ounce serving.

TABLE 23

Peach Mango Water

| Ingredient | g per batch | g per serving | Percent (by weight) |
|---|---|---|---|
| Water | 222.8447 | 222.8447 | 94.43 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Peach Mango Flavor (F0079) (flavor) | 0.2966 | 0.2966 | 0.126 |
| Peach (PH-147) Mission (flavor) | 0.388 | 0.388 | 0.164 |
| Citric Acid (stabilizer) | 5.2446 | 5.2446 | 2.222 |

TABLE 23-continued

| | Peach Mango Water | | |
|---|---|---|---|
| Ingredient | g per batch | g per serving | Percent (by weight) |
| Potassium Bicarbonate (stabilizer) | 4 | 4 | 1.695 |
| Phosphoric Acid (pH adjuster, to pH of 3.75-3.80) | 1.3069 | 1.3069 | 0.554 |
| Sucralose (sweetener) | 0.0242 | 0.0242 | 0.010 |
| Total | 236 | 236 | 100 | c. Citrus Water

Table 24 below sets forth the ingredients to make an 8 ounce batch (8 oz. serving size) of Citrus water containing 32 mg EPA DHA, 50 mg coenzyme Q10 and 1,000 IU Vitamin D3, per 8 ounce serving.

TABLE 24

| | Citrus Water | | |
|---|---|---|---|
| Ingredient | g per batch | g per serving | Percent (by weight) |
| Water | 221.7185 | 221.7185 | 93.95 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Citrus Flavor (F4721) (flavor) | 0.324000 | 0.324 | 0.137 |
| Potassium Bicarbonate (stabilizer) | 4 | 4 | 1.695 |
| Phosphoric Acid (pH adjuster, to pH of 3.75-3.80) | 2.5787 | 2.5787 | 1.093 |
| Citric Acid (stabilizer) | 5.2446 | 5.2446 | 2.222 |
| Sucralose (sweetener) | 0.0242 | 0.0242 | 0.010 |
| Total | 236 | 236 | 100 | d. Peach Mango Water

Table 25 below sets forth the ingredients to make an 8 ounce batch (8 oz. serving size) of Peach Mango water containing 32 mg EPA DHA, 50 mg coenzyme Q10 and 1,000 IU Vitamin D3, per 8 ounce serving.

TABLE 25

| | Peach Mango Water | | |
|---|---|---|---|
| Ingredient | g per batch | g per serving | Percent (by weight) |
| Water | 222.0136 | 222.0136 | 94.07 |
| Cherry Juice Concentrate | 0.72 | 0.72 | 0.305 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Peach (PH-147) (flavor) | 0.3880 | 0.3880 | 0.164 |
| Peach Mango (F0079) | 0.2966 | 0.2966 | 0.126 |
| Potassium Bicarbonate (stabilizer) | 4 | 4 | 1.695 |
| Phosphoric Acid (pH adjuster, to pH of 3.75-3.80) | 1.2030 | 1.203 | 0.510 |
| Citric Acid (stabilizer) | 5.2446 | 5.2446 | 2.222 |
| Sucralose (sweetener) | 0.0242 | 0.0242 | 0.010 |
| Total | 236 | 236 | 100 |

6. Waters Containing 4 g Bicarbonate and 2.2446 g Citric Acid

The formulation below contains 4 g potassium bicarbonate and 2.2446 g citric acid. Each water was generated as described in Section A above.

a. Peach Mango Water

Table 26 below sets forth the ingredients to make an 32800 ounce batch (8 oz. serving size) of Peach Mango water containing 250 mg EPA DHA, 50 mg coenzyme Q10 and 1,000 IU Vitamin D3, per 8 ounce serving.

TABLE 26

Peach Mango Water

| Ingredient | g per batch | g per serving | Percent (by weight) |
|---|---|---|---|
| Water | 890468.75 | 217.1875 | 92.029 |
| Cherry Juice Concentrate | 2952 | 0.72 | 0.305 |
| Fish Oil Concentrate (Omega-3, 3% EPA DHA) (non-polar active ingredient) | 32800 | 8 | 3.390 |
| Vitamin D3 concentrate (100,000 IU/g) (non-polar active ingredient) | 41 | 0.01 | 0.004 |
| Coenzyme Q10 concentrate (5%) (non-polar active ingredient) | 4100 | 1 | 0.424 |
| Peach (PH-147) (flavor) | 1590.8000 | 0.388 | 0.164 |
| Peach Mango (F0079) | 1216.0600 | 0.2966 | 0.126 |
| Potassium Bicarbonate (stabilizer) | 16400 | 4 | 1.695 |
| Phosphoric Acid (pH adjuster, to pH of 3.75-3.80) | 8575.1500 | 2.0915 | 0.886 |
| Citric Acid (stabilizer) | 9202.86 | 2.2446 | 0.951 |
| Sucralose (sweetener) | 253.38 | 0.0618 | 0.026 |
| Total | 967600 | 236 | 100 |

C. Flavored Waters Containing Potassium Bicarbonate, Citric Acid and Vitamin C

The flavored waters set forth in Tables 27-39 below contain varying amounts of potassium bicarbonate, citric acid and vitamin C.

1. Waters Containing 3 g Bicarbonate, 2.2446 g Citric Acid and 0.12 g Vitamin C

The formulations below contain 3 g potassium bicarbonate, 2.2446 g citric acid and 0.12 g vitamin C (ascorbic acid). Each water was generated as described in Section A above.

a. Pomegranate Blueberry Water

Table 27 below sets forth the ingredients to make an 8 ounce batch (8 oz. serving size) of Pomegranate Blueberry water containing 68 mg ALA, 32 mg EPA DHA, 1,000 IU Vitamin D3, 100% RDI of Vitamin B12 and 120% RDI of Vitamin C, per 8 ounce serving.

TABLE 27

Pomegranate Blueberry Water

| Ingredient | g per batch | g per serving | Percent (by weight) |
|---|---|---|---|
| Water | 226.1351976 | 226.1351976 | 95.82 |
| Blueberry juice concentrate (Schare & Assoc.) | 0.7200 | 0.7200 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Pomegranate Grape (FO233) (flavor) | 0.2020 | 0.2020 | 0.086 |
| Vitamin C (Ascorbic Acid) (stabilizer) (non-polar active ingredient) | 0.12 | 0.12 | 0.051 |
| Potassium Bicarbonate (stabilizer) | 3 | 3 | 1.271 |
| Phosphoric Acid (pH adjuster, to pH of 3.75-3.80) | 1.0640 | 1.0640 | 0.451 |
| Citric Acid (stabilizer) | 2.2446 | 2.2446 | 0.951 |
| Sucralose (sweetener) | 0.0242 | 0.0242 | 0.010 |
| Total | 236 | 236 | 100 | b. Tropical Berry Water

Table 28 below sets forth the ingredients to make an 8 ounce batch (8 oz. serving size) of Tropical Berry water containing 68 mg ALA, 32 mg EPA DHA, 1,000 IU Vitamin D3, 100% RDI of Vitamin B12 and 120% RDI of Vitamin C, per 8 ounce serving.

TABLE 28

Tropical Berry Water

| Ingredient | g per batch | g per serving | Percent (by weight) |
|---|---|---|---|
| Water | 225.8717976 | 225.8717976 | 95.71 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Mixed Berry Flavor (F3090) (flavor) | 0.3039 | 0.3039 | 0.129 |
| Vitamin C (Ascorbic Acid) (stabilizer) (non-polar active ingredient) | 0.12 | 0.12 | 0.051 |
| Potassium Bicarbonate (stabilizer) | 3 | 3 | 1.271 |
| Phosphoric Acid (pH adjuster, to pH of 3.75-3.80) | 1.2255 | 1.2255 | 0.519 |
| Citric Acid (stabilizer) | 2.2446 | 2.2446 | 0.951 |
| Sucralose (sweetener) | 0.0242 | 0.0242 | 0.010 |
| Total | 236 | 236 | 100 | c. Mixed Berry Water

Table 29 below sets forth the ingredients to make an 8 ounce batch (8 oz. serving size) of Mixed Berry flavored water containing 32 mg EPA DHA, 2 mg resveratrol, 1,000 IU Vitamin D3 and 120 RDI of Vitamin C, per 8 ounce serving.

TABLE 29

Mixed Berry Water

| Ingredient | g per batch | g per serving | Percent (by weight) |
|---|---|---|---|
| Water | 227.358 | 227.358 | 96.34 |
| Blueberry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Mixed Berry Flavor (F3090) (flavor) | 0.3039 | 0.3039 | 0.129 |
| Vitamin C (Ascorbic Acid) (stabilizer) (non-polar active ingredient) | 0.12 | 0.12 | 0.051 |
| Citric Acid (stabilizer) | 2.2446 | 2.2446 | 0.951 |
| Potassium Bicarbonate (stabilizer) | 3 | 3 | 1.271 |
| Phosphoric Acid (pH adjuster, to pH of 3.75-3.80) | 1.0543 | 1.0543 | 0.447 |
| Sucralose (sweetener) | 0.0242 | 0.0242 | 0.010 |
| Total | 236 | 236 | 100 | d. Peach Mango Water

Table 30 below sets forth the ingredients to make an 8 ounce batch (8 oz. serving size) of Peach Mango water containing 32 mg EPA DHA, 2 mg resveratrol, 1,000 IU Vitamin D3 and 120% RDI of Vitamin C, per 8 ounce serving.

TABLE 30

Peach Mango Water

| Ingredient | g per batch | g per serving | Percent (by weight) |
|---|---|---|---|
| Water | 226.9125 | 226.9125 | 96.15 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Vitamin C (Ascorbic Acid) (stabilizer) (non-polar active ingredient) | 0.12 | 0.12 | 0.051 |
| Peach Mango Flavor (F0079) (flavor) | 0.2966 | 0.2966 | 0.126 |
| Peach (PH-147) Mission (flavor) | 0.388 | 0.388 | 0.164 |
| Citric Acid (stabilizer) | 2.2446 | 2.2446 | 0.951 |
| Potassium Bicarbonate (stabilizer) | 3 | 3 | 1.271 |
| Phosphoric Acid (pH adjuster, to pH of 3.75-3.80) | 1.1191 | 1.1191 | 0.474 |
| Sucralose (sweetener) | 0.0242 | 0.0242 | 0.010 |
| Total | 236 | 236 | 100 | e. Citrus Water

Table 31 below sets forth the ingredients to make an 8 ounce batch (8 oz. serving size) of Citrus water containing 32 mg EPA DHA, 50 mg coenzyme Q10, 1,000 IU Vitamin D3 and 120% RDI Vitamin C, per 8 ounce serving.

TABLE 31

Citrus Water

| Ingredient | g per batch | g per serving | Percent (by weight) |
|---|---|---|---|
| Water | 226.0857 | 226.0857 | 95.80 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |
| Coenzyme Q10 concentrate (5%) (non-polar active ingredient) | 1 | 1 | 0.424 |
| Vitamin C (Ascorbic Acid) | 0.12 | 0.12 | 0.051 |
| Citrus Flavor (F4721) (flavor) | 0.32400 | 0.324 | 0.137 |
| Potassium Bicarbonate (stabilizer) | 3 | 3 | 1.271 |
| Phosphoric Acid (pH adjuster, to pH of 3.75-3.80) | 2.0915 | 2.0915 | 0.886 |
| Citric Acid (stabilizer) | 2.2446 | 2.2446 | 0.951 |
| Sucralose (sweetener) | 0.0242 | 0.0242 | 0.010 |
| Total | 236 | 236 | 100 | f. Peach Mango Water

Table 32 below sets forth the ingredients to make an 8 ounce batch (8 oz. serving size) of Peach Mango water containing 32 mg EPA DHA, 50 mg coenzyme Q10, 1,000 IU Vitamin D3 and 120% RDI Vitamin C, per 8 ounce serving.

TABLE 32

Peach Mango Water

| Ingredient | g per batch | g per serving | Percent (by weight) |
|---|---|---|---|
| Water | 226.0586 | 226.0586 | 95.79 |
| Cherry Juice Concentrate | 0.72 | 0.72 | 0.305 |
| Fish Oil Concentrate (Omega-3, 3% EPA DHA) (non-polar active ingredient) | 1.1 | 1.1 | 0.466 |
| Vitamin D3 concentrate (100,000 IU/g) (non-polar active ingredient) | 0.01 | 0.01 | 0.004 |

TABLE 32-continued

| Peach Mango Water | | | |
|---|---|---|---|
| Ingredient | g per batch | g per serving | Percent (by weight) |
| Coenzyme Q10 concentrate (5%) (non-polar active ingredient) | 1 | 1 | 0.424 |
| Peach (PH-147) (flavor) | 0.3880 | 0.3880 | 0.164 |
| Peach Mango (F0079) | 0.2966 | 0.2966 | 0.126 |
| Vitamin C (Ascorbic Acid) | 0.12 | 0.12 | 0.051 |
| Potassium Bicarbonate (stabilizer) | 3 | 3 | 1.271 |
| Phosphoric Acid (pH adjuster, to pH of 3.75-3.80) | 1.0380 | 1.0380 | 0.440 |
| Citric Acid (stabilizer) | 2.2446 | 2.2446 | 0.951 |
| Sucralose (sweetener) | 0.0242 | 0.0242 | 0.010 |
| Total | 236 | 236 | 100 |

2. Waters Containing 3.3 g Bicarbonate, 2.4446 g Citric Acid and 0.125 g Vitamin C The formulations below contain 3.3 g potassium bicarbonate, 2.2446 g citric acid and 0.125 g vitamin C (ascorbic acid). Each water was generated as described in Section A above.

a. Pomegranate Blueberry Water

Table 33 below sets forth the ingredients to make a 32800 ounce batch (8 oz. serving size, 4100 servings) of Pomegranate Blueberry water containing 68 mg ALA, 32 mg EPA DHA, 1,000 IU Vitamin D3, 100% RDI of Vitamin B12 and 120% RDI of Vitamin C, per 8 ounce serving.

TABLE 33

| Pomegranate Blueberry Water | | | |
|---|---|---|---|
| Ingredient | g per batch | g per serving | Percent (by weight) |
| Water | 925622.5502 | 225.761597600 | 95.66 |
| Vitamin D3 concentrate (100,000 IU/g) (non-polar active ingredient) | 41 | 0.01 | 0.004 |
| Fish Oil Concentrate (Omega-3, 3% EPA DHA) (non-polar active ingredient) | 4510 | 1.1 | 0.466 |
| Flaxseed oil concentrate (Omega-3, 5% ALA) (non-polar active ingredient) | 5658 | 1.38 | 0.585 |
| Vitamin B12 (2.4 mcg) (non-polar active ingredient) | 0.00984 | 0.0000024 | 0.00000102 |
| Pomegranate Grape (FO233) (flavor) | 828.2000 | 0.2020 | 0.086 |
| Natural Blackberry Flavor (#125-00875) (flavor) | 1957.3400 | 0.4774 | 0.202 |
| Vanilla Flavor (VA-158) (flavor) | 410.0000 | 0.1 | 0.042 |
| Vitamin C (Ascorbic Acid) (stabilizer) (non-polar active ingredient) | 512.5 | 0.125 | 0.053 |
| Potassium Bicarbonate (stabilizer) | 13530 | 3.3 | 1.398 |
| Phosphoric Acid (pH adjuster, to pH of 3.75-3.80) | 4362.4000 | 1.0640 | 0.451 |
| Citric Acid (stabilizer) | 10022.86 | 2.4446 | 1.036 |
| Sucralose (sweetener) | 145.14 | 0.0354 | 0.015 |
| Total | 967600 | 236 | 100 | b. Mixed Berry Water

Table 34 below sets forth the ingredients to make a 32800 ounce batch (8 oz. serving size, 4100 servings) of Tropical Berry water containing 68 mg ALA, 32 mg EPA DHA, 1,000 IU Vitamin D3, 100% RDI of Vitamin B12 and 120% RDI of Vitamin C, per 8 ounce serving.

TABLE 34

| Tropical Berry Water | | | |
|---|---|---|---|
| Ingredient | g per batch | g per serving | Percent (by weight) |
| Water | 920949.5752 | 224.621847600 | 95.18 |
| Cherry Juice Concentrate | 2952 | 0.72 | 0.305 |
| Vitamin D3 concentrate (100,000 IU/g) (non-polar active ingredient) | 41 | 0.01 | 0.004 |
| Fish Oil Concentrate (Omega-3, 3% EPA DHA) (non-polar active ingredient) | 4510 | 1.1 | 0.466 |

TABLE 34-continued

| Tropical Berry Water | | | |
|---|---|---|---|
| Ingredient | g per batch | g per serving | Percent (by weight) |
| Flaxseed oil concentrate (Omega-3, 5% ALA) (non-polar active ingredient) | 5658 | 1.38 | 0.585 |
| Vitamin B12 (2.4 mcg) (non-polar active ingredient) | 0.00984 | 0.0000024 | 0.00000102 |
| Mixed Berry Flavor (F3090) (flavor) | 3159.4600 | 0.7706 | 0.327 |
| Mixed berry Flavor (MB-106) (flavor) | 684.9050 | 0.16705 | 0.071 |
| Vanilla Flavor (VA-158) (flavor) | 410.0000 | 0.1 | 0.042 |
| Vitamin C (Ascorbic Acid) (stabilizer) (non-polar active ingredient) | 512.5 | 0.125 | 0.053 |
| Potassium Bicarbonate (stabilizer) | 13530 | 3.3 | 1.398 |
| Phosphoric Acid (pH adjuster, to pH of 3.75-3.80) | 5024.5500 | 1.2255 | 0.519 |
| Citric Acid (stabilizer) | 10022.86 | 2.4446 | 1.036 |
| Sucralose (sweetener) | 145.14 | 0.0354 | 0.015 |
| Total | 967600 | 236 | 100 |

3. Waters Containing 4 g Bicarbonate, 2.2446 g Citric Acid and 0.12 g Vitamin C

The formulations below contain 4 g potassium bicarbonate, 2.2446 g citric acid and 0.12 g vitamin C (ascorbic acid). Each water was generated as described in Section A above.

a. Pomegranate Blueberry Water

Table 35 below sets forth the ingredients to make an 8 ounce batch (8 oz. serving size) of Pomegranate Blueberry water containing 68 mg ALA, 32 mg EPA DHA, 1,000 IU Vitamin D3, 100% RDI of Vitamin B12 and 120% RDI of Vitamin C, per 8 ounce serving.

TABLE 35

| Pomegranate Blueberry Water | | | |
|---|---|---|---|
| Ingredient | g per batch | g per serving | Percent (by weight) |
| Water | 225.1351976 | 225.1351976 | 95.40 |
| Blueberry juice concentrate (Schare & Assoc.) | 0.7200 | 0.7200 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Pomegranate Grape (FO233) (flavor) | 0.2020 | 0.2020 | 0.086 |
| Vitamin C (Ascorbic Acid) (stabilizer) (non-polar active ingredient) | 0.12 | 0.12 | 0.051 |
| Potassium Bicarbonate (stabilizer) | 4 | 4 | 1.695 |
| Phosphoric Acid (pH adjuster, to pH of 335-3.80) | 1.0640 | 1.0640 | 0.451 |
| Citric Acid (stabilizer) | 2.2446 | 2.2446 | 0.951 |
| Sucralose (sweetener) | 0.0242 | 0.0242 | 0.010 |
| Total | 236 | 236 | 100 | b. Tropical Berry Water

Table 36 below sets forth the ingredients to make an 8 ounce batch (8 oz. serving size) of Tropical Berry water containing 68 mg ALA, 32 mg EPA DHA, 1,000 IU Vitamin D3, 100% RDI of Vitamin B12 and 120% RDI of Vitamin C, per 8 ounce serving.

TABLE 36

| Tropical Berry Water | | | |
|---|---|---|---|
| Ingredient | g per batch | g per serving | Percent (by weight) |
| Water | 224.8717976 | 224.8717976 | 95.28 |
| Cherry Juice Concentrate | 0.72 | 0.72 | 0.305 |
| Vitamin D3 concentrate (100,000 IU/g) (non-polar active ingredient) | 0.01 | 0.01 | 0.004 |

TABLE 36-continued

Tropical Berry Water

| Ingredient | g per batch | g per serving | Percent (by weight) |
|---|---|---|---|
| Fish Oil Concentrate (Omega-3, 3% EPA DHA) (non-polar active ingredient) | 1.1 | 1.1 | 0.466 |
| Flaxseed oil concentrate (Omega-3, 5% ALA) (non-polar active ingredient) | 1.38 | 1.38 | 0.585 |
| Vitamin B12 (2.4 mcg) (non-polar active ingredient) | 0.0000024 | 0.0000024 | 0.00000102 |
| Mixed Berry Flavor (F3090) (flavor) | 0.3039 | 0.3039 | 0.129 |
| Vitamin C (Ascorbic Acid) (stabilizer) (non-polar active ingredient) | 0.12 | 0.12 | 0.051 |
| Potassium Bicarbonate (stabilizer) | 4 | 4 | 1.695 |
| Phosphoric Acid (pH adjuster, to pH of 3.75-3.80) | 1.2255 | 1.2255 | 0.519 |
| Citric Acid (stabilizer) | 2.2446 | 2.2446 | 0.951 |
| Sucralose (sweetener) | 0.0242 | 0.0242 | 0.010 |
| Total | 236 | 236 | 100 | c. Mixed Berry Water

Table 37 below sets forth the ingredients to make an 8 ounce batch (8 oz. serving size) of Mixed Berry flavored water containing 32 mg EPA DHA, 2 mg resveratrol, 1,000 IU Vitamin D3 and 120 RDI of Vitamin C, per 8 ounce serving.

TABLE 37

Mixed Berry Water

| Ingredient | g per batch | g per serving | Percent (by weight) |
|---|---|---|---|
| Water | 226.358 | 226.358 | 95.91 |
| Blueberry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Mixed Berry Flavor (F3090) (flavor) | 0.3039 | 0.3039 | 0.129 |
| Vitamin C (Ascorbic Acid) (stabilizer) (non-polar active ingredient) | 0.12 | 0.12 | 0.051 |
| Citric Acid (stabilizer) | 2.2446 | 2.2446 | 0.951 |
| Potassium Bicarbonate (stabilizer) | 4 | 4 | 1.695 |
| Phosphoric Acid (pH adjuster, to pH of 3.75-3.80) | 1.0543 | 1.0543 | 0.447 |
| Sucralose (sweetener) | 0.0242 | 0.0242 | 0.010 |
| Total | 236 | 236 | 100 | d. Peach Mango Water

Table 38 below sets forth the ingredients to make an 8 ounce batch (8 oz. serving size) of Peach Mango water containing 32 mg EPA DHA, 2 mg resveratrol, 1,000 IU Vitamin D3 and 120% RDI of Vitamin C, per 8 ounce serving.

TABLE 38

Peach Mango Water

| Ingredient | g per batch | g per serving | Percent (by weight) |
|---|---|---|---|
| Water | 225.9125 | 225.9125 | 95.73 |
| Cherry Juice Concentrate | 0.72 | 0.72 | 0.305 |
| Vitamin D3 concentrate (100,000 IU/g) (non-polar active ingredient) | 0.01 | 0.01 | 0.004 |
| Fish Oil Concentrate (Omega-3, 3% EPA DHA) (non-polar active ingredient) | 1.1 | 1.1 | 0.466 |
| Resveratrol concentrate (4%) (non-polar active ingredient) | 0.065 | 0.065 | 0.028 |
| Vitamin C (Ascorbic Acid) (stabilizer) (non-polar active ingredient) | 0.12 | 0.12 | 0.051 |

TABLE 38-continued

Peach Mango Water

| Ingredient | g per batch | g per serving | Percent (by weight) |
|---|---|---|---|
| Peach Mango Flavor (F0079) (flavor) | 0.2966 | 0.2966 | 0.126 |
| Peach (PH-147) Mission (flavor) | 0.388 | 0.388 | 0.164 |
| Citric Acid (stabilizer) | 2.2446 | 2.2446 | 0.951 |
| Potassium Bicarbonate (stabilizer) | 4 | 4 | 1.695 |
| Phosphoric Acid (pH adjuster, to pH of 3.75-3.80) | 1.1191 | 1.1191 | 0.474 |
| Sucralose (sweetener) | 0.0242 | 0.0242 | 0.010 |
| Total | 236 | 236 | 100 |

4. Waters Containing 4 g Bicarbonate, 2.4446 g Citric Acid and 0.125 g Vitamin C The formulation below contains 4 g potassium bicarbonate, 2.4446 g citric acid and 0.125 g vitamin C (ascorbic acid). Each water was generated as described in Section A above.

a. Pomegranate Blueberry Water

Table 39 below sets forth the ingredients to make an 48 ounce batch (8 oz. serving size) of Pomegranate Blueberry water containing 250 mg EPA DHA, 1,000 IU Vitamin D3, 100% RDI of Vitamin B12 and 120% RDI of Vitamin C, per 8 ounce serving.

TABLE 39

Pomegranate Blueberry Water

| Ingredient | g per batch | g per serving | Percent (by weight) |
|---|---|---|---|
| Water | 1318.364086 | 219.727347600 | 93.105 |
| Vitamin D3 concentrate (100,000 IU/g) (non-polar active ingredient) | 0.06 | 0.01 | 0.004 |
| Fish Oil Concentrate (Omega-3, 3% EPA DHA) (non-polar active ingredient) | 48.6 | 8.1 | 3.432 |
| Vitamin B12 (2.4 mcg) (non-polar active ingredient) | 0.0000144 | 0.0000024 | 0.00000102 |
| Pomegranate Grape (FO233) (flavor) | 1.2120 | 0.202 | 0.086 |
| Natural Blackberry (125-00875) (flavor) | 1.3893 | 0.23155 | 0.098 |
| Banana (146) (flavor) | 0.3606 | 0.0601 | 0.025 |
| Vitamin C (Ascorbic Acid) (stabilizer) (non-polar active ingredient) | 0.75 | 0.125 | 0.053 |
| Potassium Bicarbonate (stabilizer) | 24 | 4 | 1.695 |
| Phosphoric Acid (pH adjuster, to pH of 3.75-3.80) | 6.3840 | 1.064 | 0.451 |
| Citric Acid (stabilizer) | 14.6676 | 2.4446 | 1.036 |
| Sucralose (sweetener) | 0.2124 | 0.0354 | 0.015 |
| Total | 1416 | 236 | 100 |

Example 3

Stability

In this example, the stability, or shelf life, of various water formulations was assessed according to ICH (International Conference on Harmonisation of Technical Requirements for Registration of Pharmaceuticals for Human Use, www.ich.org) stability test guidelines (see Table 40 below). In general, the flavored waters were maintained at a temperature of 25° C. with 65% relative humidity for a period of at least 12 months. At various time points, the stability of the waters was evaluated by examining physical, chemical, biological and microbiological properties. Alternatively, testing was accelerated by maintaining a temperature of 40° C. with 75% relative humidity for a period of at least 6 months. Seven weeks monitoring under accelerated conditions can be extrapolated to 1 year under long term conditions. The environment chamber for accelerated testing was a testing chamber (Model PRA-1AP, Serial #2980 from Tabai Espec Corp.) maintained at 40±1° C. with 75±5% relative humidity. At least 3 samples were tested per product and control samples that did not contain fish oil concentrate were also evaluated.

TABLE 40

ICH Stability Testing Guidelines

| | Temperature (° C.) | Relative Humidity (%) | Time (minimum) | Testing Intervals |
|---|---|---|---|---|
| Long Term | 25 ± 2 | 65 ± 5 | 12 months | 0, 6, 12, 18, 24, 36 months |
| Accelerated | 40 ± 2 | 75 ± 5 | 6 months | 0, 1, 2, 4, 8, 12, 18, 24 weeks |

Six different formulations, including Pomegranate Blueberry Water Example 2.C.2.a, Mixed Berry Water Example 2.C.2.b, Mixed Berry Water Example 2.C.1.c, Peach Mango Water Example 2.C.1.d, Citrus Water Example 2.B.3.e, and Peach Mango Water Example 2.B.3.d, were tested for 21 and 42 days under accelerated conditions to equal 6 months and 1 year, respectively, per ICH guidelines. The results are set forth in Table 41 below, which sets forth the flavor notes on a scale from 0-10, with 0 being no note detected, 1 corresponding to low levels detected and 10 corresponding to high levels detected. None of the sampled water formulations had an off taste associated with oxidized omega-3 DHA and EPA. All formulations were free from separation or precipitation. Samples 1-4 were transparent and sample 5-6 were transparent to cloudy. All samples were the same at the end of the study as compared to the beginning of the study. No difference were observed between control samples and samples containing omega-3 DHA and EPA after 21 days or 42 days under accelerated conditions.

2.C.4.a above, respectively, were stable for 21 days under accelerated conditions, corresponding to 6 months, with no of fishy smell or taste.

Example 4

Cranberry Berry Shot

Table 42 below sets forth ingredients to make a 2 ounce cranberry berry shot containing 175 mg omega-3 EPA & DHA. The shot was generated as described in Example 2A above and contained the algal oil concentrate set forth in Table 3.

TABLE 42

Cranberry Berry Shot

| Ingredient | g per batch | mg per serving | Percent (by weight) |
|---|---|---|---|
| Water | 2190.9 | 43817.62 | 73.029 |
| Algal Oil Concentrate (Omega-3, 3.5% EPA DHA) (non-polar active ingredient) | 250.0 | 5000.00 | 8.333 |
| Cherry Juice Concentrate | 10.6 | 2012.00 | 3.353 |
| Vitamin C (Ascorbic Acid) (stabilizer) (non-polar active ingredient) | 6.3 | 125.000 | 0.208 |
| Potassium Bicarbonate (stabilizer) | 150.0 | 3000.00 | 5.000 |
| Phosphoric Acid (pH adjuster, to pH of 3.75-3.80) | 82.350 | 1647.000 | 2.745 |
| Sucralose (sweetener) | 2.855 | 57.100 | 0.095 |
| Citric Acid (stabilizer) | 100.780 | 2015.6 | 3.359 |
| Mixed Berry Flavor (MB-106) (flavor) | 3.7750 | 75.50 | 0.126 |
| Cranberry Juice Extract | 50.600 | 1012.0 | 1.687 |
| Mixed Berry Flavor (F-3090) (flavor) | 5.575 | 111.5 | 0.186 |
| Peach Flavor (PH-147) (flavor) | 37.145 | 742.900 | 1.2382 |
| Cherry Flavor (CH-172) (flavor) | 16.8390 | 336.780 | 0.561 |
| Vanilla Flavor (VA-158) (flavor) | 2.3500 | 47.000 | 0.078 |
| Total | 3000.000 | 60000.00 | 100.000 |

TABLE 41

Stability Data

| SAMPLE | Pomegranate Blueberry 2.C.2.a Sample 1 | Mixed Berry 2.C.2.b Sample 2 | Mixed Berry 2.C.1.c Sample 3 | Peach Mango 2.C.1.d Sample 4 | Citrus 2.B.3.e Sample 5 | Peach Mango 2.B.3.d Sample 6 |
|---|---|---|---|---|---|---|
| fish smell | 0 | 0 | 0 | 0 | 0 | 0 |
| metal/iron smell | 2 | 1 | 0 | 0 | 0 | 0 |
| grass smell | 0 | 0 | 2 | 0 | 0 | 0 |
| sharp/tingling smell | 2 | 2 | 3 | 1 | 0 | 0 |
| fishy taste | 0 | 0 | 0 | 0 | 0 | 0 |
| metal/iron taste | 0 | 0 | 0 | 0 | 0 | 0 |
| grass taste | 0 | 0 | 0 | 1 | 2 | 1 |
| sharp/tingling taste | 0 | 2 | 0 | 2 | 0 | 0 |

Peach mango and pomegranate blueberry waters containing 250 mg DHA and EPA, set forth in Examples 2.B.6.a and Example 5

Cranberry Juice Containing DHA and EPA

Table 43 below sets forth ingredients to make a 500 g batch (8 oz. serving size) of Cranberry Juice containing 32 mg EPA and DHA, per 8 ounce serving. The cranberry juice was generated as described in Example 2A above and contained the fish oil concentrate set forth in Table 1.

TABLE 43

Cranberry Juice containing 32 mg DHA & EPA per serving

| Ingredient | g per batch | g per serving | Percent (by weight) |
|---|---|---|---|
| Water | 423.637 | 199.961 | 84.727 |
| Fish Oil Concentrate (Omega-3, 3% EPA DHA) (non-polar active ingredient) | 2.160 | 1.07 | 0.432 |
| Sucrose (sweetener) | 49.915 | 23.560 | 9.983 |
| Cranberry Concentrate (flavor) | 19.858 | 9.373 | 3.972 |
| Vitamin C (Ascorbic Acid) (stabilizer) | 0.206 | 0.0972 | 0.041 |
| Citric Acid (stabilizer) | 3.362 | 1.587 | 0.672 |
| Potassium Bicarbonate (stabilizer) | 0.863 | 0.407 | 0.173 |
| Total | 500 | 236 | 100 |

Example 6

Omega-3 Encapsulated Powder

In this example, an omega-3 encapsulated powder was generated. First, a fish oil solid concentrate was generated containing 9.6% omega-3 EPA and DHA. The solid concentrate was then used to generate a pre-spray emulsion that was spray dried to form a powder containing 3% EPA and DHA.

A. Fish Oil Solid Concentrate Containing 9.6% Omega-3 EPA & DHA

Table 44 below sets forth the ingredients used to make a fish oil solid concentrate containing 9.6% omega-3 EPA and DHA. The fish oil was a fish oil containing about 30% DHA/EPA (sold under the name Omega 30 TG Food Grade (Non-GMO) MEG-3™ Fish Oil by Ocean Nutrition Canada Limited, Nova Scotia, Mass.).

The ingredients added to an oil phase vessel (a Pyrex® beaker), and mixed using a standard mixer (IKA® model No. RE-16 1S, which is an overhead mixer (laboratory stirrer) compatible with the bench-top process) and heated to 60° C. with a hot plate (a Thermolyne hot Plate Model # SP46615, Barnstead International, Dubuque, Iowa) until dissolved. A temperature meter (temperature probe (Model # DPP400W, Cooper-Atkins)) was used to evaluate (measure) the temperature of the oil phase. A reversible homogenizer (Arde Barinco, Inc.; Model CJ-4E) was placed in the water phase vessel and turned on at 850-1200 RPM and the oil phase was sheared until homogeneous at 60° C. and then packaged into containers. The product becomes a solid or semi-solid at room temperature.

TABLE 44

Fish Oil Solid Concentrate

| Ingredient | g per batch | mg per serving | Percent (by weight) |
|---|---|---|---|
| Tocopherol Polyethylene Glycol Succinate (surfactant) | 773.24 | 297.4 | 59.48 |
| Benzyl alcohol (preservative) | 6.50 | 2.5 | 0.5 |
| Omega 30 TG Food Grade (Non-GM) MEG-3 ™ Fish Oil (non-polar active ingredient) | 520.26 | 200.1 | 40.02 |
| Total | 1300 | 500 | 100 |

B. Pre-Spray Emulsion Containing 3% EPA & DHA

Table 45 sets forth ingredients used to make a pre-spray emulsion containing 3% omega-3 EPA and DHA. The water phase ingredients maltodextrin, potassium bicarbonate and citric acid were added to the water phase vessel (a Pyrex® beaker) and mixed using a standard mixer (IKA® model No. RE-16 1S, which is an overhead mixer (laboratory stirrer) compatible with the bench-top process) while heating at 60° C. with a hot plate (a Thermolyne hot Plate Model # SP46615, Barnstead International, Dubuque, Iowa). The fish oil solid concentrate prepared in section A was added to an oil phase vessel (a Pyrex® beaker), heated to 60° C. with a hot plate and mixed. The oil phase was filtered before homogenizing with the water phase. The emulsion was formed by adding the oil phase into the water mixture while shearing with a reversible homogenizer (Arde Barinco, Inc.; Model CJ-4E) turned on at 850-1200 RPM. An additional 960 g of water preheated to 35° C. was then added to the emulsion to account for evaporation. The resulting emulsion was cooled to 35° C. and packaged into containers.

TABLE 45

Pre-Spray Emulsion

| Ingredient | Phase | Percent (by weight) of concentrate | g/batch |
|---|---|---|---|
| Water | Water | 56.859 | 4548.73 |
| Citric Acid (stabilizer) | Water | 0.133 | 10.6652 |
| Maltodextrin | Water | 12.132 | 970.54 |
| Potassium Bicarbonate (stabilizer) | Water | 16.664 | 1333.16 |
| Fish Oil Solid Concentrate (9.6% EPA & DHA) (non-polar active ingredient) | Oil | 14.211 | 1136.92 |
| Totals | | 100 | 8000 |

C. Omega-3 Encapsulated Powder

The pre-spray emulsion formed in section B above was spray dried resulting in an omega-3 encapsulated powder containing 3% EPA and DHA (set forth in Table 46 below).

TABLE 46

Omega-3 Encapsulated Powder

| Ingredient | Percent (by weight) | g/batch |
|---|---|---|
| Citric Acid (stabilizer) | 0.31 | 10.6652 |
| Maltodextrin | 28.12 | 970.54 |
| Potassium Bicarbonate (stabilizer) | 38.63 | 1333.16 |
| Fish Oil Solid Concentrate (9.6% EPA & DHA) (non-polar active ingredient) | 32.94 | 1136.92 |
| Totals | 100 | 3451 |

Example 7

Flavored Waters

In this example, flavored waters (see Tables 47-56 below) were generated and contain omega-3 polyunsaturated fatty acids, from fish oil, and vitamin D3. Each of the waters contained bicarbonate and citric acid as a stabilizing system for the non-polar active ingredients. Each of the waters was prepared as described in Example 2A above. The ingredients in the exemplified water compositions included:

Non-polar active ingredients, including: Fish oil concentrate, containing 2% omega-3 EPA & DHA, described in Example 1G above;

Potassium bicarbonate, produced by Armand Products Company, distributed by Stauber Performance Ingredients, Fullerton, Calif.; Citric Acid, which was anhydrous granular citric acid, from RZBC Imp. & Exp., Co., Ltd, Shandong, China;

Flavors, including blueberry pomegranate (BL-238), peach (PH-147), vanilla (VA-158), creamy custard (L-17865), watermelon (L-18628), peach mango (L-19046), pina colada (PC-113) and cherry (CH-172), all sold by Mission Flavors and Fragrances, Inc., Foothill Ranch, Calif.; and chocolate (Code 135-02418), chocolate (Code 125-13376), green tea (Code 135-02046) and pineapple (Code 030-01992) sold by Cargill; cucumber (V001) sold by Creative Flavors and Fragrances;

Xylitol, sold by Nutra Food Ingredients; Stevia Leaf Powder Extract, Product code STE091 sold by MiniStar International Inc.; An antifoaming agent that was Tramfloc 1147, sold by Tramfloc Inc, Forney, Tex.; and Water, which was city water, which was purified prior to addition to the water phase vessel, by passage through using the following purifiers, sequentially in the following order: a charcoal filter, a particle filter, a water softener, a reverse osmosis purifier, a UV sterilizer and an end-point filter (a 50 micron end-point filter).

a. Blueberry Pomegranate Water

Table 47 below sets forth the ingredients to make a 1100 g batch (10 oz. serving size) of Pomegranate Blueberry water containing 32 mg EPA DHA, and 1,000 IU Vitamin D3, per 10 ounce serving.

TABLE 47

Blueberry Pomegranate Water

| Ingredient | g per batch | mg per serving | Percent (by weight) |
| --- | --- | --- | --- |
| Water | 1049.3 | 282353.2 | 95.390 |
| Vitamin D3 concentrate (100,000 IU/g) (non-polar active ingredient) | 0.0386 | 10.4 | 0.004 |
| Fish Oil Concentrate (Omega-3, 2% EPA DHA) (non-polar active ingredient) | 6.1318 | 1650.0 | 0.557 |
| Citric Acid (stabilizer) | 11.7990 | 3175.0 | 1.073 |
| Blueberry Pomegranate (BL-238) (flavor) | 1.3624 | 366.6 | 0.124 |
| Potassium Bicarbonate (stabilizer) | 12.26 | 3300.0 | 1.115 |
| Xylitol (sweetener) | 18.8189 | 5064.0 | 1.711 |
| Stevia Leaf Powder Extract (sweetener) | 0.3003 | 80.8 | 0.027 |
| Total | 1100 | 296000 | 100 | b. Peach Water

Table 48 below sets forth the ingredients to make a 1100 g batch (10 oz. serving size) of Peach water containing 32 mg EPA DHA, and 1,000 IU Vitamin D3, per 10 ounce serving.

TABLE 48

Peach Water

| Ingredient | g per batch | mg per serving | Percent (by weight) |
| --- | --- | --- | --- |
| Water | 1052.45473 | 283206.0 | 95.678 |
| Vitamin D3 concentrate (100,000 IU/g) (non-polar active ingredient) | 0.03865 | 10.4 | 0.004 |
| Fish Oil Concentrate (Omega-3, 2% EPA DHA) (non-polar active ingredient) | 6.13176 | 1650.0 | 0.557 |
| Citric Acid (stabilizer) | 9.08466 | 2444.6 | 0.826 |
| Peach (PH-147) (flavor) | 0.99966 | 269.0 | 0.091 |
| Potassium Bicarbonate (stabilizer) | 12.26351 | 3300.0 | 1.115 |
| Xylitol (sweetener) | 18.81892 | 5064.0 | 1.711 |
| Stevia Leaf Powder Extract (sweetener) | 0.20811 | 56.0 | 0.019 |
| Total | 1100 | 296000 | 100 | c. Cherry Chocolate Water

Table 49 below sets forth the ingredients to make a 300 g batch (10 oz. serving size) of Cherry Chocolate water containing 32 mg EPA DHA, and 1,000 IU Vitamin D3, per 10 ounce serving.

TABLE 49

Cherry Chocolate Water

| Ingredient | g per batch | mg per serving | Percent (by weight) |
| --- | --- | --- | --- |
| Water | 292.0179 | 288123.23 | 97.339 |
| Vitamin D3 concentrate (100,000 IU/g) (non-polar active ingredient) | 0.01054 | 10.4 | 0.004 |
| Fish Oil Concentrate (Omega-3, 2% EPA DHA) (non-polar active ingredient) | 1.37230 | 1650.0 | 0.557 |
| Citric Acid (stabilizer) | 2.47764 | 2444.6 | 0.826 |
| Cherry (CH-172) (flavor) | 0.21588 | 213.0 | 0.072 |
| Potassium Bicarbonate (stabilizer) | 3.34459 | 3300.0 | 1.115 |
| Chocolate (135-02418) (flavor) | 0.24426 | 241.0 | 0.081 |
| Stevia Leaf Powder Extract (sweetener) | 0.01801 | 17.77 | 0.006 |
| Total | 300 | 296000 | 100 | d. Cherry Vanilla Water

Table 50 below sets forth the ingredients to make a 100 g batch (10 oz. serving size) of Cherry Vanilla water containing 32 mg EPA DHA, and 1,000 IU Vitamin D3, per 10 ounce serving.

TABLE 50

Cherry Vanilla Water

| Ingredient | g per batch | mg per serving | Percent (by weight) |
| --- | --- | --- | --- |
| Water | 97.42913 | 2888390.23 | 97.429 |
| Vitamin D3 concentrate (100,000 IU/g) (non-polar active ingredient) | 0.00351 | 10.4 | 0.004 |
| Fish Oil Concentrate (Omega-3, 2% EPA DHA) (non-polar active ingredient) | 0.55743 | 1650.0 | 0.557 |
| Citric Acid (stabilizer) | 0.82588 | 2444.6 | 0.826 |
| Cherry (CH-172) (flavor) | 0.00574 | 213.0 | 0.006 |
| Potassium Bicarbonate (stabilizer) | 1.11486 | 3300.0 | 1.115 |
| Vanilla (VA-158) (flavor) | 0.05743 | 170.0 | 0.057 |
| Stevia Leaf Powder Extract (sweetener) | 0.00600 | 17.77 | 0.006 |
| Total | 100 | 296000 | 100 | e. Chocolate Blueberry Water

Table 51 below sets forth the ingredients to make a 300 g batch (10 oz. serving size) of Chocolate Blueberry water containing 32 mg EPA DHA, and 1,000 IU Vitamin D3, per 10 ounce serving.

TABLE 51

Chocolate Blueberry Water

| Ingredient | g per batch | mg per serving | Percent (by weight) |
| --- | --- | --- | --- |
| Water | 292.26010 | 288363.3 | 97.420 |
| Vitamin D3 concentrate (100,000 IU/g) (non-polar active ingredient) | 0.01054 | 10.4 | 0.004 |
| Fish Oil Concentrate (Omega-3, 2% EPA DHA) (non-polar active ingredient) | 1.67230 | 1650.0 | 0.557 |
| Citric Acid (stabilizer) | 2.47764 | 2444.6 | 0.826 |
| Chocolate (125-13376) (flavor) | 0.15801 | 155.9 | 0.053 |

TABLE 51-continued

Chocolate Blueberry Water

| Ingredient | g per batch | mg per serving | Percent (by weight) |
|---|---|---|---|
| Potassium Bicarbonate (stabilizer) | 3.34459 | 3300.0 | 1.115 |
| Blueberry (BL-238) (flavor) | 0.05818 | 57.4 | 0.019 |
| Stevia Leaf Powder Extract (sweetener) | 0.01865 | 18.4 | 0.006 |
| Total | 300 | 296000 | 100 | f. Chocolate Caramel Water

Table 52 below sets forth the ingredients to make a 300 g batch (10 oz. serving size) of Chocolate Caramel water containing 32 mg EPA DHA, and 1,000 IU Vitamin D3, per 10 ounce serving.

TABLE 52

Chocolate Caramel Water

| Ingredient | g per batch | mg per serving | Percent (by weight) |
|---|---|---|---|
| Water | 292.26020 | 288363.4 | 97.420 |
| Vitamin D3 concentrate (100,000 IU/g) (non-polar active ingredient) | 0.01054 | 10.4 | 0.004 |
| Fish Oil Concentrate (Omega-3, 2% EPA DHA) (non-polar active ingredient) | 1.67230 | 1650.0 | 0.557 |
| Citric Acid (stabilizer) | 2.47764 | 2444.6 | 0.826 |
| Chocolate (125-13376) (flavor) | 0.15801 | 155.9 | 0.053 |
| Potassium Bicarbonate (stabilizer) | 3.34459 | 3300.0 | 1.115 |
| Creamy custard (L-17865) (flavor) | 0.05736 | 56.6 | 0.019 |
| Stevia Leaf Powder Extract (sweetener) | 0.01865 | 18.4 | 0.006 |
| Total | 300 | 296000 | 100 | g. Cucumber Water

Table 53 below sets forth the ingredients to make a 1100 g batch (10 oz. serving size) of Cucumber water containing 32 mg EPA DHA, and 1,000 IU Vitamin D3, per 10 ounce serving.

TABLE 53

Cucumber Water

| Ingredient | g per batch | mg per serving | Percent (by weight) |
|---|---|---|---|
| Water | 1072.12106 | 288498.03 | 97.466 |
| Vitamin D3 concentrate (100,000 IU/g) (non-polar active ingredient) | 0.03902 | 10.5 | 0.004 |
| Fish Oil Concentrate (Omega-3, 2% EPA DHA) (non-polar active ingredient) | 6.13176 | 1650.0 | 0.557 |
| Citric Acid (stabilizer) | 9.09209 | 2444.6 | 0.827 |
| Cucumber Flavor (V001) (flavor) | 0.28652 | 77.1 | 0.026 |
| Potassium Bicarbonate (stabilizer) | 12.26351 | 3300.0 | 1.115 |
| Stevia Leaf Powder Extract (sweetener) | 0.06604 | 17.77 | 0.006 |
| Total | 1100 | 296000 | 100 | h. Green Tea Water

Table 53 below sets forth the ingredients to make a 6000 g batch (10 oz. serving size) of Green Tea water containing 32 mg EPA DHA, and 1,000 IU Vitamin D3, per 10 ounce serving.

TABLE 54

Green Tea Water

| Ingredient | g per batch | mg per serving | Percent (by weight) |
|---|---|---|---|
| Water | 5845.72561 | 288389.13 | 97.429 |
| Vitamin D3 concentrate (100,000 IU/g) (non-polar active ingredient) | 0.21284 | 10.5 | 0.004 |
| Fish Oil Concentrate (Omega-3, 2% EPA DHA) (non-polar active ingredient) | 33.44595 | 1650.0 | 0.557 |
| Citric Acid (stabilizer) | 49.55270 | 2444.6 | 0.826 |
| Green Tea (135-02146) (flavor) | 3.81081 | 188.0 | 0.064 |
| Potassium Bicarbonate (stabilizer) | 66.89189 | 3300.0 | 1.115 |
| Stevia Leaf Powder Extract (sweetener) | 0.36020 | 17.77 | 0.006 |
| Total | 6000 | 296000 | 100 | i. Honey-Dew Melon Water

Table 55 below sets forth the ingredients to make a 1100 g batch (10 oz. serving size) of Honey-Dew Melon water containing 32 mg EPA DHA, and 1,000 IU Vitamin D3, per 10 ounce serving.

TABLE 55

Honey-Dew Melon Water

| Ingredient | g per batch | mg per serving | Percent (by weight) |
|---|---|---|---|
| Water | 1071.42973 | 288312.0 | 97.403 |
| Vitamin D3 concentrate (100,000 IU/g) (non-polar active ingredient) | 0.03865 | 10.5 | 0.004 |
| Fish Oil Concentrate (Omega-3, 2% EPA DHA) (non-polar active ingredient) | 6.13176 | 1650.0 | 0.557 |
| Citric Acid (stabilizer) | 9.08466 | 2444.6 | 0.826 |
| Watermelon (L-18628) (flavor) | 0.20625 | 55.5 | 0.019 |
| Potassium Bicarbonate (stabilizer) | 12.26351 | 3300.0 | 1.115 |
| Peach Mango (L-19046) (flavor) | 0.77372 | 208.2 | 0.070 |
| Stevia Leaf Powder Extract (sweetener) | 0.017172 | 19.3 | 0.006 |
| Total | 1100 | 296000 | 100 | ii. Pineapple Papaya Water

Table 56 below sets forth the ingredients to make a 300 g batch (10 oz. serving size) of Pineapple Papaya water containing 32 mg EPA DHA, and 1,000 IU Vitamin D3, per 10 ounce serving.

TABLE 56

Pineapple Papaya Water

| Ingredient | g per batch | mg per serving | Percent (by weight) |
|---|---|---|---|
| Water | 292.00318 | 288109.8 | 97.334 |
| Vitamin D3 concentrate (100,000 IU/g) (non-polar active ingredient) | 0.01054 | 10.5 | 0.004 |

TABLE 56-continued

Pineapple Papaya Water

| Ingredient | g per batch | mg per serving | Percent (by weight) |
|---|---|---|---|
| Fish Oil Concentrate (Omega-3, 2% EPA DHA) (non-polar active ingredient) | 1.67230 | 1650.0 | 0.557 |
| Citric Acid (stabilizer) | 2.47764 | 2444.6 | 0.826 |
| Pineapple (030-01992) (flavor) | 0.28571 | 281.9 | 0.095 |
| Potassium Bicarbonate (stabilizer) | 3.34459 | 3300.0 | 1.115 |
| Pina Colada (PC-113) (flavor) | 0.17047 | 168.2 | 0.057 |
| Stevia Leaf Powder Extract (sweetener) | 0.03557 | 35.1 | 0.012 |
| Total | 300 | 296000 | 100 |

Example 8

Flavored Waters

In this example, flavored waters (see Tables 57-67 below) containing omega-3 polyunsaturated fatty acids, from fish oil, vitamin D3, vitamin B1, vitamin B3, vitamin B5, vitamin B6, vitamin B12, yerba mate and gingko *biloba* were prepared. The flavored waters described in tables 57-61 additionally contained *ginseng*. Each of the waters contained bicarbonate and citric acid as a stabilizing system for the non-polar active ingredients. Each of the waters was prepared as described in Example 2A.

The ingredients in the exemplified water compositions included:

Non-polar active ingredients, including: Fish oil concentrate, containing 2% omega-3 EPA & DHA, described in Example 1G above;

Potassium bicarbonate, produced by Armand Products Company, distributed by Stauber Performance Ingredients, Fullerton, Calif.; Citric Acid, which was anhydrous granular citric acid, from RZBC Imp. & Exp., Co., Ltd, Shandong, China;

Flavors, including fresh orange (L-17283), blood orange (L-17281), lime (L-8314), peach (PH-147), sold by Mission Flavors and Fragrances, Inc., Foothill Ranch, Calif.; blackberry (Code 125-00875) sold by Cargill; Peach nectarine (DABJ832), raspberry (DABJ876), lemonade (DABJ878), blueberry pomegranate (DABJ831), grape muscat (DABJ830) and orange tangerine (DABJ326), all sold by Wild Flavors, Erlanger, Ky.;

Xylitol, sold by Nutra Food Ingredients; Stevia Leaf Powder Extract, Product code STE091 sold by MiniStar International Inc.; An antifoaming agent that was Tramfloc 1147, sold by Tramfloc Inc, Forney, Tex.; and Water, which was city water, which was purified prior to addition to the water phase vessel, by passage through using the following purifiers, sequentially in the following order: a charcoal filter, a particle filter, a water softener, a reverse osmosis purifier, a UV sterilizer and an end-point filter (a 50 micron end-point filter).

A. Flavor Waters Containing Sucralose

Tables 57-62 set forth ingredients to make waters containing sucralose as a sweetener.

a. Peach Nectarine Water

Table 57 below sets forth the ingredients to make an 500 g batch (16 oz. serving size) of Peach Nectarine flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate, *Ginkgo biloba* and ginseng.

TABLE 57

Peach Nectarine Water

| Ingredient | g per batch | mg per serving | Percent (by weight) |
|---|---|---|---|
| Water | 490.17232 | 464683.3574 | 98.034 |
| Vitamin D3 concentrate (100,000 IU/g) (non-polar active ingredient) | 0.01097 | 10.4 | 0.002 |
| Fish Oil Concentrate (Omega-3, 2% EPA DHA) (non-polar active ingredient) | 2.10970 | 2000.0 | 0.422 |
| Yerba Mate 8% (non-polar active ingredient) | 0.02110 | 20.0 | 0.004 |
| Ginkgo Biloba 24/6 (non-polar active ingredient) | 0.0158228 | 15.0 | 0.003 |
| Ginseng Panax (7% HPLC, Red Korean Ginseng) (JIA Herb) (non-polar active ingredient) | 0.03165 | 30.0 | 0.006 |
| Vitamin B1 (Thiamine) + 5% (non-polar active ingredient) | 0.00068 | 0.64 | 0.00014 |
| Vitamin B3 (Niacin/Niacinamide) + 5% (non-polar active ingredient) | 0.00886 | 8.4 | 0.002 |
| Vitamin B5 (Pantothenic Acid) + 5% (non-polar active ingredient) | 0.00559 | 5.3 | 0.001 |
| Vitamin B6 + 5% (non-polar active ingredient) | 0.00148 | 1.4 | 0.0003 |
| Vitamin B12 + >5% (non-polar active ingredient) | 0.00000274 | 0.0026 | 0.0000005 |
| Peach Nectarine (DABJ832) (flavor) | 0.70992 | 673.0 | 0.142 |
| Sucralose (sweetener) | 0.08175 | 77.5 | 0.016 |
| Citric Acid (stabilizer) | 3.34916 | 3175.0 | 0.6698 |
| Potassium Bicarbonate (stabilizer) | 3.48101 | 3300.0 | 0.696 |
| Total | 500 | 474000 | 100 | b. Raspberry Lemonade Water

Table 58 below sets forth the ingredients to make an 500 g batch (16 oz. serving size) of Raspberry Lemonade flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate, *Ginkgo biloba* and ginseng.

TABLE 58

Raspberry Lemonade Water

| Ingredient | g per batch | mg per serving | Percent (by weight) |
| --- | --- | --- | --- |
| Water | 489.75038 | 464283.3574 | 97.950 |
| Vitamin D3 concentrate (100,000 IU/g) (non-polar active ingredient) | 0.01097 | 10.4 | 0.002 |
| Fish Oil Concentrate (Omega-3, 2% EPA DHA) (non-polar active ingredient) | 2.10970 | 2000.0 | 0.422 |
| Yerba Mate 8% (non-polar active ingredient) | 0.02110 | 20.0 | 0.004 |
| Ginkgo Biloba 24/6 (non-polar active ingredient) | 0.0158228 | 15.0 | 0.003 |
| Ginseng Panax (7% HPLC, Red Korean Ginseng) (JIA Herb) (non-polar active ingredient) | 0.03165 | 30.0 | 0.006 |
| Vitamin B1 (Thiamine) + 5% (non-polar active ingredient) | 0.00068 | 0.64 | 0.00014 |
| Vitamin B3 (Niacin/Niacinamide) + 5% (non-polar active ingredient) | 0.00886 | 8.4 | 0.002 |
| Vitamin B5 (Pantothenic Acid) + 5% (non-polar active ingredient) | 0.00559 | 5.3 | 0.001 |
| Vitamin B6 + 5% (non-polar active ingredient) | 0.00148 | 1.4 | 0.0003 |
| Vitamin B12 + >5% (non-polar active ingredient) | 0.00000274 | 0.0026 | 0.0000005 |
| Raspberry (DABJ876) (flavor) | 0.70992 | 673.0 | 0.142 |
| Lemonade (DABJ878) (flavor) | 0.42194 | 400.0 | 0.084 |
| Sucralose (sweetener) | 0.08175 | 77.5 | 0.016 |
| Citric Acid (stabilizer) | 3.34916 | 3175.0 | 0.6698 |
| Potassium Bicarbonate (stabilizer) | 3.48101 | 3300.0 | 0.696 |
| Total | 500 | 474000 | 100 | c. Blueberry Pomegranate Water

Table 59 below sets forth the ingredients to make an 500 g batch (16 oz. serving size) of Blueberry Pomegranate flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate, *Ginkgo biloba* and ginseng.

TABLE 59

Blueberry Pomegranate Water

| Ingredient | g per batch | mg per serving | Percent (by weight) |
| --- | --- | --- | --- |
| Water | 490.48223 | 464977.1574 | 98.096 |
| Vitamin D3 concentrate (100,000 IU/g) (non-polar active ingredient) | 0.01097 | 10.4 | 0.002 |
| Fish Oil Concentrate (Omega-3, 2% EPA DHA) (non-polar active ingredient) | 2.10970 | 2000.0 | 0.422 |
| Yerba Mate 8% (non-polar active ingredient) | 0.02110 | 20.0 | 0.004 |
| Ginkgo Biloba 24/6 (non-polar active ingredient) | 0.0158228 | 15.0 | 0.003 |
| Ginseng Panax (7% HPLC, Red Korean Ginseng) (JIA Herb) (non-polar active ingredient) | 0.03165 | 30.0 | 0.006 |
| Vitamin B1 (Thiamine) + 5% (non-polar active ingredient) | 0.00068 | 0.64 | 0.00014 |
| Vitamin B3 (Niacin/Niacinamide) + 5% (non-polar active ingredient) | 0.00886 | 8.4 | 0.002 |
| Vitamin B5 (Pantothenic Acid) + 5% (non-polar active ingredient) | 0.00559 | 5.3 | 0.001 |
| Vitamin B6 + 5% (non-polar active ingredient) | 0.00148 | 1.4 | 0.0003 |

TABLE 59-continued

Blueberry Pomegranate Water

| Ingredient | g per batch | mg per serving | Percent (by weight) |
| --- | --- | --- | --- |
| Vitamin B12 + >5% (non-polar active ingredient) | 0.00000274 | 0.0026 | 0.0000005 |
| Blueberry Pomegranate (DABJ831) (flavor) | 0.39947 | 378.7 | 0.080 |
| Sucralose (sweetener) | 0.08175 | 77.5 | 0.016 |
| Citric Acid (stabilizer) | 3.34916 | 3175.0 | 0.6698 |
| Potassium Bicarbonate (stabilizer) | 3.48101 | 3300.0 | 0.696 |
| Total | 500 | 474000 | 100 | d. Grape Water

Table 60 below sets forth the ingredients to make an 500 g batch (16 oz. serving size) of Grape flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate, *Ginkgo biloba* and ginseng.

TABLE 60

Grape Water

| Ingredient | g per batch | mg per serving | Percent (by weight) |
| --- | --- | --- | --- |
| Water | 490.17232 | 464683.3574 | 98.034 |
| Vitamin D3 concentrate (100,000 IU/g) (non-polar active ingredient) | 0.01097 | 10.4 | 0.002 |
| Fish Oil Concentrate (Omega-3, 2% EPA DHA) (non-polar active ingredient) | 2.10970 | 2000.0 | 0.422 |
| Yerba Mate 8% (non-polar active ingredient) | 0.02110 | 20.0 | 0.004 |
| Ginkgo Biloba 24/6 (non-polar active ingredient) | 0.0158228 | 15.0 | 0.003 |
| Ginseng Panax (7% HPLC, Red Korean Ginseng) (JIA Herb) (non-polar active ingredient) | 0.03165 | 30.0 | 0.006 |
| Vitamin B1 (Thiamine) + 5% (non-polar active ingredient) | 0.00068 | 0.64 | 0.00014 |
| Vitamin B3 (Niacin/Niacinamide) + 5% (non-polar active ingredient) | 0.00886 | 8.4 | 0.002 |
| Vitamin B5 (Pantothenic Acid) + 5% (non-polar active ingredient) | 0.00559 | 5.3 | 0.001 |
| Vitamin B6 + 5% (non-polar active ingredient) | 0.00148 | 1.4 | 0.0003 |
| Vitamin B12 + >5% (non-polar active ingredient) | 0.00000274 | 0.0026 | 0.0000005 |
| Grape Muscat (DABJ830) (flavor) | 0.70992 | 673.000 | 0.142 |
| Sucralose (sweetener) | 0.08175 | 77.5 | 0.016 |
| Citric Acid (stabilizer) | 3.34916 | 3175.0 | 0.6698 |
| Potassium Bicarbonate (stabilizer) | 3.48101 | 3300.0 | 0.696 |
| Total | 500 | 474000 | 100 | e. Orange Tangerine Water

Table 61 below sets forth the ingredients to make an 500 g batch (16 oz. serving size) of Orange Tangerine flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate, *Ginkgo biloba* and ginseng.

TABLE 61

Orange Tangerine Water

| Ingredient | g per batch | mg per serving | Percent (by weight) |
| --- | --- | --- | --- |
| Water | 490.00228 | 464522.1574 | 98.000 |
| Vitamin D3 concentrate (100,000 IU/g) (non-polar active ingredient) | 0.01097 | 10.4 | 0.002 |

TABLE 61-continued

Orange Tangerine Water

| Ingredient | g per batch | mg per serving | Percent (by weight) |
|---|---|---|---|
| Fish Oil Concentrate (Omega-3, 2% EPA DHA) (non-polar active ingredient) | 2.10970 | 2000.0 | 0.422 |
| Yerba Mate 8% (non-polar active ingredient) | 0.02110 | 20.0 | 0.004 |
| Ginkgo Biloba 24/6 (non-polar active ingredient) | 0.0158228 | 15.0 | 0.003 |
| Ginseng Panax (7% HPLC, Red Korean Ginseng) (JIA Herb) (non-polar active ingredient) | 0.03165 | 30.0 | 0.006 |
| Vitamin B1 (Thiamine) + 5% (non-polar active ingredient) | 0.00068 | 0.64 | 0.00014 |
| Vitamin B3 (Niacin/Niacinamide) + 5% (non-polar active ingredient) | 0.00886 | 8.4 | 0.002 |
| Vitamin B5 (Pantothenic Acid) + 5% (non-polar active ingredient) | 0.00559 | 5.3 | 0.001 |
| Vitamin B6 + 5% (non-polar active ingredient) | 0.00148 | 1.4 | 0.0003 |
| Vitamin B12 + >5% (non-polar active ingredient) | 0.00000274 | 0.0026 | 0.0000005 |
| Orange Tangerine (DABJ326) (flavor) | 0.72838 | 690.5 | 0.146 |
| Sucralose (sweetener) | 0.08175 | 77.5 | 0.016 |
| Citric Acid (stabilizer) | 3.34916 | 3175.0 | 0.6698 |
| Potassium Bicarbonate (stabilizer) | 3.48101 | 3300.0 | 0.696 |
| Total | 500 | 474000 | 100 | e. Flavored Water Example

Table 62 below sets forth the ingredients to make an 500 g batch (16 oz. serving size) of a flavored water example containing 40 mg EPA DHA, 100% RDI of vitamins B5, B6 and B12, 50% RDI of vitamins B1 and B3 and 1,000 IU Vitamin D3, per 16 ounce serving, and additionally containing *Ginkgo biloba*. The flavors can be selected to generate a desired flavored water.

The water is generated by adding to an appropriate size tank, the ingredients in the table below in the following order: water, sucralose, xylitol, citric acid, flavors, all vitamins, vitamin D3 concentrate, bicarbonate and fish oil concentrate (see Table 6B) and stirring to dissolve while heating. The water can then be hot filled using standard FDA/ISO methods or cooled down and cold filled. The bottle and cap can be injected with approximately 0.09 g liquid nitrogen (ISO100 sterilization) prior to cold filling. In addition, approximately 0.09 g liquid nitrogen can be added to the head space to remove oxygen followed by capping.

TABLE 62

Flavored Water Example

| Ingredient | g per batch | mg per serving | Percent (by weight) |
|---|---|---|---|
| Water | 970.57312 | 460051.65740 | 97.057 |
| Vitamin D3 concentrate (100,000 IU/g) (non-polar active ingredient) | 0.02194 | 10.40000 | 0.002 |
| Fish Oil Concentrate (Omega-3, 2% EPA DHA, 42 mg EPA DHA) (non-polar active ingredient) | 4.21941 | 2000.00000 | 0.422 |
| Ginkgo Biloba 24/6 (non-polar active ingredient) | 0.0316456 | 15.00000 | 0.003 |
| Vitamin B1 (Thiamine) + 5% (non-polar active ingredient) | 0.00135 | 0.64000 | 0.000 |
| Vitamin B3 (Niacin/Niacinamide) + 5% (non-polar active ingredient) | 0.01772 | 8.40000 | 0.002 |
| Vitamin B5 (Pantothenic Acid) + 5% (non-polar active ingredient) | 0.01118 | 5.30000 | 0.001 |
| Vitamin B6 + 5% (non-polar active ingredient) | 0.00295 | 1.40000 | 0.000 |
| Vitamin B12 + >5% (non-polar active ingredient) | 0.00001 | 0.00260 | 0.000 |
| Flavor 1 (flavor) | 1.27532 | 604.50000 | 0.128 |
| Flavor 2 (flavor) | 0.10696 | 50.70000 | 0.011 |
| Sucralose (sweetener) | 0.07806 | 37.00000 | 0.008 |
| Xylitol (sweetener) | 10.00000 | 4740.00000 | 1.000 |
| Citric Acid (stabilizer) | 6.69831 | 3175.00000 | 0.6698 |
| Potassium Bicarbonate (stabilizer) | 6.96203 | 3300.00000 | 0.696 |
| Total | 1000 | 474000 | 100 |

B. Base Beverage

Table 63 below sets forth the ingredients to make an 3100 g batch (16 oz. serving size) of base beverage containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate and *Ginkgo biloba*.

TABLE 63

Base Beverage

| Ingredient | g per batch | mg per serving | Percent (by weight) |
|---|---|---|---|
| Water | 3048.94978 | 466194.2574 | 98.353 |
| Vitamin D3 concentrate (100,000 IU/g) (non-polar active ingredient) | 0.06802 | 10.4 | 0.002 |
| Fish Oil Concentrate (Omega-3, 2% EPA DHA) (non-polar active ingredient) | 13.08017 | 2000.0 | 0.422 |
| Yerba Mate 8% (non-polar active ingredient) | 0.13080 | 20.0 | 0.004 |
| Ginkgo Biloba 24/6 (non-polar active ingredient) | 0.0981013 | 15.0 | 0.003 |
| Vitamin B1 (Thiamine) + 5% (non-polar active ingredient) | 0.00419 | 0.64 | 0.00014 |
| Vitamin B3 (Niacin/Niacinamide) + 5% (non-polar active ingredient) | 0.05494 | 8.4 | 0.002 |
| Vitamin B5 (Pantothenic Acid) + 5% (non-polar active ingredient) | 0.03466 | 5.3 | 0.001 |
| Vitamin B6 + 5% (non-polar active ingredient) | 0.00916 | 1.4 | 0.0003 |
| Vitamin B12 + >5% (non-polar active ingredient) | 0.00002 | 0.0026 | 0.0000005 |
| Citric Acid (stabilizer) | 15.98789 | 3175.0 | 0.5157 |
| Potassium Bicarbonate (stabilizer) | 21.58228 | 3300.0 | 0.696 |
| Total | 31000 | 474000 | 100 |

C. Flavored Waters Containing Stevia

Tables 64-67 set forth ingredients to make waters containing stevia and xylitol as sweeteners.

a. Blueberry Pomegranate Flavored Water

Table 64 below sets forth the ingredients to make an 3100 g batch (16 oz. serving size) of Blackberry flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate and *Ginkgo biloba*.

TABLE 64

Blackberry Flavored Water

| Ingredient | g per batch | mg per serving | Percent (by weight) |
|---|---|---|---|
| Water | 291.10914 | 459952.4574 | 97.036 |
| Vitamin D3 concentrate (100,000 IU/g) (non-polar active ingredient) | 0.00658 | 10.4 | 0.002 |
| Fish Oil Concentrate (Omega-3, 2% EPA DHA) (non-polar active ingredient) | 1.26582 | 2000.0 | 0.422 |
| Yerba Mate 8% (non-polar active ingredient) | 0.01266 | 20.0 | 0.004 |
| Ginkgo Biloba 24/6 (non-polar active ingredient) | 0.0094937 | 15.0 | 0.003 |
| Vitamin B1 (Thiamine) + 5% (non-polar active ingredient) | 0.00041 | 0.64 | 0.00014 |
| Vitamin B3 (Niacin/Niacinamide) + 5% (non-polar active ingredient) | 0.00532 | 8.4 | 0.002 |
| Vitamin B5 (Pantothenic Acid) + 5% (non-polar active ingredient) | 0.00335 | 5.3 | 0.001 |
| Vitamin B6 + 5% (non-polar active ingredient) | 0.00089 | 1.4 | 0.0003 |
| Vitamin B12 + >5% (non-polar active ingredient) | 0.0000016 | 0.0026 | 0.0000005 |

TABLE 64-continued

Blackberry Flavored Water

| Ingredient | g per batch | mg per serving | Percent (by weight) |
|---|---|---|---|
| Blackberry (125-00875) (flavor) | 0.23203 | 366.6 | 0.077 |
| Stevia Leaf Powder Extract (sweetener) | 0.05114 | 137.0 | 0.017 |
| Xylitol (sweetener) | 3.20506 | 80.8 | 1.068 |
| Citric Acid (stabilizer) | 2.00949 | 3175.0 | 0.6698 |
| Potassium Bicarbonate (stabilizer) | 2.08861 | 3300.0 | 0.696 |
| Total | 300 | 474000 | 100 | b. Orange Flavored Water

Table 65 below sets forth the ingredients to make an 3100 g batch (16 oz. serving size) of Orange flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate and *Ginkgo biloba*.

TABLE 65

Orange Flavored Water

| Ingredient | g per batch | mg per serving | Percent (by weight) |
|---|---|---|---|
| Water | 291.13554 | 459994.1574 | 97.045 |
| Vitamin D3 concentrate (100,000 IU/g) (non-polar active ingredient) | 0.00658 | 10.4 | 0.002 |
| Fish Oil Concentrate (Omega-3, 2% EPA DHA) (non-polar active ingredient) | 1.26582 | 2000.0 | 0.422 |
| Yerba Mate 8% (non-polar active ingredient) | 0.01266 | 20.0 | 0.004 |
| Ginkgo Biloba 24/6 (non-polar active ingredient) | 0.0094937 | 15.0 | 0.003 |
| Vitamin B1 (Thiamine) + 5% (non-polar active ingredient) | 0.00041 | 0.64 | 0.00014 |
| Vitamin B3 (Niacin/Niacinamide) + 5% (non-polar active ingredient) | 0.00532 | 8.4 | 0.002 |
| Vitamin B5 (Pantothenic Acid) + 5% (non-polar active ingredient) | 0.00335 | 5.3 | 0.001 |
| Vitamin B6 + 5% (non-polar active ingredient) | 0.00089 | 1.4 | 0.0003 |
| Vitamin B12 + >5% (non-polar active ingredient) | 0.0000016 | 0.0026 | 0.0000005 |
| Fresh Orange (L-17283) (flavor) | 0.09722 | 153.6 | 0.032 |
| Blood Orange (L-17281) (flavor) | 0.10842 | 171.3 | 0.036 |
| Stevia Leaf Powder Extract (sweetener) | 0.05114 | 137.0 | 0.017 |
| Xylitol (sweetener) | 3.20506 | 80.8 | 1.068 |
| Citric Acid (stabilizer) | 2.00949 | 3175.0 | 0.6698 |
| Potassium Bicarbonate (stabilizer) | 2.08861 | 3300.0 | 0.696 |
| Total | 300 | 474000 | 100 | c. Lime Flavored Water

Table 66 below sets forth the ingredients to make an 3100 g batch (16 oz. serving size) of Lime flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate and *Ginkgo biloba*.

TABLE 66

Lime Flavored Water

| Ingredient | g per batch | mg per serving | Percent (by weight) |
|---|---|---|---|
| Water | 291.18491 | 460072.1574 | 97.062 |
| Vitamin D3 concentrate (100,000 IU/g) (non-polar active ingredient) | 0.00658 | 10.4 | 0.002 |
| Fish Oil Concentrate (Omega-3, 2% EPA DHA) (non-polar active ingredient) | 1.26582 | 2000.0 | 0.422 |

TABLE 66-continued

| Lime Flavored Water | | | |
|---|---|---|---|
| Ingredient | g per batch | mg per serving | Percent (by weight) |
| Yerba Mate 8% (non-polar active ingredient) | 0.01266 | 20.0 | 0.004 |
| Ginkgo Biloba 24/6 (non-polar active ingredient) | 0.0094937 | 15.0 | 0.003 |
| Vitamin B1 (Thiamine) + 5% (non-polar active ingredient) | 0.00041 | 0.64 | 0.00014 |
| Vitamin B3 (Niacin/Niacinamide) + 5% (non-polar active ingredient) | 0.00532 | 8.4 | 0.002 |
| Vitamin B5 (Pantothenic Acid) + 5% (non-polar active ingredient) | 0.00335 | 5.3 | 0.001 |
| Vitamin B6 + 5% (non-polar active ingredient) | 0.00089 | 1.4 | 0.0003 |
| Vitamin B12 + >5% (non-polar active ingredient) | 0.0000016 | 0.0026 | 0.0000005 |
| Lime (L-8314) (flavor) | 0.15899 | 251.2 | 0.053 |
| Stevia Leaf Powder Extract (sweetener) | 0.04842 | 76.5 | 0.016 |
| Xylitol (sweetener) | 3.20506 | 5064.0 | 1.068 |
| Citric Acid (stabilizer) | 2.00949 | 3175.0 | 0.6698 |
| Potassium Bicarbonate (stabilizer) | 2.08861 | 3300.0 | 0.696 |
| Total | 300 | 474000 | 100 | d. Peach Flavored Water

Table 67 below sets forth the ingredients to make an 3100 g batch (16 oz. serving size) of Peach flavored water containing 40 mg EPA DHA, 100% RDI of vitamins B5, B6 and B12, 50% RDI of vitamins B1 and B3 and 1,000 IU Vitamin D3, per 16 ounce serving, and additionally containing yerba mate and *Ginkgo biloba*.

TABLE 67

| Peach Flavored Water | | | |
|---|---|---|---|
| Ingredient | g per batch | mg per serving | Percent (by weight) |
| Water | 291.18662 | 460074.8574 | 97.062 |
| Vitamin D3 concentrate (100,000 IU/g) (non-polar active ingredient) | 0.00658 | 10.4 | 0.002 |
| Fish Oil Concentrate (Omega-3, 2% EPA DHA) (non-polar active ingredient) | 1.26582 | 2000.0 | 0.422 |
| Yerba Mate 8% (non-polar active ingredient) | 0.01266 | 20.0 | 0.004 |
| Ginkgo Biloba 24/6 (non-polar active ingredient) | 0.0094937 | 15.0 | 0.003 |
| Vitamin B1 (Thiamine) + 5% (non-polar active ingredient) | 0.00041 | 0.64 | 0.00014 |
| Vitamin B3 (Niacin/Niacinamide) + 5% (non-polar active ingredient) | 0.00532 | 8.4 | 0.002 |
| Vitamin B5 (Pantothenic Acid) + 5% (non-polar active ingredient) | 0.00335 | 5.3 | 0.001 |
| Vitamin B6 + 5% (non-polar active ingredient) | 0.00089 | 1.4 | 0.0003 |
| Vitamin B12 + >5% (non-polar active ingredient) | 0.0000016 | 0.0026 | 0.0000005 |
| Peach (PH-147) (flavor) | 0.17025 | 269.0 | 0.057 |
| Stevia Leaf Powder Extract (sweetener) | 0.03544 | 56.0 | 0.012 |
| Xylitol (sweetener) | 3.20506 | 5064.0 | 1.068 |
| Citric Acid (stabilizer) | 2.00949 | 3175.0 | 0.6698 |
| Potassium Bicarbonate (stabilizer) | 2.08861 | 3300.0 | 0.696 |
| Total | 300 | 474000 | 100 |

Since modifications will be apparent to those of skill in this art, it is intended that this invention be limited only by the scope of the appended claims.

The invention claimed is:

1. A beverage composition, comprising:
   a) a bicarbonate or carbonate in an amount between at or about 0.1% and at or about 5%, inclusive, by weight, of the composition;
   b) an ingestible acid in an amount between at or about 0.5% and at or about 5%, inclusive, by weight, of the composition;

c) an antioxidant in an amount between about 0.01% and about 3%, inclusive, by weight, of the composition;

d) a beverage base in an amount at least about 50%, by weight, of the composition;

e) one or a mixture of non-polar compounds selected from among polyunsaturated fatty acids, omega-3 fatty acids, omega-6 fatty acids, omega-9 fatty acids, conjugated fatty acids, coenzyme Q-containing compounds, alpha lipoic acid, carotenoid-containing compounds, phytosterols and resveratrol in an amount between 0.05% and 15%, inclusive, by weight, of the composition; and f) a pH adjuster in an amount between about 0.1% and at or about 3%, by weight of the composition, whereby:

the total amount of ingestible acid and pH adjuster in the composition is between about 0.6% and about 8%, by weight, of the composition; and the pH of the composition is between about 2.0 to about 4.0, whereby the organoleptic properties of the beverage composition containing the one or mixture of non-polar compounds are the same or about the same, for at least a month, as the organoleptic properties of the beverage composition in the absence of the one or more non-polar compounds.

2. The beverage composition of claim 1, wherein the antioxidant is selected from ascorbic acid, ascorbate or a coenzyme Q-containing compound.

3. The beverage composition of claim 2, wherein the antioxidant is ascorbic acid.

4. The beverage composition of claim 1, wherein the bicarbonate or carbonate is selected from among potassium bicarbonate, sodium bicarbonate, potassium carbonate, sodium carbonate, calcium carbonate, magnesium carbonate and zinc carbonate.

5. The beverage composition of claim 1, wherein the ingestible acid of b), and the pH adjuster of f) each independently is selected from among citric acid, phosphoric acid, adipic acid, ascorbic acid, lactic acid, malic acid, fumaric acid, gluconic acid, succinic acid, tartaric acid and maleic acid.

6. The beverage composition of claim 1, wherein the ingestible acid is citric acid.

7. The beverage composition of claim 6, wherein the citric acid is present in an amount between at or about 0.5% and at or about 4%, inclusive, by weight, of the composition.

8. The beverage composition of claim 1, wherein the non-polar compound(s) is a polyunsaturated fatty acid that is selected from among omega-3 fatty acids, omega-6 fatty acids, omega-9 fatty acids and conjugated fatty acids.

9. The beverage composition of claim 1, wherein the non-polar compound(s) contain(s) a polyunsaturated fatty acid selected from among a docosahexaenoic acid (DHA), an eicosapentaenoic acid (EPA), a fish oil, an algal oil, a flaxseed oil, a borage oil, an alpha-linolenic acid (ALA), a gamma-linolenic acid (GLA), a conjugated linoleic acid (CLA), an oleic acid and a saw palmetto extract.

10. The beverage composition of claim 1, wherein the non-polar compound(s) is selected from among coenzyme Q-containing compounds, alpha lipoic acid, carotenoid-containing compounds and phytochemicals.

11. The beverage composition of claim 1, wherein the non-polar compound(s) comprise(s) one or more of:

a coenzyme Q10 (CoQ10);

a carotenoid-containing compound that is selected from among lycopene, lutein, zeaxanthin and mixtures of lutein and zeaxanthin; and a phytochemical-containing compound that is selected from among phytosterols and resveratrol.

12. The beverage composition of claim 1, wherein the beverage base contains one or more of water, a juice, a juice concentrate, a juice extract or a flavor, or combinations thereof.

13. The beverage composition of claim 1, wherein the beverage base is present in an amount between at or about 55% and at or about 99%, by weight, of the composition.

14. The beverage composition of claim 1, further comprising a sweetener.

15. The beverage composition of claim 14, wherein the sweetener is selected from among sucralose, sucrose, lactose, fructose, an acesulfame salt, aspartame, saccharin, stevia, stevioside, and combinations thereof.

16. The beverage composition of claim 1, comprising:

a bicarbonate in an amount between at or about 0.1% and at or about 2%, inclusive, by weight, of the composition;

citric acid in an amount between at or about 0.5% and at or about 2.5%, inclusive, by weight, of the composition; and one or a mixture of non-polar compounds selected from among fish oil and flaxseed oil, in an amount between at or about 0.1% and at or about 2%, inclusive, by weight, of the composition.

17. The beverage composition of claim 1, comprising:

a bicarbonate in an amount between at or about 0.5% and at or about 2%, inclusive, by weight, of the composition;

citric acid in an amount between at or about 0.5% and at or about 2.5%, inclusive, by weight, of the composition; and one or a mixture of non-polar compounds selected from among fish oil and resveratrol in an amount between at or about 0.1% and at or about 1%, inclusive, by weight, of the composition.

18. The beverage composition of claim 1, wherein the beverage base comprises flavored water.

19. The beverage composition of claim 1, wherein the beverage base comprises between about 80% to about 99%, by weight, of the composition.

20. The beverage composition of claim 1, wherein the beverage base comprises at least about 97%, by weight, of the composition.

21. The beverage composition of claim 1, wherein the beverage base comprises water.

22. A container, comprising the composition of claim 1 sealed in nitrogen.

23. The beverage composition of claim 1, wherein the pH adjuster is phosphoric acid.

24. The beverage composition of claim 1, wherein the pH adjuster is citric acid.

25. The beverage composition of claim 1, wherein the pH adjuster is present in an amount less than about 1.5%, by weight, of the composition.

26. The beverage composition of claim 1, wherein the amount of bicarbonate or carbonate in the composition is between about 0.3% and about 1.8%.

27. The beverage composition of claim 1, wherein the beverage base is present in an amount of at least about 95%, by weight, of the composition.

28. The beverage composition of claim 1, comprising a surfactant in an amount between about 0.05% and about 2.2%, by weight, of the composition.

29. A beverage composition, comprising in a beverage base:

at least 0.05% up to and including 15% or about 15%, by weight, of one or a mixture of non-polar compounds selected from among polyunsaturated fatty acids, omega-3 fatty acids, omega-6 fatty acids, omega-9 fatty acids, conjugated fatty acids, coenzyme Q-containing compounds, oil soluble vitamins, alpha lipoic acid, carotenoid-containing compounds, phytosterols, resveratrol and micronutrients; and a mixture of a bicarbonate or carbonate, an ingestible acid and an antioxidant, whereby the organoleptic properties of the beverage composition containing the one or a mixture of non-polar compounds are the same or about the same as the organoleptic properties of the beverage composition in the absence of the one or a mixture of non-polar compounds for at least at or about 1 month, wherein:

the beverage composition is for direct ingestion;

the beverage base comprises at least 50%, by weight, or at least about 50%, by weight, of the composition;

the bicarbonate or carbonate is present in an amount between at or about 0.01% and at or about 7%, inclusive, by weight, of the composition;

the ingestible acid is present in an amount between at or about 0.01% and at or about 5%, inclusive, by weight, of the composition; and the antioxidant is present in an amount between at or about 0.01% and at or about 3%, inclusive, by weight, of the composition.

\* \* \* \* \*